US012784467B2

(12) United States Patent
Nabatame et al.

(10) Patent No.: US 12,784,467 B2
(45) Date of Patent: Nov. 3, 2026

(54) PARKING-SLOT LEARNING METHOD AND APPARATUS

(71) Applicants: DENSO CORPORATION, Kariya-city (JP); TOYOTA JIDOSHA KABUSHIKI KAISHA, Toyota (JP); J-QuAD DYNAMICS Inc., Tokyo (JP)

(72) Inventors: Shinya Nabatame, Kariya-city (JP); Kenji Kaneko, Kariya-city (JP); Masaya Takatsuji, Tokyo (JP); Suguru Sakai, Tokyo (JP)

(73) Assignees: DENSO CORPORATION, Kariya-city (JP); TOYOTA JIDOSHA KABUSHIKI KAISHA, Toyota (JP); J-QuAD DYNAMICS Inc., Tokyo (JP)

( * ) Notice: Subject to any disclaimer, the term of this patent is extended or adjusted under 35 U.S.C. 154(b) by 0 days.

(21) Appl. No.: 18/900,204

(22) Filed: Sep. 27, 2024

(65) Prior Publication Data

US 2025/0111683 A1 Apr. 3, 2025

(30) Foreign Application Priority Data

Sep. 28, 2023 (JP) ................................ 2023-168680

(51) Int. Cl.
*G06V 20/58* (2022.01)
*G06V 10/44* (2022.01)
(Continued)

(52) U.S. Cl.
CPC ............ *G06V 20/586* (2022.01); *G06V 10/44* (2022.01); *G06V 10/70* (2022.01); *B60W 30/06* (2013.01)

(58) Field of Classification Search
CPC ...... G06V 20/58; G06V 20/586; G06V 10/34; G06V 10/44; G06V 10/70; G06V 10/82;
(Continued)

(56) References Cited

U.S. PATENT DOCUMENTS

| | | | | |
|---|---|---|---|---|
| 11,958,497 B2 * | 4/2024 | Obara | H04L 12/40 | |
| 2007/0142169 A1 * | 6/2007 | Marcil | B60Q 5/006 | 477/107 |

(Continued)

FOREIGN PATENT DOCUMENTS

| | | |
|---|---|---|
| JP | 2010-210477 A | 9/2010 |
| JP | 2015-64797 A | 4/2015 |

(Continued)

*Primary Examiner* — Van T Trieu
(74) *Attorney, Agent, or Firm* — Precision Patents, P.C.

(57) ABSTRACT

A processor of an apparatus for learning a recognition rule of at least one parking slot around a vehicle is configured to execute learning program instructions to accordingly objectify at least one parking slot at least partly included in a learning image as an at least one objectified parking slot comprised of (i) a plurality of corner points of the at least one parking slot, (ii) a center point of the at least one parking slot; and (iii) attribute information on the at least one parking slot. The processor is configured to execute learning program instructions to accordingly generate annotation data for the objectified at least one parking slot, and execute, from the learning image, learning of a recognition rule of the at least one parking slot based on the generated annotation data for the objectified at least one parking slot.

20 Claims, 90 Drawing Sheets

(51) Int. Cl.
*G06V 10/70* (2022.01)
*B60W 30/06* (2006.01)

(58) Field of Classification Search
CPC ...... B60W 10/04; B60W 30/00; B60W 30/06; B60W 30/14; B60W 30/146; B60W 30/18; B60W 50/14
See application file for complete search history.

(56) References Cited

U.S. PATENT DOCUMENTS

| | | | | |
|---|---|---|---|---|
| 2019/0325595 | A1 | 10/2019 | Stein et al. | |
| 2021/0118161 | A1 | 4/2021 | Stein et al. | |
| 2021/0179078 | A1 * | 6/2021 | Nakada | G06V 20/586 |
| 2023/0256967 | A1 * | 8/2023 | Sakai | B60W 40/02 |
| 2024/0029448 | A1 * | 1/2024 | Li | G06V 10/44 |
| 2024/0161622 | A1 | 5/2024 | Stein et al. | |
| 2024/0227785 | A1 * | 7/2024 | Wang | G06V 20/586 |

FOREIGN PATENT DOCUMENTS

| | | | |
|---|---|---|---|
| JP | 2015-101276 | A | 6/2015 |
| JP | 2015-140699 | A | 8/2015 |
| JP | 2021-140699 | A | 9/2021 |
| JP | 2023-154553 | A | 10/2023 |
| JP | 2025-001700 | A | 1/2025 |
| WO | 2021/095354 | A1 | 5/2021 |
| WO | 2021/138619 | A2 | 7/2021 |

* cited by examiner

CENTER: Offset X

Ec1

| | | |
|---|---|---|
| 0.2 | 0 | 0 |
| 0 | 0.5 | 0 |
| 0 | 0 | 0 |

Ecv

CENTER:Offset Y

FIG.39

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 1 | 0 | 0 | 0 | 0 |
| 0 | 0 | 0 | 0 | 0 | 0 | 1 | 0 | 0 | 0 |
| 0 | 0 | 0 | 0 | 0 | 0 | 0 | 1 | 0 | 0 |
| 0 | 1 | 0 | 0 | 0 | 0 | 0 | 0 | 0 | 0 |
| 0 | 1 | 0 | 0 | 0 | 0 | 0 | 0 | 1 | 0 |
| 0 | 0 | 0 | 0 | 0 | 0 | 0 | 0 | 0 | 1 |
| 0 | 0 | 1 | 0 | 0 | 0 | 0 | 0 | 0 | 0 |
| 0 | 0 | 0 | 1 | 0 | 0 | 0 | 0 | 0 | 0 |
| 0 | 0 | 0 | 0 | 0 | 0 | 0 | 0 | 0 | 0 |

Ec1 Ecv

CENTER : Responsible

FIG.40

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0.1 | 0 | 0 | 0 | 0 |
| 0 | 0 | 0 | 0 | 0 | 0 | 0.5 | 0 | 0 | 0 |
| 0 | 0 | 0 | 0 | 0 | 0 | 0 | 0.4 | 0 | 0 |
| 0 | 0.5 | 0 | 0 | 0 | 0 | 0 | 0 | 0 | 0 |
| 0 | 0.2 | 0 | 0 | 0 | 0 | 0 | 0 | 0.1 | 0 |
| 0 | 0 | 0 | 0 | 0 | 0 | 0 | 0 | 0 | 0.2 |
| 0 | 0 | 0.5 | 0 | 0 | 0 | 0 | 0 | 0 | 0 |
| 0 | 0 | 0 | 0.4 | 0 | 0 | 0 | 0 | 0 | 0 |
| 0 | 0 | 0 | 0 | 0 | 0 | 0 | 0 | 0 | 0 |

Ec1

Ecv

CENTER: Offset X

FIG.41

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0.1 | 0 | 0 | 0 | 0 |
| 0 | 0 | 0 | 0 | 0 | 0 | 0.2 | 0 | 0 | 0 |
| 0 | 0 | 0 | 0 | 0 | 0 | 0 | 0.3 | 0 | 0 |
| 0 | 0.1 | 0 | 0 | 0 | 0 | 0 | 0 | 0 | 0 |
| 0 | 0.4 | 0 | 0 | 0 | 0 | 0 | 0 | 0.2 | 0 |
| 0 | 0 | 0 | 0 | 0 | 0 | 0 | 0 | 0 | 0.1 |
| 0 | 0 | 0.2 | 0 | 0 | 0 | 0 | 0 | 0 | 0 |
| 0 | 0 | 0 | 0.6 | 0 | 0 | 0 | 0 | 0 | 0 |
| 0 | 0 | 0 | 0 | 0 | 0 | 0 | 0 | 0 | 0 |

Ec1 Ecv

CENTER:Offset Y

FIG.50

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 1 | 0 | 0 | 0 | 0 |
| 0 | 0 | 0 | 0 | 0 | 0 | 1 | 0 | 0 | 0 |
| 0 | 0 | 0 | 0 | 0 | 0 | 0 | 1 | 0 | 0 |
| 0 | 1 | 0 | 0 | 0 | 0 | 0 | 0 | 0 | 0 |
| 0 | 1 | 0 | 0 | 0 | 0 | 0 | 0 | 1 | 0 |
| 0 | 0 | 0 | 0 | 0 | 0 | 0 | 0 | 0 | 1 |
| 0 | 0 | 1 | 0 | 0 | 0 | 0 | 0 | 0 | 0 |
| 0 | 0 | 0 | 1 | 0 | 0 | 0 | 0 | 0 | 0 |
| 0 | 0 | 0 | 0 | 0 | 0 | 0 | 0 | 0 | 0 |

Ec3 Ecv

Left Line

FIG.51

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 1 | 0 | 0 | 0 | 0 |
| 0 | 0 | 0 | 0 | 0 | 0 | 1 | 0 | 0 | 0 |
| 0 | 0 | 0 | 0 | 0 | 0 | 0 | 1 | 0 | 0 |
| 0 | 1 | 0 | 0 | 0 | 0 | 0 | 0 | 0 | 0 |
| 0 | 1 | 0 | 0 | 0 | 0 | 0 | 0 | 1 | 0 |
| 0 | 0 | 0 | 0 | 0 | 0 | 0 | 0 | 0 | 1 |
| 0 | 0 | 1 | 0 | 0 | 0 | 0 | 0 | 0 | 0 |
| 0 | 0 | 0 | 1 | 0 | 0 | 0 | 0 | 0 | 0 |
| 0 | 0 | 0 | 0 | 0 | 0 | 0 | 0 | 0 | 0 |

Ec3

Ecv

Right Line

FIG.78

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

Ec4 Ecv

FIG.79

| | | | | | | | | | |
|---|---|---|---|---|---|---|---|---|---|
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |

Ec4 Ecv

FIG.82

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 1 | 0 | 0 | 0 | 0 |
| 0 | 0 | 0 | 0 | 0 | 0 | 1 | 0 | 0 | 0 |
| 0 | 0 | 0 | 0 | 0 | 0 | 0 | 1 | 0 | 0 |
| 0 | 1 | 0 | 0 | 0 | 0 | 0 | 0 | 0 | 0 |
| 0 | 1 | 0 | 0 | 0 | 0 | 0 | 0 | 1 | 0 |
| 0 | 0 | 0 | 0 | 0 | 0 | 0 | 0 | 0 | 1 |
| 0 | 0 | 1 | 0 | 0 | 0 | 0 | 0 | 0 | 0 |
| 0 | 0 | 0 | 1 | 0 | 0 | 0 | 0 | 0 | 0 |
| 0 | 0 | 0 | 0 | 0 | 0 | 0 | 0 | 0 | 0 |

Ec5

Ecv

WHEEL STOPPER ENCODING

ADDITIONAL ATTRIBUTE INFORMATION ENCODING

PARKING-SLOT LEARNING METHOD AND APPARATUS

CROSS REFERENCE TO RELATED APPLICATION

This application is based on and claims the benefit of priority from Japanese Patent Application No. 2023-168680 filed on Sep. 28, 2023, the disclosure of which is incorporated in its entirety herein by reference.

TECHNICAL FIELD

The present disclosure relates to parking-slot learning methods and apparatuses.

BACKGROUND

Research and development for drive assist technologies and/or autonomous driving technologies has been proceeding actively. Various types of proposals related to the drive assist technologies and/or autonomous driving technologies have been carried out, one of which is disclosed in Internal Patent Publication WO 2019/202397.

Drive assist technologies aim to reduce driver's load to enable drivers to drive vehicles comfortably and safely. These drive assist technologies include, for example, technologies related to following distance control, lane keeping assist control, lane-change assist control, parking assist control, obstacle warning, collision-avoidance assist control, or other vehicle-control technologies. These autonomous driving technologies aim to cause vehicles to automatically, i.e., autonomously, travel without the need of driver's driving operations. Various sensing devices, such as cameras and/or radar devices, are installed in a vehicle with such drive assist technologies and/or drive assist technologies. The various sensing devices are configured to detect surrounding situations around the vehicle. Autonomous control operations, such as autonomous steering, autonomous driving, and/or autonomous braking, of a traveling autonomous vehicle are carried out based on, for example, the surrounding situations detected by the sensing devices and/or map information indicative of a visual representation of a region around the current location of the autonomous vehicle. In particular, the autonomous control operations of a traveling autonomous vehicle can be carried out using high-accuracy map information including road data of each lane around the autonomous vehicle, making it possible to improve the safety and reliability of the autonomous control operations of the traveling autonomous vehicle.

SUMMARY

Research and development for these autonomous driving technologies and drive assist technologies has been accelerating recently in view of accuracy improvement of object detection and/or object recognition by sensing devices and improvement of user's convenience. That is, a further improvement of these autonomous driving technologies and drive assist technologies enables the earlier and wider spread of advanced driving assistance vehicles and/or autonomous driving vehicles.

In view of the above circumstances, the present disclosure provides an apparatus for learning a recognition rule of at least one parking slot around a vehicle. The apparatus include a memory device storing learning program instructions, and a processor configured to execute the learning program instructions to accordingly objectify at least one parking slot at least partly included in a learning image as an at least one objectified parking slot comprised of (i) a plurality of corner points of the at least one parking slot, (ii) a center point of the at least one parking slot, and (iii) attribute information on the at least one parking slot. The processor is configured to execute the learning program instructions to generate annotation data for the objectified at least one parking slot, and execute, from the learning image, learning of a recognition rule of the at least one parking slot based on the generated annotation data for the objectified at least one parking slot.

The present disclosure provides a method of learning a recognition rule of at least one parking slot around a vehicle (V), the method including (1) Objectifying at least one parking slot at least partly included in a learning image as an at least one objectified parking slot comprised of (i) a plurality of corner points of the at least one parking slot, (ii) a center point of the at least one parking slot; and (iii) attribute information on the at least one parking slot (2) Generating annotation data for the objectified at least one parking slot (3) Executing, from the learning image, learning of a recognition rule of the at least one parking slot based on the generated annotation data for the objectified at least one parking slot The present disclosure provides a processor program product readable by a processor installed in a vehicle. The processor program product includes learning program instructions that cause the processor to (1) Objectify at least one parking slot at least partly included in a learning image as an at least one objectified parking slot comprised of (i) a plurality of corner points of the at least one parking slot, (ii) a center point of the at least one parking slot; and (iii) attribute information on the at least one parking slot (2) Generate annotation data for the objectified at least one parking slot (3) Execute, from the learning image, learning of a recognition rule of the at least one parking slot based on the generated annotation data for the objectified at least one parking slot Note that each parenthesized reference character assigned to a corresponding element in the present disclosure merely represents an example of a relationship between the corresponding element and a corresponding specific element described in the following embodiments described later, and therefore the present disclosure is not limited to the parenthesized reference characters.

BRIEF DESCRIPTION OF THE DRAWINGS

Other aspects of the present disclosure will become apparent from the following description of embodiments with reference to the accompanying drawings in which:

FIG. 39 is a diagram illustrating the first encoding of the existence of each parking-slot center in the whole of the target image illustrated in FIG. 32;

FIG. 40 is a diagram illustrating the first encoding of the horizontal position of each parking-slot center in the whole of the target image illustrated in FIG. 32;

FIG. 41 is a diagram illustrating the first encoding of the vertical position of each parking-slot center in the whole of the target image illustrated in FIG. 32;

FIG. 50 is a diagram illustrating the third encoding of the information on the left-side segment lines in the whole of the target image illustrated in FIG. 32;

FIG. 51 is a diagram illustrating the third encoding of the information on the right-side segment lines in the whole of the target image illustrated in FIG. 32;

FIG. 78 is a diagram illustrating an example of fourth encoded data representing that the own vehicle is located in an unidentified place or the own vehicle is located outside a parking lot according to the sixth embodiment;

FIG. 79 is a diagram illustrating an example of fourth encoded data representing that the own vehicle is located in a parking lot according to the sixth embodiment;

FIG. 82 is a diagram schematically illustrating an example of fifth encoded data as a result of a fifth encoding according to the seventh embodiment;

DETAILED DESCRIPTION OF EMBODIMENTS

Figure 1:
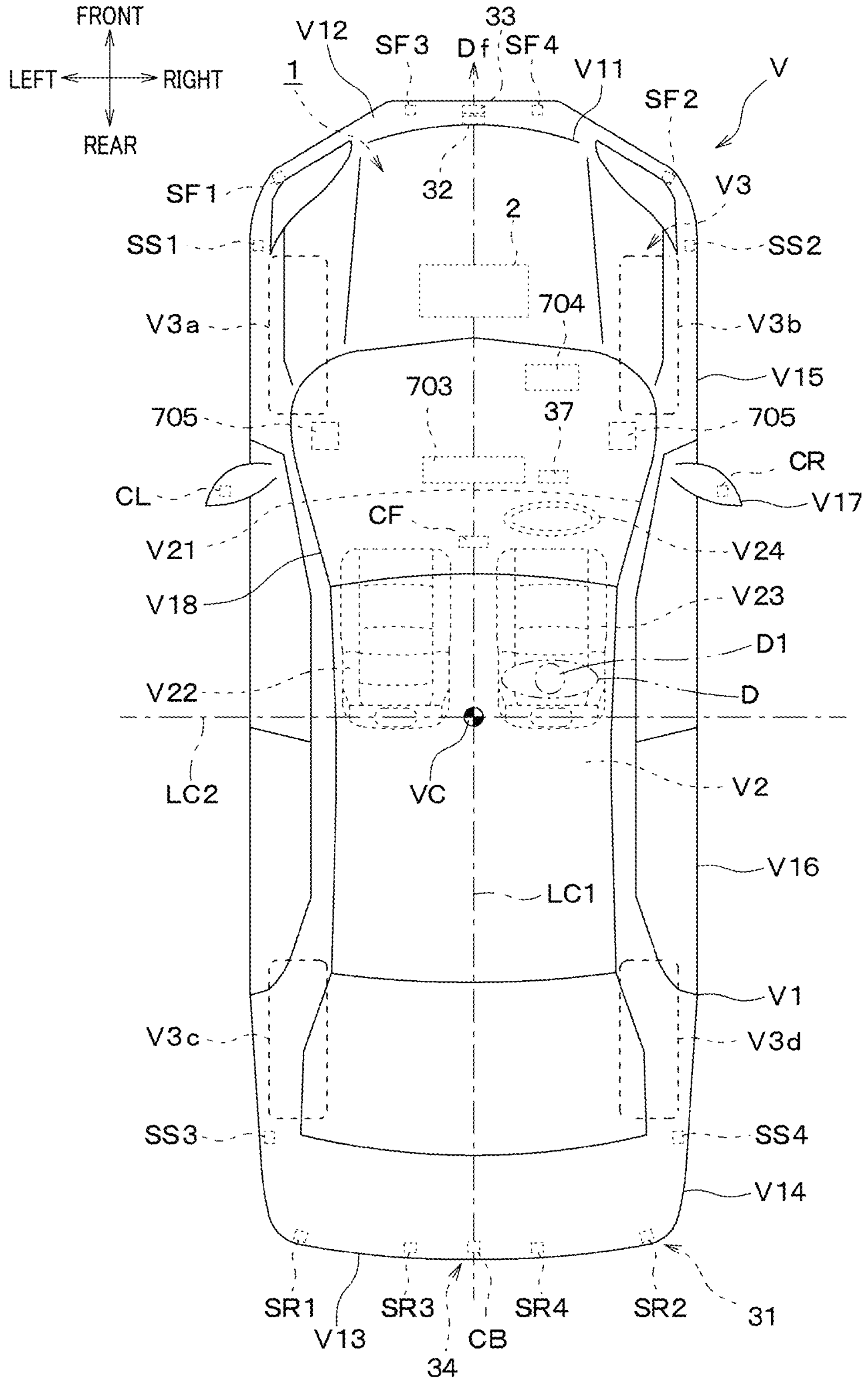
FIG. 1 is a plan view schematically illustrating a vehicle in which a vehicular system including a driving ECU serving as a control apparatus according to a base embodiment.

The following describes a base embodiment and first to ninth embodiments of the present disclosure with reference to the accompanying drawings. Configurations, functions, and/or examples descried in the following embodiments can be freely modified. In the embodiments and their modifications, same reference characters are assigned to equivalent or same components between the embodiments, between each embodiment and its modifications, and between the modifications. Among the equivalent or same components, descriptions of the former component can be directly used to describe the later component(s) as long as (i) no technological contradictions arise and/or no additional descriptions.

Overall Configuration of Vehicle

FIG. 1 illustrates a system-installed vehicle V according to the base embodiment to which the present disclosure is applied. The system-installed vehicle V is a four-wheel motor vehicle. The system-installed vehicle V has a body V1 having a substantially rectangular shape in plan view. The body, i.e., the vehicle body, V1 has a first center line LC1 defined as a virtual line that passes through a center point VC of the vehicle V and extends in the front-rear direction, i.e., the longitudinal direction, of the system-installed vehicle V. The system-installed vehicle V has a second center line LC2 defined as a virtual line that passes through the vehicle center point VC and extends in the left-right direction, i.e., the width direction, of the system-installed vehicle V. The center point VC of the system-installed vehicle V is defined as a three-dimensional center point of the vehicle body V1.

In FIG. 1, the width direction of the system-installed vehicle V, which will be referred to as a vehicle width direction, corresponds to the horizontal direction therein, a vehicle height direction is defined as a height direction of the system-installed vehicle V, and is parallel to the direction of gravity of the system-installed vehicle V while the system-installed vehicle V is mounted movably and stably on the plane of horizon. The longitudinal direction of the system-installed vehicle V, which will be referred to as a vehicle longitudinal direction, is defined to be perpendicular to both the vehicle width direction and the vehicle height direction.

In the system-installed vehicle V, a front direction, a rear direction, a left direction, and a right direction are defined as illustrated in FIG. 1. That is, the vehicle longitudinal direction is synonymous with the front-rear direction, and the vehicle width direction is synonymous with the left-right direction. The vehicle height direction may be not parallel to the direction of gravity of the system-installed vehicle V depending on the situation where the system-installed vehicle V is mounted on any road and/or the conditions in which the system-installed vehicle V is traveling. The vehicle height direction is usually parallel to the direction of gravity of the system-installed vehicle V.

The vehicle body V1 has defined thereinside an interior V2 serving as a compartment of one or more occupants including a driver of the system-installed vehicle V.

The body V1 has a front-end portion, a rear-end portion, a left-side portion, a right-side portion, a top portion, and four corners that include a front-left corner, a front-right corner, a rear-left corner, and a rear-right corner.

The vehicle V includes four wheels V3, i.e., four wheels V3*a*, V3*b*, V3*c*, and V3*d*, mounted to the respective four corners of the body V1. Specifically, the wheel V3*a*, i.e., the front-left wheel V3*a*, is mounted to the front-left corner of the body V1, the wheel V3*b*, i.e., the front-right vehicle V3*b*, is mounted to the front-right corner of the body V1, the wheel V3*c*, i.e., the rear-left wheel V3*c*, is mounted to the rear-left corner of the body V1, and the wheel V3*d*, i.e., the rear-right vehicle V3*d*, is mounted to the rear-right corner of the body V1. The system-installed vehicle V is not limited to such a four-wheel motor vehicle, and a three-wheel motor vehicle or a six- or an eight-wheel vehicle, such as a cargo truck, can be used as the system-installed vehicle V. The number of driving wheels in the wheels of the system-installed vehicle V can be freely determined, and each driving wheel can be freely located to the body V1 of the system-installed vehicle V.

The system-installed vehicle V includes a front bumper V12 mounted to the front end portion, i.e., a front side, V11 of the body V1. The system-installed vehicle V includes a rear bumper V14 mounted to the rear end portion, i.e., a rear side, V13 of the body V1. The body V1 of the system-installed vehicle V includes a body panel V15 arranged to constitute the left- and right-side portions and the top portion of the body V1. The body panel V15 includes door panels V16. In the base embodiment illustrated in FIG. 1, the body panel V15 includes a front pair of left and right door panels V16 and a rear pair of left and right door panels V16; the left door panels V16 of the front and right pairs are located at the left-side portion of the body V1, and the right door panels V16 of the front and right pairs are located at the right-side portion of the body V1. The system-installed vehicle V includes a pair of door mirrors V17 mounted to the respective left and right doors V16 of the front pair. The body V1 includes a front windshield V18 that covers a front side of the interior V2.

The front windshield V18 has a substantially plate-like shape, and is made of translucent glass or translucent synthetic resin. The front windshield V18 is attached to the body panel V15, and is inclined such that a bottom of the front windshield V18 is located to be closer to the front of the body V1 than a top of the front windshield V18 is when viewed in a side view in parallel to the vehicle width direction.

The system-installed vehicle V includes a dashboard V21 and a plurality of seats V22 that include a driver's seat V23 on which a driver D sits. The dashboard V21 is provided in a front portion of the interior V2, and the seats V22 are located at the rear of the dashboard V21. The system-installed vehicle V includes a steering wheel V24 located in front of the driver's seat V23. The driver D grasps the steering wheel V24 and steers the steering wheel V24 to thereby control the steering of the system-installed vehicle V. The steering wheel V24 typically has a substantially ring shape, a substantially ellipsoidal shape, or a substantially polygonal-ring shape, but can have a bar-like shape or a control-stick shape.

Overall Configuration of Vehicular System

The system-installed vehicle V includes a vehicular system 1 installed therein. The vehicular system 1, which is installed in the system-installed vehicle V, is configured to serve as a driving automation system or an autonomous driving system in the system-installed vehicle V. The system-installed vehicle V will also be referred to as an own vehicle V. The autonomous driving system is configured to implement one of levels 1 to 5 included in all the six autonomous driving levels (0 to 5 levels) defined in SAE J2016 standard opened by SAE international; SAE is an abbreviation for "Society of Automotive Engineers". Any level X in the autonomous driving levels 0 to 5 will also be referred to as an SOE level X. That is, the variable X can take any one of 0, 1, 2, 3, 4, and 5. The higher the SOE level X, the higher the driving automation level. In other words, the greater the number of dynamic driving tasks that the driving system carries out, the higher the autonomous driving level. When the autonomous driving level is changed to be higher, the autonomous driving level increases. In contrast, the lower the SOE level X, the lower the autonomous driving level. In other words, the smaller the number of dynamic driving tasks that the autonomous driving system carries out, the lower the autonomous driving level. When the autonomous driving level is changed to be lower, the autonomous driving level decreases.

Definition of Driving Assist and Autonomous Driving

The SAE levels 0 to 5 will be specifically described below.

Hereinafter, the driver D is an occupant who manages and carries out dynamic driving tasks. The dynamic driving tasks show all operational functions and all maneuver functions that need be carried out in real time by the driver D when the driver D drives the own vehicle V in traffic roads except for strategical functions. Overall driving actions can be categorized into the operational functions, maneuver functions, and strategical functions.

The strategical functions may include functions of planning a travel schedule and selecting one or more places through the planned travel schedule. Specifically, the strategical functions may include functions of determining or selecting a travel schedule that shows (i) whether to go to a destination, (ii) when to go to the destination, and (iii) how to go to the destination.

The maneuver functions may include functions of determining, in various traffic situations, various maneuvers that may include, during the scheduled travel, (i) determining, during the scheduled travel, whether and when to overtake, (ii) determining whether and when to make a lane change, (iii) selectively setting a proper speed of the own vehicle V, and (iv) checking the mirrors.

The operational functions may include driver's instantaneous reactions, such as steering operations, braking operations, accelerating operations, and/or minor adjustments of these operations, in order to keep a position of the own vehicle V in a corresponding lane of a road and/or avoid at least one obstacle and/or at least one danger event on the path of the moving own vehicle V. OEDR is an abbreviation for "Object and Event Detection and Response", and can be called "detection and response of objects and events". OEDR includes the monitoring of driving environment around the own vehicle V. The monitoring of the driving environment around the own vehicle V may include detection, recognition, and classification of one or more objects and/or events. The monitoring of the driving environment around the own vehicle V may additionally include preparation of response for the one or more objects and/or events. Operational Design Domain (ODD) conditions, which will also be called "specific domain conditions", represents specific conditions under which a given autonomous driving system or feature thereof is designed to function. The ODD conditions may include, for example, at least one of a plurality of limiting conditions including, for example, geographic conditions, environmental conditions, velocity conditions, and time conditions.

Level 0 represents No Autonomous driving, which represents that the driver D performs all the dynamic driving tasks.

Level 1 represents Driving Assistance, which represents that an autonomous driving system sustainably executes, under specific ODD conditions, either the lateral vehicle motion control subtasks or the longitudinal vehicle motion control subtasks of the dynamic driving tasks. The longitudinal vehicle motion control subtasks include, for example, forward/backward operation, acceleration/deceleration operation, and stop operation. The lateral vehicle motion control tasks include, for example, steering operation. In particular, the autonomous driving system is configured not to perform both the lateral vehicle motion control subtasks and the longitudinal vehicle motion control subtasks.

Level 2 represents Partial Autonomous driving or Advanced Driving assistance, which represents that an autonomous driving system sustainably executes, under specific ODD conditions, both the lateral vehicle motion control subtasks and the longitudinal vehicle motion control subtasks of the dynamic driving tasks with expectation that the driver D completes OEDR subtasks and supervises the autonomous driving system.

Level 3 represents Conditional Autonomous driving, which represents that a driving automatic system sustainably executes, under specific ODD conditions, all the dynamic driving tasks. Under the specific ODD conditions, the driver D is not required to perform one of the OEDR subtasks of monitoring the traffic environment around the own vehicle V, but, when the driving automatic system has a difficulty in continuing at Level 3, the driving automatic system requests the driver D to control the own vehicle V with plenty of time, so that the driver D needs to smoothly respond to the request.

Level 4 represents High Automation, which represents that a driving automatic system sustainably executes, under specific ODD conditions, all the dynamic driving tasks. When the driving automatic system has a difficulty in continuing at Level 4, the driving automatic system addresses the difficulty.

Level 5 represents Full Automation, which represents that a driving automatic system on the own vehicle V sustainably executes all the dynamic driving tasks without limitation in all the ODD conditions. When the driving automatic system has a difficulty in continuing at Level 5, the driving automatic system addresses the difficulty without limitation in all the ODD conditions.

The vehicular system 1 is configured to perform various driving control tasks and various notifying tasks based on the various driving tasks during driving of the own vehicle V. Specifically, the vehicular system 1 is configured as an autonomous driving system that implements driving assistance for the own vehicle V and/or autonomous driving of the own vehicle V. The autonomous driving corresponds to each of the SAE levels 3 to 5. That is, the autonomous driving in each of the SAE levels 3 to 5 represents that the vehicular system 1 serves as the autonomous driving system to execute all the dynamic driving tasks in the corresponding one of the SAE levels 3 to 5. In contrast, the driving assistance corresponds to each of the SAE levels 1 and 2. That is, the autonomous driving in each of the SAE levels 1 and 2 represents that the vehicular system 1 serves as the autonomous driving system to execute a part of the dynamic driving tasks in the corresponding one of the SAE levels 1 and 2. That is, the driving assistance can include both the SAE level 1 of "Driver Assistance" and the SAE level 2 of "Partial Autonomous driving" or "Advanced Driving assistance" except that the expression "driving assistance of the SAE level 1" is used or the driving assistance is used to be distinguished from the partial autonomous driving of the SAE level 2.

The vehicular system 1 of the base embodiment can be configured to execute (i) the autonomous driving in each of the SAE levels 3 to 5, (ii) the partial autonomous driving, i.e., advanced driving assistance, in the SAE level 2, and the driving assistance in the SAE level 1. The driving assistance that can be carried out by the vehicular system 1 of the base embodiment may include hands-off driving. The hands-off driving enables the vehicular system 1 to automatically move the own vehicle V forward or backward, steer the own vehicle V, accelerate or decelerate the own vehicle V, make lane changes of the own vehicle V, and/or stop the own vehicle V as long as the driver D addresses appropriately an intervening request issued from the vehicular system 1.

The hands-off driving requests the driver D to monitor road conditions around the own vehicle V, traffic situations around the own vehicle V, and information about whether there are one or more obstacles around the own vehicle V without requesting the driver D to be in a hands-on state. The hand-on state represents a state of the driver D in which the driver D is ready to steer the own vehicle V, i.e., ready to intervene in the lateral vehicle motion control subtasks. The hand-on state typically represents a state of the driver D in which the driver D is sit on the driver's seat V23 with a posture enabling driving of the own vehicle V and is ready to operate the steering wheel V24 with his/her hands. The driver D being in the hands-on state grasps the steering wheel V24 with his/her hands. The state in which the driver D touches the steering wheel V24 with his/her hands while being ready to grasp the steering wheel V24 applies to the hands-on state. For example, the state in which the driver D is operating the steering wheel V24, i.e., the driver D is actively operating the steering wheel V24, applies to the hands-on state. The state in which the driver D holds the steering wheel V24 against the controlled steering of the steering wheel V24 by the vehicular system 1 applies to the hands-on state.

Configuration of Vehicular System

Figure 2:
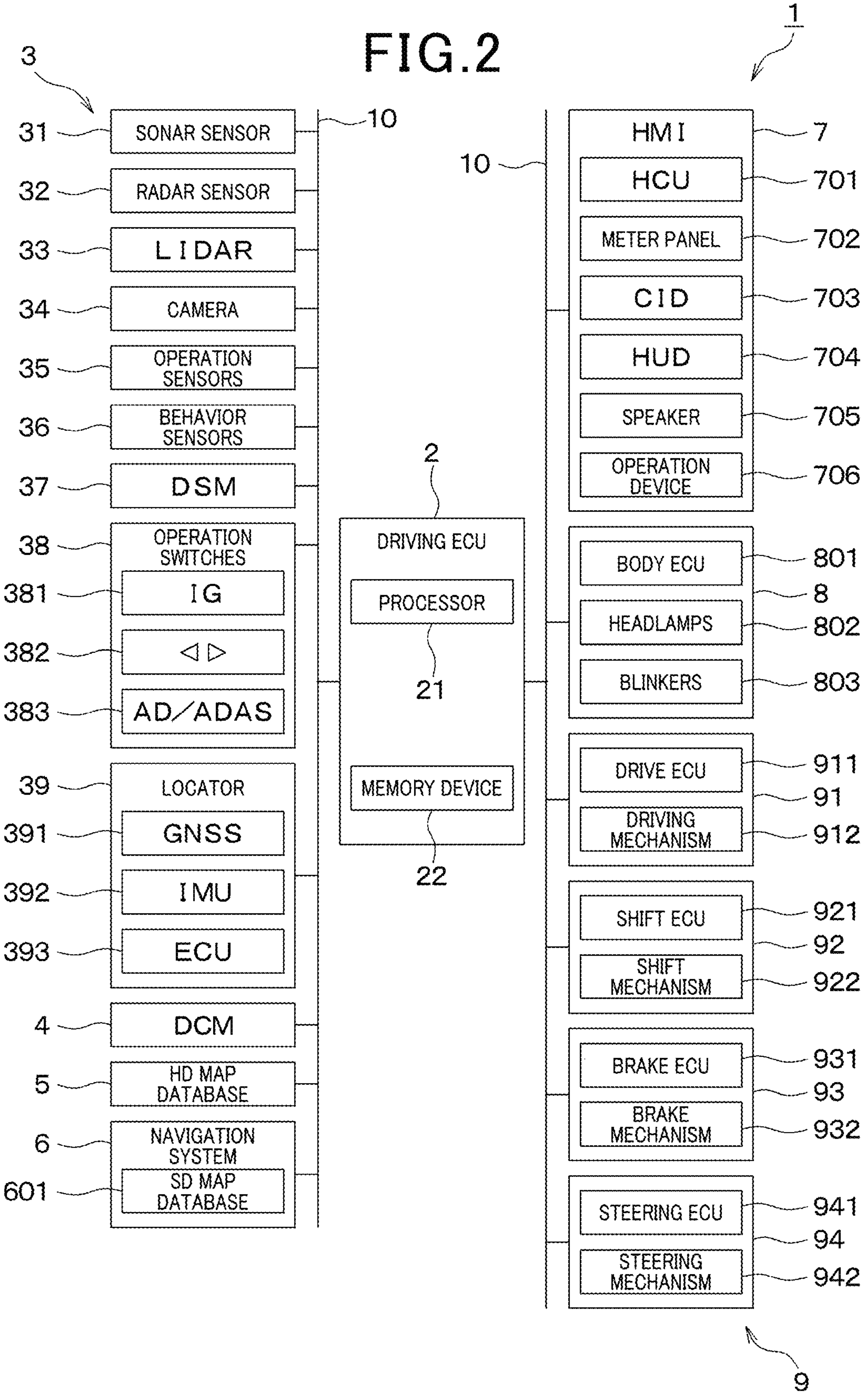
FIG. 2 is a schematic block diagram illustrating an overall structure of the vehicular system illustrated in FIG. 1.

The following describes an overall configuration of the vehicular system 1 with reference to FIGS. 1 and 2.

The vehicular system 1 includes a driving electronic control unit (ECU) 2, a driving information input unit 3, a vehicular communication module, in other words, a data communication module (DCM), 4, a high-definition (HD) map database 5, a navigation system 6, a human machine interface (HMI) system 7, a lighting system 8, and a motion control system 9.

The vehicular system 1 is configured such that the driving ECU 2, the driving information input unit 3, the vehicular communication module 4, the HD map database 5, the navigation system 6, the HMI system 7, the lighting system 8, and the motion control system 9 are communicably connected to one another via vehicular communication network 10. The vehicular communication network 10 includes a main network that is in conformity with one of various communication standards, such as Controller Area Network® (INTERNATIONAL REGISTRATION NUMBER 1048262A). The vehicular communication network 10 may include, in addition to the main network being in conformity with CAN®, a subnetwork that is in conformity with Local Interconnect Network (LIN) or FlexRay.

Driving ECU

The driving ECU 2 serves as a control apparatus according to the present disclosure, which is installed in the system-installed vehicle V, and is configured to control overall operations in the vehicular system 1. The driving ECU 2 is configured as an Autonomous Driving/Advanced Driver-Assistance Systems (AD/ADAS) ECU serving as both a driving assistance controller and an autonomous driving controller. Specifically, the driving ECU 2 includes at least one processor 21 and at least one memory device 22 communicably connected to the at least one processor 21.

The at least one processor 21, which will be simply referred to as a processor 21, is comprised of a Center Processing unit (CPU) or a Micro Processing Unit (MPU). The at least one memory device 22 may include, for example, at least a Read Only Memory (ROM) and a Random Access Memory (RAM) selected from various nonvolatile memory devices, such as ROMs, RAMS, and nonvolatile rewritable recording media. Such recording media can be referred to as storage media. These nonvolatile rewritable recording media, such as flash ROMs or EEPROMs, enable information stored therein to be rewritable while being power on, and hold information unwritable while being power off. EEPROM is an abbreviation for Electronically Erasable and Programmable ROM. The ROM or at least one of the nonvolatile rewritable memory devices included in the memory device 22 stores beforehand data and program instructions used for the processor 21. The driving ECU 2 is configured to read the program instructions stored in the memory device 22 and execute the readout program instructions to accordingly perform various tasks and operations, which include own-vehicle control operations and notification operations to the occupants.

Driving Information Input Unit

The driving information input unit 3 is configured to input, to the driving ECU 2, information required for the driving ECU 2 to perform various operations and tasks. Specifically, the driving information input unit 3 may include at least one sonar sensor 31, a radar sensor 32, a laser-radar sensor (LIDAR) 33, at least one camera 34, operation sensors 35, behavior sensors 36, a driver-state monitor 37, operation switches 38, and a locator 39. The sonar sensor 31, radar sensor 32, LIDAR 33, and camera 34 will be collectively referred to as surrounding monitor sensors or ADAS sensors. The following sequentially describes the components of the driving information input unit 3.

Sonar Sensor

Figure 3:
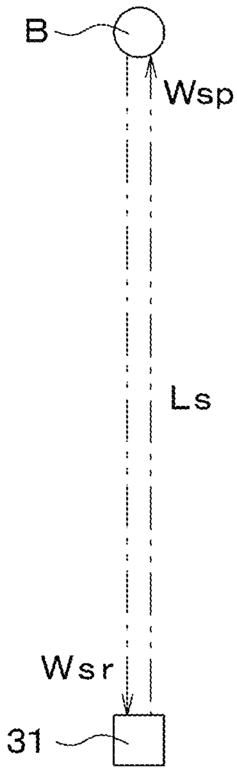
FIG. 3 is a plan view schematically illustrating target-object detection using one of the sonar sensors illustrated in FIG. 2.

The at least one sonar sensor, which will be simply referred to as a sonar sensor, 31 is an ultrasonic range sensor mounted to the body V1. The sonar sensor 31 is an ultrasonic sensor, and is configured to, as illustrated in FIG. 3, emit sonar probing waves Wsp within an ultrasonic frequency band toward an external space outside the own vehicle V. The sonar sensor 31 is configured to receive sonar echoes Wsr resulting from reflection of the sonar probing waves Wsp by a target object B to accordingly detect various information about the target object B. In the specification, reference character B is assigned to any target object for the sake of convenience, but target objects to which the same reference character B are assigned may not necessarily represent the same target object.

Specifically, the sonar sensor 31 is configured to calculate a distance of the object B from the sonar sensor 31 based on Time of Flight (TOF) and the speed of sound. The TOF represents time defined from a time of emitting a sonar probing wave, i.e., pulse, Wsp to a time of receiving a sonar echo Wsr through a propagation path Ls of the pulses Wsp and Wsr; the TOF will also be therefore referred to as propagation time.

Figure 4:
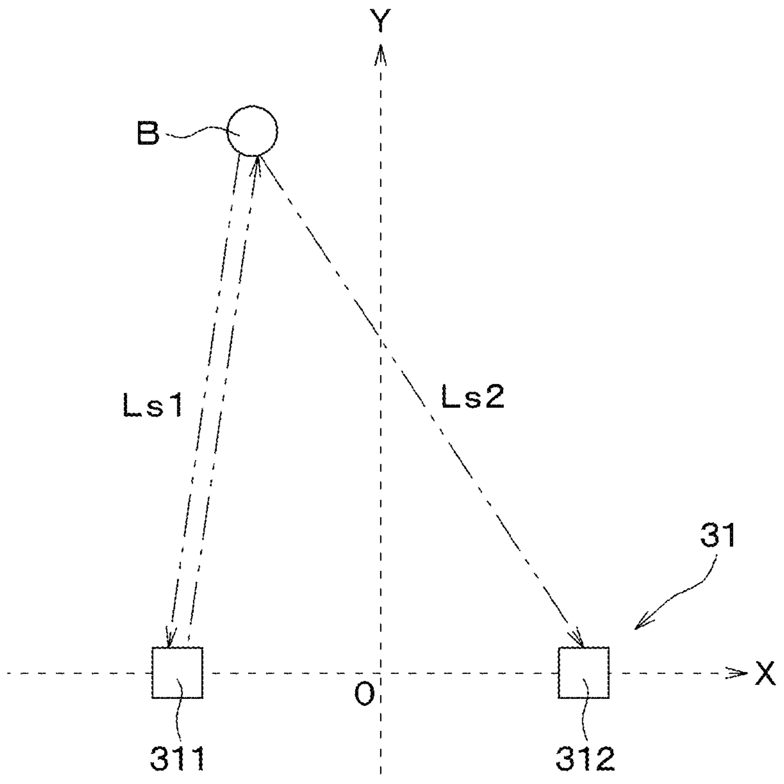
FIG. 4 is a plan view schematically illustrating target-object detection using a pair of sonar sensors illustrated in FIG. 2.

If the driving information input unit 3 includes a pair of sonar sensors 31, i.e., a pair of a first sonar sensor 311 and a second sonar sensor 312 (see FIG. 4), using a known triangulation method enables measurement of a relative distance of the target object B relative to the own vehicle V. In FIG. 4, an X axis is defined along a virtual line connecting between the first and second sonars 311 and 312, and a Y axis is defined to be perpendicular to the X axis. The X and Y axes extend along a reference horizontal plane that is perpendicular to the vehicle height direction.

The first sonar sensor 311 is configured to emit the sonar probing waves Wsp, and each of the first and second sonar sensors 311 and 312 is configured to receive the sonar echoes Wsr resulting from reflection of the sonar probing waves Wsp by the target object B. It is possible to calculate, based on a first TOF through a first propagation path Ls1 and a second TOF through a second propagation path Ls2, a position of the target object B in a two-dimensional XY coordinate system constituted by the X and Y axes. The first propagation path Ls1 is defined as a propagation path through which an ultrasonic wave (pulse) emitted as a sonar probing wave Wsp from the first sonar 311 is propagated through the target object B to be returned to the first sonar 311 as a sonar echo Wsr. Ultrasonic waves (pulses) propagated through the propagation path Ls1 will also be referred to as direct waves (pulses). The second propagation path Ls2 is defined as a propagation path through which an ultrasonic wave (pulse) emitted as a sonar probing wave Wsp from the first sonar 311 is propagated through the target object B to reach the second sonar 312 as a sonar echo Wsr. Ultrasonic waves (pulses) propagated through the propagation path Ls2 will also be referred to as indirect waves (pulses).

For example, the driving information input unit 3 according to the base embodiment includes a plurality of sonar sensors 31 mounted to the body V1 (see FIG. 1). Specifically, the sonar sensors 31 include first, second, third, and fourth front sonars SF1, SF2, SF3, and SF4 mounted to the front bumper V12. Similarly, the sonar sensors 31 include first, second, third, and fourth rear sonars SR1, SR2, SR3, and SR4 mounted to the rear bumper V14. Additionally, the sonar sensors 31 include first, second, third, and fourth side sonars SS1, SS2, SS3, and SS4. The first and third side sonars SS1 and SS3 are mounted to the left side portion of the body V1, and the second and fourth side sonars SS2 and SS4 are mounted to the right side portion of the body V1.

The first to fourth front sonars SF1 to SF4, the first to fourth rear sonars SR1 to SR4, and the first to fourth side sonars SS1 to SS4 will also be collectively referred to simply as a sonar sensor 31 or sonar sensors 31 if it is unnecessary to identify any of the sonars SF1 to SS4.

Figure 5:
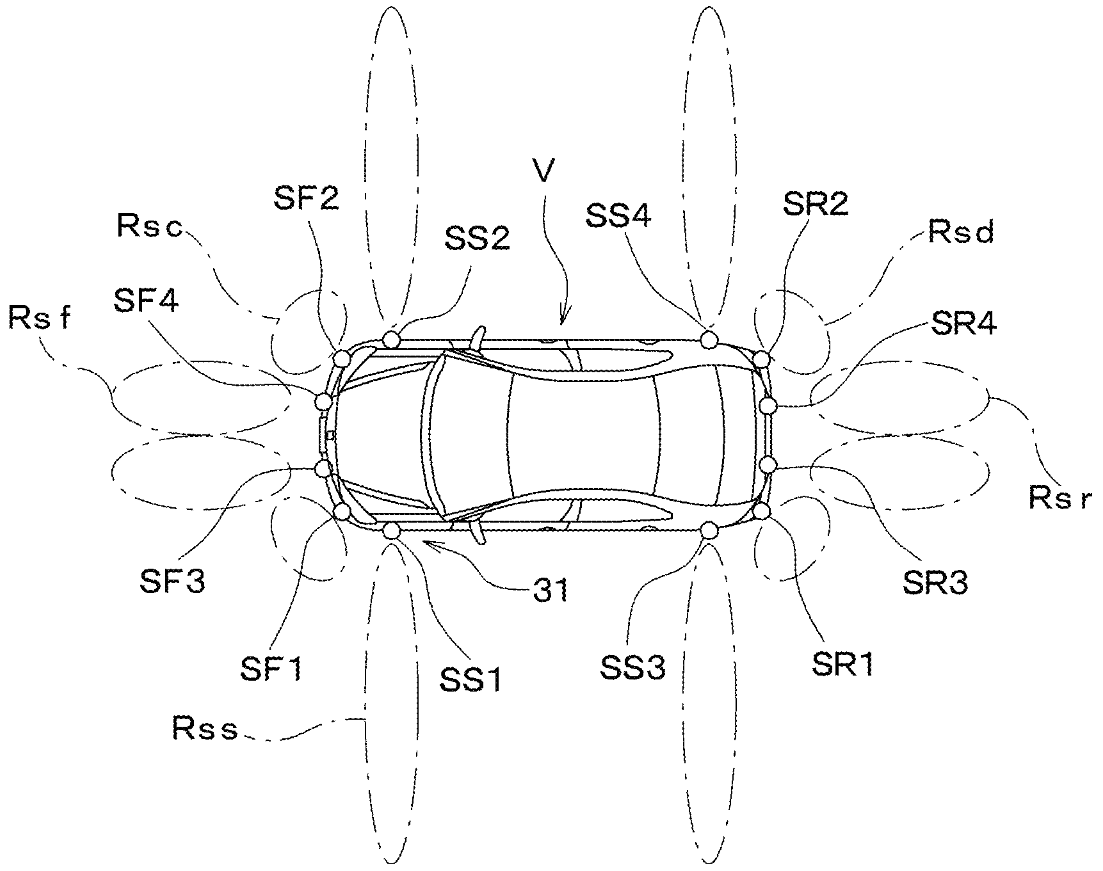
FIG. 5 is a plan view schematically illustrating target-object detection using each sonar sensor illustrated in FIG. 2.

FIG. 5 illustrates a predetermined detection region, i.e., a predetermined sensing region, of each of the sonar sensors 31.

The following sequentially describes the sonar sensors 31 with reference to FIGS. 1 and 5.

The first front sonar SF1 is mounted to a portion of the front bumper V12, which is closer to the left edge of the front bumper V12 than the right edge thereof in the vehicle width direction, and is configured to emit the sonar probing waves Wsp diagonally forward left. The second front sonar SF2 is mounted to a portion of the front bumper V12, which is closer to the right edge of the front bumper V12 than the left edge thereof in the vehicle width direction, and is configured to emit the sonar probing waves Wsp diagonally forward right. The first and second front sonars SF1 and SF2 are arranged symmetrically with respect to the first center line LC1. Each of the first and second front sonars SF1 and SF2 has a predetermined detection region Rsc, and the detection region Rsc, which will also be referred to as a front-corner detection region Rsc, of each of the first and second front sonars SF1 and SF2 is designed such that a detection range of the front-corner detection region Rsc is set to, for example, 60 cm or thereabout. The detection range of a sonar sensor 31 represents a maximum measurable range (distance) of the sonar sensor 31.

The third and fourth front sonars SF3 and SF4 are mounted to a middle portion of the front bumper V12 to be aligned in the vehicle width direction. Specifically, the third front sonar SF3 is arranged between the first front sonar SF1 and the first center line LC1, and is configured to emit the sonar probing waves Wsp substantially forward, and the fourth front sonar SF4 is arranged between the second front sonar SF2 and the first center line LC1, and is configured to emit the sonar probing waves Wsp substantially forward. The third and fourth front sonars SF3 and SF4 are arranged symmetrically with respect to the first center line LC1. Each of the third and fourth front sonars SF3 and SF4 has a predetermined detection region Rsf, and the detection region Rsf, which will also be referred to as a front detection region Rsf, of each of the third and fourth front sonars SF3 and SF4 is designed such that the detection range of the front detection region Rsf is set to, for example, 1 m or thereabout.

The first and third front sonars SF1 and SF3, which are mounted to the left side of the front bumper V12 relative to the first center line LC1, are arranged at different positions in the vehicle width direction, i.e., the horizontal direction. The first and third front sonars SF1 and SF3, which are adjacent to one another in the vehicle width direction, are arranged to have a predetermined positional relationship that enables one of the first and third front sonars SF1 and SF3 to receive, as received echoes, sonar echoes resulting from reflection of the sonar probing waves Wsp emitted from the other of the first and third front sonars SF1 and SF3 by a target object.

Specifically, the first front sonar SF1 is arranged to receive both (i) direct echoes resulting from reflection of the sonar probing waves Wsp emitted from the first front sonar SF1 by a target object, and (ii) indirect echoes resulting from reflection of the sonar probing waves Wsp emitted from the third front sonar SF3 by the target object. Similarly, the third front sonar SF3 is arranged to receive both (i) direct echoes resulting from reflection of the sonar probing waves Wsp emitted from the third front sonar SF3 by a target object, and (ii) indirect echoes resulting from reflection of the sonar probing waves Wsp emitted from the first front sonar SF1 by the target object.

Similarly, the third and fourth front sonars SF3 and SF4, which are mounted to the middle portion of the front bumper V12 in the vehicle width direction, are arranged at different positions in the vehicle width direction, i.e., the horizontal direction. The third and fourth front sonars SF3 and SF4, which are adjacent to one another in the vehicle width direction, are arranged to have a predetermined positional relationship that enables one of the third and fourth front sonars SF3 and SF4 to receive, as received echoes, sonar echoes resulting from reflection of the sonar probing waves Wsp emitted from the other of the third and fourth front sonars SF3 and SF4 by a target object.

The second and fourth front sonars SF2 and SF4, which are mounted to the right side of the front bumper V12 relative to the first center line LC1, are arranged at different positions in the vehicle width direction, i.e., the horizontal direction. The second and fourth front sonars SF2 and SF4, which are adjacent to one another in the vehicle width direction, are arranged to have a predetermined positional relationship that enables one of the second and fourth front sonars SF2 and SF4 to receive, as received echoes, sonar echoes resulting from reflection of the sonar probing waves Wsp emitted from the other of the second and fourth front sonars SF2 and SF4 by a target object.

The first rear sonar SR1 is mounted to a portion of the rear bumper V14, which is closer to the left edge of the rear bumper V14 than the right edge thereof in the vehicle width direction, and is configured to emit the sonar probing waves Wsp diagonally rearward left. The second rear sonar SR2 is mounted to a portion of the rear bumper V14, which is closer to the right edge of the rear bumper V14 than the left edge thereof in the vehicle width direction, and is configured to emit the sonar probing waves Wsp diagonally rearward right. The first and second rear sonars SR1 and SR2 are arranged symmetrically with respect to the first center line LC1. Each of the first and second rear sonars SR1 and SR2 has a predetermined detection region Rsd, and the detection region Rsd, which will also be referred to as a rear-corner detection region Rsd, of each of the first and second rear sonars SR1 and SR2 is designed such that the detection range of the rear-corner detection region Rsd is set to, for example, 60 cm or thereabout.

The third and fourth rear sonars SR3 and SR4 are mounted to a middle portion of the rear bumper V14 to be aligned in the vehicle width direction. Specifically, the third rear sonar SR3 is arranged between the first rear sonar SR1 and the first center line LC1, and is configured to emit the sonar probing waves Wsp substantially rearward, and the fourth rear sonar SR4 is arranged between the second rear sonar SR2 and the first center line LC1, and is configured to emit the sonar probing waves Wsp substantially rearward. The third and fourth rear sonars SR3 and SR4 are arranged symmetrically with respect to the first center line LC1. Each of the third and fourth rear sonars SR3 and SR4 has a predetermined detection region Rsr, and the detection region Rsr, which will also be referred to as a rear detection region Rsr, of each of the third and fourth rear sonars SR3 and SR4 is designed such that the detection distance of the rear detection region Rsr is set to, for example, 1.5 m or thereabout.

The first and third rear sonars SR1 and SR3, which are mounted to the left side of the rear bumper V14 relative to the first center line LC1, are arranged at different positions in the vehicle width direction, i.e., the horizontal direction. The first and third rear sonars SR1 and SR3, which are adjacent to one another in the vehicle width direction, are arranged to have a predetermined positional relationship that enables one of the first and third rear sonars SR1 and SR3 to receive, as received echoes, sonar echoes resulting from reflection of the sonar probing waves Wsp emitted from the other of the first and third rear sonars SR1 and SR3 by a target object.

Specifically, the first rear sonar SR1 is arranged to receive both (i) direct echoes resulting from reflection of the sonar probing waves Wsp emitted from the first rear sonar SR1 by a target object, and (ii) indirect echoes resulting from reflection of the sonar probing waves Wsp emitted from the third rear sonar SR3 by the target object. Similarly, the third rear sonar SR3 is arranged to receive both (i) direct echoes resulting from reflection of the sonar probing waves Wsp emitted from the third rear sonar SR3 by a target object, and (ii) indirect echoes resulting from reflection of the sonar probing waves Wsp emitted from the first rear sonar SR1 by the target object.

Similarly, the third and fourth rear sonars SR3 and SRF4, which are mounted to the middle portion of the rear bumper V14 in the vehicle width direction, are arranged at different positions in the vehicle width direction, i.e., the horizontal direction. The third and fourth rear sonars SR3 and SR4, which are adjacent to one another in the vehicle width direction, are arranged to have a predetermined positional relationship that enables one of the third and fourth rear sonars SR3 and SR4 to receive, as received echoes, sonar echoes resulting from reflection of the sonar probing waves Wsp emitted from the other of the third and fourth rear sonars SR3 and SR4 by a target object.

The second and fourth rear sonars SR2 and SR4, which are mounted to the right side of the rear bumper V14 relative to the first center line LC1, are arranged at different positions in the vehicle width direction, i.e., the horizontal direction. The second and fourth rear sonars SR2 and SR4, which are adjacent to one another in the vehicle width direction, are arranged to have a predetermined positional relationship that enables one of the second and fourth rear sonars SR2 and SR4 to receive, as received echoes, sonar echoes resulting from reflection of the sonar probing waves Wsp emitted from the other of the second and fourth rear sonars SR2 and SR4 by a target object.

Each of the first side sonar SS1 and the third sonar SS3 is mounted to a portion of the left side portion of the body V1, and is configured to emit the sonar probing waves Wsp leftward relative to the own vehicle V. Similarly, each of the second side sonar SS2 and the fourth sonar SS4 is mounted to a portion of the right side portion of the body V1, and is configured to emit the sonar probing waves Wsp rightward relative to the own vehicle V. Each of the first, second, third, and fourth side sonars SS1, SS2, SS3, and SS4 is arranged to receive only direct echoes resulting from reflection of the sonar probing waves Wsp emitted from the corresponding one of the first, second, third, and fourth side sonars SS1, SS2, SS3, and SS4. Each of the first, second, third, and fourth side sonars SS1, SS2, SS3, and SS4 has a predetermined detection region Rss, and the detection region Rss, which will also be referred to as a side detection region Rss, of each of the first to fourth side sonars SS1 to SS4 is designed such that the detection distance of the side detection region Rss is set to be within, for example, a range from 2 to 3 m inclusive.

The first side sonar SS1 is arranged between the first front sonar SF1 and the door mirror V17 mounted to the left door panel V16 of the front pair, which will also be referred to as a left door mirror V17. The first side sonar SS1 is configured to emit the sonar probing waves Wsp leftward relative to the own vehicle V. The second side sonar SS2 is arranged between the second front sonar SF2 and the door mirror V17 mounted to the right door panel V16 of the front pair, which will also be referred to as a right door mirror V17. The second side sonar SS2 is configured to emit the sonar probing waves Wsp rightward relative to the own vehicle V. The first and second side sonars SS1 and SS2 are arranged symmetrically with respect to the first center line LC1. The first and second side sonars SS1 and SS2 can be mounted to the body panel V15 or mounted to portions of the respective left and right edges of the front bumper V12 in the vehicle width direction; the portion of each of the left and right edges of the front bumper V12 to which the corresponding one of the first and second side sonars SS1 and SS2 extends rearward in the vehicle longitudinal direction.

The third side sonar SS3 is arranged between the first rear sonar SR1 and the left door panel V16 of the rear pair. The third side sonar SS3 is configured to emit the sonar probing waves Wsp leftward relative to the own vehicle V. The fourth side sonar SS2 is arranged between the second rear sonar SR2 and the right door panel V16 of the rear pair. The fourth side sonar SS4 is configured to emit the sonar probing waves Wsp rightward relative to the own vehicle V. The third and fourth side sonars SS3 and SS4 are arranged symmetrically with respect to the first center line LC1. The third and fourth side sonars SS3 and SS4 can be mounted to the body panel V15 or mounted to portions of the respective left and right edges of the rear bumper V14 in the vehicle width direction; the portion of each of the left and right edges of the rear bumper V14 to which the corresponding one of the third and fourth side sonars SS3 and SS4 extends forward in the vehicle longitudinal direction.

Figure 6:
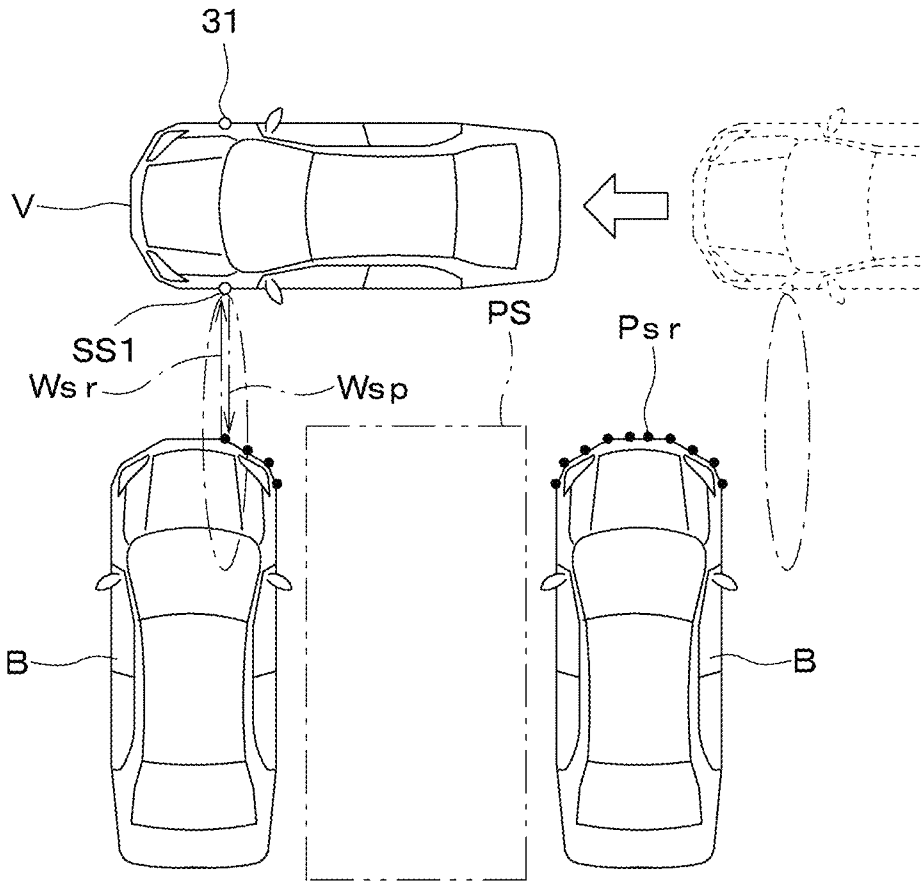
FIG. 6 is a plan view schematically illustrating parking-space detection using a first sonar sensor illustrated in FIG. 2.

FIG. 6 schematically illustrates an example where the driving ECU 2 detects, using the first side sonar SS1, a parking slot PS located left-sideward relative to the own vehicle V for performing side-by-side parking. The parking slot PS is a rectangular frame-like area in plan view, and represents a space in which a vehicle can be parked. The parking slot PS can also be referred to as a parking space or a parking lot. FIG. 6 illustrates sonar detection points Psr that are points by which the sonar probing waves Wsp emitted from any sonar sensor 31 are estimated to be reflected; the sonar detection points Psr can also be referred to as ranging points Psr. As illustrated in FIG. 6, the driving ECU 2 can detect the parking slot PS based on a distribution of the sonar detection points Psr that are acquired based on sonar echoes Wsr from target objects B that are parked vehicles arranged side-by-side in the direction of the straight forward movement of the own vehicle V.

Specifically, when acquiring adjacent rows of the sonar detection points Psr arranged in the traveling direction of the own vehicle V when performing a side-by-side parking of the own vehicle V as illustrated in FIG. 6, the driving ECU 2 can determine whether the length of a space between each adjacent pair of rows of the sonar detection points Psr exceeds the entire width of the own vehicle V, and detect, in response to determination that the length of the space between at least one adjacent pair of rows of the sonar detection points Psr exceeds the entire width of the own vehicle V, the space between at least one adjacent pair of rows of the sonar detection points Psr as location of a parking slot PS.

Radar Sensor

Figure 7:
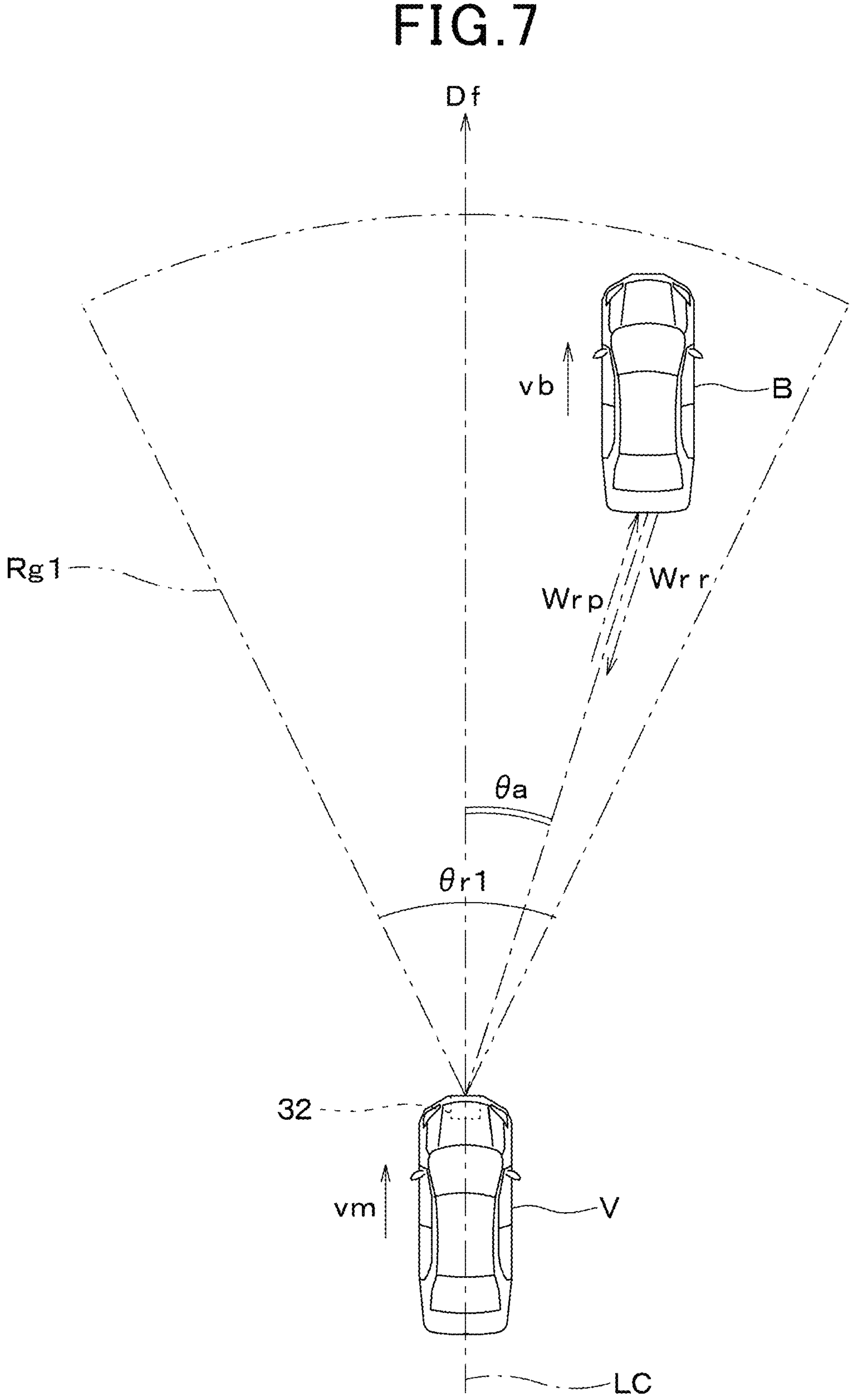
FIG. 7 is a plan view schematically illustrating target-object detection using a radar sensor illustrated in FIG. 2.

Referring to FIGS. 1 and 2, the radar sensor 32 is configured to transmit millimetric radar waves or sub-millimetric radar waves and receive reflected radar waves to accordingly detect a target object B. The radar sensor 32 of the base embodiment is mounted to the middle of a front portion V11 of the body V1 in the vehicle width direction. The radar sensor 32 is, as illustrated in FIG. 7, a long-range radar having a substantially fan-like radar detection region Rg1 in plan view. The fan-like radar detection region Rg1 has a predetermined detection range from 10 to 250 m inclusive and has a radar scan angle θr1 around a forward movement direction Df of the own vehicle V. The radar sensor 32 is configured as a phased-array radar sensor or a beam-forming radar sensor. The forward movement direction Df represents the direction of a virtual line extending forward from the first center line LC1, and represents the traveling direction of the own vehicle V with a current shift position of a shift lever being set to any position except for the reverse position. The forward movement direction Df of the own vehicle V matches the traveling direction of the own vehicle V when the own vehicle V is moving straight forward, and becomes the direction of a tangent to a travel path of the own vehicle V when the own vehicle V is traveling around a curve.

The radar sensor 32 is configured to emit radar probing waves Wrp, scan the emitted radar probing waves Wrp within the radar scan angle θr1, and receive radar waves Wrr resulting from reflection of the radar probing waves Wrp by a target object B located in the radar detection region Rg1.

Specifically, the radar sensor 32 is comprised of an FMCW radar device equipped with an array antenna, and is configured to detect, based on differences in frequency between the emitted millimeter waves and received millimeter waves and/or differences in phase between the emitted millimeter waves and received millimeter waves, (i) a distance to the target object B therefrom, (ii) an azimuth angle θa of the target object B, (iii) a relative speed of the target object B relative to the own vehicle V. The azimuth angle θa of the target object B is defined as an angle made by a first virtual line generated by extending the first center line LC1 forward the own object V and a second virtual line connecting between the radar sensor 32 and the target object B; the first center line CL1 represents the center line of the radar detection range Rg1.

The relative speed of the target object B relative to the own vehicle V is defined as a difference between a moving speed vb of the target object B and a traveling speed vm of the own vehicle V.

Specifically, the radar sensor 32 is configured to transmit radar probing waves Wrp generated based on a transmission signal having a predetermined modulated frequency, and receive radar waves Wrr resulting from reflection of the radar probing waves Wrp by the target object B to accordingly detect, based on the received radar waves Wrr, received signals that represent frequency characteristics of the received radar waves Wrr. Then, the radar sensor 32 is configured to calculate deviations between the modulated frequency of the transmission signal and the frequencies of the received signals to accordingly generate beat signals based on the respective frequency deviations. The radar sensor 32 is configured to perform first Fourier transform on the beat signals to accordingly calculate a frequency-power spectrum of each of the beat signals. Then, the radar sensor 32 is configured to analyze the frequency-power spectrum of each beat signal to accordingly obtain beat frequencies, and calculate, based on the beat frequencies, a distance of the target object B from the radar sensor 32 and the relative speed of the target object B relative to the own vehicle V.

In addition to the long-range radar sensor 32, a middle-range radar sensor or a short-range radar sensor can be installed in the vehicular system 1. Such a middle-range radar sensor has, for example, a predetermined detection range from 1 to 100 m inclusive, and such a short-range radar sensor has, for example, a predetermined detection range from 15 cm to 30 m.

Laser-Radar Sensor

Figure 8:
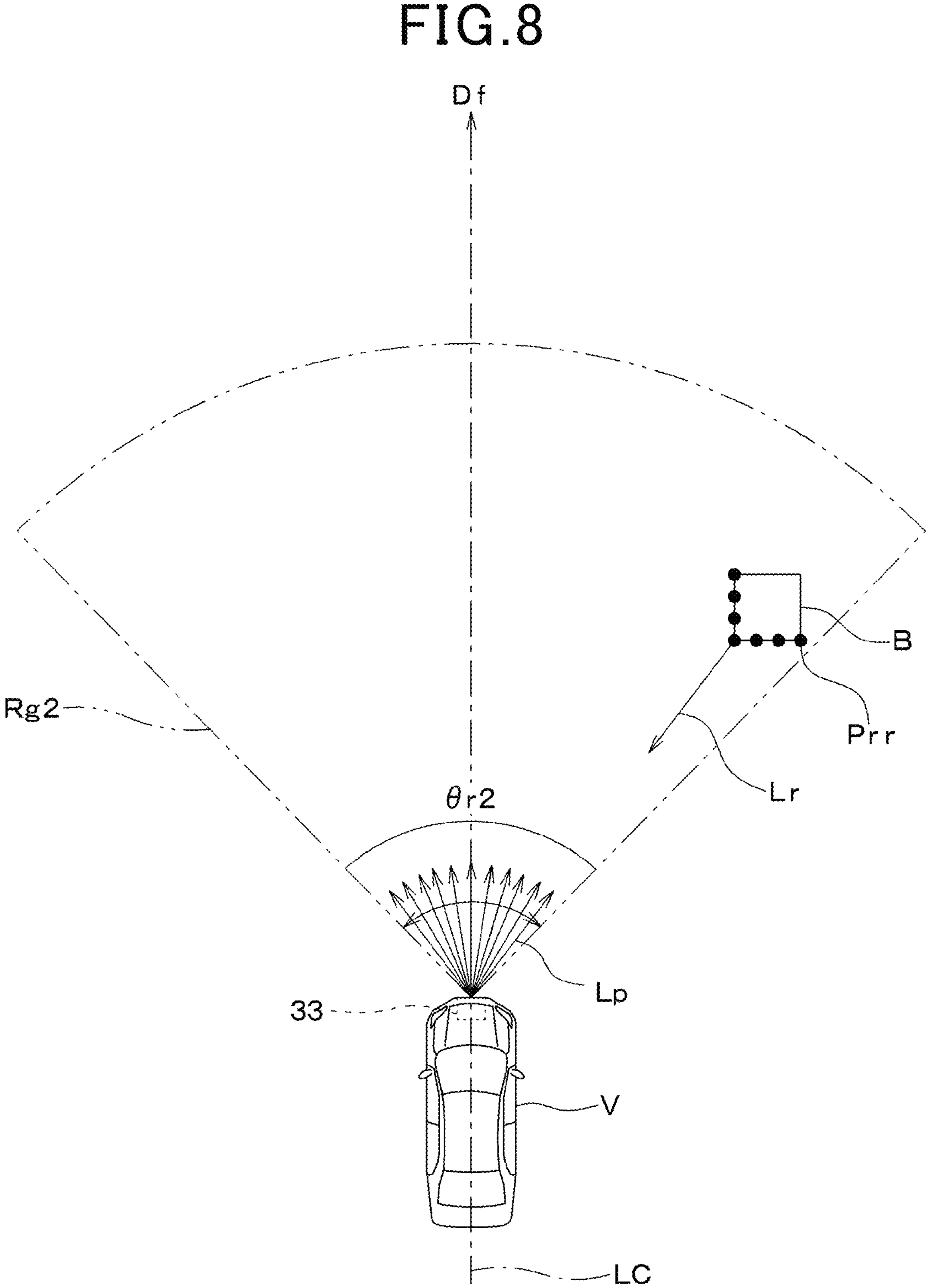
FIG. 8 is a plan view schematically illustrating target-object detection using a laser-radar sensor illustrated in FIG. 2.

The laser-radar sensor 33 is configured to, as illustrated in FIG. 8, irradiate the outside of the own vehicle V with detection light Lp, i.e., laser light within an infrared frequency band, and receive reflected light Lr resulting from reflection of the detection light Lp by a target object B to accordingly detect the target object B. The laser-radar sensor 33 can also be called LIDAR, which is an abbreviation for Light Detection and Ranging or Laser Imaging Detection and Ranging. The vehicular system 1 of the base embodiment includes, as the laser-radar sensor 33, a long-range laser-radar sensor 33 comprising a scanning LIDAR. The laser-radar sensor 33 is mounted to, as illustrated in FIG. 1, mounted to the middle of the front portion V11 of the body V1 in the vehicle width direction.

The laser-radar sensor 33 has a substantially fan-like LIDAR detection region Rg2 in plan view. The fan-like radar detection region Rg2 has a predetermined radius of, for example, 200 m or more and has a LIDAR scan angle θr2 around the forward movement direction Df of the own vehicle V. The laser-radar sensor 33 is configured to horizontally scan the laser detection light Lp within the LIDAR scan angle θr2 to accordingly detect a target object B located in the LIDAR detection region Rg2.

Figure 9:
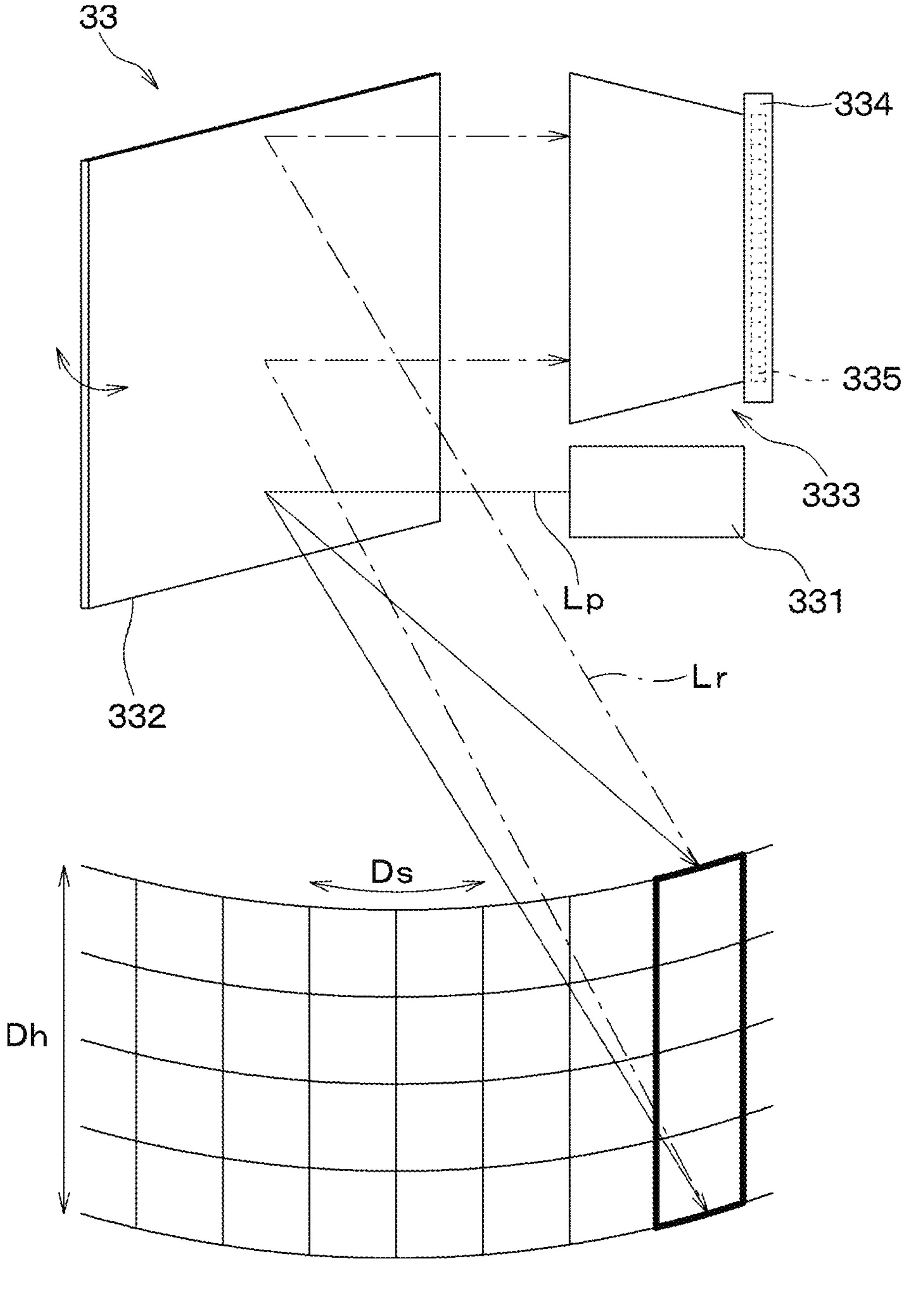
FIG. 9 is perspective view schematically illustrating a configuration and operations of the laser-radar sensor illustrated in FIG. 8.

FIG. 9 illustrates a schematic configuration of the laser-radar sensor 33. The laser-radar 33 includes a light emitting unit 331, a scanning unit 332, and a light receiving unit 333.

The light emitting unit 331 is configured to emit the detection light Lp. The scanning unit 332 is comprised of a MEMS mirror unit that includes at least one reflection mirror located on a light pash of the detection light Lp emitted by the light emitting unit 331 and a MEMS mechanism that, for example, rotates the at least one reflection mirror to accordingly change a direction of light reflected by the at least one reflection mirror; MEMS is an abbreviation for Micro Electro Mechanical Systems. Specifically, the scanning unit 332 is configured to electrically control the MEMS mechanism so that the MEMS mechanism rotates the at least one reflection mirror, thus scanning the detection light Lp emitted by the light emitting unit 331 in both a horizontal scanning direction Ds and a vertical scanning direction Dh.

The light receiving unit 333 includes a light receiving sensor 334 that is a two-dimensional image sensor. Specifically, the light receiving sensor 334 is comprised of a plurality of light-receiving elements 335 two-dimensionally arranged in a horizontal direction corresponding to the horizontal scanning direction Ds and a vertical direction corresponding to the vertical scanning direction Dh. Each of the light-receiving elements 335, which is comprised of an Avalanche Photo Diode (APD) or a Single Photon Avalanche Diode (SPAD), is configured to detect a corresponding part of the reflected light Lr resulting from reflection of the detection light Lp by at least one target object B.

The laser-radar sensor 33 is configured to generate, based on the reflected light Lr received by the light receiving unit 333, at least one detection-point data cloud, and detect, based on the at least one detection-point data cloud, the at least one target object B.

The at least one detection-point data cloud represents, like an image, i.e., a frame image, a two-dimensional array of a plurality of LIDAR detection points Prr, which are close to one another, two-dimensionally arranged in the horizontal scanning direction Ds and the vertical scanning direction Dh (see FIG. 9). Each LIDAR detection point Prr, which is arranged to a corresponding light receiving element 335, represents a point of the at least one target object B that is estimated to reflect a part of the detection light Lp; a part of the reflected light Lr received by the corresponding light receiving element 335 corresponds to the part of the detection light Lp. This therefore results in the LIDAR detection points Prr two-dimensionally arranged in the horizontal scanning direction Ds and the vertical scanning direction Dh including positional information and range information on the two-dimensional array. This therefore enables the at least one detection-point data cloud to also be referred to as at least one range-point data cloud.

That is, the laser-radar sensor 33 is configured to detect the at least one detection-point data cloud comprised of the LIDAR detection points Prr two-dimensionally arranged, like a frame image, in the horizontal scanning direction Ds and the vertical scanning direction Dh. This therefore enables the laser-radar sensor 33 to also be referred to as a type of an image sensor.

That is, if there are target objects B, the laser-radar sensor 33 is configured to detect, for each of the target objects B, the detection-point data cloud comprised of the LIDAR detection points Prr two-dimensionally arranged, like a frame image, in the horizontal scanning direction Ds and the vertical scanning direction Dh.

Camera

Referring to FIGS. 1 and 2, the at least one camera 34 serving as an image sensor is mounted to the own vehicle V. The at least one camera 34 is configured to capture images of a peripheral field of view around the own vehicle V while moving together with the own vehicle V. That is, the at least one camera 34 is configured to generate image information, which will also be referred to as image data, on each captured image around the own vehicle V.

The at least one camera 34 is configured as a digital camera device comprised of an image sensor, such as a Charge Coupled Device (CCD) image sensor or a Complementary Metal Oxide Semiconductor (CMOS) image sensor. The image sensor of the at least one camera 34 is comprised of a plurality of light-sensitive elements, such as photodiodes, which respectively correspond to a plurality of pixels, two-dimensionally arranged in both the vertical direction, i.e., the vehicle height direction, and the horizontal direction, i.e., the vehicle width direction, of the own vehicle V.

The driving information input unit 3 of the base embodiment includes a plurality of cameras, i.e., a front camera CF, a rear camera CB, a left-side camera CL, and a right-side camera CR mounted to the own vehicle V. The front camera CF, rear camera CR, left-side camera CL, and right-side camera CR will also be collectively referred to simply as a camera 34 or cameras 34 if it is unnecessary to identify any of the cameras CF, CR, CL, and CR.

The front camera CF is mounted to a substantially middle of an upper end of the front windshield V18 in the vehicle width direction in the top of the interior V2, and has a front field of view in front of the own vehicle V. That is, the front camera CF is located on the first center line LC1 in plan view. The front camera CF can be mounted to the front portion V11 of the body V1. The front camera CF is configured to capture an image of the front field of view to accordingly acquire information on the captured image of the front field of view.

The rear camera CB is mounted to a substantially middle of a rear end V13 of the body V1 in the vehicle width direction, and has a rear field of view located at the rear of the own vehicle V. The rear camera CR is configured to capture an image of the rear field of view to accordingly acquire information on the captured image of the rear field of view.

The left-side camera CL is mounted to the left door mirror V17, and has a left-side field of view located at the left side of the own vehicle V. The left-side camera CL is configured to capture an image of the left-side field of view to accordingly acquire information on the captured image of the left-side field of view.

The right-side camera CR is mounted to the right door mirror V17, and has a right-side field of view located at the right side of the own vehicle V. The right-side camera CR is configured to capture an image of the right-side field of view to accordingly acquire information on the captured image of the right-side field of view.

The image captured by each camera 34 is comprised of two-dimensionally arranged pixels respectively corresponding to the two-dimensionally arranged light-sensitive elements of the corresponding camera 34.

The driving ECU 2 can recognize a target object B based on the images captured by any camera 34, i.e., determine, based on the images captured by any camera 34, at least a location of a target object B and a type of the target object B.

Figure 10:
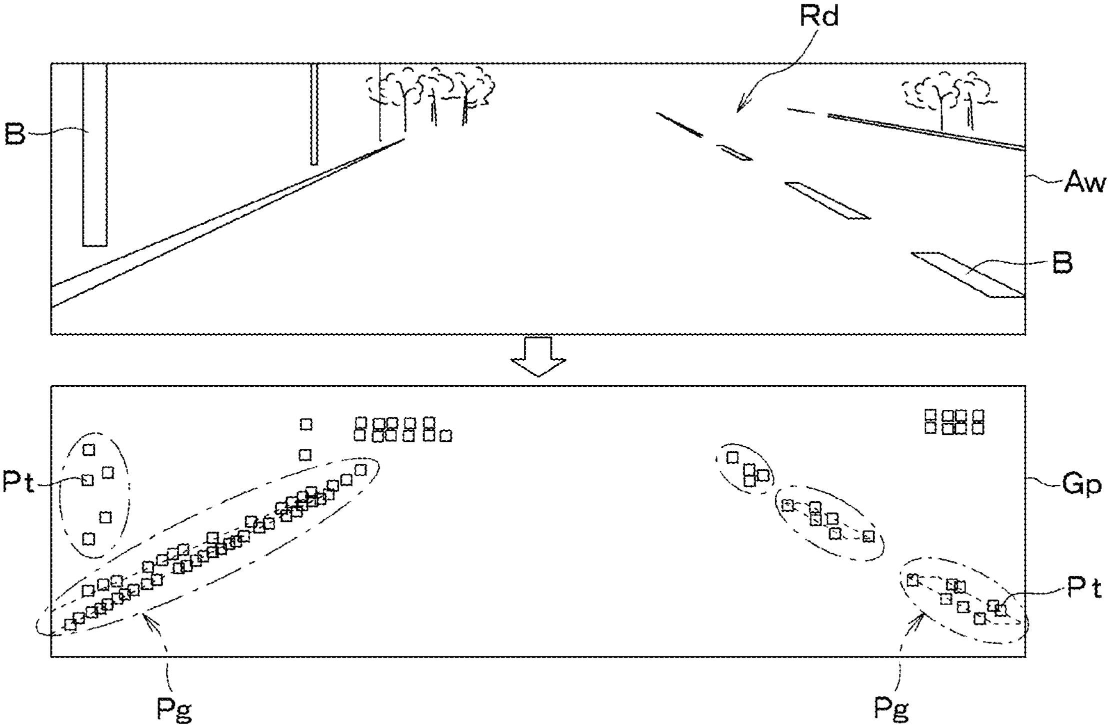
FIG. 10 is a diagram schematically illustrating target-object detection using a camera illustrated in FIG. 2.

FIG. 10 illustrates an example of how the driving ECU 2 recognizes target objects B included in the front field of view in accordance with an image of the front field of view captured by the front camera CF; the front field of view includes a road Rd in front of the own vehicle V. In the specification, reference character Rd is assigned to any road for the sake of convenience, but roads to which the same reference character Rd are assigned may not necessarily represent the same road.

Specifically, the driving ECU 2 sets, in a captured image, a detection region Aw. The detection region Aw represents a part or a whole of an entire region of the captured image, i.e., an entire view-angle region of the front camera CF. Then, the driving ECU 2 acquires, based on pixel feature parameters of the image data included in the detection region Aw, a feature-point image Gp. The pixel feature parameters of the image data represent feature parameters of each pixel constituting the image data based on corresponding received light, and can include, for example, a luminance, a contrast, and a hue of each pixel of the image data. The luminance of each pixel can be referred to as the brightness of the corresponding pixel, and the hue of each pixel can be referred to as the chroma of the corresponding pixel.

The feature-point image Gp is comprised of feature points Pt two-dimensionally arranged in the horizontal direction and the vertical direction like a frame image; each of the feature points Pt is extracted from the image data included in the detection region Aw based on, for example, the difference and/or change gradient between a corresponding adjacent pair of the pixels of the image data. The feature points Pt characterize the shape of a target object B included in the detection region Aw of a captured image. In other words, the feature points Pt are characteristic points, i.e., characteristic pixels, of the image data included in the detection region Aw.

The driving ECU 2 performs a pattern matching task of matching one or more feature-point clouds Pg, each of which is an assembly of the corresponding feature points Pt, with predetermined patterns stored therein to accordingly identify, for each of the feature-point clouds Pg, the type of a corresponding one of the target objects B based on the corresponding one of the feature-point clouds Pg.

Various methods of extracting, from the image data included in the detection region Aw, the feature points Pt have been well known. For example, an extraction method using a Sobel filter, an extraction method using Laplacian filter, an extraction method using a Canny algorithm can be used to extract, from the image data included in the detection region Aw, the feature points Pt. Therefore, detailed descriptions of one of the well-known extraction methods used in the specification are omitted. Extraction of the feature points Pt from the image data included in the detection region Aw can be expressed as detection of the feature points Pt from the image data included in the detection region Aw.

The driving ECU 2 can estimate a relative position of the recognized target object B relative to the own vehicle V and/or a distance, i.e., a range, of the recognized target object B relative to the own vehicle V.

Figure 11:
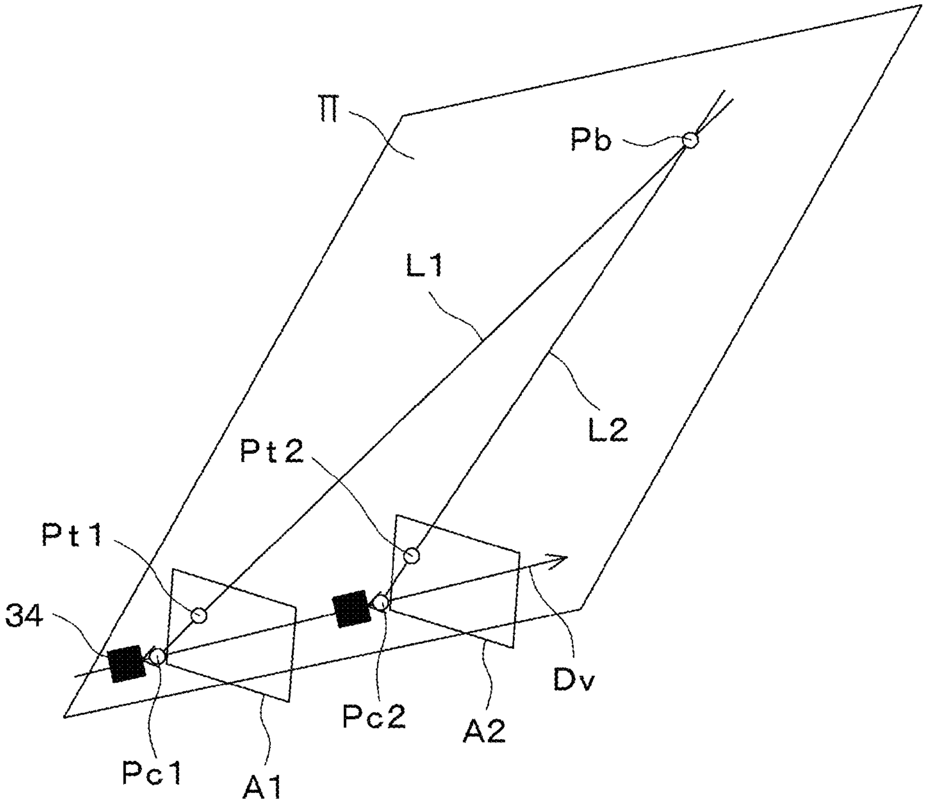
FIG. 11 is a diagram schematically illustrating target-object detection using a camera illustrated in FIG. 2.

FIG. 11 illustrates an example where the driving ECU 2 calculates an estimated point Pb as an estimation result of three-dimensional positions of each feature point Pt corresponding to a target object B using, for example, a monocular motion stereo method, in other words, a Structure from Motion (SFM) method. The present disclosure can calculate the estimated point Pb as the estimation result of the three-dimensional positions of each feature point Pt corresponding to a target object B using a selected one of the other calculation methods. That is, each camera 34 can be configured as a compound-eye stereo camera.

Let us assume that, as illustrated in FIG. 11, the camera 34 is moving, together with the own vehicle V, toward the own-vehicle movement direction Dv of the own vehicle V. The position of the camera 34 at time t1 will be referred to as a first camera position Pc1, and the position of the camera 34 at time t2 after the time t1 will be referred to as a second camera position Pc2. A first captured image A1 is an image captured by the camera 34 at the first camera position Pc1, and a second captured image A2 is an image captured by the camera 34 at the second camera position Pc2.

A first feature point Pt1 is a feature point Pt extracted from the first captured image A1, and a second feature point Pt2, which is extracted from the second captured image A2, is estimated correspond to the first feature point Pt1 at the time t1. That is, the second feature point Pt2 is a point to which a point on the target object B corresponding to the first feature point Pt1 is estimated to have moved for an elapsed time (t2−t1) from the time t1 to the time t2. The driving ECU 2 can determine whether the first feature point Pt1 and the second feature point Pt1 are based on the same point on the target object B, i.e., the first feature point Pt1 on the target object B corresponds to the second feature point Pt2 thereon, using one of well-known methods, such as an optical-flow method. Then, the driving ECU 2 defines a first line L1 passing through the first camera position Pc1 and the first feature point Pt1 and a second line L2 passing through the second camera position Pc2 and the second feature point Pt2, and calculates a point of intersection of the first and second lines L1 and L2 as the estimated point Pb. The estimated point Pb represents, in a three-dimensional coordinate system defined relative to the own vehicle V, a point on the target object B, which corresponds to both the first feature point Pt1 and the second feature point Pt2. If the estimated point Pb is a stationary point, the estimated point Pb satisfies epipolar constraint. The epipolar constraint is an epipolar-geometric constraint that the first camera position Pc1, the second camera position Pc2, and the estimated point Pb lie on the same plane Π at any time t1 or t2.

Various Sensors

Referring to FIGS. 1 and 2, the operation sensors 35 are each provided in the own vehicle V for outputting a parameter indicative of a corresponding driver's operated state of the own vehicle V. The parameters to be outputted from the respective operation sensors 35, each of which represents the corresponding driver's operated state of the own vehicle V, may for example include (i) a driver's operated quantity of an accelerator pedal of the own vehicle V, (ii) a driver's operated quantity of a brake pedal of the own vehicle V, (iii) a driver's set current shift position of the shift lever, (iv) a driver's operated steering angle of the steering wheel V24, and (v) a driver's applied steering torque of the steering wheel V24. That is, the operation sensors 35 include known sensors including, for example an accelerator-pedal sensor, a brake-pedal sensor, a shift-position sensor, a steering-angle sensor, and a steering-torque sensor. That is, these known sensors are collectively referred to as the operation sensors 35 for the sake of simple illustration and simple descriptions. The operation sensors 35 can include a steering-wheel sensor for detecting information indicative of whether the driver D grasps the steering wheel V24.

The behavior sensors 36 are each provided in the own vehicle V for outputting a parameter indicative of a corresponding drive behavior of the own vehicle V. The parameters to be outputted from the respective behavior sensors 36, each of which represents the corresponding behavior of the own vehicle V, may for example include (i) a speed of the own vehicle V, (ii) a yaw rate of the own vehicle V, (iii) an acceleration of the own vehicle V in the longitudinal direction, and (iv) an acceleration of the own vehicle V in the vehicle width direction. That is, the behavior sensors 36 include known sensors including, for example a vehicle speed sensor, a yaw-rate sensor, and acceleration sensors. That is, these known sensors are collectively referred to as the behavior sensors 36 for the sake of simple illustration and simple descriptions.

Driver-State Monitor

Referring to FIGS. 1, 2, 12, and 13, the driver-state monitor 37 is configured to sequentially capture images of the driver D, and sequentially detect driver's state parameters representing the driver's states based on the captured images of the driver D. The driver's conditions include, for example, information indicative of whether the driver D is in an awake state.

Specifically, the driver-state monitor 37 includes a driver monitor camera having a predetermined field of view; the driver monitor camera is located in the interior V2 such that at least the head D1 of the driver D2 who is sitting on the driver's seat V23 lies within the field of view of the driver monitor camera. This enables the driver monitor camera to capture, from the front, images of the face D2 of the driver D. The driver monitor camera can be configured as a near-infrared camera.

The driver-state monitor 37 includes an image processing unit configured to perform image-processing tasks on the images captured by the driver monitor camera to accordingly detect the driver's state parameters.

Figure 12:
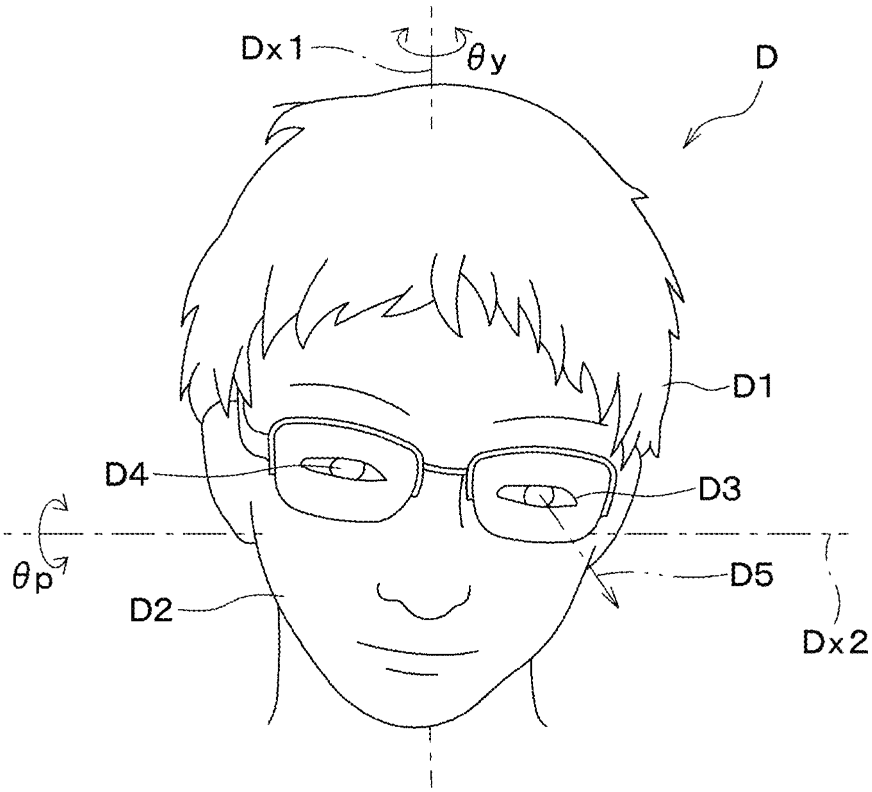
FIG. 12 is a diagram schematically illustrating driver-state detection using a driver-state monitor illustrated in FIG. 2.
Figure 13:
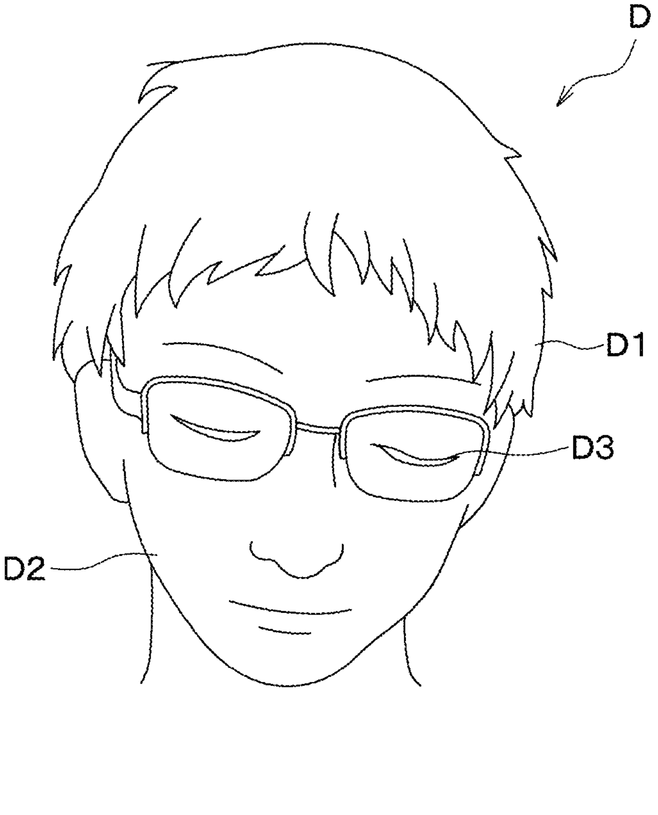
FIG. 13 is a diagram schematically illustrating driver-state detection using a driver-state monitor illustrated in FIG. 2.

The driver's state parameters to be detected by the driver-state monitor 37 for example include, as illustrated in FIGS. 12 and 13, (i) the direction of the face D2 of the driver D, (ii) the degree of opening of each driver's eye D3, and (iii) the position of each pupil D4 of the driver D. The direction of the face D2 of the driver D is defined by a yaw angle θy and a pitch angle θp of the face D2 of the driver D. The yaw angle θy represents a rotational angle of the face D2 of the driver D around a vertical axis Dx1 extending vertically through the head D1 of the driver D. When the face D2 of the driver D faces the front, the yaw angle θy is 0°. That is, the yaw angle θy becomes a corresponding positive degree when the face D2 of the driver D faces to the left relative to the front, and becomes a corresponding negative degree when the face D2 of the driver D faces to the right relative to the front.

The pitch angle θp represents a rotational angle of the face D2 of the driver D around a horizontal axis Dx2 extending horizontally through the face D2 of the driver D. When the face D2 of the driver D faces the front, the pitch angle θp is 0°. That is, the pitch angle θp becomes a corresponding positive degree when the face D2 of the driver D faces upward relative to the front, and becomes a corresponding negative degree when the face D2 of the driver D faces downward relative to the front.

FIG. 12 is an example of an image captured by the driver-state monitor 37 in which the driver D is in the awake state, and FIG. 13 is an example of an image captured by the driver-state monitor 37 in which the driver D is not in the awake state. FIGS. 12 and 13 show that the driver's state parameters of (i) the direction of the face D2 of the driver D, (ii) the degree of open of each driver's eye D3, and (iii) the position of each pupil D4 of the driver D enable the driving ECU 2 to detect the driver's states including, for example, (i) information about whether the driver D is in the awake state and (ii) information about the driver's line of sight D5.

Operation Switches

Referring to FIGS. 1 and 2, the operation switches 38 are various switches that can be operated by the driver E when the driver E is driving the own vehicle E, and are provided at predetermined positions in the interior V2. Each of the operation switches 38 is a switch whose operated quantity and operated state are exempted from being detected by the operation sensors 35. Specifically, the operation switches 38 for example include an ignition switch 381, a blinker switch 382, and one or more AD/ADAS switches 383. The ignition switch 381, which can be called a start switch or a power switch, is a switch for activating or deactivating the system-installed vehicle V, i.e., the vehicular system 1. The blinker switch 382 is configured to detect a driver's operated state of a blinker lever of the own vehicle V. The AD/ADAS switches 383 are switches that enable the driver E, when operating them, to input, to the driving ECU 2, various instructions related to the driving assistance or the autonomous driving of the own vehicle V; the various instructions related to the driving assistance or the autonomous driving of the own vehicle V include, for example, a start instruction, a stop instruction, a level setting instruction, and a function selection instruction.

The locator 39 is configured to acquire highly accurate position information on the own vehicle V. Specifically, the locator 39 is configured as a complex positioning system, and is comprised of a GNSS receiver 391, an inertia detector 392, and a locator ECU 393.

The GNSS is an abbreviation for Global Navigation Satellite System, and the highly accurate position information on the own vehicle V is positional information on the own vehicle V, which has at least a position accuracy usable by the advanced driving assistance in the SAL level 2 or more, in other words, a position accuracy with an error of lower than or equal to 10 cm. As the locator 39, a commercially available positioning system, such as a POSLV system for land vehicles, in other words, a positioning azimuth system for land vehicles, manufactured by Applanix Corporation, can be used.

The GNSS receiver 391 can be configured to receive the navigation signals transmitted from at least one positioning satellite, that is, at least one artificial satellite. In particular, the GNSS receiver 391 is configured to be able to receive receiving the navigation signals from a positioning satellite included in at least one GNSS selected from the GPS, the QZSS, the GLONASS, the GLONASS, the Galileo, the IRNSS, and the Beidou Navigation Satellite System. GPS is an abbreviation for Global Positioning System, QZSS is an abbreviation for Quasi-Zenith Satellite System, GLONASS is an abbreviation for Global Navigation Satellite System, and IRNSS is an abbreviation for Indian Regional Navigation Satellite System.

The inertia detector 392 is configured to detect (i) linear accelerations acting on the own vehicle V in respective three axes corresponding to the vehicle longitudinal direction, the vehicle width direction, and the vehicle height direction, and (ii) angular velocities acting on the own vehicle V around the respective three axes. For example, the locator 39 has a substantially box-shaped housing, and inertia detector 392 is comprised of a three-axis accelerometer and a three-axis gyro sensor installed in the housing.

The locator ECU 393 includes a vehicular microcomputer comprised of a CPU, a ROM, a RAM, an input/output (I/O) interface, and other peripheral devices. The locator ECU 393 is configured to sequentially determine the current position and/or the current azimuth of the own vehicle V in accordance with the navigation signals received by the GNSS receiver 391 and the linear accelerations and angular velocities detected by the inertia detector 392.

Vehicular Communication Module

The vehicular communication module 4, which will also be referred to as a DCM 4, can be configured to communicate information with base stations located around the own vehicle V using wireless communications that are compliant with a predetermined communication standard, such as Long Term Evolution (LTE) or 5th Generation (5G).

Specifically, the vehicular communication module 4 is configured to acquire traffic information, such as traffic-jam information, from probe servers and/or predetermined databases in a cloud computing environment. The traffic-jam information includes, for example, the location and the length of at least one traffic-jam section. Specifically, the traffic-jam information includes, for example, various information items about at least one traffic-jam section, such as the head of the at least one traffic-jam section, the tail of the at least one traffic-jam section, an estimated length of the at least one traffic-jam section, and an estimated time for the at least one traffic-jam section. The traffic information will also be referred to as road traffic information.

Additionally, the vehicular communication module 4 is configured to retrieve, from at least one of the probe servers, latest HD map information, and store the HD map information in the HD map database 5.

HD Map Database

The HD map database 5 is comprised of mainly one or more non-volatile rewritable memories, and is configured to store the HD map information to be rewritable while holding the stored HD map information even if power supplied to the HD map database 5 is shut off. The HD map information will also be referred to as HD map data.

The HD map information includes higher-definition map information than map information stored in a standard (SD) map database 601 of the navigation system 6. That is, the higher-definition map information has a positional error lower than or equal to an error of approximately several meters of the map information stored in the SD map database 601.

Specifically, the HD map information database 5 stores, as the HD map information, for example, map information available by the advanced driving assistance or the autonomous driving, that includes, for example, (i) information about three-dimensional road shapes, (ii) information about the number of lanes in each road, and (iii) information about road traffic regulations. The HD map information is stored in the HD map information database 5 to be in conformity with a predetermined standard, such as ADASIS.

Navigation System

The navigation system 6 is configured to calculate a scheduled travel route from the current position of the own vehicle V to a destination. The navigation system 6 of the base embodiment is configured to calculate the scheduled travel route based on (i) the destination inputted by, for example the driver D through, for example, the HMI system 7, (ii) the HD map information stored in the HD map database 5 or the SD map information stored in the SD map database 601, and (iii) the position information on the own vehicle V, such as the current position and the current azimuth of the own vehicle V. The navigation system 6 is additionally configured to provide various information including the scheduled travel route to one or more selected components of the vehicular system 1, such as the driving ECU 2 and/or the HMI system 7, through the vehicular communication network 10. That is, the navigation system 6 is capable of instructing the HMI system 7 to sequentially display navigation images that show, for example, maps on which the current position of the own vehicle V and the scheduled travel route respectively appear.

HMI System

The HMI system 7 is designed as a vehicular HMI system, and is configured to implement information communications between the own vehicle V and one or more occupants including the driver D of the own vehicle V.

Specifically, the HMI system 7 is configured to provide, i.e., display, various information items at least visibly to the one or more occupants, and enable occupant's input on information input relative to the provided information items. The various information items to be provided to the one or more occupants include, for example, various guide information items, information items on input-operation guidance, notification of inputted information, and/or warnings.

The HMI system 7 is typically comprised of I/O components mounted to the steering wheel V24 or installed in the dashboard V21, which is so-called "dashboard HMI". At least one of the I/O components of the HMI system 7 can be mounted to at least one portion in the interior V2 except for the dashboard V21, such as the cell in the interior V2 or a center console located between the driver's seat V23 and the passenger's seat V22 adjacent to the driver's seat V23.

The HMI system 7 includes an HMI control unit (HCU) 701, a meter panel 702, a main display device 703, a head-up display 704, a speaker 705, and operation devices 706.

The HCU 701 includes a vehicular microcomputer comprised of a CPU, a ROM, a RAM, an input/output (I/O) interface, and other peripheral devices. The HCU 701 is configured to perform overall control of display output and/or audible output through the HMI system 7. That is, the HCU 701 is configured to control operations of each of the meter panel 702, the main display device 703, the head-up display 704, and the speaker 705.

The meter panel 702 is installed in the dashboard V21 to be arranged to face the driver's seat V23. The meter panel 702 is configured to display metered values including, for example, the speed of the own vehicle V, the temperature of the coolant, and the fuel level. The meter panel 702 is additionally configured to display various information items including, for example, the current date and time, the outside temperature, the receivable radio broadcasts.

The main display device 703, which is also called a center information display (CID) device, is installed in the middle of the dashboard V21 in the vehicle width direction, which enables the one or more occupants to visibly recognize information displayed thereon.

The main display device 703 has a housing and a screen installed in the housing, and can be configured to successively display, on the screen, the navigation images generated by the navigation system 6, which show, for example, maps on which the current position of the own vehicle V and the scheduled travel route respectively appear. The main display device 703 can be additionally configured to display, on the screen, various information and contents different from the navigation images. For example, the main display device 703 can be configured to display a drive-mode setting image on which icons of plural driving modes are selectably displayed; the plural driving modes include a comfort drive mode, a normal driving mode, a sport driving mode, and a circuit drive mode. The main display mode 703 is moreover configured to display, on the screen, a second-task image on which icons of plural second tasks are selectably displayed; the second tasks, which are other than the driving tasks of the own vehicle V, are usable by the driver D during the autonomous driving of the own vehicle V. For example, the secondary tasks include (i) a task of reading digital books, (ii) a task of operating a mobile communication terminal, and (iii) a task of watching video contents, such as movies, concert videos, music videos, or television broadcasts. The second tasks can be called secondary activities or other tasks.

Referring to FIGS. 1, 2, 14, and 15, the head-up display 704 is configured to display a virtual image M including letters, figures, and/or characters in the driver's forward view. The head-up display 704 of the base embodiment is configured to project the virtual image M in front of the driver D using AR technologies to accordingly superimpose the virtual image M on the forward scenery including the road surface FR located at the traveling course of the own vehicle V; AR is abbreviated for Augmented Reality. The task of superimposing the virtual image M on the forward scenery can display information included in the virtual image M, which is related to at least one focusing target included in the forward scenery, to be positionally linked to the at least one focusing target.

For example, the task of superimposing the virtual image M on the forward scenery can display the information included in the virtual image M while superimposing the information on the at least one focusing target, or display the information included in the virtual image M while being adjacent to the at least one focusing target. The at least one focusing target is, for example, at least one target object on which the driver D driving the own vehicle V should focus, i.e., to which the driver D driving the own vehicle V should pay attention. The at least one focusing target includes, for example, a road-surface marking (a road marking), a road sign, a forward vehicle, and/or a pedestrian. For example, the head-up display 704 can be configured to superimpose the scheduled travel route, a traveling direction of the own vehicle V, traffic information, and other similar information on a forward road surface FR as the focusing target.

An area on the front windshield V18 on which the virtual image M is projected will be referred to as a projection area AP.

Figure 14:
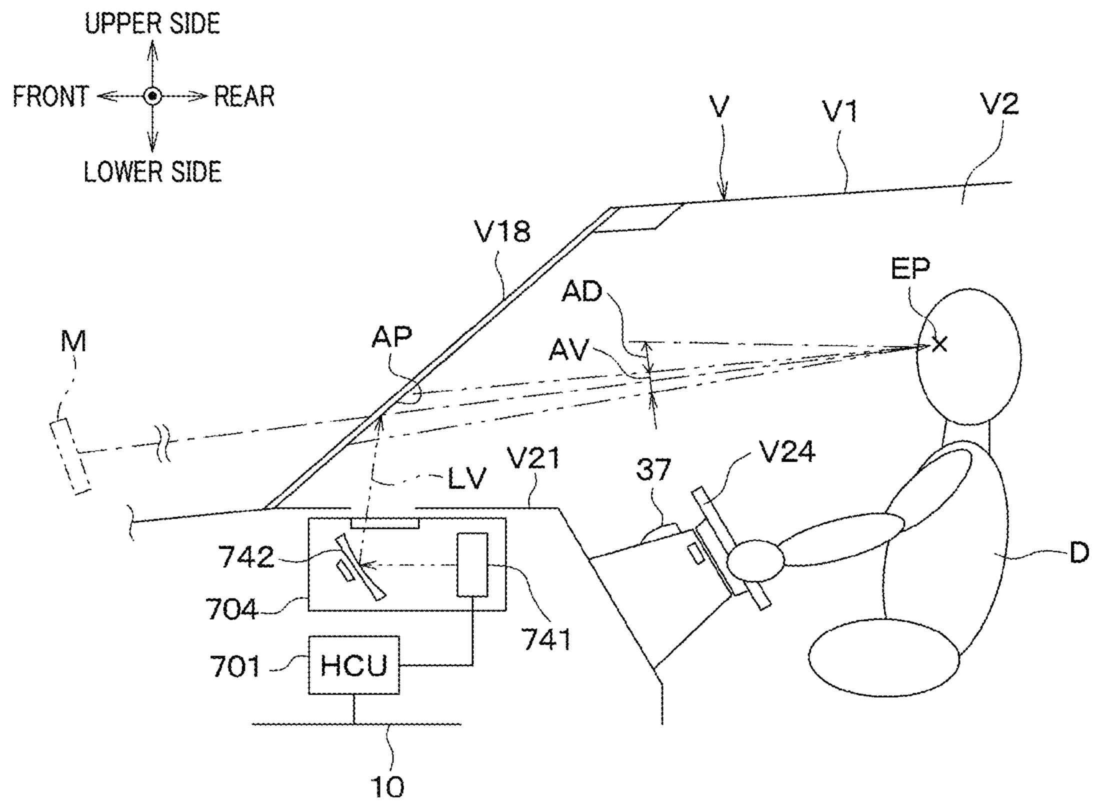
FIG. 14 is a diagram illustrating a schematic configuration of a head-up display illustrated in FIG. 2.

The head-up display 704 has, as illustrated in FIG. 14, a depression angle AD of, for example, a positive degree more than 0°. The depression angle AD of the head-up display 704 is defined, in for example side view illustrated in FIG. 14, as an angle formed between a virtual horizontal plane passing through the eyepoints EP of the driver D and a virtual plane passing through the eyepoints EP of the driver D and a top edge of the projection area AP. The depression angle AD becomes a positive value when the eyepoints EP look down the top edge of the projection area AP, or becomes a negative value when the eyepoints EP look up the top edge of the projection area AP.

The head-up display 704 has a vertical angle of view AV and a horizontal angle of view, and the vertical angle of view AV defines a vertical width of the projection area AP, and the horizontal angle of view defines a horizontal width of the projection area AP. The horizontal angle of view being set to be greater than the vertical angle of view AV results in the projection area AP having a substantially rectangular shape. The vertical angle of view AV can be defined, in for example left side view illustrated in FIG. 14, as an angle formed between the virtual line passing through the left eyepoint EP of the driver D and the top edge of the projection area AP and a virtual line passing through the left eyepoint EP of the driver D and a bottom edge of the projection area AP. That is, the virtual angle of view AV represents an angular range in the vertical direction within which the left eyepoint EP can view the virtual image M, which can be called a vertical view angle in the vertical direction.

The head-up display 704 includes, as illustrated in FIG. 14, a projector 741 and a magnifying optical system 742. The projector 741 is configured to generate, based on a display image signal generated by the HCU 701, a light-based image LV, and emit the light-based image to the magnifying optical system 742. The magnifying optical system 742 includes a plurality of optical components including a concave mirror, and an actuator configured to control the alignment of the optical components. The magnifying optical system 742 is configured to project, using the optical components, a magnified image of the light-based image LV onto the front windshield V18 while controlling, through the actuator, the alignment of the optical components based on the location of the eyepoints EP detected by the driver-state monitor 37 to accordingly adjust the projected state of the magnified image onto the front windshield V18. This results in the magnified image based on the light-based image LV being projected in the projection area AP of the front windshield V18. This enables the driver D to visibly recognize the virtual image M based on reflected light of the magnified image projected in the projection area AP of the front windshield V18.

Figure 15:
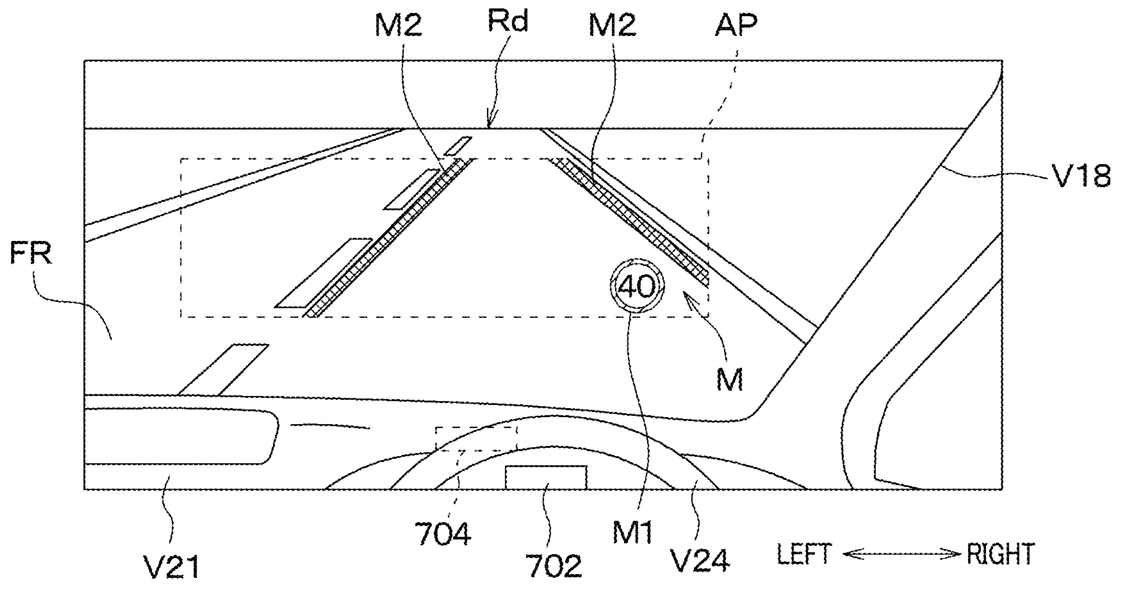
FIG. 15 is a schematic diagram illustrating (i) a road surface in front of an own vehicle through a front windshield and (ii) a part of a dashboard when viewed from a driver illustrated in FIG. 14.

FIG. 15 illustrates an example of the virtual image M. The virtual image M for example is comprised of a transparent base image, one or more information contents M1 contained in the transparent base image, and one or more graphic contents M2 contained in the transparent base image. The one or more information contents M1 are information contents displaying, for example, the maximum speed limit for a road Rd in which the own vehicle V is traveling, the current speed of the own vehicle V, the distance to the destination, an estimated arrival time to the destination, and the name of at least one building appearing in the forward scenery. The one or more graphic contents M2 are graphic contents indicative of lines and/or arrows, which are used to display information indicative of (i) the traveling direction of the own vehicle V and (ii) selection of lanes.

The head-up display 704 can be configured to display the virtual image M containing superimposed contents and non-superimposed contents. The superimposed contents are image contents linked to one or more specific focusing targets included in the forward scenery and superimposed on the one or more specific focusing targets. In contrast, the non-superimposed contents are image contents that are not linked to the one or more specific focusing targets included in the forward scenery and are not superimposed on the one or more specific focusing targets.

In the virtual image M illustrated as an example in FIG. 15, linear graphic contents, which are an example of the graphic contents M2, are superimposed on a lane on which the own vehicle V is traveling, and an information content indicative of the maximum speed limit for the current road of the own vehicle V, which is an example of the information contents M1, is located at a predetermined position of the virtual image M while being not superimposed on the graphic contents M2.

The HMI system 7 described above serves as a notifying unit for notifying information of the one or more occupants including the driver D in the own vehicle V.

Referring to FIGS. 1 and 2, the speaker 705 is configured to output voice related to information indicated by each of the meter panel 702, the main display device 703, and the head-up display 704. The speaker 705 can be configured to output voice, such as music and/or radio sound, which are not related to the information indicated by each of the meter panel 702, the main display device 703, and the head-up display 704.

The operation devices 706 are input devices that are not included in the operation switches 38, and operated quantities and operated states of the operation devices 706 are exempted from being detected by the operation sensors 35. Specifically, the operation devices 706 include, for example, switches mounted to the housing of the main display device 703 around the screen, and a transparent touch panel mounted to cover the screen of the main display device 703. The operation devices 703 may include switches mounted to a spoke of the steering wheel V24, and pointing devices, such as a touch panel, mounted to the center console.

The switches, pointing devices, and the touch panel of the operation devices 706 enable the one or more occupants, who are operating them, to enter various information items respectively corresponding to the switches, pointing devices, and touch panel.

The lighting system 8 includes a body ECU 801, headlamps 802, and blinkers 803.

The body ECU 801 includes a vehicular microcomputer comprised of a CPU, a ROM, a RAM, an input/output (I/O) interface, and other peripheral devices. The body ECU 801 is configured to control how the headlamps 802 light up in accordance with information inputted from the driving ECU 2 and/or the driving information input unit 3, and control how the blinkers 803 light up in accordance with information inputted from the driving ECU 2 and/or the driving information input unit 3, in particular information inputted from the blinker switch 382.

The motion control system 9 is configured to control motions of the own vehicle V, i.e., traveling behaviors of the own vehicle V, in accordance with information inputted by the driving ECU 2 and/or the driving information input unit 3.

Specifically, the motion control system 9 includes, for example, a drive system 91, a shift system 92, a brake system 93, and a steering system 94.

The drive system 91 includes a drive ECU 911 and a driving mechanism 912. The drive ECU 911 includes a vehicular microcomputer comprised of a CPU, a ROM, a RAM, an input/output (I/O) interface, and other peripheral devices. The drive ECU 911 is configured to receive, from the accelerator-pedal sensor or the driving ECU 2, an accelerator signal indicative of an acceleration request, and control operations of the drive mechanism 912 in accordance with the acceleration request. The drive mechanism 912 is configured to generate drive power that causes the system-installed vehicle V to travel. Specifically, the drive mechanism 912 includes an engine, i.e., an internal combustion engine, and one or more motors. That is, the system-installed vehicle V is any one of a gasoline-fueled vehicle, a diesel engine vehicle, a biofuel vehicle, a hydrogen engine vehicle, a hybrid vehicle, a battery electric vehicle (BEV), a fuel-cell vehicle, or other vehicles.

The shift system 92 includes a shift ECU 921 and a shift mechanism 922. The shift ECU 921 includes a vehicular microcomputer comprised of a CPU, a ROM, a RAM, an input/output (I/O) interface, and other peripheral devices. The shift ECU 921 is configured to receive, from the shift position sensor, a shift position signal indicative of the current shift position set by the shift lever or the driving ECU 2, and control operations of the shift mechanism 922 in accordance with the current shift position of the shift lever. The shift mechanism 922 is provided between the driving wheels of the wheels V3 and the drive mechanism 912 and includes an automatic transmission. Specifically, the shift ECU 921 is configured to control, in accordance with the shift position signal indicative of the current shift position set by the shift lever or the driving ECU 2, the shift mechanism 922 to perform (i) a first task of causing forward drive power generated by the drive mechanism 912 to transmit to the driving wheels for forward traveling of the own vehicle V, (ii) a second task of causing reverse drive power generated by the drive mechanism 912 to transmit to the driving wheels for rearward traveling of the own vehicle V, (iii) a third task of shutting off the drive power to the driving wheels to accordingly stop the own vehicle V, and/or (iv) a fourth task of changing a speed ratio between an input speed from the drive mechanism 912 to the shift mechanism 922 and an output speed outputted from the shift mechanism 922 to the driving wheels in forward movement of the own vehicle V. The shift system 92 can be configured as so-called shift-by-wire configuration.

The brake system 93 includes a brake ECU 931 and a brake mechanism 932. The brake ECU 931 includes a vehicular microcomputer comprised of a CPU, a ROM, a RAM, an input/output (I/O) interface, and other peripheral devices. The brake ECU 931 is configured to receive, from the brake-pedal sensor or the driving ECU 2, a braking signal indicative of a braking request, and control operations of the brake mechanism 932 in accordance with the braking request. The brake mechanism 932 includes a friction mechanism for each of the wheels V3. That is, the brake ECU 931 is configured to control, in accordance with the braking request, the friction mechanism for each wheel V3 to accordingly apply friction to each wheel V3, resulting in the own vehicle V being slowed down. The brake mechanism 932 can include a regenerative brake mechanism configured to rotate, by the kinetic energy of the own vehicle V, the driving wheels to accordingly slow down the own vehicle V due to load of the rotation of the driving wheels, and convert the kinetic energy of the own vehicle V into electrical power. The brake system 93 can be configured as so-called brake-by-wire configuration.

The steering system 94 includes a steering ECU 941 and a steering mechanism 942. The steering ECU 941 includes a vehicular microcomputer comprised of a CPU, a ROM, a RAM, an input/output (I/O) interface, and other peripheral devices. The steering ECU 941 is configured to receive, from the steering-angle sensor or the driving ECU 2, a steering signal indicative of a steering request, and control operations of the steering mechanism 942 in accordance with the steering request. That is, the steering ECU 941 is configured to control, in accordance with the steering request, the steering mechanism 942 to change the direction of each steered wheel, for example, each front wheel V3*a*, V3*b*, to accordingly change the traveling direction of the own vehicle V. The steering mechanism 942 can be configured to change the direction of each of the front and rear wheels V3*a*, V3*b*, V3*c*, and V3*d*. That is, the own vehicle V can be configured as a four-wheel steering vehicle. The steering system 94 can be configured as so-called steering-by-wire configuration.

Driving Control Based on Identification Results of at Least One of the ADAS Sensors 31 to 34

Figure 16:
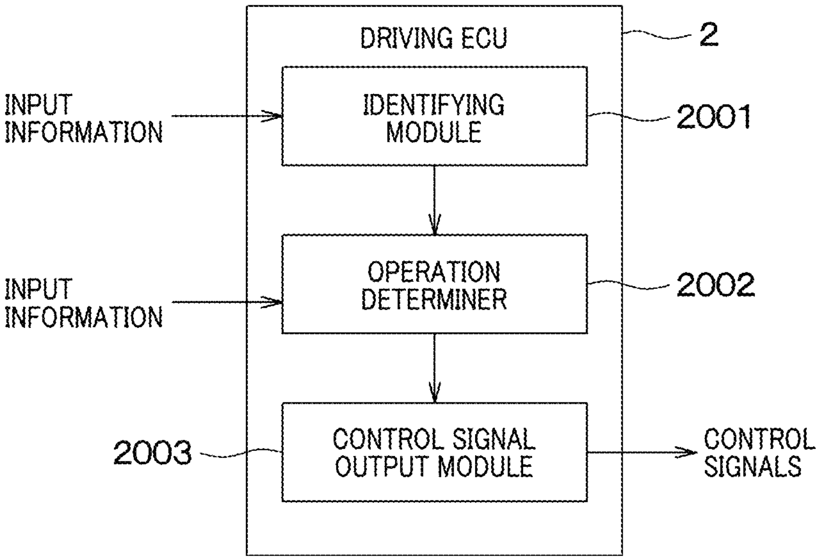
FIG. 16 is a block diagram illustrating a schematic functional configuration to be implemented by the driving ECU illustrated in FIG. 2.
Figure 17:
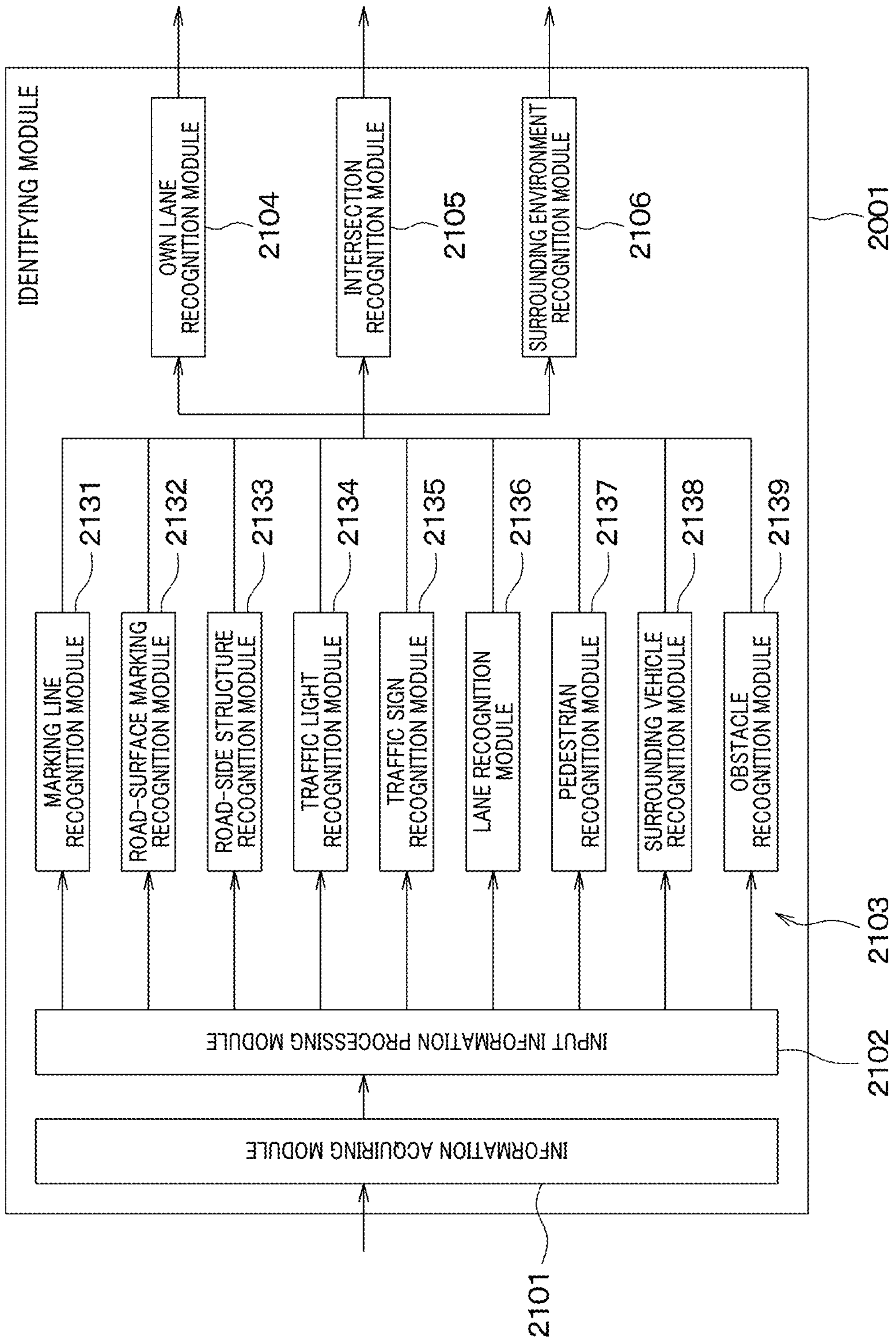
FIG. 17 is a block diagram illustrating a schematic functional configuration to be implemented by an identifying unit illustrated in FIG. 16.

FIGS. 16 and 17 schematically illustrate an example of functions implemented by the driving ECU 2. That is, the processor 21 executes the program instructions stored in the memory device 22 to accordingly implement the functions illustrated in FIGS. 16 and 17.

The following describes a summary of the autonomous driving of the own vehicle V carried out by the driving ECU 2 based on identification results of at least one of the ADAS sensors 31 to 34 around the own vehicle V.

Note that, in the base embodiment, "identification" conceptually includes "detection", "classification", and "recognition". Detection is to find a target object B based on at least one detection-point data cloud and/or images captured by the cameras 34. Detection of a target object B is to determine that there is a target object B, and not to identify the shape and/or attribute of the target object B. Classification of a target object B is to classify the shape and/or the attribute of the detected target object B into one of various object types, such as "humans", "vehicles", "buildings", and so on. In other words, a classified target object is a target object that has been detected and classified into one of the various object types. Recognition of a target object B is to determine whether the detected and classified target object B should be considered in driving control of the own vehicle V.

Detection of an object can include sensing of an object. Detection can conceptually include classification and/or recognition, classification can conceptually include detection and/or recognition, and recognition can conceptually include detection and classification.

Referring to FIG. 16, the driving ECU 2 includes, as functional components implemented by the processor 21, an identifying module 2001, an operation determiner 2002, and a control signal output module 2003.

The identifying module 2001 is operative to perform an identifying task for one or more target objects B around the own vehicle V in accordance with information items inputted from the surrounding monitor sensors 31 to 34, the operation sensors 35, and the behavior sensors 36. The operation determiner 2002 is operative to determine, based on an identified result of the identifying module 2001 and the information items inputted from the operation sensors 35 and the behavior sensors 36, one or more control tasks that are required at present to control the own vehicle V. The one or more control tasks for example include a collision avoiding task, an emergency stop task, and a warning task for the driver D.

The control signal output module 2003 is operative to output control signals based on the determined control tasks to selected components of the vehicular system 1. The control signals include, for example, a signal indicative of the steering signal indicative of a steering amount, the braking signal indicative of the amount of braking, and a message code signal indicative of a warning message.

Referring to FIG. 17, the identifying unit 120 includes an input information acquiring module 2101, an input information processing module 2102, a target object recognition module 2103, an own lane recognition module 2104, an intersection recognition module 2105, and a surrounding environment recognition module 2106.

The information acquiring module 2101 acquires the information items inputted from the surrounding monitor sensors 31 to 34, the operation sensors 35, and the behavior sensors 36, and holds the acquired information items in a sequential order. The input information processing module 2102 applies one or more predetermined tasks, such as a noise removal task and/or a coordinate conversion task, to the information items held in the information acquiring module 2101.

The target object recognition module 2103 is operative to perform a target object recognition task in accordance with the information items subjected to the predetermined tasks.

Specifically, the target object recognition module 2103 includes, for example, a marking line recognition module 2131, a road-surface marking recognition module 2132, a road-side structure recognition module 2133, a traffic light recognition module 2134, a traffic sign recognition module 2135, a lane recognition module 2136, a pedestrian recognition module 2137, a surrounding vehicle recognition module 2138, and an obstacle recognition module 2139.

Figure 18:
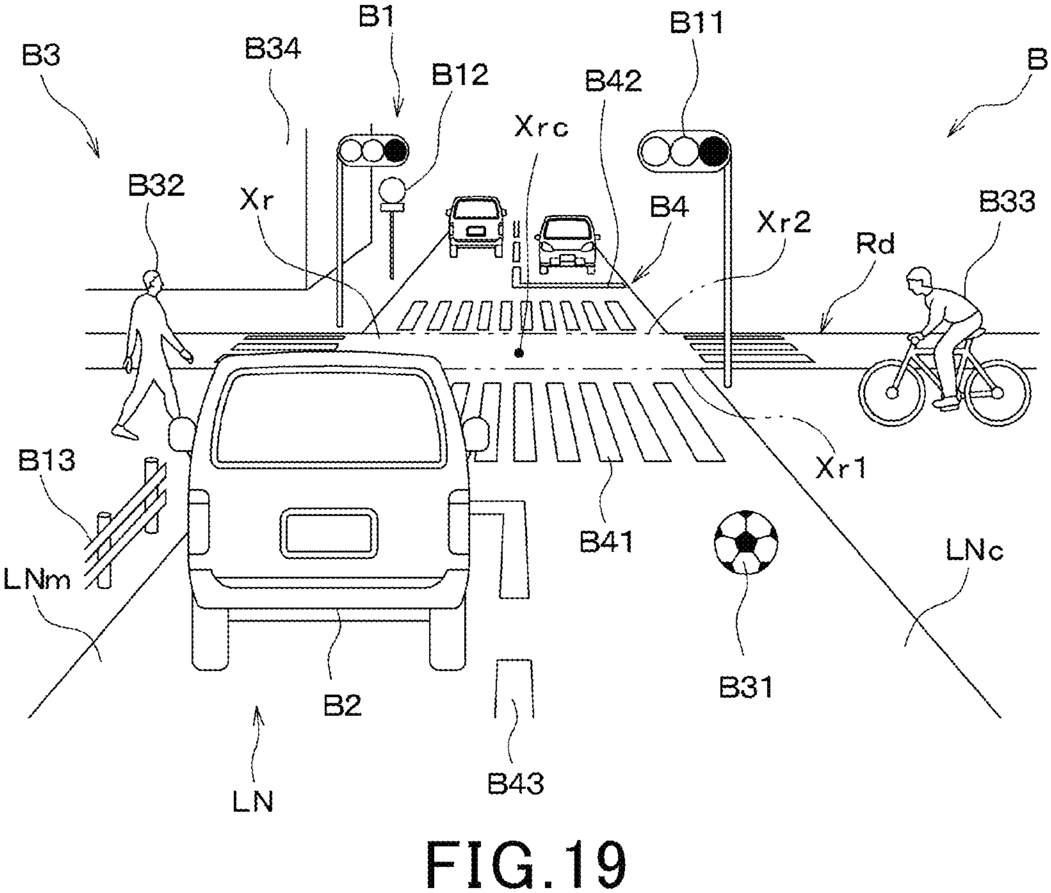
FIG. 18 is a schematic view illustrating a first example of target objects to be identified by the base embodiment.
Figure 19:
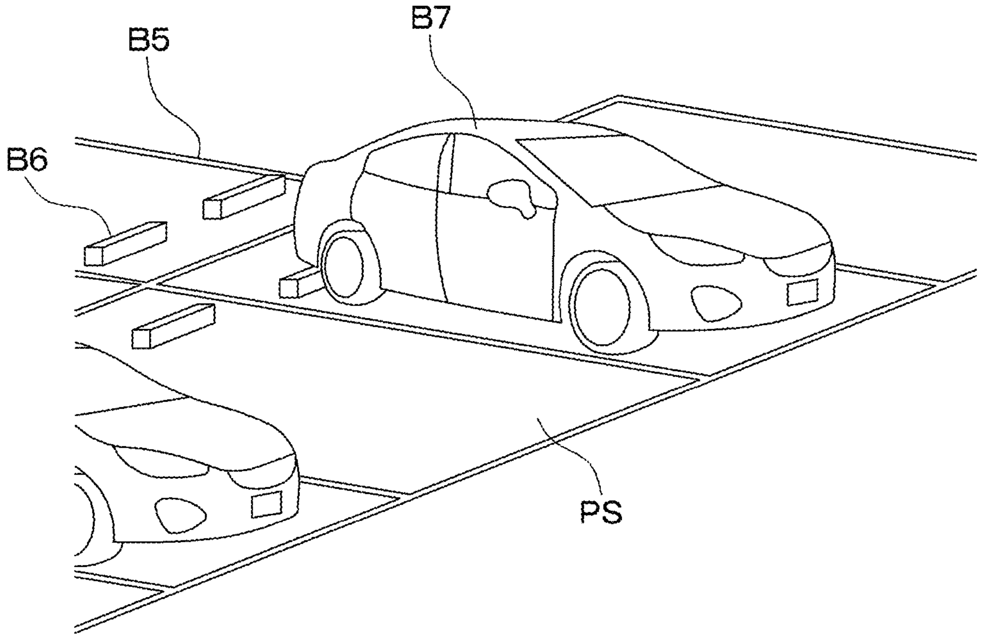
FIG. 19 is a schematic view illustrating a second example of target objects to be identified by the base embodiment.

Target objects B to be recognized by the identifying module 2001 are illustrated as examples in FIG. 18 or FIG. 19.

Referring to FIG. 18, target objects B broadly include, for example, traffic-related three-dimensional objects B1, other vehicles B2, general three-dimensional objects B3, and road-surface markings B4. The target objects B to be recognized by the identifying module 2001 additionally include, as illustrated in FIG. 19, parking-slot segment lines B5, wheel stoppers B6, and parked vehicles B7, which are related to detection of the parking slots PS and/or execution of parking assistance. The parking-slot segment lines B5 are for example painted lines to define the shape and area of each parking slot PS. Each of the wheel stoppers B6 is a block-like solid installed in each parking slot PS to stop wheels of a corresponding parked vehicle B7. Each of the parked vehicles B7 is a vehicle parked in the corresponding parking slot PS.

The traffic-related three-dimensional objects B1 are three-dimensional objects, such as traffic lights B11 and traffic signs B12, used for road-traffic safety. Each of the other vehicles B2 may become a target vehicle that the traveling own vehicle V tracks or an obstacle for the traveling own vehicle V, so that the parked vehicles B7 are excluded from the other vehicles B2. The general three-dimensional objects B3 are solid objects except for the traffic-related three-dimensional objects B1, the other vehicles B2, the wheel stoppers B6, and the parked vehicles V7, and may mainly constitute obstacles.

It is possible to recognize lanes LN in accordance with the recognized results of the target objects B that are acquired based on captured images. Specifically, although the parking slots PS or the lanes LN are different from the target objects B that are direct recognition targets by the ADAS sensors 31 to 34, these parking slots PS and the lanes LN can be indirect recognition targets based on the recognition results of the target objects B. The lanes LN as the indirect targets include, for example, an own lane LNm on which the own vehicle V is traveling and oncoming lanes LNc. The recognition targets to be recognized by the identifying module 2001 will be described in detail later.

The own lane recognition module 2104 is operative to recognize, based on the recognized results of the target objects B by the target object recognition module 2103, the location of the own vehicle V in a road in a width direction of the road; the road is a road in which the own vehicle V is traveling. The width direction of the road will be referred to as a road width direction, and a direction perpendicular to the road width direction will be referred to as a road extending direction. The road extending direction is a direction extending along the road, and can be referred to as a road extension direction or a road elongation direction. If the road Rd includes a plurality of lanes LN, the own lane recognition module 2104 is operative to recognize, as the own lane LNm, any one of the plural lanes LN arranged in the road width direction.

The intersection recognition module 2105 is operative to recognize, based on the recognized results of the target objects B by the target object recognition module 2103, an intersection Xr around the own vehicle V.

Specifically, the intersection recognition module 2105 is operative to recognize an intersection Xr that the own vehicle V is approaching in accordance with (i) whether there is a traffic light B11, (ii) which of color signal lights outputted from the traffic light B11 if it is determined that there is the traffic light B11, (iii) whether there is a stop line B42 as one of the road-surface markings B4, (iv) a location of an intersection entrance Xr1, (v) a location of an intersection exit Xr2, and (vi) traffic signs or marks, each of which indicates a corresponding traveling direction.

The surrounding environment recognition module 2106 is operative to recognize, based on the recognized results of the target objects B by the target object recognition module 2103, a surrounding environment around the own vehicle V, for example, how one or more obstacles are located around the own vehicle V.

These recognition results by the recognition modules 2103 to 2106 are used for the operation determiner 2002 that determines one or more control tasks that are required at present to control the own vehicle V.

Figure 20:
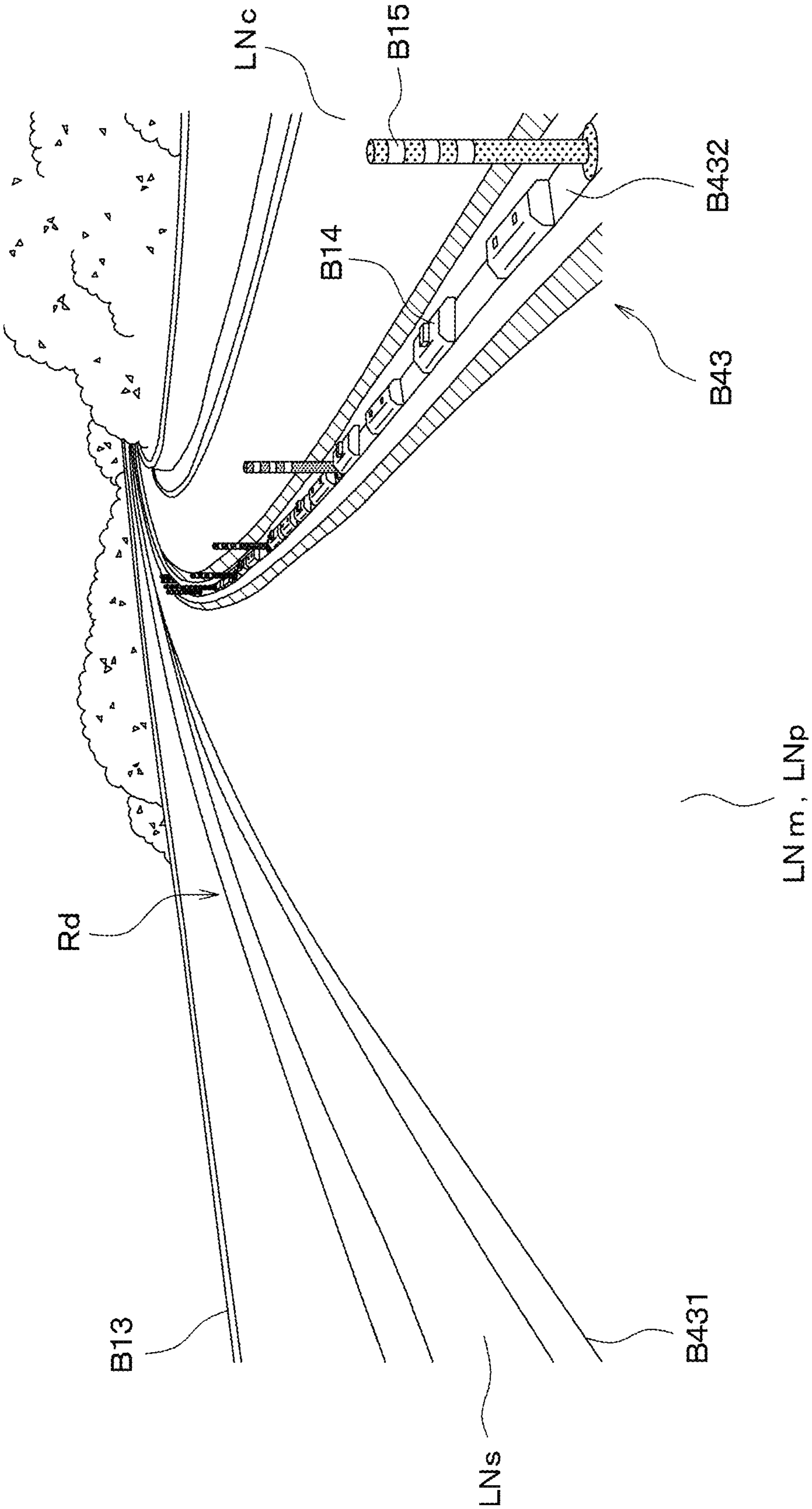
FIG. 20 is a schematic view illustrating a third example of target objects to be identified by the base embodiment.

FIG. 18 is an example of a forward scenery from the own vehicle V in a situation where the own vehicle V is approaching an intersection Xr that constitutes a crossroad and includes therein a signal light B11. An intersection Xr constituting a crossroad will be merely referred to as a cross intersection Xr. The recognition results of the signal light B11 and the traffic signs B12 included in the traffic-related three-dimensional objects B1 can be used for the HMI system 7 to notify information of the driver D and/or output warnings to the driver D. The recognition results of the signal light B11 and the traffic signs B12 included in the traffic-related three-dimensional objects B1 can also be used for the driving ECU 2 to perform motion control of the own vehicle V in the autonomous driving of the own vehicle V and/or in the driving assistance of the own vehicle V. The traffic-related three-dimensional objects B1 include, in addition to the signal lights B11 and the traffic signs B12, road-side structures B13, such as guardrails and curbstones. The traffic-related solid objects B11 also include, as illustrated in FIG. 20, road studs B14 and poles B15. The road studs may be recognized as obstacles depending on (i) the heights of the road studs and/or (ii) how the road studs are provided around the own vehicle V. The poles B15 are recognized as obstacles when the driving ECU 2 performs traveling control of the own vehicle V.

Referring to FIG. 18, the general three-dimensional objects B3 include, for example, fallen objects on the road surface B31, pedestrians B32, cyclists B33, and buildings B34. The fallen objects on the road surface B31, the pedestrians B32, and cyclists B33 are recognizes as obstacles when the driving ECU 2 performs traveling control of the own vehicle V. The buildings B34 are not recognized as obstacles, because the buildings B34 are located outside a road Rd, but may become contents to be superimposed on the forward scenery when the head-up display 704 displays the virtual image M.

Figure 21:
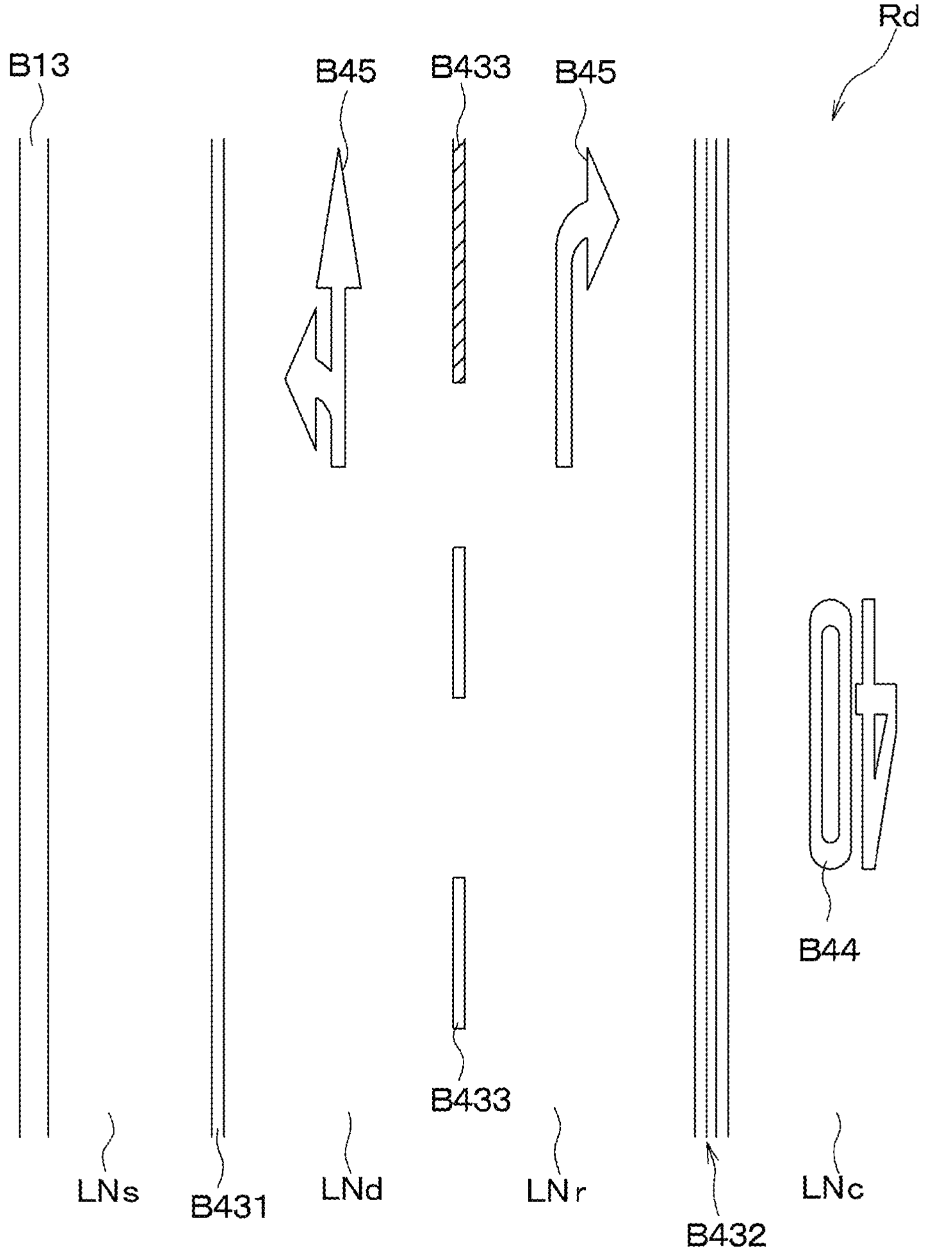
FIG. 21 is a schematic view illustrating a fourth example of target objects to be identified by the base embodiment.

The road-surface markings B4 include, for example, pedestrian-crossing markings B41, stop lines B42, and road making lines B43. The road-surface markings B4 additionally include, as illustrated in FIG. 21, letter markings B44 and symbol markings B45. The letter markings B44 include, for example, a numeral indicative of the maximum speed limit, vehicle traffic zones, such as "BUS ONLY", or restriction letters, such as "STOP". The symbol markings B45 include, for example, arrows indicating respective mandatory directions, and attention symbols for forward pedestrian crossings.

The recognition results of the road traffic markings B4 are used to estimate the location of each of the intersection entrance Xr1 and the intersection exit Xr2 and the location of the intersection center Xrc. The intersection entrance Xr1 represents an edge of a focusing intersection that the own vehicle V is going to enter. The focusing intersection is the nearest intersection Xr which (i) the own vehicle V is approaching and (ii) the own vehicle V is scheduled to pass through or is likely to pass through. An intersection which the own vehicle V is likely to pass through is, if no scheduled travel route and destination of the own vehicle V are determined by the navigation system 6, an intersection which is estimated, based on (i) a distance to the intersection from the own vehicle V and (ii) the speed of the own vehicle V, for the own vehicle V to pass through at a high probability. The intersection exit Xr2 represents an edge of the focusing intersection from which the own vehicle V is going to exit. The intersection center Xrc is the center of the focusing intersection.

Figure 22:
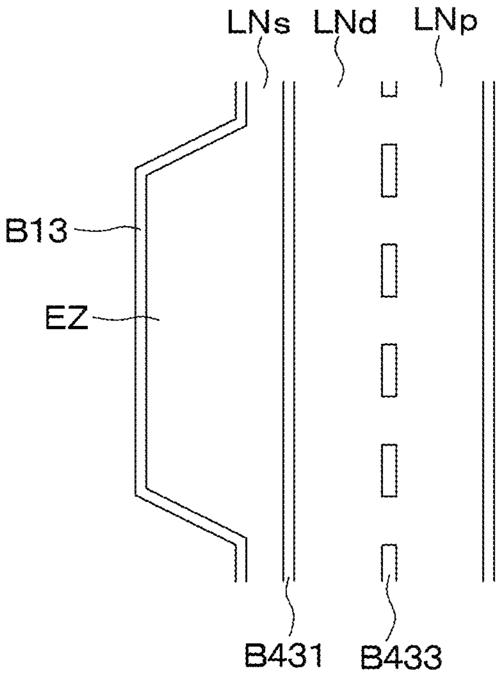
FIG. 22 is a schematic view illustrating a fifth example of target objects to be identified by the base embodiment.
Figure 23:
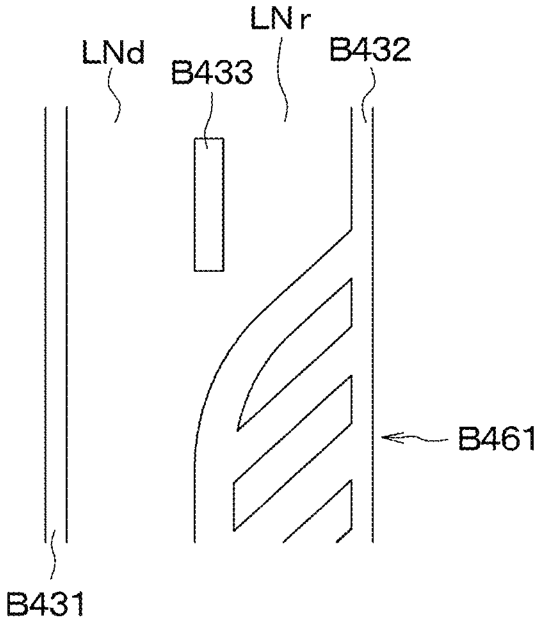
FIG. 23 is a schematic view illustrating a sixth example of target objects to be identified by the base embodiment.

As illustrated in FIGS. 22 and 23, the road making lines B43 include, for example, vehicle-road edge lines B431, centerlines B432, and lane lines B433. The vehicle-road edge lines B431 are provided for each vehicle-road, and they respectively show the left and right edges of the corresponding vehicle-road in the road width direction. The vehicle-road of a road Rd represents a section of the road Rd in which vehicles can travel. Each centerline B432 represents a line down the center of a two-way road, and divides the two-way road into two sections in the respective opposite traveling directions. Each centerline B432 is comprised of a single straight line pattern or a single broken line pattern, a double line pattern, or a triple line pattern. The lane lines B433 are provided for a road Rd with two or more lanes each way, and they divide the road Rd into two or more lanes each way. Each of the lane lines B433 is a painted white line or a painted yellow line. FIG. 20 illustrates, as an example, that a centerline B432 is comprised of a triple line pattern that is comprised of a white solid line and a pair of yellow lines located at both sides of the white line. The road studs B14 and the poles B15 are mounted on the white line of the triple line pattern of the centerline B432 illustrated in FIG. 20. FIG. 21 illustrates, as another example, that a centerline B432 is comprised of a double line pattern that is comprised of white solid lines, and the lane line B433 is comprised of a white broken line and a yellow solid line extending from the white broken line. It is possible to recognize, based on the recognition results of the road-side structures B13 and the road making lines B43, (i) a traveling lane LNd or an own lane LNm on which the own vehicle V is traveling (see for example FIGS. 20 and 21), (ii) oncoming lanes LNc (see for example FIGS. 20 and 21), (iii) a passing lane LNp (see for example, FIG. 20), (iv) a right turn lane LNr (see FIG. 21), (v) a road shoulder LNs (see FIGS. 20 and 21), and (vi) an emergency parking zone EZ (not shown).

The road traffic markings B4 additionally include, for example, diversion zone markings, i.e., zebra zone markings, B461, safety zone markings B462, no trespassing zone markings B463, and no stopping zone markings B464.

The diversion zone marking B461 is painted on a road and indicates a diversion zone where it is necessary to guide the safe and smooth running of vehicles. As described above, the diversion zone marking B461 is a marking that indicates a diversion zone for guiding the safe and smooth running of vehicles, and vehicles are legally not prohibited from entering the diversion zone. The diversion zone marking B461 can be provided to be adjacent to (i) an intersection Xr, (ii) a junction of roads, or (iii) a fork in a road.

Figure 24:
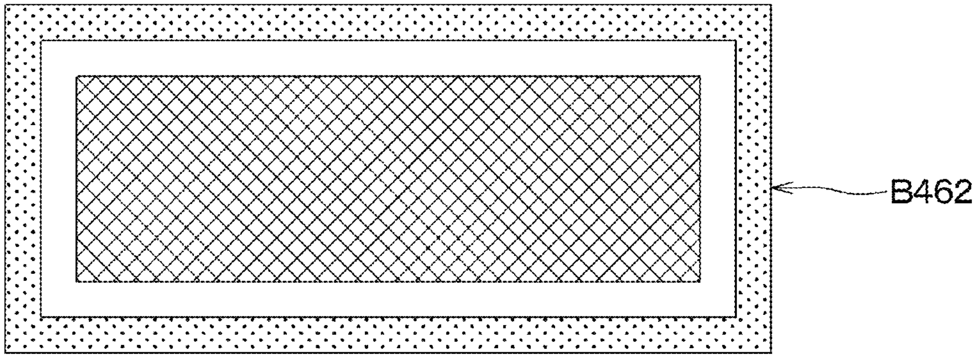
FIG. 24 is a schematic view illustrating a fifth example of a target object to be identified by the base embodiment.

The safety zone marking B462 illustrated in FIG. 24 is used to indicate a safety zone. The safety zone represents, on a road, a zone provided to ensure safety of, for example, pedestrians B32, so that vehicles cannot regally enter the safety zone.

Figure 25:
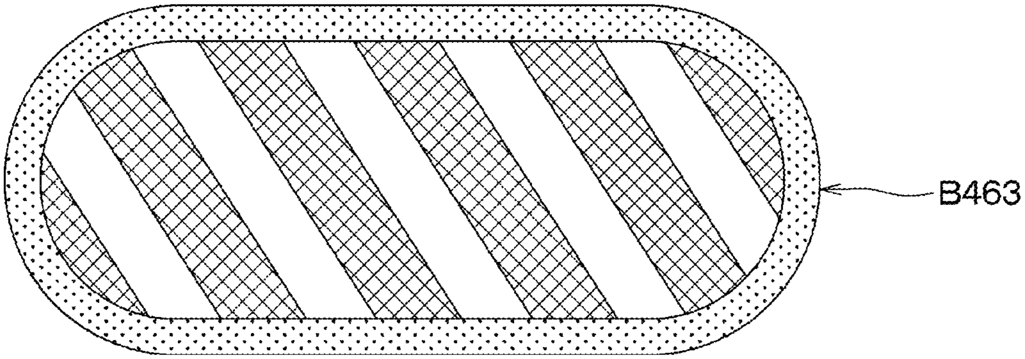
FIG. 25 is a schematic view illustrating a sixth example of a target object to be identified by the base embodiment.

The no trespassing zone marking B463 illustrated in FIG. 25 is used to indicate a no trespassing zone. The no trespassing zone represents, on a road, a zone that cannot be used for traveling of vehicles, so that vehicles cannot enter the inside of the no trespassing zone.

Figure 26:
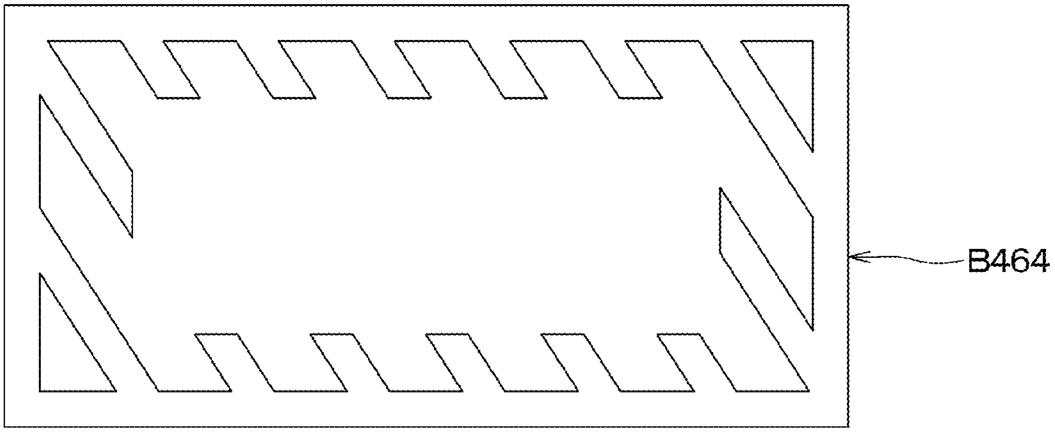
FIG. 26 is a schematic view illustrating a seventh example of a target object to be identified by the base embodiment.

The no stopping zone marking B464 illustrated in FIG. 26 is used to indicate a no stopping zone. The no stopping zone represents, on a road, a zone that, when a vehicle is likely to be stopped depending on the situations in front of the vehicle, the vehicle should not enter. That is, when any vehicle waits for a traffic light or is in a traffic jam, the vehicle should not be stopped inside the no stopping zone marking B464.

Figure 27:
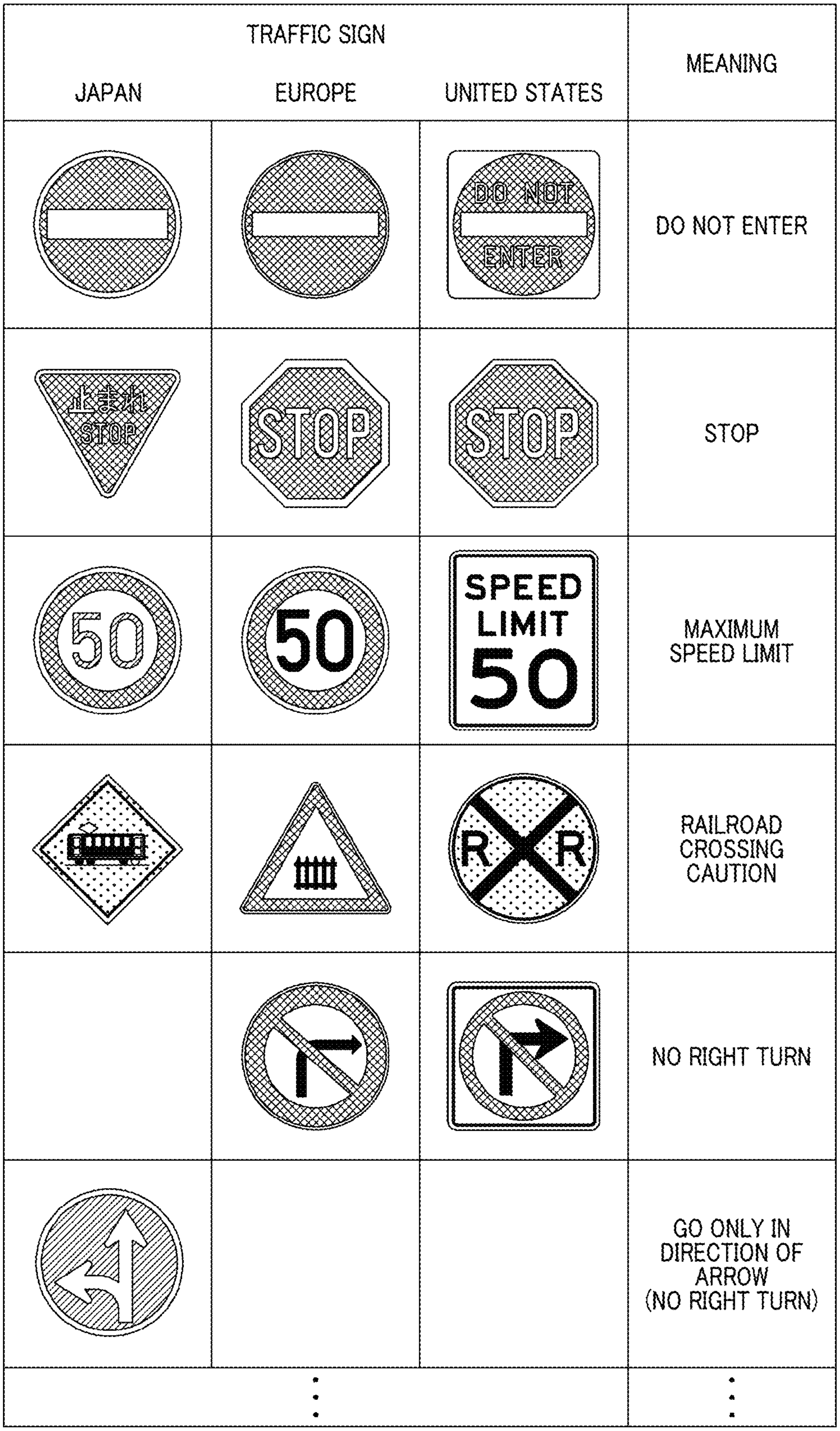
FIG. 27 is a diagram schematically illustrating traffic signs as an eight example of target objects.

FIG. 27 illustrates examples of the traffic signs B12. Each of the traffic signs B12 are installed adjacent to corresponding one or more roads Rd or installed above the corresponding one or more roads Rd. Each of the traffic signs B12 is comprised of a display board designed to offer corresponding necessary information to users who face the corresponding one of the traffic signs B12. The display board of each traffic sign B12 has (i) a designed shape, (ii) one or more colors painted on at least one major surface thereof, and (iii) one or more symbols. The one or more colors include, for example, white, black, red, blue, and yellow. In FIG. 27 cross hatching represents red, diagonal hatching represents blue, dot hatching represents yellow, and shaded portion represents black. Each symbol used in the traffic signs B12 includes, for example, one or more letters, one or more figures, and a combination of one or more letters and one or more figures.

FIG. 27 illustrates examples of the traffic signs B12 in Japan (JP), the European Union (EU), and the United States (US) categorized by meaning. As typical examples of the traffic signs B12 in EU, examples of the traffic signs B12 in German and/or France are used.

For example, traffic signs of respective JP, EU, and US, which means "DO NOT ENTER" or "NO ENTRY", have substantially the same design. In contrast, traffic signs of respective JP, EU, and US, which means "STOP" have substantially the same color and symbol, and the shape of the board of the traffic sign of EU is substantially identical to that of US, but the shape of the board of the traffic sign of JP is different from that of EU and US.

Traffic sings of respective JP and EU, which means "MAXIMUM SPEED LIMIT" by the letter "50", have substantially the same design except for the difference in letter's color, but a traffic sing of US, which means "SPEED LIMIT" by the letter "50", is different in the shape of the board and color from those of the respective JP and EU.

Traffic sings of respective JP, EU, and US, which means "RAILROAD CROSSING CAUTION", have a low level of commonality in design.

Traffic signs of respective EU and US, which means "NO RIGHT TURN", have substantially the same design, and there is no corresponding traffic sign in JP.

A traffic sign of JP, which means "GO ONLY IN DIRECTION OF ARROW", and indicates, using white arrows, the forward direction and left-turn direction, illustrated in FIG. 27, similarly represents "NO RIGHT TURN".

Precise recognition of the traffic signs B12 enables autonomous driving and/or advanced driving assistance to be implemented smoothly and safely. As described above, the designs of some of the traffic signs B12 vary considerably between JP, EU, and US. For this reason, the memory device 22 stores beforehand at least one database that stores information indicative of patterns of the traffic signs used in, for example, each of all the countries in the world or each of all the regions in the world. Pattern matching between a recognized traffic sign B12 and the information stored in the at least one database enables the meaning of the recognized traffic sign B12 to be detected. The at least one database can be configured as a common database all over the world, or can be comprised of a plurality of databases provided for all the counties in the world, each of the databases stores information indicative of patterns of the traffic signs used in the corresponding one of the countries in the world. The at least one database can be stored in a host computer in place of or in addition to the memory device 22; the driving ECU 2 is communicably connected, based on vehicle-to-everything technologies (V2X), to the host computer through the vehicular communication module 4. This enables the driving ECU 2 to freely access the at least one database stored in the host computer.

Figure 28:
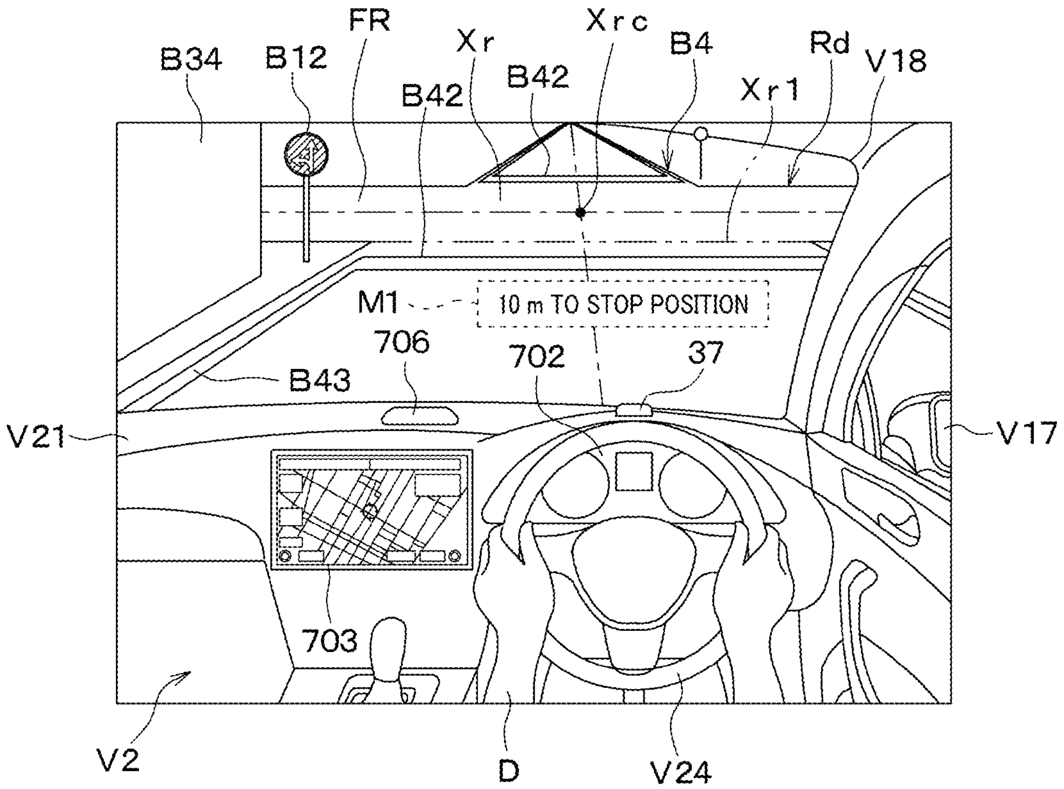
FIG. 28 is a schematic diagram illustrating a first example indicative of how to use recognition results of target objects.

FIG. 28 schematically illustrates a first example indicative of how to use the recognition results of target objects B in a situation where the own vehicle V is approaching a cross intersection. In this situation, the head-up display 704 can superimpose, on the stop line B42, an information content M1 indicating a message "10 m to stop position" representing the distance of 10 m to the stop line B42. Additionally, the HMI system 7 can output, using the speaker 705, a sound message indicative of "10 m to stop line". This efficiently assists the driver D, who uses the advanced driving assistance, to reliably cause the own vehicle V to pause before the stop line B42. Alternatively, the sound message outputted from the HMI system 7 enables the one or more occupants of the own vehicle V to reliably grasp, beforehand, the occurrence of a temporary stop event of the own vehicle V, thus avoiding reduction in the comfort of the one or more occupants of the own vehicle V.

Figure 29:
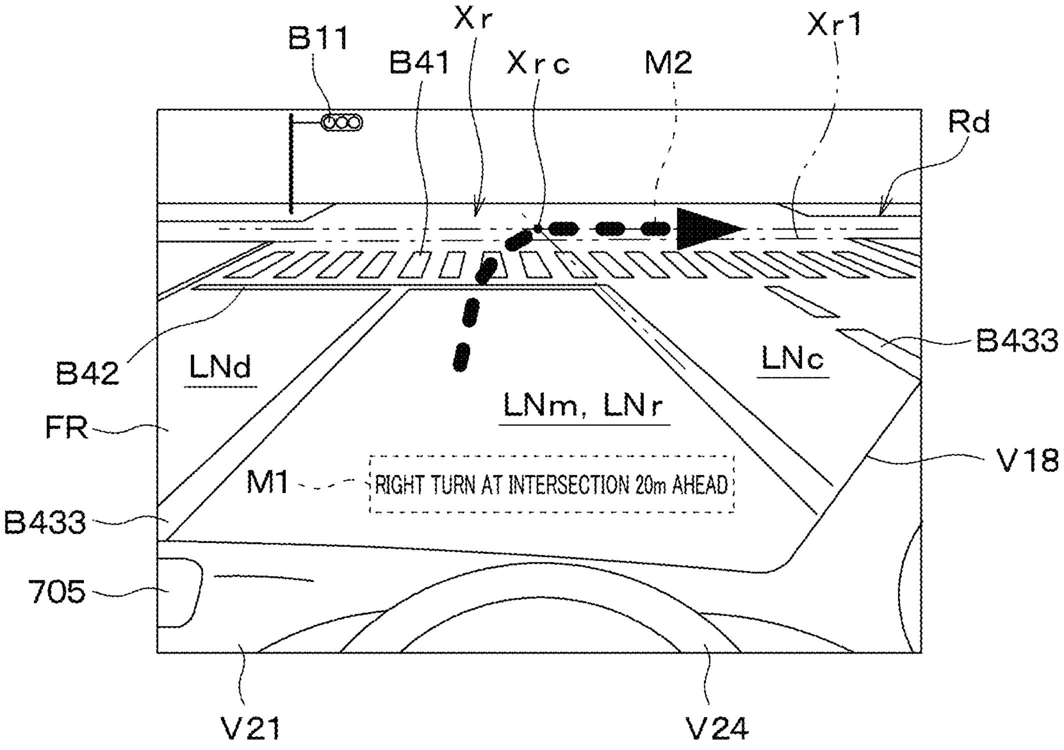
FIG. 29 is a schematic diagram illustrating a second example indicative of how to use recognition results of target objects.

FIG. 29 schematically illustrates a second example indicative of how to use the recognition results of target objects B in a situation where the own vehicle V is approaching a cross intersection with a traffic light B11 and the own vehicle V is going to turn right in the cross intersection. In this situation, the head-up display 704 can superimpose, on the own lane LN, i.e., the right-turn lane LNr, of the road surface FR in front of the own vehicle V, an information content M1 indicating a message "right turn at intersection 20 m ahead". The HMI system 7 also can output, using the speaker 705, a sound message indicative of "right turn at intersection 20 m ahead". Additionally, the HMI system 7 can superimpose, on the road surface FR, a graphic content M2 of an arrow extending from the right-turn lane LNr up to a target road Rd through the center Xrc of the intersection or thereabout. This efficiently offers, to the one or more occupants including the driver D of the own vehicle V, the traveling direction guidance of the own vehicle V and/or an advance notice of the behavior of the own vehicle V subjected to lateral acceleration during right turning. This therefore enables the one or more occupants of the own vehicle V to reliably grasp, beforehand, the occurrence of the behavior of the own vehicle V, thus avoiding reduction in the comfort of the one or more occupants of the own vehicle V.

Referring to FIG. 17, the target object recognition module 2103 is operative to recognize the type and the state of at least one target object B in accordance with the recognition results of the at least one target object B and the HD map information stored in the HD map information database 5. The state of the at least one target object B includes, for example, positional information about the at least one target object B. The positional information about the at least one target object B includes, for example, the distance of the at least one target object B relative to the own vehicle V, the relative position of the at least one target object B relative to the own vehicle V, and, if the at least one target objects B is one of the plural lanes LN, the position of one of the lanes LN.

Specifically, the marking line recognition module 2131 of the target object recognition module 2103 is operative to recognize the road marking lines B43 in a peripheral region around the own vehicle V, which includes the road surface FR of a road Rd located at the traveling course of the own vehicle V. For example, the marking line recognition module 2131 is operative to recognize, for example, whether each of the vehicle-road edge lines B431, the centerlines B432, and/or the lane lines B433, which are illustrated in FIGS. 20 to 23, (i) has white or yellow, (ii) is a solid line or a dashed line, (iii) has a single line pattern or a multiple line pattern. Because the recognition technologies of the road marking lines B43 are well-known at the time of filing the present application, detailed descriptions of the recognition technologies of the road marking lines B43 are omitted in the present disclosure.

The road-surface marking recognition module 2132 of the target object recognition module 2103 is operative to recognize the type, the meaning, and the position of each of the road-surface markings B4 except for the road marking lines B43; the recognition targets of the road-surface marking recognition module 2132 include, for example, the pedestrian-crossing markings B41, the stop lines B42, and the symbol markings B45.

The road-side structure recognition module 2133 is operative to recognize the type and the position of at least one road-side structure B13 located around the own vehicle V in accordance with, for example, at least one of (i) the recognition results based on the images captured by cameras 34, (ii) the recognition results based on the at least one detection-point data cloud detected by the laser-radar sensor 33, and (iii) the HD map information stored in the HD map information database 5.

The traffic light recognition module 2134 is operative to recognize (i) whether a traffic light B11 is located at the traveling course of the own vehicle V and (ii) the position of the traffic light B11 and which of the color signal lights outputted from the traffic light B11 if it is recognized that the signal light B11 is located at the traveling course of the own vehicle V.

The traffic sign recognition module 2135 is operative to recognize the traffic signs B12 located around the own vehicle V.

The lane recognition module 2136 is operative to perform a lane recognition task of recognizing the number of lanes LN in a road Rd in which the own vehicle V is traveling, and the type of each lane LN in the road Rd. That is, the lane recognition module 2136 is operative to perform the lane recognition task in accordance with, for example, (i) the recognition results based on the images captured by the front camera CF of the cameras 34, (ii) the recognition results based on the at least one detection-point data cloud detected by the laser-radar sensor 33, and (iii) the HD map information stored in the HD map information database 5.

Specifically, the lane recognition module 2136 can be normally operative to perform the lane recognition task in accordance with the recognition results based on the images captured by cameras 34 or, if necessary arises, perform a sensor-fusion lane recognition task in accordance with combination of (i) the recognition results based on the images captured by the front camera CF of the cameras 34 and at least one of (ii) the recognition results based on the at least one detection-point data cloud detected by the laser-radar sensor 33 and (iii) the HD map information stored in the HD map information database 5.

The pedestrian recognition module 2137 is operative to recognize one or more pedestrians B32 located around the own vehicle V. The surrounding vehicle recognition module 2138 is operative to recognize one or more other vehicles B2 located around the own vehicle V. The obstacle recognition module 2139 is operative to recognize one or more obstacles, such as one or more fallen objects B31 on the road surface and/or one or more pedestrians B32 located around the own vehicle V. How each of the traffic light recognition module 2134, the traffic sign recognition module 2135, the lane recognition module 2136, the pedestrian recognition module 2137, the surrounding vehicle recognition module 2138, and the obstacle recognition module 2139 recognizes corresponding one or more target objects is well-known at the time of filing the present application, and therefore detailed descriptions of how each of the modules 2134 to 2139 recognizes corresponding one or more target objects are omitted in the present disclosure.

First Embodiment

The following describes the first embodiment. In each of the following embodiments, the combination of (i) the driving ECU 2 serving as a vehicular apparatus according to the corresponding embodiment, (ii) computer programs, i.e., computer-program instructions, to be executed by the driving ECU 2, i.e., the processor 21, according to the corresponding embodiment and (iii) a storage medium storing the computer programs according to the corresponding embodiment will also be collectively referred to as a present embodiment.

Figure 30:
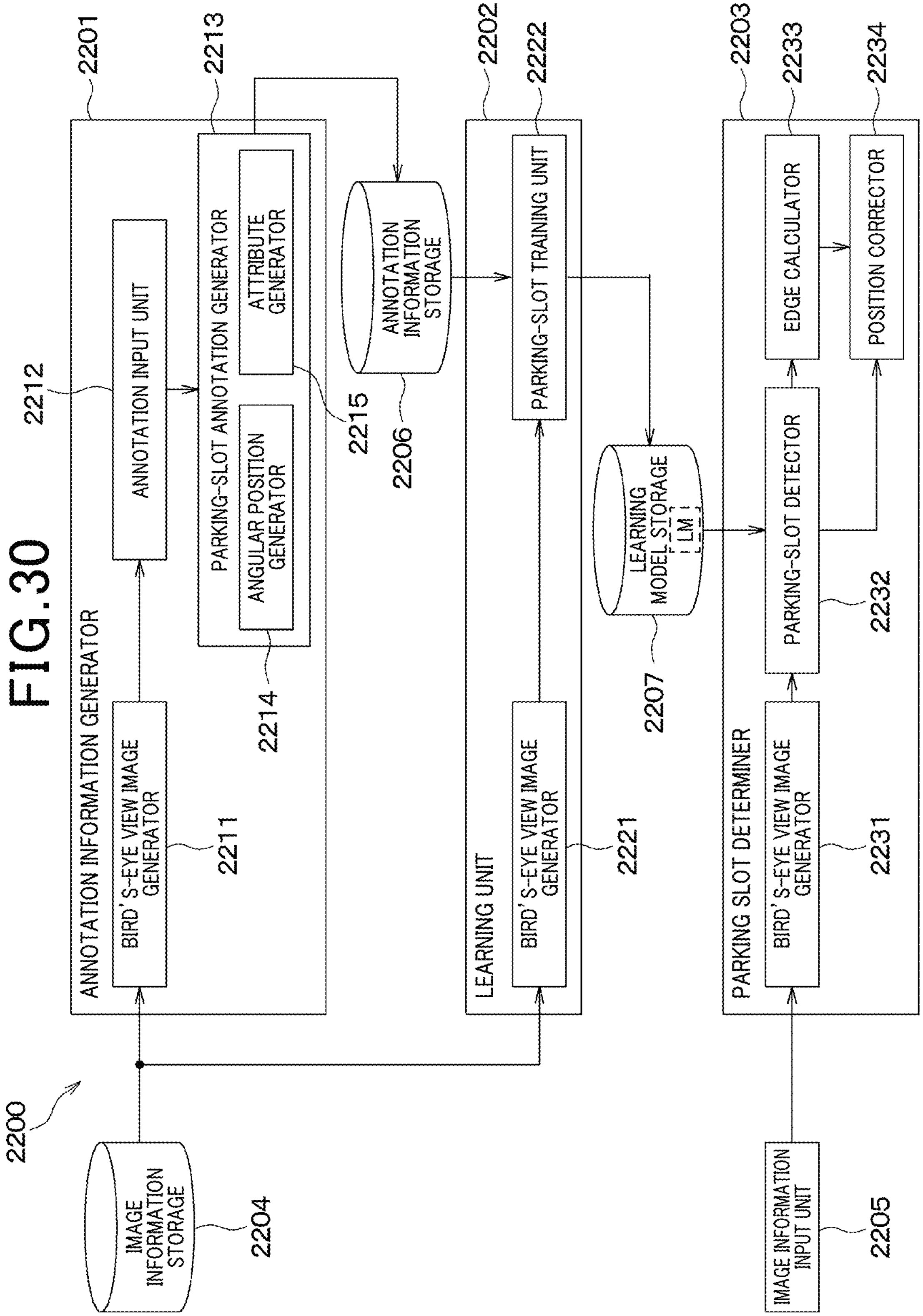
FIG. 30 is a schematic block diagram of a parking-slot detection apparatus according to the first embodiment.

FIG. 30 is a schematic block diagram of a parking-slot detection apparatus 2200 according to the first embodiment. The parking-slot detection apparatus 2200 is configured to detect, during a parking assistance operation or automatic parking operation by the driving ECU 2, parking slots PS located around the own vehicle V based on images captured by at least one of the cameras 34. The parking assistance operation can include (i) an automatic parking that parks the own vehicle V in a selected target parking slot PS without driver's driving operations, and (ii) a semi-automatic parking that parks the own vehicle V in a selected target parking slot PS (i) with driver's partial driving operations, such as an operation of the accelerator pedal of the own vehicle V and (ii) without the other driver's driving operations, such as the driver's steering operation. The parking-slot detection apparatus 2200 can be implemented as at least one functional block included in the identifying module 2001 illustrated in FIG. 17. Specifically, the parking-slot detection apparatus 2200 can be implemented as a part of the road-surface sign recognition unit 2132 illustrated in FIG. 17 or a part of the surrounding environment recognition module 2106 illustrated in FIG. 17. Alternatively, the road-surface sign recognition unit 2132 and the surrounding environment recognition module 2106 can serve as the parking-slot detection apparatus 2200.

The following describes the details of the parking-slot detection apparatus 2200 according to the present embodiment. The parking-slot detection apparatus 2200 includes an annotation information generator 2201, a learning unit 2202, and a parking-slot determiner 2203. Additionally, the parking-slot detection apparatus 2200 includes an image information storage 2204, an image information input unit 2205, an annotation information storage 2206, and a learning model storage 2207.

The annotation information generator 2201 is configured to generate annotation information corresponding to information on each of images for training, which will be referred to as training images or learning images, stored in the image information storage 2204, and output the annotation information to the annotation information storage 2206. The annotation information on each learning image represents the so-called ground truth data indicative of what and where the one or more target objects B are in the corresponding learning image.

In the present embodiment, the one or more target objects B are one or more parking slots PS. That is, the annotation information generator 2201 is configured to generate, as the annotation information on each learning image, the ground truth data, i.e., ground-truth annotation data, indicative of what and where one or more parking slots PS are in the corresponding learning image.

That is, each learning image includes one or more parking slots PS, and each learning image is paired to the corresponding ground-truth annotation data indicative of what and where the one or more parking slots PS are in the corresponding learning image.

The learning model storage 2207 includes, for example, a machine learning model LM, such as a deep neural-network model (DNN model) with variable parameters. The machine learning model LM stored in the learning model storage 2207 is configured to output, when input data, i.e., an input image, is inputted thereto, inferred annotation data indicative of what and where one or more parking slots PS are in the input image.

In other words, the learning unit 2202 is configured to learn a recognition rule of one or more parking slot PS in an input image using the machine learning model LM stored in the learning model storage 2207.

To increase the inference accuracy, i.e., learning accuracy, of the machine learning model LM, it is necessary that inputting many learning images, each of which includes one or more actual parking slots PS, to the machine learning model LM results in the inferred annotation data outputted from the machine learning model LM being substantially identical to the ground-truth annotation data of the one or more actual parking slots PS.

The learning unit 2202 is configured to perform training of the parameters of the machine learning model LM stored in the learning model storage 2207 based on each learning image stored in the image information storage 2204 and corresponding ground-truth annotation information, i.e., corresponding ground-truth annotation data, generated by the annotation information generator 2201. Then, the learning unit 2202 is configured to store the trained machine learning model LM with the trained parameters in the learning model storage 2207.

The image information input unit 2205 is configured to input, to the parking-slot determiner 2203, one or more images captured by the at least one camera 34.

The parking-slot determiner 2203 is configured to perform a parking-slot determination/detection task using the trained machine learning model LM and the one or more images captured by the at least one camera 34 and inputted thereto by the image information input unit 2205.

The annotation information generator 2201 includes a bird's-eye view image generator 2211, an annotation input unit 2212, and a parking-slot annotation generator 2213.

The bird's-eye view image generator 2211 is configured to convert at least one learning image stored in the image information storage 2204 into a bird's-eye view image using, for example, a known viewpoint converting approach. Such a bird's-eye view image of a target is, for example, an image of the target viewed from above the target along a line of view that is parallel to the direction of gravity applied to the target. That is, a bird's-eye view image of a target is an image corresponding to a plan view of the target.

The annotation input unit 2212 is configured to input, to the parking-slot annotation generator 2213, annotation information corresponding to the bird's-eye view image generated by the bird's-eye view image generator 2211. For example, the annotation input unit 2212 may perform an image recognition operation on the bird's-eye view image to automatically generate the annotation information corresponding to the bird's-eye view image. The annotation input unit 2212 may include a human machine interface that enables an annotation-information input worker to input correction information for correcting the automatically generated annotation information. Then, the annotation input unit 2212 may correct the automatically generated annotation information in accordance with the correction information inputted by the annotation-information input worker through the human machine interface.

Alternatively, the annotation input unit 2212 may include such a human machine interface that enables such an annotation-information input worker to input information for generating the generated annotation information, and the annotation input unit 2212 may generate the generated annotation information in accordance with the information inputted by the annotation-information input worker through the human machine interface.

The parking-slot annotation generator 2213 is configured to generate annotation information corresponding to at least one parking slot PS included in the bird's-eye view image, and output the annotation information corresponding to the at least one parking slot PS included in the bird's-eye view image to the annotation information storage 2206.

Specifically, the parking-slot annotation generator 2213 includes, for example, an angular position generator 2214 and an attribute generator 2215.

Figure 31:
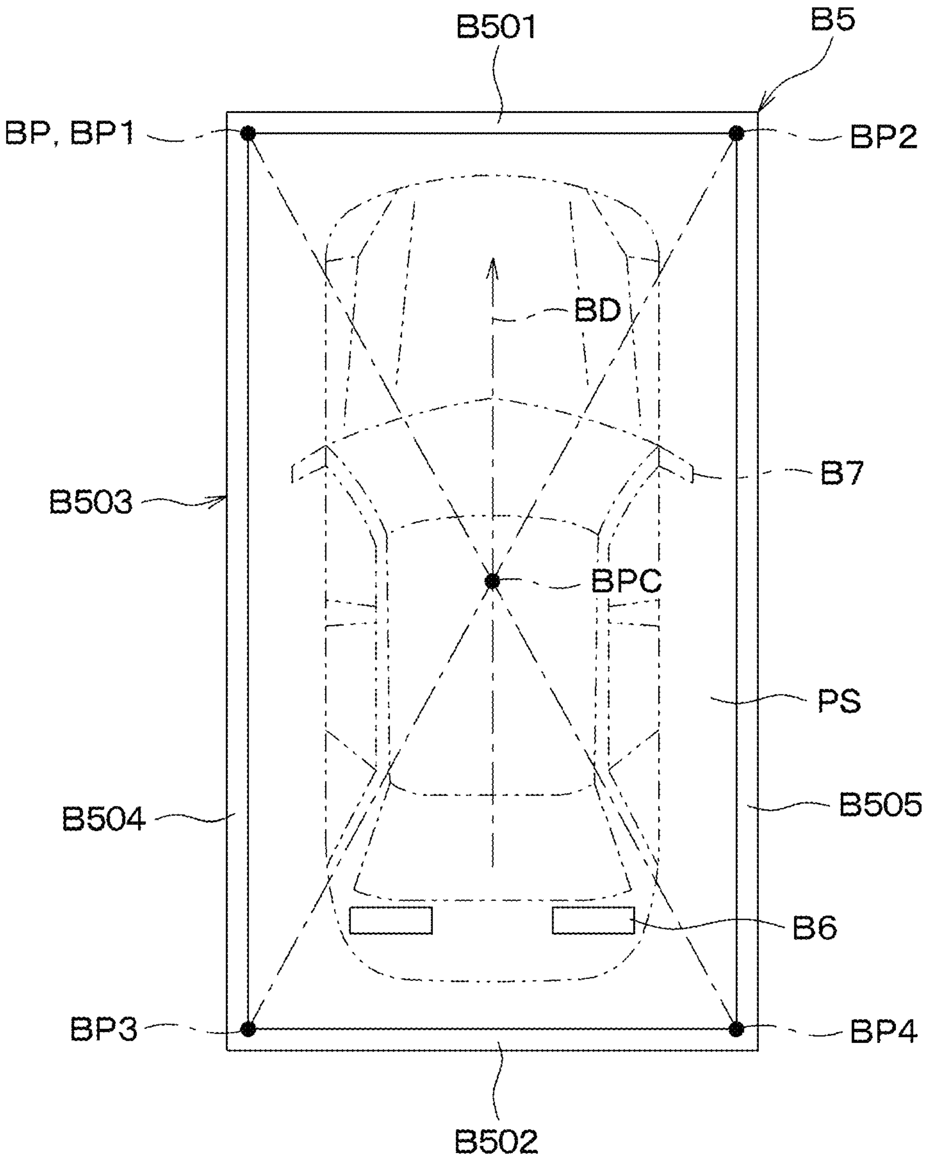
FIG. 31 is a schematic view illustrating annotation information generated by a parking-slot annotation generator illustrated in FIG. 30.

The angular position generator 214 is configured to generate, in a bird's-eye view image generated by the bird's-eye view image generator 2211, positional information on parking-slot corner points BP and positional information on a parking-slot center point BPC that constitute the shape of a parking slot PS illustrated in FIG. 31. The parking-slot corner points BP include a left-front corner point BP1, a right-front corner point BP2, a left-rear corner point BP3, and a right-rear corner point BP4.

The following describes the definition of each of the left-front corner point BP1, right-front corner point BP2, left-rear corner point BP3, right-rear corner point BP4, and parking-slot center point BPC with reference to FIG. 31. In FIG. 31, for the sake of simple illustration, the parking slot PS illustrated in FIG. 31 is surrounded by a rectangular parking segment B5 formed by a front segment line B501, a rear segment line B502, and a pair of side segment lines B503. However, as described later, the parking slot PS is not limited to being surrounded by the rectangular parking-slot box B5. Specifically, the parking slot PS can be constituted by a substantially U-shaped parking segment B5 or by plural linear lines B5 parallel to each other. Alternatively, the parking slot PS can be constituted as a space formed between parked vehicles B7 that are arranged adjacently to one another.

The front segment line B501 and the rear segment line B502 are located at respective short sides of the rectangular parking slot PS. The front segment line B501 is located in front of the rear segment line B502 in a parking-slot direction BD. The parking-slot direction BD of the parking slot PS is defined, if there is a parked vehicle B7 in the parking slot PS, as a forward direction of the parked vehicle B7 in the parking slot PS. The parking-slot direction BD of the parking slot PS can be defined depending on the configuration and arrangement of the parking slot PS. For example, if wheel stoppers B6 are provided to be closer to one of the short sides of the rectangular parking slot PS, the parking-slot direction BD is defined from the closer short side to the farther short side. As another example, if there are parking slots PS arranged such that their short sides are aligned to constitute side-by-side parking areas, the parking-slot direction BD of each parking slot PS is defined from the parking slot PS to the common parking aisle. As a further example, if there are parking slots PS arranged such that their long sides are aligned to constitute parallel parking areas, the parking-slot direction BD of each parking slot PS is defined as the traveling direction of a corresponding parked vehicle.

The pair of side segment lines B503 are located at the respective long sides of the rectangular parking slot PS. If the parking-slot direction BD of the parking slot PS is defined as the forward direction, the left-side one of the side segment lines B503 will be referred to as a left-side segment line B504, and the right-side one of the side segment lines B503 will be referred to as a right-side segment line B505.

The left-front corner point BP1 is a corner point at the location where the front segment line B501 and the left-side segment line B504 intersect with each other. The right-front corner point BP2 is a corner point at the location where the front segment line B501 and the right-side segment line B505 intersect with each other. The left-rear corner point BP3 is a corner point at the location where the rear segment line B502 and the left-side segment line B504 intersect with each other. The right-rear corner point BP4 is a corner point at the location where the rear segment line B502 and the right-side segment line B505 intersect with each other.

The parking-slot center point BPC is a center point of a rectangle formed by connecting the left-front corner point BP1, right-front corner point BP2, left-rear corner point BP3, and right-rear corner point BP4. Specifically, the parking-slot center point BPC is an intersection point between a virtual straight line connecting the left-front corner point BP1 and the right-rear corner point BP4 and a virtual straight line connecting the right-front corner point BP2 and the left-rear corner point BP3. If the parking slot PS is not surrounded by the rectangular parking segment B5, each corner point of the parking slot PS can be defined in the same manner as the case where the parking slot PS is surrounded by the rectangular parking segment B5.

For example, if the parking slot PS is surrounded by a substantially U-shaped parking segment B5 with lack of the front segment line B501 as compared with the rectangular parking segment B5, the left-front corner point BP1 can be defined as the front end of the left-side segment line B504. Similarly, if the parking slot PS is surrounded by a substantially U-shaped parking segment B5 with lack of the rear segment line B502 as compared with the rectangular parking segment B5, the right-rear corner point BP4 can be defined as the rear end of the right-side segment line B505. If there is no parking segment B5 so that the parking slot PS is constituted as a space formed between parked vehicles B7 that are arranged adjacently to one another, each corner point of the parking slot PS can be defined by a circumscribed rectangle around a parked vehicle B7 in the parking slot PS or by a virtual rectangular space formed between parked vehicles B7 that are arranged adjacently to one another.

If parking slots PS are included in a bird's-eye view image generated by the bird's-eye view image generator 2211, the attribute generator 2215 is configured to generate, for each parking slot PS, attribute information on the corresponding parking slot PS. The attribute information on each parking slot PS can include, for example, parking segment information on the corresponding parking slot PS. The parking segment information on each parking slot PS can include, for example, (i) whether there is a corresponding parking segment B5 and (ii) whether there is a segment-line component, such as a front segment line B501 or a rear segment line B502, in the corresponding parking segment B5. Other items of the attribute information except for the parking segment information will be described in the second and subsequent embodiments for avoiding redundant and complex descriptions.

The bird's-eye view image generator 2211 is configured to convert a learning image stored in the image information storage 2204 into a bird's-eye view target image, which will also be referred to simply as a target image (see reference character GS in FIG. 32) using, for example, a known viewpoint converting approach. The target image GS is used to train the machine learning model LM and input the annotation information.

Figure 32:
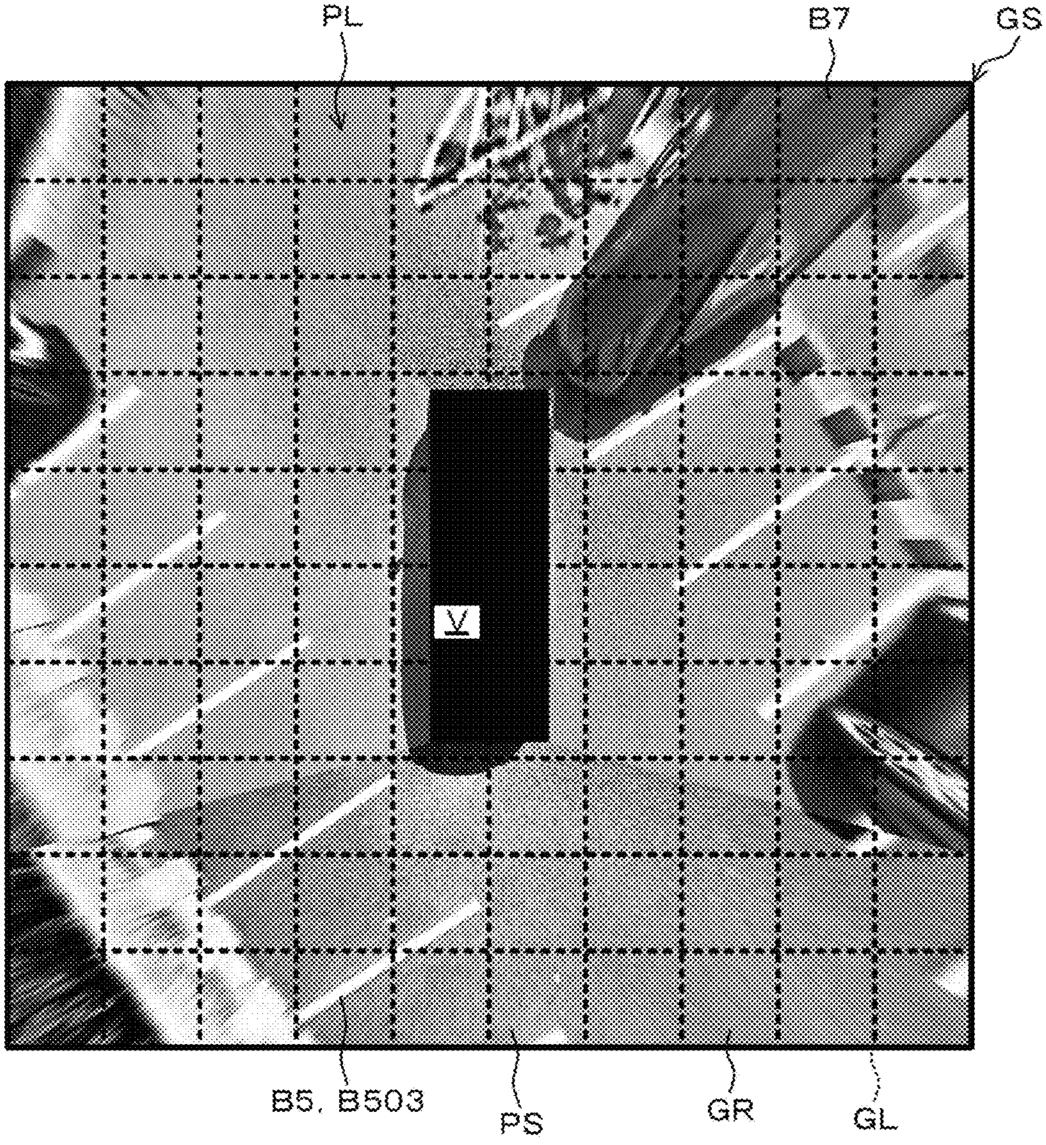
FIG. 32 is an example of a learning image that includes the own vehicle that has entered a parking lot and plural parking slots arranged around the own vehicle.
Figure 33:
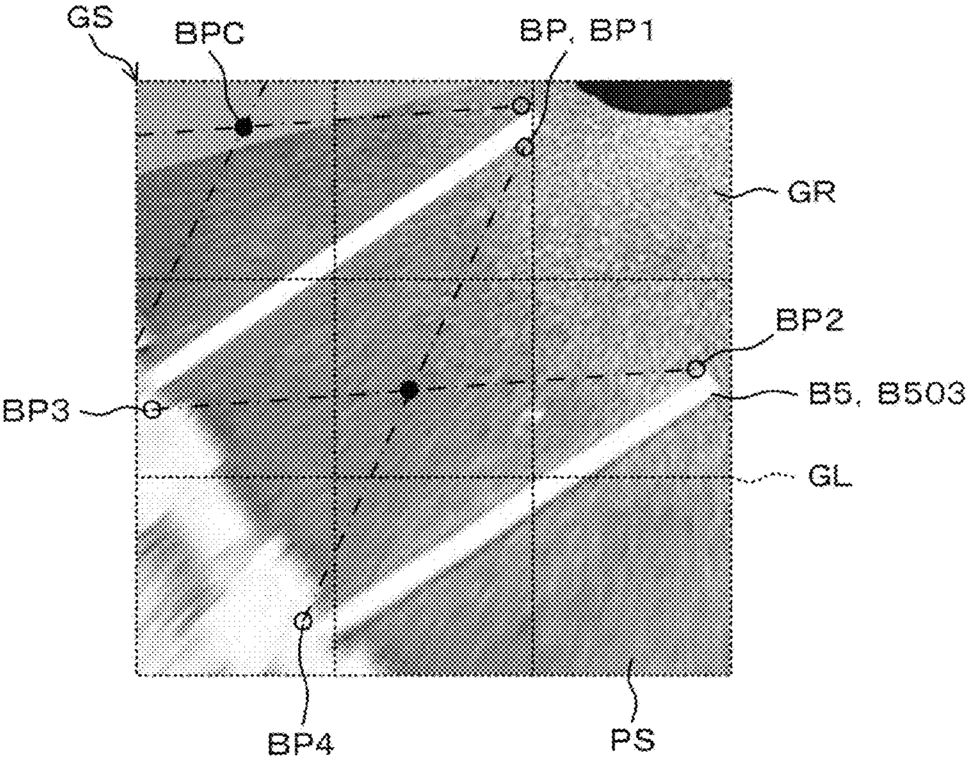
FIG. 33 is a view illustrating, in a large scale, a part of a target image illustrated in FIG. 32.

FIG. 32 is an example of a learning image that includes the own vehicle, i.e., the system-installed vehicle, V that has entered a parking lot PL and plural parking slots PS arranged around the own vehicle V. FIG. 33 illustrates, in a large scale, a part of the learning image illustrated in FIG. 32. Specifically, FIG. 33 illustrates, in a large scale, a selected parking slot PS located diagonally behind the own vehicle V to the left and its surroundings; the selected parking slot PS is a parking slot in which the own vehicle V is about to be parked.

The parking-slot annotation generator 2213 is configured to generate, for each parking slot PS included in each target image GS, the annotation information on the corresponding parking slot PS in the target image GS in accordance with the annotation information inputted thereto from the annotation input unit 2212. Specifically, as illustrated in FIG. 33, the parking-slot annotation generator 2213 generates, for each parking slot PS, positional information on at least one of the parking-slot corner points BP and the parking-slot center BPC in each target image GS as the parking-slot annotation information. The parking-slot annotation generator 2213 is additionally configured to output, to the annotation information storage 2206, the parking-slot annotation information on each parking slot PS for each target image GS, so that the parking-slot annotation information on each parking slot PS for each target image GS is stored in the annotation information storage 2206. The attribute generator 2215 is configured to generate, for each parking slot PS included in each target image GS, the attribute information on the corresponding parking slot PS included in the corresponding target image GS, and output, to the annotation information storage 2206, the attribute information on each parking slot PS for each target image GS, so that the attribute information on each parking slot PS for each target image GS is stored in the annotation information storage 2206.

The learning unit 2202 includes a bird's-eye view image generator 2221 and a parking-slot training unit 2222.

The bird's-eye view image generator 2221 is configured to convert at least one learning image stored in the image information storage 2204 into a training bird's-eye view image using, for example, a known viewpoint converting approach. The configuration and functions of the bird's-eye view image generator 2221 are substantially identical to those of the bird's-eye view image generator 2211. For this reason, the bird's-eye view image generators 2221 and 2222 can be configured as a common module.

The parking-slot training unit 2222 is configured to perform training of the parameters of the machine learning model LM stored in the learning model storage 2207 based on each target image GS generated by the bird's-eye view image generator 2221 and the annotation information, i.e., ground truth data, for the corresponding target image GS generated by the parking-slot annotation generator 2213 and stored in the annotation information storage 2206 to increase the parking-slot inference accuracy, i.e., the parking-slot recognition accuracy, of the machine learning model LM stored in the learning model storage 2207.

The following describes, in detail, the training process of the parameters of the machine learning model LM stored in the learning model storage 2207, which is carried out by the parking-slot training unit 2222, to accordingly improve the accuracy of recognizing at least one parking slot PS included in an input image.

First, the training process partitions a target image GS as an example illustrated in FIG. 32 into plural grids GR using plural grid lines GL. For the sake of simple illustration and simple descriptions, the training process partitions, as illustrated in FIG. 32, the target image GS into a 10-by-10 grid GR, i.e., a 10×10 grid GR using vertical nine grid lines GL and horizontal nine grid lines GL. The 10×10 grid GR has 10 cells, i.e., 10 rows, in the vertical direction and 10 cells, i.e., 10 columns, in the horizontal direction.

FIG. 33 illustrates, in a large scale, a 3×3 grid GR included in the 10×10 grid GR illustrated in FIG. 32. In the 3×3 grid GR illustrated as an example in FIG. 33, two parking-slot centers BPC are respectively located in the center cell of the 3×3 grid GR and the top left cell of the 3×3 grid GR.

In this example, the training process objectifies, from the 3×3 grid GR, a selected parking slot PS based on the parking-slot center BPC located in the center cell of the 3×3 grid GR as the assembly of the parking-slot center BPC located in the center cell of the 3×3 grid GR and the corner points BP1, BP2, BP3, and BP4 located in the respective top middle cell, the middle right cell, the middle left cell, and the bottom left cell.

Figure 34:
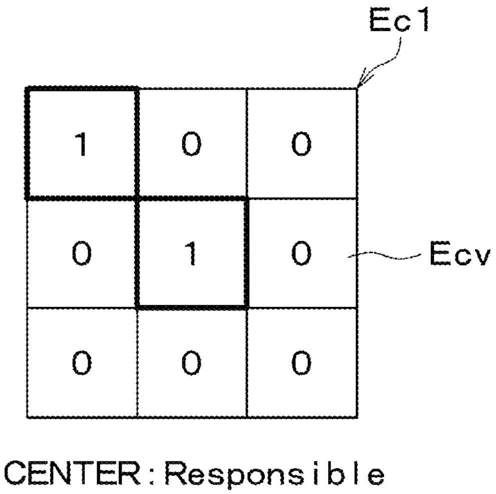
FIG. 34 is a diagram illustrating an encoding of an existence of a parking-slot center in a grind illustrated in FIG. 33.

Then, the training process encodes an existence of the parking-slot center BPC as a first type of first encoded data Ec1 indicative of whether the parking-slot center BPC exists in each cell of the 3×3 grid GR, which is illustrated as "CENTER: responsible" in FIG. 34. Specifically, the training process encodes existence of the parking-slot center BPC as the first type of the first encoded data Ec1 in which an encoded data value Ecv of each of the center cell and the top left cell of the 3×3 grid GR is set to "1", and the encoded data values Ecv of the other cells, i.e., the top middle cell, the top right cell, the middle left cell, the middle right cell, the bottom left cell, the bottom middle cell, and the bottom right cell, of the 3×3 grid GR are respectively set to "0".

Figure 35:
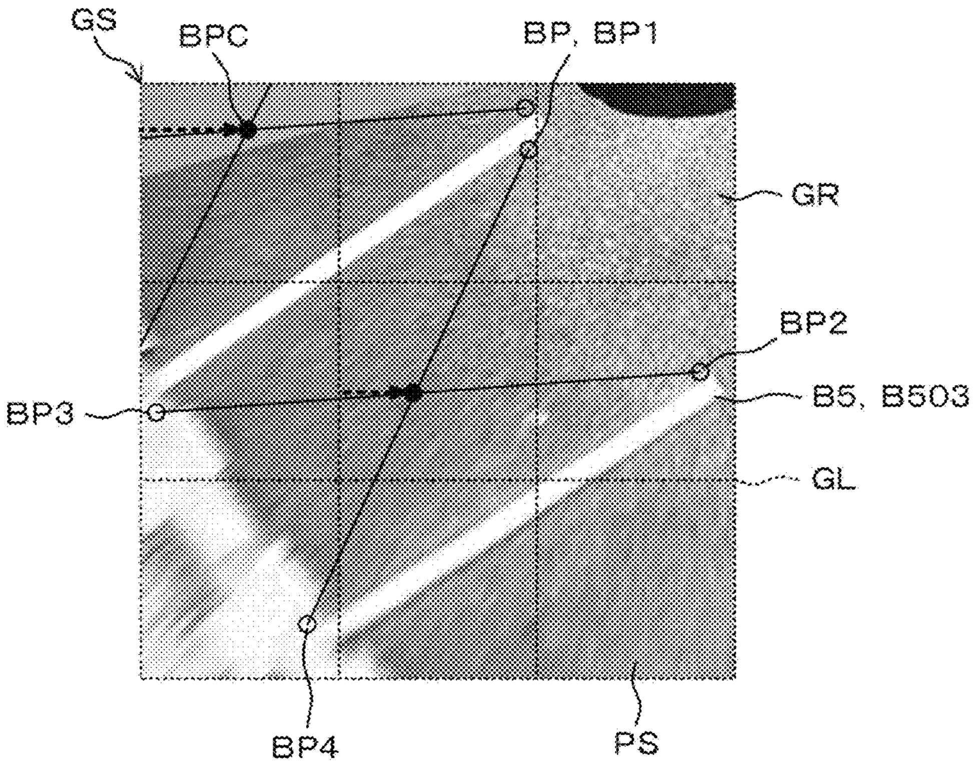
FIG. 35 is a view illustrating a horizontal position of the parking-slot center in a grind illustrated in FIG. 33.
Figure 36:
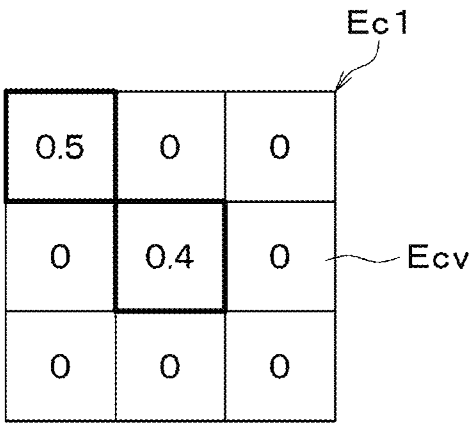
FIG. 36 is a diagram illustrating an encoding of the horizontal position of the parking-slot center illustrated in FIG. 35.

FIGS. 35 and 36 illustrate how the training process encodes a horizontal position of the parking-slot center BPC as a second type of the first encoded data Ec1 in the 3×3 grid GR, which is illustrated as "CENTER: offset X" in FIG. 36.

The training process according to the first embodiment defines a horizontal position of the parking-slot center BPC in the center cell of the 3×3 grid GR relative to the left side of the center cell, and a horizontal position of the parking-slot center BPC in the top left cell of the 3×3 grid GR relative to the left side of the top left cell. The horizontal position of any cell in the 3×3 grid GR is defined such that the left side is set to a first reference encoded data value of "0" and the right side is set to a second reference encoded data value of "1". Specifically, a virtual line segment of each of the center cell and the top left cell of the 3×3 grid GR between the left side and the right side thereof is defined; the virtual line segment passes through the corresponding parking-slot center BPC and is parallel to the horizontal grid lines GL. The parking-slot center BPC of each of the center cell and the top left cell of the 3×3 grid GR represents an internally dividing point of the corresponding virtual line segment. The horizontal position of the parking-slot center BPC of each of the center cell and the top left cell of the 3×3 grid GR is defined as an internal division ratio that is expressed as a decimal. For example, for the center cell, because the internal division ratio of the parking-slot center BPC in the center cell is 1:1, the horizontal position of the parking-slot center BPC in the center cell is set to 0.5. Similarly, for the top left cell, because the internal division ratio of the parking-slot center BPC in the top left cell is 2:3, the horizontal position of the parking-slot center BPC in the center cell is set to 0.4.

Then, the training process performs a first encoding of the five points BPC, BP1, BP2, BP3, and BP4 for the target image GS.

Specifically, the training process encodes the horizontal position of the parking-slot center BPC as the second type of the first encoded data Ec1 in which (i) the horizontal position of the center cell is set to "0.5" as the encoded data value Ecv, (ii) the horizontal position of the top left cell is set to "0.4" as the encoded data value Ecv, and (iii) the encoded data values Ecv of the other cells are respectively set to "0".

Figures 37, 38:
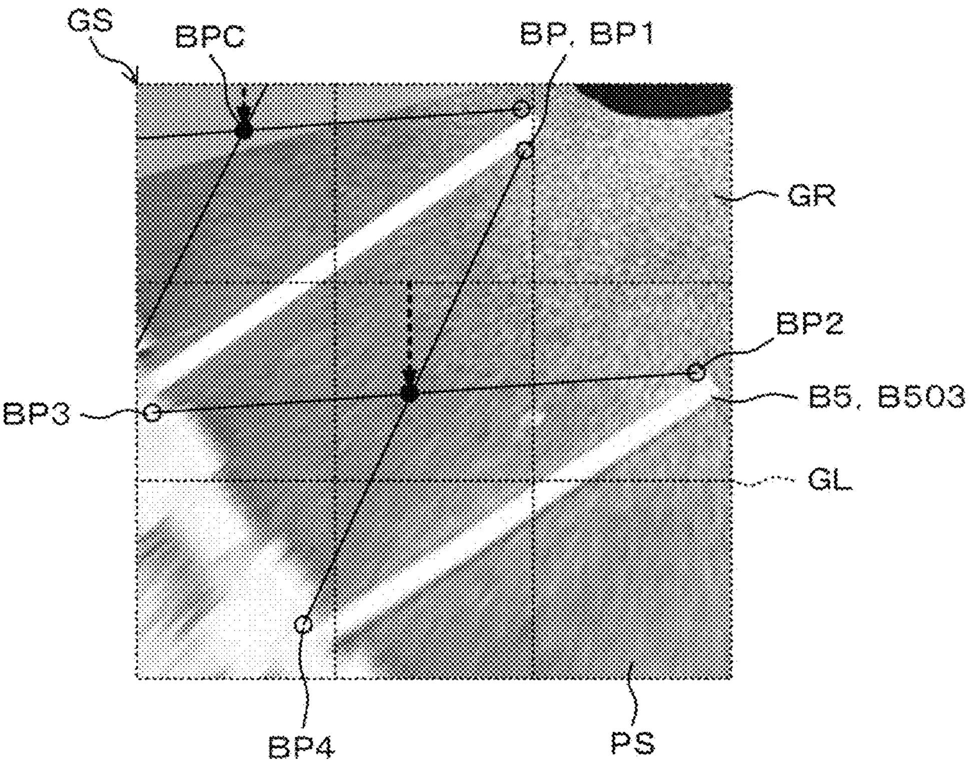
FIG. 37 is a view illustrating a vertical position of the parking-slot center in a grind illustrated in FIG. 33.
FIG. 38 is a diagram illustrating a first encoding of the vertical position of the parking-slot center illustrated in FIG. 37.

FIGS. 37 and 38 illustrate how the training process encodes a vertical position of the parking-slot center BPC as a third type of the first encoded data Ec1 in the 3×3 grid GR, which is illustrated as "CENTER: offset Y" in FIG. 38.

The training process according to the first embodiment defines a vertical position of the parking-slot center BPC in the center cell of the 3×3 grid GR relative to the top side of the center cell, and a vertical position of the parking-slot center BPC in the top left cell of the 3×3 grid GR relative to the top side of the top left cell. The vertical position of any cell in the 3×3 grid GR is defined such that the top side is set to the first reference encoded data value of "0" and the bottom side is set to the second reference encoded data value of "1". Specifically, a virtual line segment of each of the center cell and the top left cell of the 3×3 grid GR between the top side and the bottom side thereof is defined; the virtual line segment passes through the corresponding parking-slot center BPC and is parallel to the vertical grid lines GL. The parking-slot center BPC of each of the center cell and the top left cell of the 3×3 grid GR represents an internally dividing point of the corresponding virtual line segment. The vertical position of the parking-slot center BPC of each of the center cell and the top left cell of the 3×3 grid GR is defined as an internal division ratio that is expressed as a decimal. For example, for the center cell, because the internal division ratio of the parking-slot center BPC in the center cell is 1:1, the vertical position of the parking-slot center BPC in the center cell is set to "0.5". Similarly, for the top left cell, because the internal division ratio of the parking-slot center BPC in the top left cell is 1:5, the vertical position of the parking-slot center BPC in the center cell is set to "0.2".

Then, the training process encodes the vertical position of the parking-slot center BPC as the third type of the first encoded data Ec1 in which (i) the vertical position of the center cell is set to "0.5" as the encoded data value Ecv, (ii) the vertical position of the top left cell is set to "0.2" as the encoded data value Ecv, and (ii) the encoded data values Ecv of the other cells are respectively set to "0".

FIG. 39 illustrates all the existence data items of the parking-slot center BPC as the first type of the first encoded data Ec1 illustrated in FIG. 34 in the whole of the target image GS illustrated in FIG. 32. FIG. 40 illustrates all the horizontal position data items of the parking-slot center BPC as the second type of the first encoded data Ec1 illustrated in FIG. 36 in the whole of the target image GS illustrated in FIG. 32. FIG. 41 illustrates all the vertical position data items of the parking-slot center BPC as the third type of the first encoded data Ec1 illustrated in FIG. 39 in the whole of the target image GS illustrated in FIG. 32.

Accordingly, (i) the existence data items, (ii) the horizontal position data items, and (iii) the vertical position data items of the parking-slot center BPC as the first, second, and third types of the first encoded data Ec1 in the target image GS have been obtained.

Like the parking-slot center BPC, (i) the existence data items, (ii) the horizontal position data items, and (iii) the vertical position data items of each of the left-front corner point BP1, right-front corner point BP2, left-rear corner point BP3, and right-rear corner point BP4 as the first, second, and third types of the first encoded data Ec1 in the target image GS have been obtained.

That is, the first encoded data Ec1 is comprised of (i) the existence data items, the vertical position data items, and the horizontal position data items of the parking-slot center BPC, (ii) the existence data items, the vertical position data items, and the horizontal position data items of the left-front corner point BP1, (iii) the existence data items, the vertical position data items, and the horizontal position data items of the right-front corner point BP2, (iv) the existence data items, the vertical position data items, and the horizontal position data items of the left-rear corner point BP3, (v) the existence data items, the vertical position data items, and the horizontal position data items of the right-rear corner point BP4.

Figure 42:
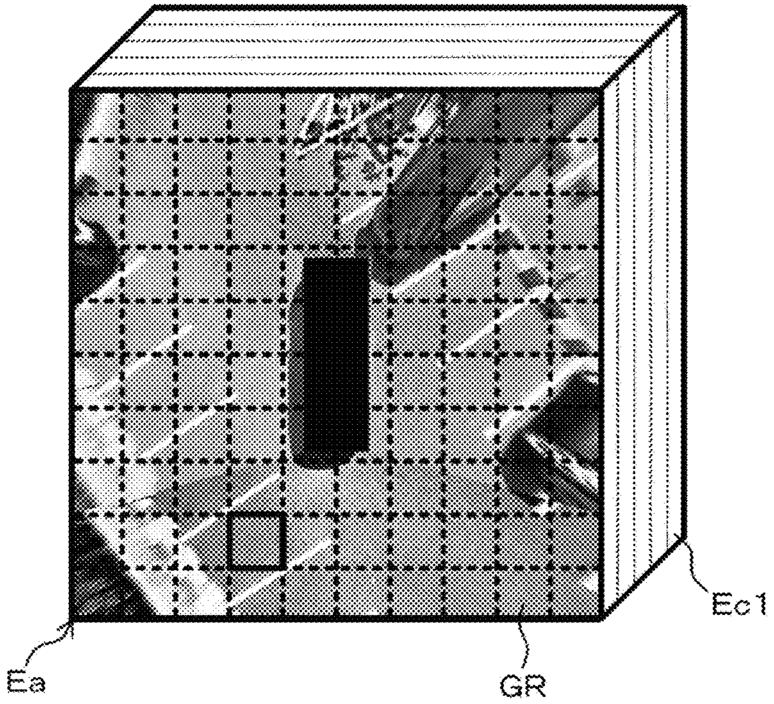
FIG. 42 is a diagram illustrating a parking-slot annotation code including first encoded data including the encoded results illustrated in FIGS. 39 to 41.

FIG. 42 schematically illustrates a parking-slot annotation code Ea as the annotation information for an objectified parking slot PS included in the target image GS, which is comprised of the first encoded data Ec1 related to each of the five points BPC, BP1, BP2, BP3, and BP4.

As described above, the parking-slot training unit 2222 is configured to generate, for each of the five points BPC, BP1, BP2, BP3, and BP4, total three-channel outputs of (i) the existence data, (ii) the horizontal position data, and (iii) the vertical position data as the first encoded data Ec1.

As described above, the parking-slot training unit 2222 is configured to obtain, as a result of the first encoding of the five points BPC, BP1, BP2, BP3, and BP4 for the target image GS, (i) the first encoded data item Ec1 of the parking-slot center BPC, (ii) the first encoded data item Ec1 of the left-front corner point BP1, (iii) the first encoded data item Ec1 of the right-front corner point BP2, (iv) the first encoded data item Ec1 of the left-rear corner point BP3, and (v) the first encoded data item Ec1 of the right-rear corner point BP4.

Next, the following describes a second encoding of connection vectors connecting from the parking-slot center BPC to each of the corner points BP1, BP2, BP3, and BP4.

Figure 43:
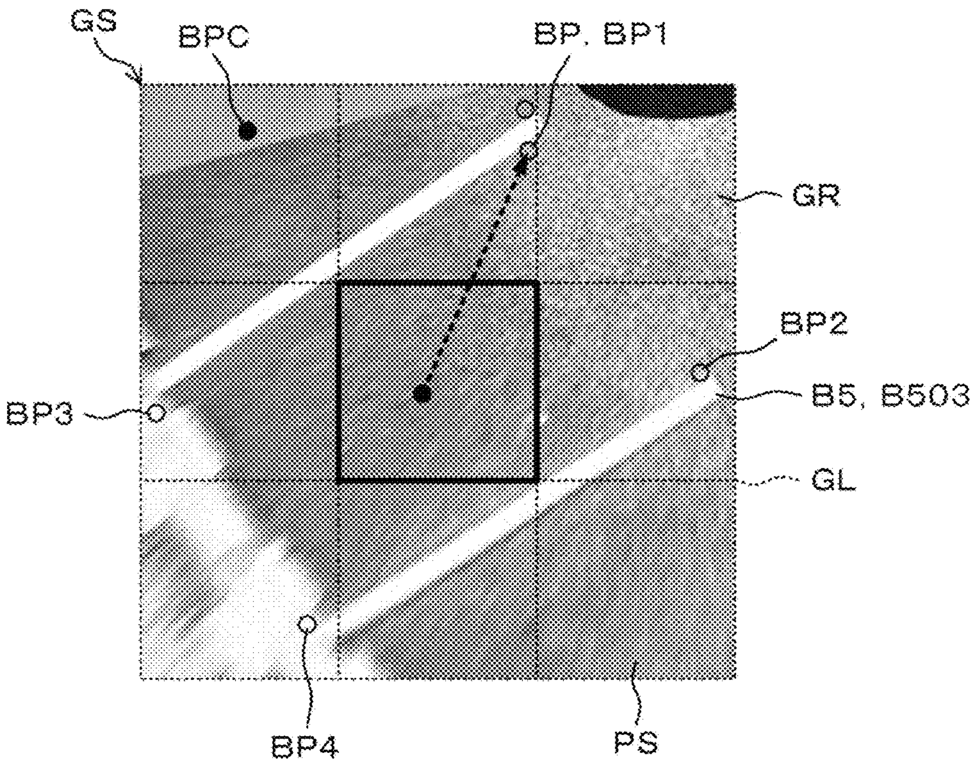
FIG. 43 is a view illustrating, in a large scale, a selected 3×3 grid comprised of nine cells including a selected cell by a heavy-line square in FIG. 42 and eight cells surrounding the selected cell.

FIG. 43 illustrates, in a large scale, a selected 3×3 grid GR, which is comprised of nine cells, of the 10×10 grid GR; the nine cells are comprised of a selected cell, i.e., center cell, illustrated by a heavy-line square in FIG. 42 and eight cells surrounding the selected cell. The 3×3 grid GR illustrated in FIG. 43 is identical to the 3×3 grid GR illustrated in FIG. 33, so that the arrangement of the five points BPC, BP1, BP2, BP3, and BP4 illustrated in FIG. 43 is identical to that of the five points BPC, BP1, BP2, BP3, and BP4 illustrated in FIG. 33. The cell illustrated by the heavy-line square in FIG. 43 is identical to the cell illustrated by the heavy-line square in FIG. 42.

Figure 44:
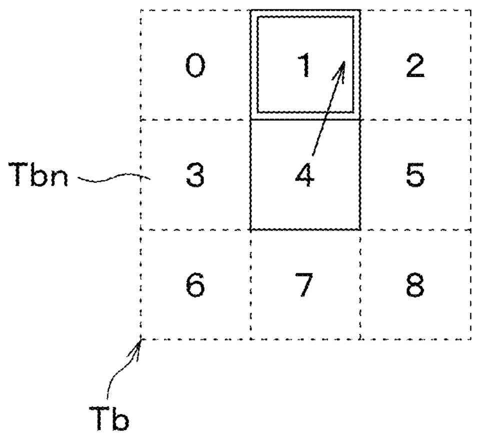
FIG. 44 is a diagram schematically illustrating a connection number table used to perform a second encoding of a connection vector illustrated in FIG. 43.
Figure 45:
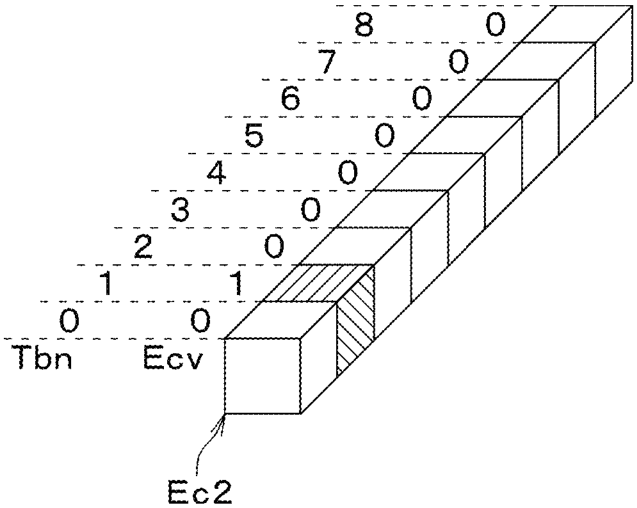
FIG. 45 is a diagram schematically illustrating an encoded result of the connection vector illustrated in FIG. 43 using the connection number table illustrated in FIG. 44.
Figure 46:
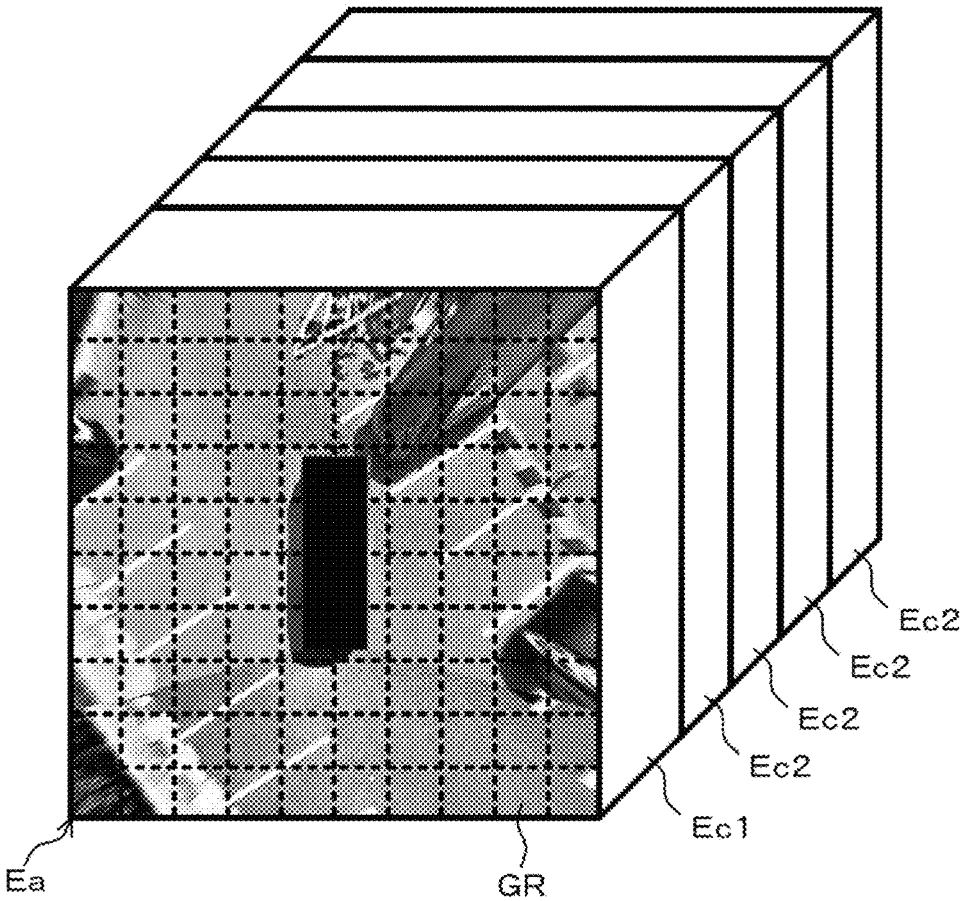
FIG. 46 is a diagram illustrating a parking-slot annotation code including the first encoded data and second encoded data including the encoded result illustrated in FIG. 45.

FIG. 44 illustrates an example of a connection number table Tb used to perform the second encoding. Each of FIGS. 45 and 46 illustrate a result of the second encoding constituting second encoded data Ec2.

In FIG. 43, a connection vector directed from the parking-slot center BPC as a start point to the left-front corner point BP1 is illustrated by a dashed arrow. In FIG. 43, the connection vector has the left-front corner point BP1 as an end point located in the cell located adjacently at the upper side of the center cell at which the parking-slot center BPC is located.

When performing the second encoding of the connection vector directed from the parking-slot center BPC as the start point to the left-front corner point BP1, the training process applies the connection number table Tb illustrated in FIG. 44 to the second encoding of the connection vector. The connection number table Tb has a 3×3 array corresponding to the 3×3 grid GR, and has connection numbers Tbn of 0, 1, 2, 3, 4, 5, 6, 7, and 8 that are assigned respectively in the top left cell, the top middle cell, the top right cell, the middle left cell, the center cell, the middle right cell, the bottom left cell, the bottom middle cell, and the bottom right cell. That is, the connection numbers Tbn of 0, 1, 2 are sequentially assigned to the respective cells of the top row of the connection number table Tb, the connection numbers Tbn of 3, 4, 5 are sequentially assigned to the respective cells of the middle row of the connection number table Tb, and the connection numbers Tbn of 6, 7, 8 are sequentially assigned to the respective cells of the bottom row of the connection number table Tb.

When applying the connection number table Tb illustrated in FIG. 44 to the second encoding of the connection vector directed from the parking-slot center BPC as the start point to the left-front corner point BP1, because the connection vector is directed from the connection number Tbn of 4 to the connection number Tbn of 1, the training process can express the connection vector illustrated in FIGS. 42 and 43 using the connection number Tbn of 1.

As illustrated in FIG. 45, the training process gives an encoded data value Ecv of 0 or 1 to each of the cells of the 10×10 grid GR illustrated in FIG. 44 in accordance with the connection numbers Tbn of 0 to 8 to accordingly generate a second encoded data item Ec2 of the connection vector directed from the parking-slot center BPC as the start point to the left-front corner point BP1 illustrated in FIGS. 42 and 43 in the following procedure.

First, the training process encodes the selected cell illustrated by the heavy-line square of the 3×3 grid GR, which is related to the connection vector directed from the parking-slot center BPC as the start point to the left-front corner point BP1, to data comprised of "1" at the connection number Tbn of 1 and "0" at each of the other connection numbers Tbn of 0 and 2 to 8. The training process performs a similar encoding operation for each of the other cells of the 10×10 grid GR corresponding to the target image GS to accordingly generate the second encoded data item Ec2 related to the connection vector directed from the parking-slot center BPC as the start point to the left-front corner point BP1, each of which is comprised of nine-channel encoded values illustrated in FIG. 45; the second encoded data items Ec2 are arranged in conformity with the arrangement of the 10×10 grid GR.

Similarly, referring to FIGS. 43 and 44, the right-front corner point BP2 is located in the cell located on the adjacently right-hand side of the center cell illustrated by the heavy-line square at which the parking-slot center BPC is located. The cell in which the right-front corner point BP2 is located corresponds to the connection number Tbn of 5. For this reason, the training process encodes the selected cell illustrated by the heavy-line square of the 3×3 grid GR, which is related to a connection vector directed from the parking-slot center BPC as the start point to the right-front corner point BP2, to data comprised of "1" at the connection number Tbn of 5 and "0" at each of the other connection numbers Tbn of 0 to 4 and 6 to 8. The training process performs a similar encoding operation for each of the other cells of the 10×10 grid GR corresponding to the target image GS to accordingly generate a second encoded data item Ec2 related to the connection vector directed from the parking-slot center BPC as the start point to the right-front corner point BP2, each of which is comprised of nine-channel encoded values illustrated in FIG. 45; the second encoded data items Ec2 are arranged in conformity with the arrangement of the 10×10 grid GR.

The training process performs a similar encoding operation for each of (i) a connection vector directed from the parking-slot center BPC as the start point to the left-rear corner point BP3 and (ii) a connection vector directed from the parking-slot center BPC as the start point to the right-rear corner point BP4 to accordingly generate total four second encoded data items Ec2 related to the four connection vectors from the parking-slot center BPC as the start point to the respective corner points BP1 to BP4; the four second encoded data items Ec2 constitute the second encoded data Ec2 illustrated in FIG. 46.

Next, the following describes a third encoding of the parking segment information related to the parking segments B5 as a part of the attribute information with reference to FIGS. 47 to 54.

Figure 47:
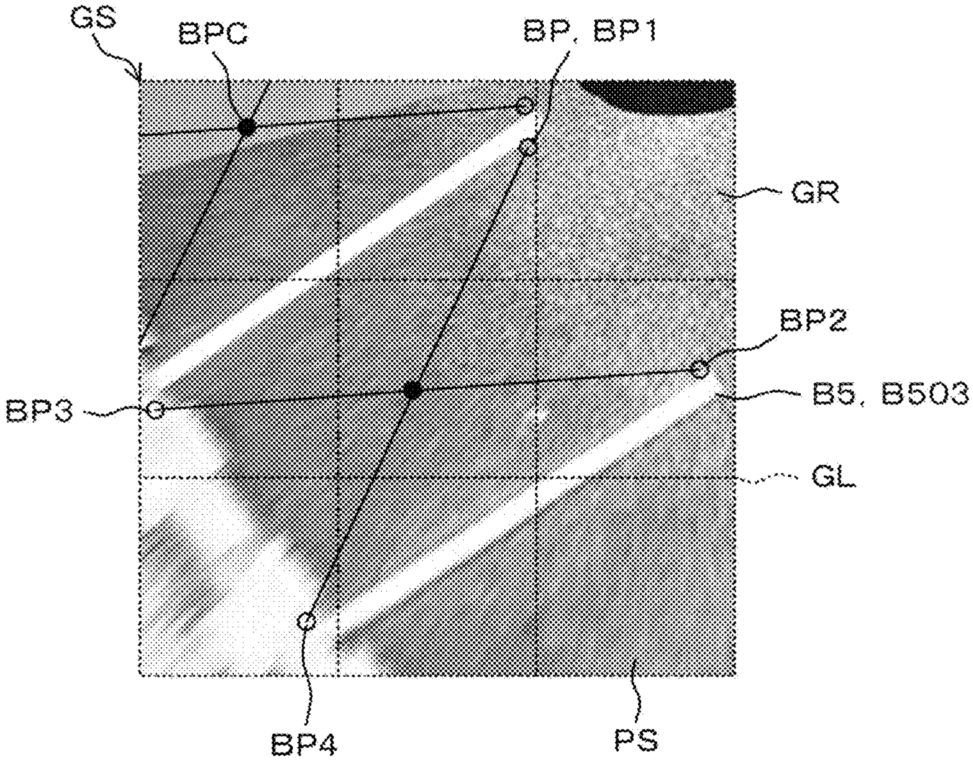
FIG. 47 is a view illustrating, in a large scale, a selected 3×3 grid and illustrating information on segment lines as a part of attribute information.

Like FIG. 33, FIG. 47 illustrates, in a large scale, a selected 3×3 grid GR of the 10×10 grid GR illustrated in FIG. 32. The 3×3 grid GR illustrated in FIG. 47 is identical to the 3×3 grid GR illustrated in FIG. 33, so that the arrangement of the five points BPC, BP1, BP2, BP3, and BP4 illustrated in FIG. 47 is identical to that of the five points BPC, BP1, BP2, BP3, and BP4 illustrated in FIG. 33 or FIG. 43. The parking segment information according to the first embodiment includes whether there is a segment-line component, such as a front segment line B501 or a rear segment line B502, which constitutes the corresponding parking segment B5.

In the example of the 3×3 grid GR illustrated in FIG. 47, the parking-slot centers BPC are respectively located at the center cell and the top left cell of the 3×3 grid GR. The training process gives an encoded data value Ecv of 0 or 1 related to the existence or non-existence of, for example, a left-side segment line B504 and a front segment line B501 to each of the center cell and the top left cell of the 3×3 grid GR.

Figure 48:
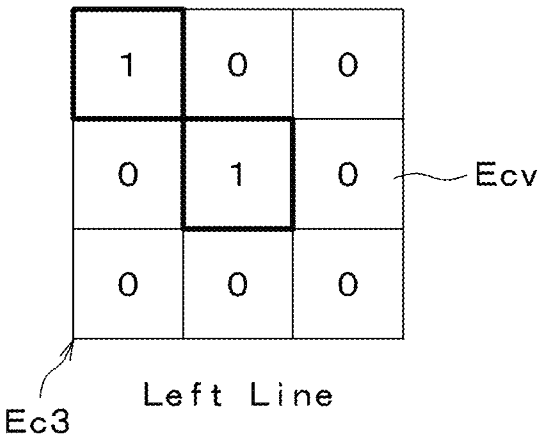
FIG. 48 is a view illustrating a third encoding of the information on a left-side segment line illustrated in FIG. 47.

Specifically, because the left-side segment line B504 exists to constitute the parking segment B5, the training process gives (i) the encoded data value Ecv of "1" to each of the center cell and the top left cell of the 3×3 grid GR in each of which the parking-slot center BPC exists and (ii) the encoded data value Ecv of "0" to each of the other cells of the 3×3 grid GR, thus obtaining an encoded result (see FIG. 48).

Figure 49:
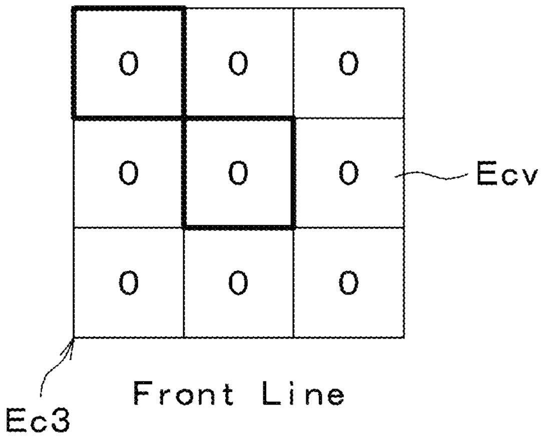
FIG. 49 is a view illustrating the third encoding of the information on a front segment line illustrated in FIG. 47.

In contrast, because no front segment line B501 exists to constitute the parking segment B5, the training process gives the encoded data value Ecv of "0" to all the cells of the 3×3 grid GR, thus obtaining an encoded result (see FIG. 49).

Specifically, the parking segment B5 illustrated in FIG. 47 is comprised of only the pair of left- and right-side segment lines B504 and B505. Because the left-side segment line B504 exists to constitute the parking segment B5, the training process gives the encoded data value Ecv of "1" to each of the center cell and the top left cell of the 3×3 grid GR in each of which the parking-slot center BPC lies (see FIG. 48). As described above, the parking segment B5 illustrated in FIG. 47 is comprised of no front and rear segment lines B501 and B502. Because no front segment line B501 exists to constitute the parking segment B5, the training process gives the encoded data value Ecv of "0" to all the cells of the 3×3 grid GR (see FIG. 49).

Figure 52:
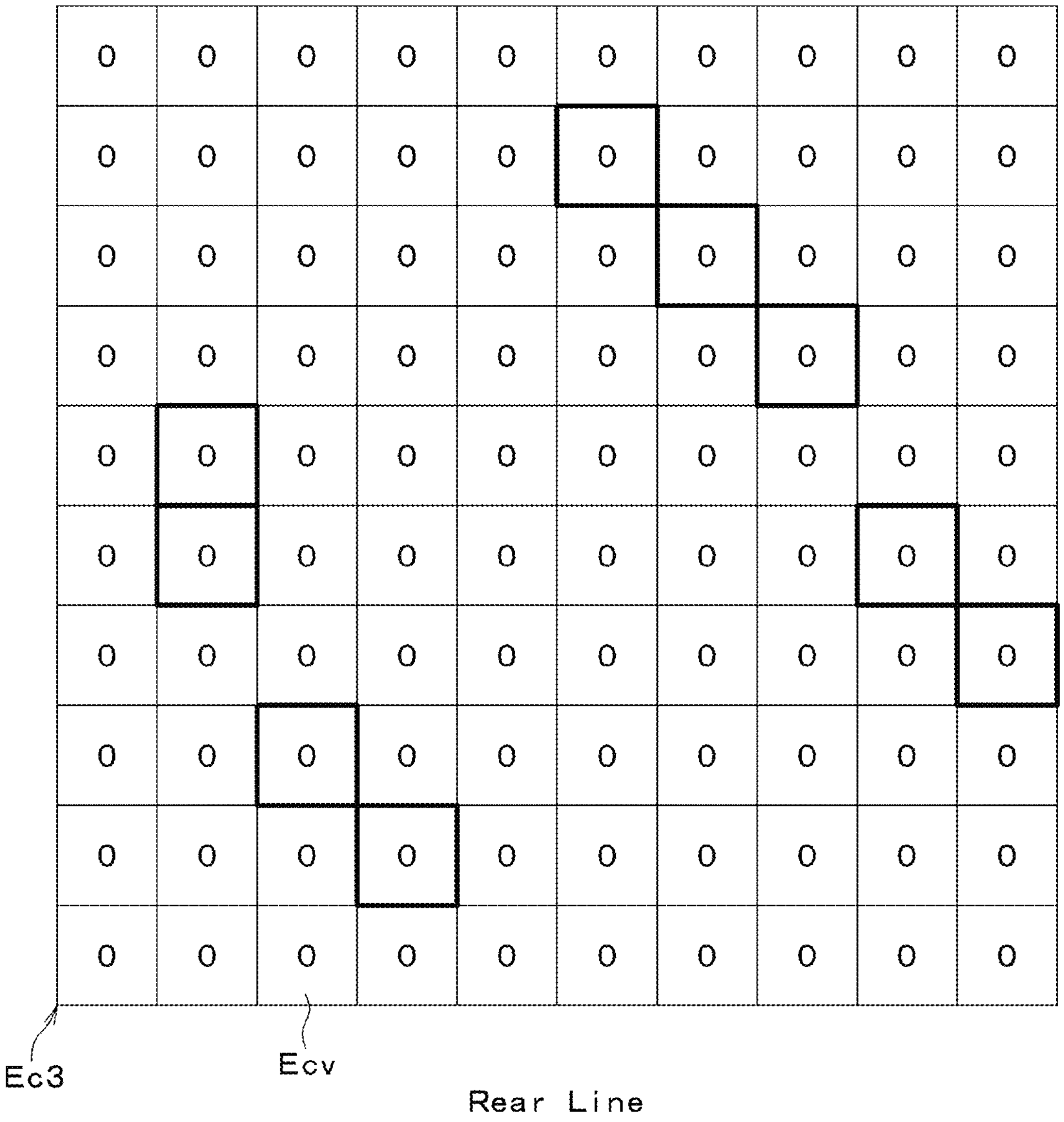
FIG. 52 is a diagram illustrating the third encoding of the information on the left-side segment lines in the whole of the target image illustrated in FIG. 32.
Figure 53:
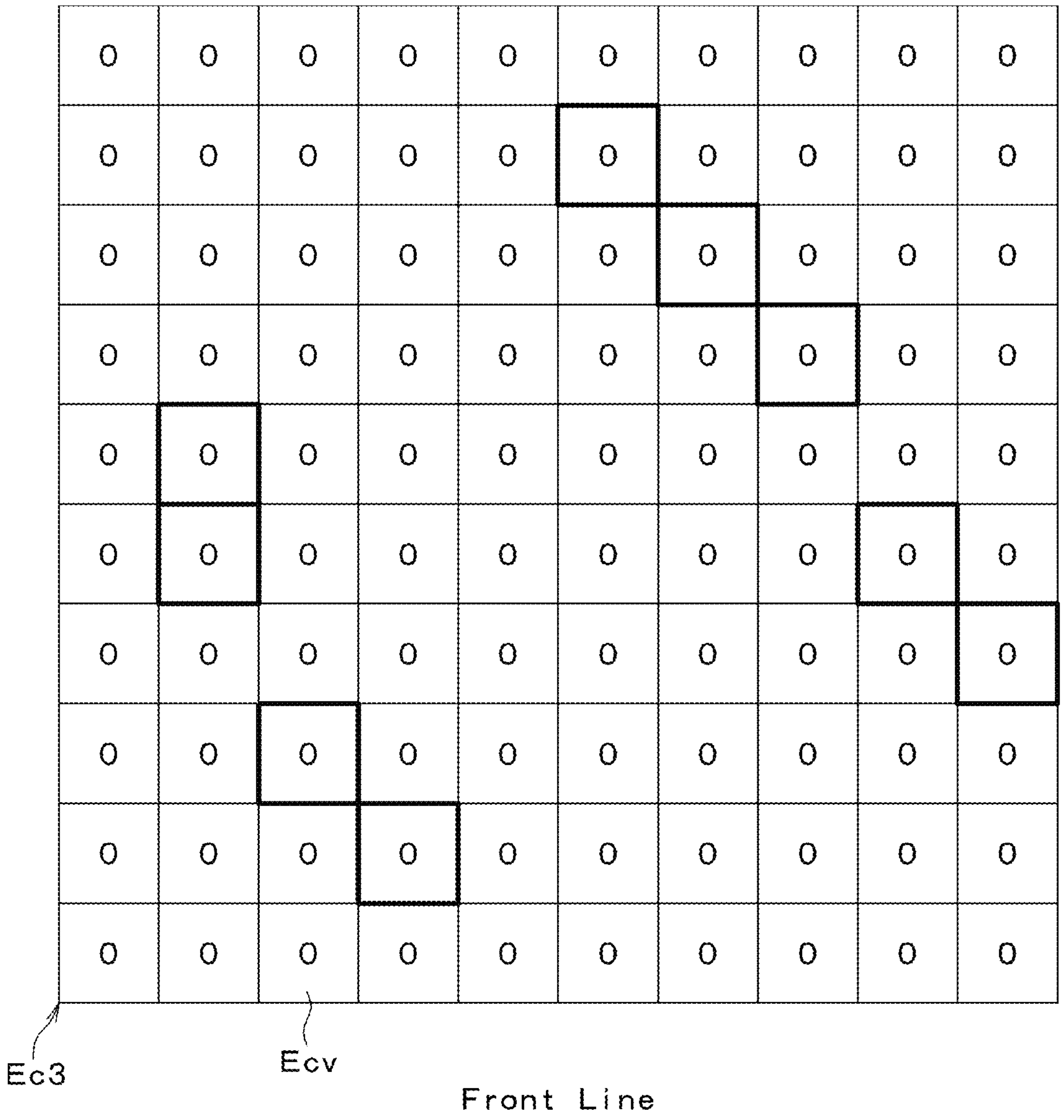
FIG. 53 is a diagram illustrating the third encoding of the information on the front segment lines in the whole of the target image illustrated in FIG. 32.

FIG. 50 illustrates all the encoded data values Ecv based on the third encoding related to the existence or non-existence of the left-side segment line B504 illustrated in FIG. 48 in the whole of the target image GS illustrated in FIG. 32. FIG. 51 illustrates all the encoded data values Ecv based on the third encoding related to the existence or non-existence of the right-side segment line B505 in the whole of the target image GS illustrated in FIG. 32. FIG. 52 illustrates all the encoded data values Ecv based on the third encoding related to the existence or non-existence of the rear segment line B502 in the whole of the target image GS illustrated in FIG. 32. FIG. 53 illustrates all the encoded data values Ecv based on the third encoding related to the existence or non-existence of the front segment line B501 illustrated in FIG. 49 in the whole of the target image GS illustrated in FIG. 32.

That is, all the encoded data values Ecv based on the third encoding related to the existence or non-existence of each of the left-side segment line B504, the right-side segment line B505, the rear segment line B502, and the front segment line B501 constitute third encoded data Ec3.

Figure 54:
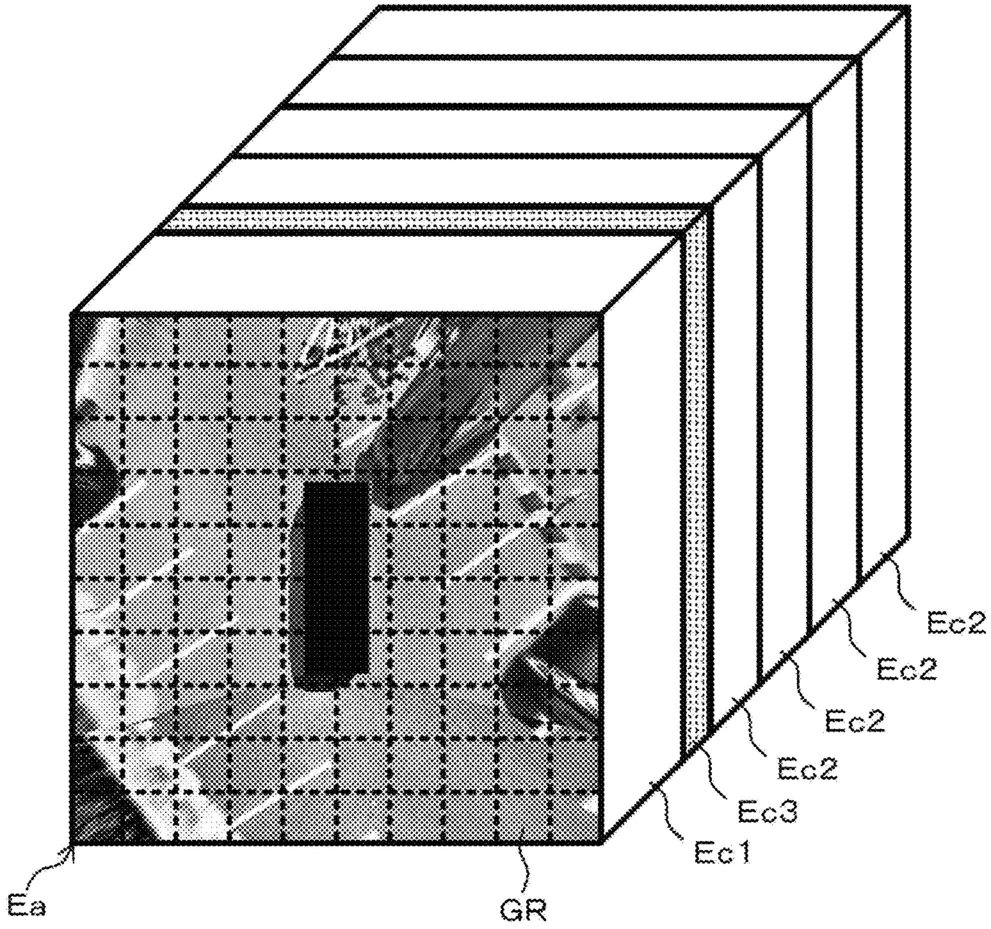
FIG. 54 is a diagram illustrating a parking-slot annotation code including the first encoded data, the second encoded data, and third encoded data including the encoded results illustrated in FIGS. 50 to 53.

FIG. 54 schematically illustrates the parking-slot annotation code Ea for the objectified parking slot PS included in the target image GS, which is comprised of (I) The first encoded data Ec1 related to each of the five points BPC, BP1, BP2, BP3, and BP4

(II) The second encoded data Ec2 related to the connection vectors (III) The third encoded data Ec3 related to the existence or non-existence of the segment lines of the parking segment B5

Specifically, in the annotation information storage 2206, the ground-truth annotation code Ea for each objectified parking slot PS included in each target image GS has been stored to be paired to the corresponding objectified parking slot PS and to the corresponding target image GS.

That is, the training process calculates, for each objectified parking slot PS in a target image GS inputted to the parking-slot training unit 2222, a loss function between (i) the ground-truth annotation code Ea for the corresponding objectified parking slot PS stored as the annotation information in the annotation information storage 2206 and (ii) the inferred parking-slot annotation code Ea calculated for the corresponding objectified parking slot PS included in the target image GS based on the machine learning model LM.

Then, the training process updates the parameters of the machine learning model LM using, for example, backpropagation to accordingly minimize the loss function. The parking-slot training unit 2222 is configured to iterate the training process to accordingly train the parameters of the machine learning model LM, thus improving the accuracy of recognizing at least one parking slot PS included in an input image.

Because the training process using the loss function is already well known at the filing time of the corresponding Japanese Patent Application, further detailed description of the training process is omitted.

In particular, the annotation code Ea prepared for each target image GS includes the third encoded data Ec3 related to the existence or non-existence of the segment lines of the parking segment B5 of each parking slot PS. This therefore enables the learning unit 2202 to infer, for each objectified parking slot PS, whether the corresponding parking slot PS has a parking segment B5 or one or more segment-line components constituting the parking segment B5.

Referring to FIG. 30, the parking-slot determiner 2203 includes a bird's-eye view image generator 2231, a parking-slot detector 2232, an edge calculator 2233, and a position corrector 2234.

The bird's-eye view image generator 2231 is configured to convert an image captured by at least one camera 34 into a bird's-eye view image using, for example, a known viewpoint converting approach. The bird's-eye view image is used for the processor 21 to detect at least one parking slot PS included in the captured image; the detected at least one parking slot PS is used for the processor 21 to perform, for example, parking assistance of the own vehicle V.

The parking-slot detector 2232 is configured to input the bird's-eye view image into the trained machine learning model LM stored in the learning model storage 2207, and determine whether there are one or more parking slots PS in the captured image in accordance with the output data of the trained machine learning model LM.

In response to determination that there are one or more parking slots PS in the captured image in accordance with the output data of the trained machine learning model LM, the parking-slot detector 2232 is configured to infer, i.e., detect, the one or more parking slots PS and their states in the captured image in accordance with the output data of the trained machine learning model LM. The state of each parking slot PS includes information on whether the corresponding parking slot PS is occupied by a parked vehicle B7 except for the own vehicle V.

Specifically, the parking-slot detector 2232 is configured to detect, i.e., infer, for each parking slot PS, location information on the corresponding parking slot PS; the inferred location information on each parking slot PS includes (i) the position of each of the parking-slot center point BPC, the left-front corner point BP1, the right-front corner point BP2, the left-rear corner point BP3, and the right-rear corner point BP4, (ii) the connection vectors from the parking-slot center point BPC to the respective corner points BP1 to BP4, and (iii) the existence or non-existence of each segment-line component of the parking segment B5 of the corresponding parking slot PS.

The edge calculator 2233 is configured to calculate, in the bird's-eye view image, inner edges of each segment-line component of the parking segment B5 of each actual parking slot PS included in the bird's-eye view image.

The position corrector 2234 is configured to correct, based on the calculated inner edges for each parking slot PS, the inferred location information on the corresponding parking slot PS to accordingly determine, based on the corrected location information on each parking slot PS, final location information on the corresponding parking slot PS.

The driving ECU 2 can be configured to perform, based on the final location information on each parking slot PS included in the input image captured by at least one camera 34, (i) tasks of responding an accelerator misoperation, such as a task of suppressing sudden acceleration and/or a task of notifying one or more occupants of the accelerator misoperation, (ii) parking assistance, and/or (iii) automatic parking. Vehicles have been recently required to have a higher accuracy of detecting parking slots PS. From these requirements, it is effective to recognize various items of attribute information on each parking slot PS in addition to the positional information on each corner point of the corresponding parking slot PS in detection of the corresponding parking slot PS from an input image using a machine learning model, such as a deep learning model.

In view of the above circumstances, the processor 21 of the driving ECU 2 according to the first embodiment is configured to objectify, from a target image GS, a selected parking slot PS as the assembly of a parking-slot center BPC four key points, i.e., four corner points BP1, BP2, BP3, and BP4 located to surround the parking-slot center BPC, in other words, the assembly of four corner points BP1, BP2, BP3, and BP4 and a parking-slot center BPC located inside the four corner points BP1, BP2, BP3, and BP4. Then, the processor 21 learns a recognition rule of parking slots PS from an input image using the objectified parking slots PS.

Specifically, the processor 21 is configured to train the parameters of the machine learning model LM, such as a deep learning mode, using, as the ground truth data, the parking-slot annotation code Ea for each training target image GS, which is comprised of (I) The first type of the first encoded data Ec1 including the existence data of each of the five points BPC, BP1, BP2, BP3, and BP4 of an objectified parking slot PS (II) The second type of the first encoded data Ec1 including the horizontal position data of each of the five points BPC, BP1, BP2, BP3, and BP4 of the objectified parking slot PS (III) The third type of the first encoded data Ec1 including the vertical position data of each of the five points BPC, BP1, BP2, BP3, and BP4 of the objectified parking slot PS (IV) The second encoded data Ec2 related to the connection vectors related to the objectified parking slot PS Objectifying plural sets of five points BPC, BP1, BP2, BP3, and BP4 detected from a target image GS enables (i) the five points BPC, BP1, BP2, BP3, and BP4 of each set to be definitely associated with the corresponding objectified parking slot PS, and (ii) the attribute information to be applied to the corresponding objectified parking slot PS.

Specifically, the processor 21 is configured to train the parameters of the machine learning model LM using, as the ground truth data, the parking-slot annotation code Ea for each training target image GS, which is additionally comprised of the attribute information, such as the third encoded data Ec3 related to the existence or non-existence of the segment lines of the parking segment B5 of the objectified parking slot PS.

This enables the processor 21, when the processor 21 infers a recognition rule of a parking slot PS from an input image, whether there is a segment-line component, such as a front segment line B501 or a rear segment line B502, which constitutes the corresponding parking segment B5. This enables, after detection, i.e., inference, of the parking slot PS, calculation of edge lines constituting the actual parking slot PS from the input image, making it possible to correct, with a high accuracy, the location of each inferred corner point based on the calculated edge lines. This therefore improves the parking-slot inference accuracy of the trained machine learning model LM to accordingly improve the accuracy of recognizing the parking slots PS included in the input image. This results in, during parking assistance or automatic parking, the parking of the own vehicle V in a selected one of the recognized parking slots PS with higher accuracy.

Figure 55:
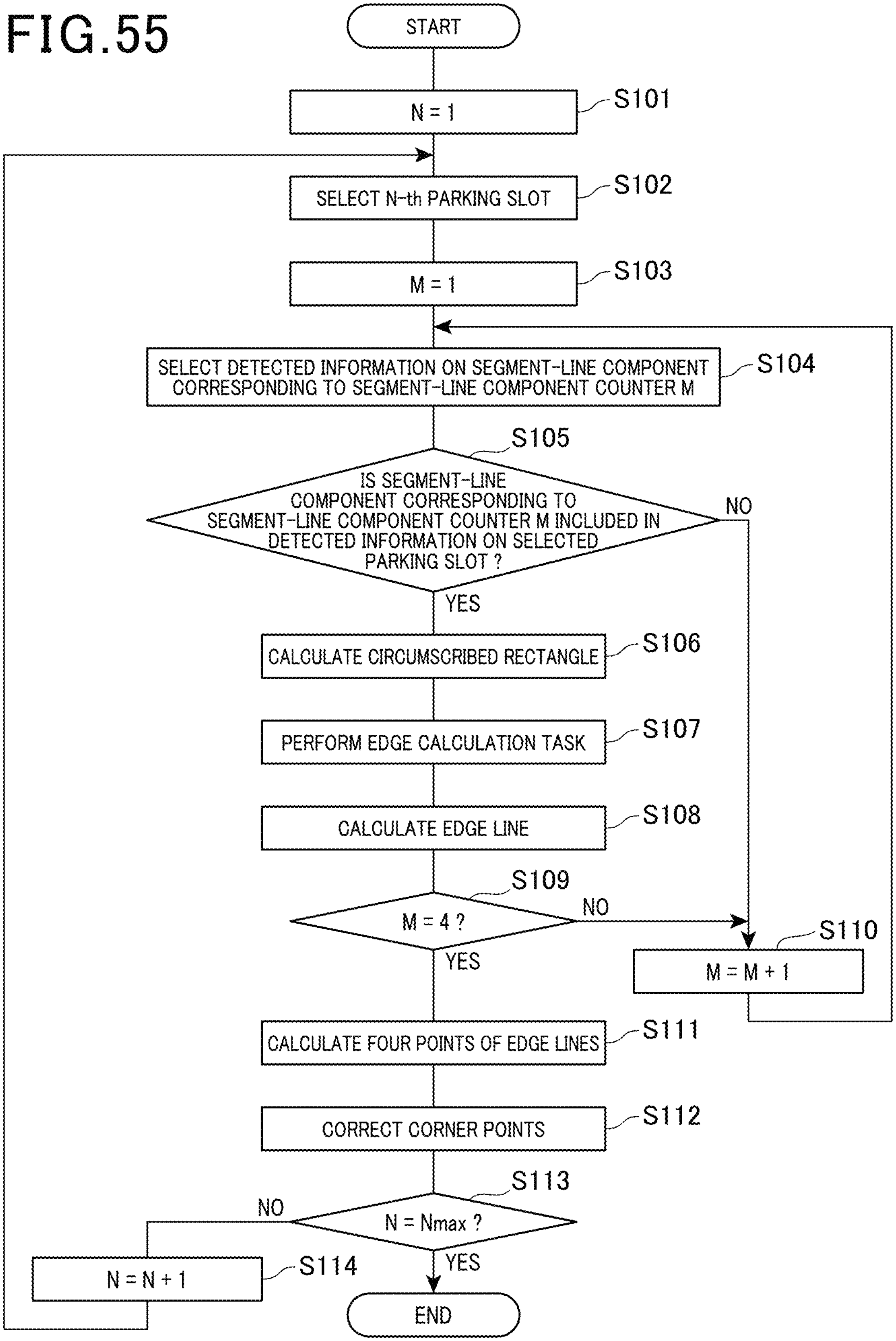
FIG. 55 is a flowchart schematically illustrating, as an example of a task after detection of the parking slots from an input image, a position correction routine according to the first embodiment.

FIG. 55 is a flowchart schematically illustrating, as an example of a task after detection, i.e., inference, of the parking slots PS from an input image, a position correction routine for each inferred parking-slot corner point BP according to the first embodiment. In FIG. 55, reference character S is an abbreviation for Step. Specifically, the processor 21 reads, from the memory device 22, a corresponding set of program instructions and executes the program instructions in response to completion of the inference of the parking slots PS from an input image to accordingly perform the operations in steps S101 to S114 illustrated in the flowchart of FIG. 55. The following described the position correction routine.

When starting the position correction routine, the processor 21 initializes a parking-slot counter N previously prepared in the memory device 22 to 1 in step S101. The parking-slot counter N is a positive integer that is variable between 1 and Nmax inclusive. The value Nmax represents the total number of the parking slots PS detected, i.e., inferred, by the processor 21.

Next, the processor 21 selects, from the detected parking slots PS, one of the detected parking slots PS as an N-th, i.e., 1-th, parking slot PS in step S102, and initializes a segment-line component counter M previously prepared in the memory device 22 to 1 in step S103. The segment-line component counter M is a positive integer that is any one of 1, 2, 3, and 4. The segment-line component counter M being set to 1 represents the front segment line B501, the segment-line component counter M being set to 2 represents the rear segment line B502, the segment-line component counter M being set to 3 represents the left-side segment line B504, and the segment-line component counter M being set to 4 represents the right-side segment line B505.

Following the operation in step S103, the position correction routine proceeds to step S104.

In step S104, the processor 21 refers to the detected information, i.e., inferred information, on the selected parking slot PS using, as a key, the segment-line component corresponding to the segment-line component counter M. Specifically, if the segment-line component counter M is set to 1 immediately after the operation in step S103, the processor 21 refers to the detected information on the selected parking slot PS using, as a key, the front segment line B501 of the selected parking slot PS. Next, the processor 21 determines whether the segment-line component corresponding to the segment-line component counter M is included in the detected information, i.e., inferred information, on the selected parking slot PS in step S105.

Upon determination that the segment-line component corresponding to the segment-line component counter M is included in the detected information on the selected parking slot PS (YES in step S105), the processor 21 is programmed to execute the following operations in steps S106 to S109.

Figure 56:
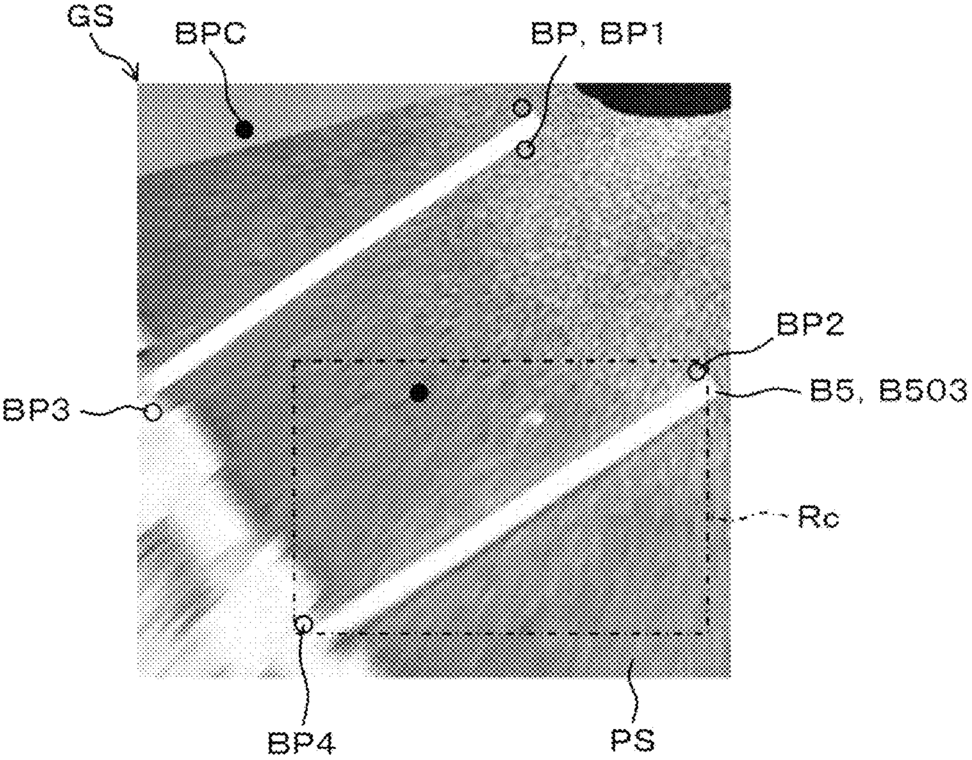
FIG. 56 is a view schematically illustrating a circumscribed-rectangle calculation task illustrated in FIG. 55.

Specifically, the processor 21 calculates, on the bird's-eye view image generated by the bird's-eye view image generator 2231, a circumscribed rectangle Rc (see FIG. 56) in step S106. The circumscribed rectangle Rc has a pair of the detected corner points BP constituting the segment-line component corresponding to the segment-line component counter M. Next, the processor 21 performs an edge calculation task of calculating, based on luminance values of the pixels included in the bird's-eye view image, the inner edges of the actual segment-line component of the parking segment B5 of the selected parking slot PS included in the bird's-eye view image using a known filter, such as a Sobel filter in step S107.

Figure 57:
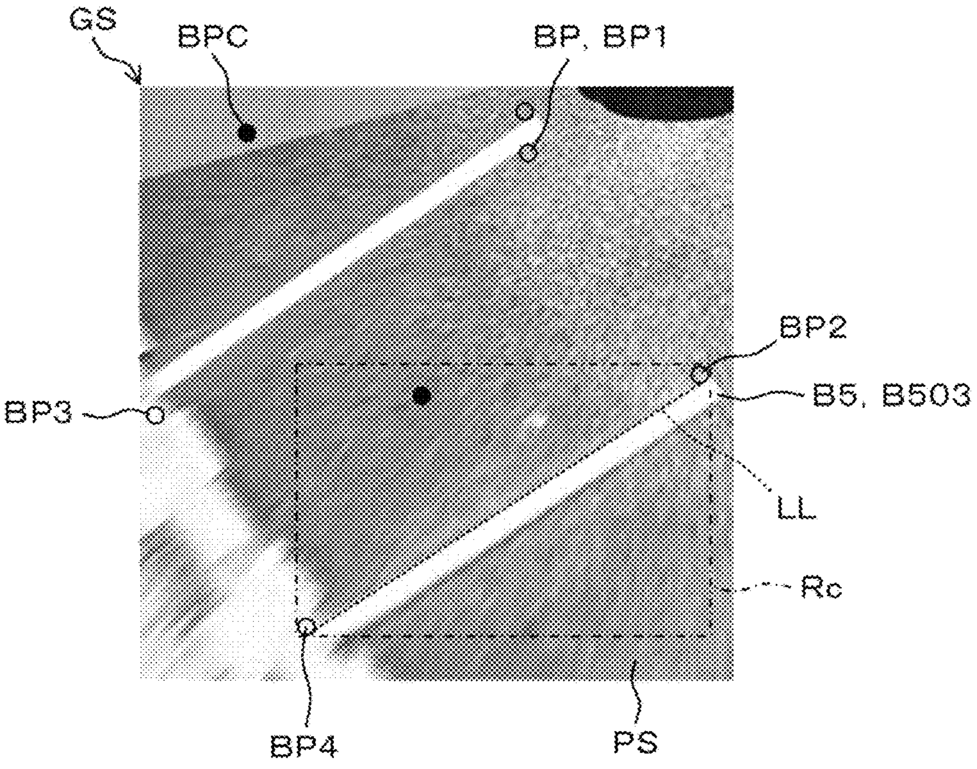
FIG. 57 is a view schematically illustrating an edge-line production task and an edge-line calculation task illustrated in FIG. 55.

Next, the processor 21 applies a known edge-line production task, such as Hough transformation, to the calculated inner edges of the actual segment-line component to accordingly calculate an edge line LL of the actual segment-line component (see, for example, FIG. 57) in step S108.

Following the operation in step S108, the processor 21 determines whether the segment-line component counter M is set to 4 in step S109.

Upon determination that the segment-line component counter M is set to any of 1 to 3 except for 4 (NO in step S109), the processor 21 recognizes that there is at least one segment-line component included in the detected information, i.e., inferred information, on the selected parking slot P; the edge calculation task in step S107 and the edge line calculation task in step S108 are not carried out for the at least one segment-line component. Then, the processor 21 increments the segment-line component counter M by 1 in step S110, and thereafter returns to the operation in step S104, and iteratively performs the operations in step S104 to S110 until the determination in step S109 is affirmative.

Otherwise, upon determination that the segment-line component counter M is set to 4 (YES in step S109), the processor 21 recognizes that the edge calculation task in step S107 and the edge line calculation task in step S108 have been carried out for all the segment-line components included in the detected information, i.e., inferred information, on the selected parking slot P. Then, the position correction routine proceeds to step S111.

At that time, if the edge line LL for at least one segment-line component has not been calculated due to the determination in step S105 that the segment-line component corresponding to the segment-line component counter M is not included in the detected information on the selected parking slot PS (NO in step S105), the processor 21 calculates at least one linear line connecting between the corresponding adjacent pair of parking-slot corner points BP whose edge line LL has been calculated in step S111.

Then, the processor 21 calculates four points of intersection among the calculated four edge lines LL in which the at least one linear line may be included in step S111.

Next, the processor 21 corrects the parking-slot corner points BP detected, i.e., inferred based on the machine learning model LM in step S112. Following the operation in step S112, the processor 21 determines whether the parking-slot counter N is set to the value Nmax in step S113. Upon determination that the parking-slot counter N is not set to the value Nmax (NO in step S113), the processor 21 recognizes that at least one unselected parking slot PS remains in the parking slots PS detected, i.e., inferred, by the processor 21. Then, the processor 21 increments the parking-slot counter N by 1 in step S114, and thereafter returns to the operation in step S102, and iteratively performs the operations in step S102 to S114 until the determination in step S113 is affirmative.

That is, upon determination that the parking-slot counter N is set to the value Nmax (YES in step S113), the processor 21 recognizes that the corner-point position correction for all the parking slots PS detected, i.e., inferred, by the processor 21 has been completed, and therefore the processor 21 terminates the position correction routine.

Second Embodiment

Figure 58:
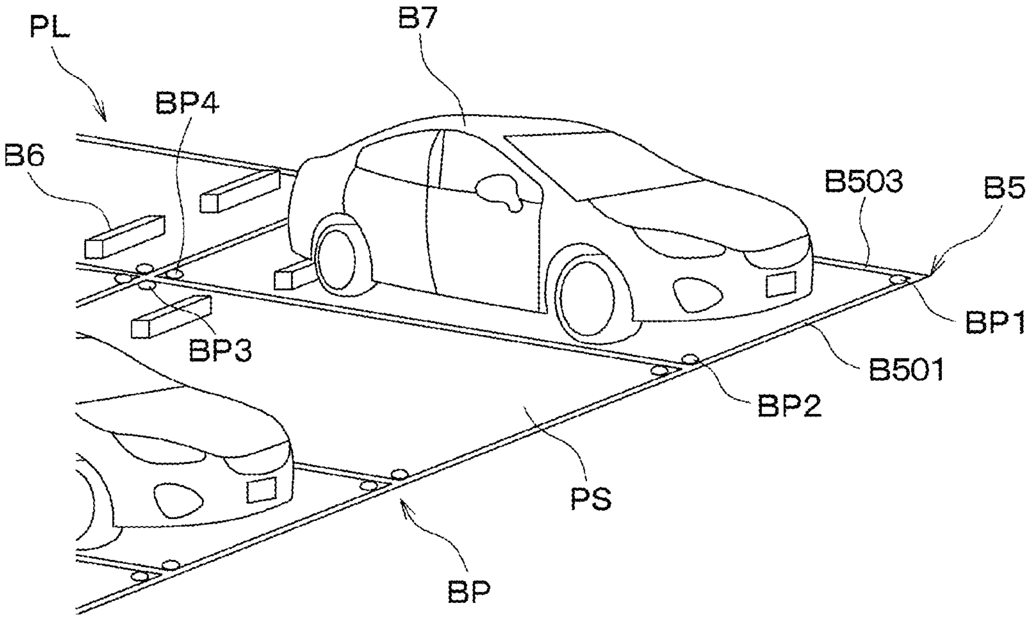
FIG. 58 is a perspective view illustrating a situation where a part of a parking-slot segment and/or at least one parking-slot corner point may be blocked by at least one parked vehicle.
Figure 59:
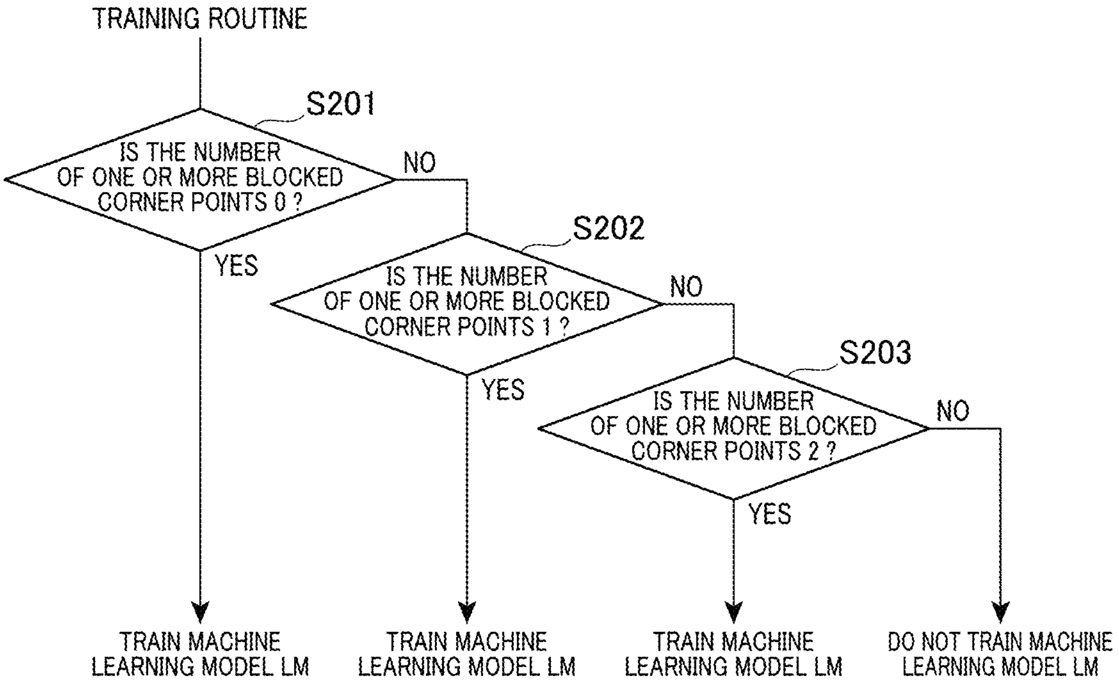
FIG. 59 is a flowchart schematically illustrating a part of a training routine according to the second embodiment.

The following describes a parking-slot detection apparatus 2200 according to the second embodiment of the present disclosure with reference to FIGS. 58 and 59.

The following therefore describes mainly different points of the second embodiment as compared with the first embodiment. Similarly, each of the following third embodiment and subsequent embodiments describes mainly different points as compared with the former embodiments. For this reason, the structure, functions, and achieved benefits of each of the subsequent embodiments are substantially identical to those of at least one of the former embodiments unless there are technical contradictions.

In an actual parking lot PL illustrated in, for example, FIG. 58, there may be a situation where a part of the parking-slot segment B5 and/or at least one parking-slot corner point BP may be blocked by at least one parked vehicle B7. If the processor 21 performs training of the parameters of the machine learning model LM based on a learning image captured under such a situation, the processor 21 may train the parameters of the machine learning model LM such that a slight part of a parking-slot segment B5 appearing in the learning image is a recognized target parking slot PS. This may result in the processor 21 erroneously detecting, i.e., inferring, a pedestrian-crossing marking B41, a stop line B42, or a dashed road marking line B43 on a road Rd for example illustrated in FIG. 18 as a parking slot PS.

From this viewpoint, the parking-slot annotation generator 2213 of the second embodiment can be configured to generate the annotation information, i.e., the parking-slot annotation code Ea for each parking slot PS included in a target image GS, that includes block information indicative of a degree of the corresponding parking slot PS being blocked by an object other than the own vehicle V, such as, typically, at least one parked vehicle B7. For example, the parking-slot annotation generator 2213 of the second embodiment is configured to add, to the parking-slot annotation code Ea for each parking slot PS illustrated in FIG. 54, block information indicative of a size of an unblocked region of the corresponding parking slot PS or its parking-slot segment B5. This added block information to the parking-slot annotation code Ea for each parking slot PS enables the processor 21 to determine whether to train the machine learning model LM for the corresponding parking slot PS in accordance with the size of the unblocked region of the corresponding parking slot PS or its parking-slot segment B5. This enables reduction of such an erroneous detection of another object as a parking slot PS.

Alternatively, the parking-slot annotation generator 2213 of the second embodiment can be configured to generate the annotation information, i.e., the parking-slot annotation code Ea for each parking slot PS included in a target image GS, that includes block information indicative of a degree of each parking-slot corner point BP of the corresponding parking slot PS being blocked by, for example, at least one parked vehicle B7. Then, this added encoded data to the parking-slot annotation code Ea for each objectified parking slot PS enables the processor 21 to determine whether to train the machine learning model LM for the corresponding parking slot PS. Specifically, the processor 21 can calculate the number of parking-slot corner points BP of a selected parking slot PS being blocked by, for example, at least one parked vehicles B7, and can determine not to train the machine learning model LM for the selected parking slot PS upon determination that the number of parking-slot corner points BP of the selected parking slot PS being blocked by the at least one parked vehicle B7 is more than or equal to a non-training threshold, such as 3. This enables reduction of such an erroneous detection of another object as a parking slot PS while minimizing an increase in a load of generating the parking-slot annotation code Ea.

FIG. 59 is a flowchart schematically illustrating a part of a training routine according to the second embodiment. Specifically, the processor 21 is programmed to execute the part of the training routine illustrated in FIG. 59 when starting training of the parameters of the machine learning model LM for each parking slot PS using the corresponding parking-slot annotation code Ea including the block information.

Referring to FIG. 59, the processor 21 refers to the parking-slot annotation code Ea for a selected parking slot PS to determine whether the number of one or more blocked corner points of the selected objectified parking slot PS is 0 in step S201. The blocked corner points are one or more parking-slot corner points BP that are so blocked by at least one parked vehicle B7 as to be hard to see. Upon determination that the number of one or more blocked corner points of the selected parking slot PS is 0 (YES in step S201), the processor 21 recognizes that the selected parking slot PS is not blocked by any parked vehicle B7 so that the selected parking slot PS is an empty slot. Then, the processor 21 determines to train the parameters of the machine learning model LM for the selected parking slot PS.

Otherwise, upon determination that the number of one or more blocked corner points of the selected parking slot PS is not 0 (NO in step S201), the processor 21 recognizes that the selected parking slot PS is blocked by at least one parked vehicle B7 so that there is at least one blocked corner point. Then, the training routine proceeds to step S202.

In step S202, the processor 21 determines whether the number of one or more blocked corner points of the selected objectified parking slot PS is 1. Upon determination that the number of one or more blocked corner points of the selected parking slot PS is 1 (YES in step S202), the processor 21 determines to train the parameters of the machine learning model LM for the selected parking slot PS.

Otherwise, upon determination that the number of one or more blocked corner points of the selected parking slot PS is not 1 (NO in step S202), the training routine proceeds to step S203.

In step S203, the processor 21 determines whether the number of one or more blocked corner points of the selected objectified parking slot PS is 2. Upon determination that the number of one or more blocked corner points of the selected parking slot PS is 2 (YES in step S203), the processor 21 determines to train the parameters of the machine learning model LM for the selected parking slot PS.

Otherwise, upon determination that the number of one or more blocked corner points of the selected parking slot PS is not 2 (NO in step S203), the processor 21 recognizes that the number of one or more blocked corner points are 3 or more. Then, the processor 21 determines not to train the parameters of the machine learning model LM for the selected parking slot PS, i.e., the processor 21 determines not to calculate the loss function for the selected parking slot PS.

Third Embodiment

Figure 60:
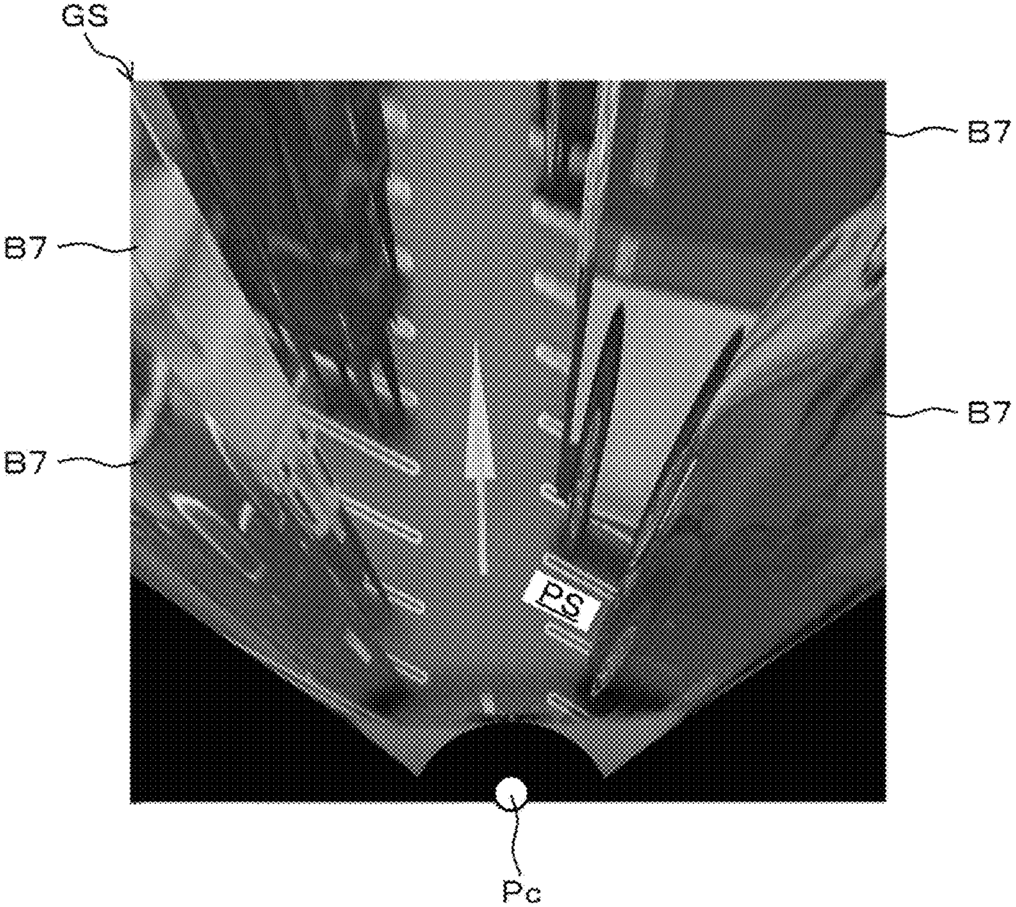
FIG. 60 is a view schematically illustrating an image indicative of a situation where it is difficult to determine whether a target parking slot, which is empty, because a parked vehicle is occupied in a parking slot adjacent to the target parking slot blocks the target parking slot according to the third embodiment.
Figure 61:
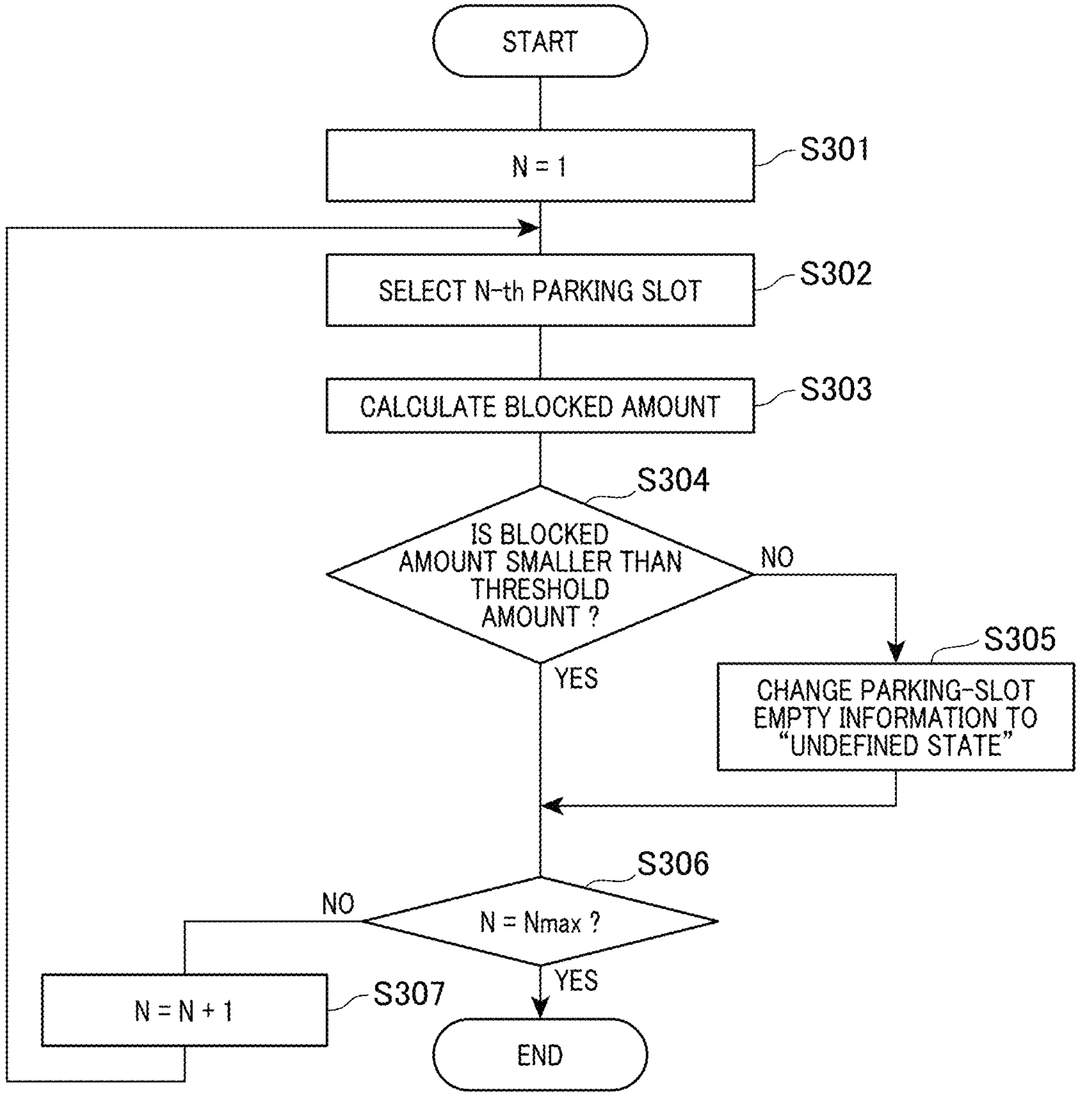
FIG. 61 is a flowchart schematically illustrating a preprocess before the training of the parameters of a machine learning model according to the third embodiment.
Figure 62:
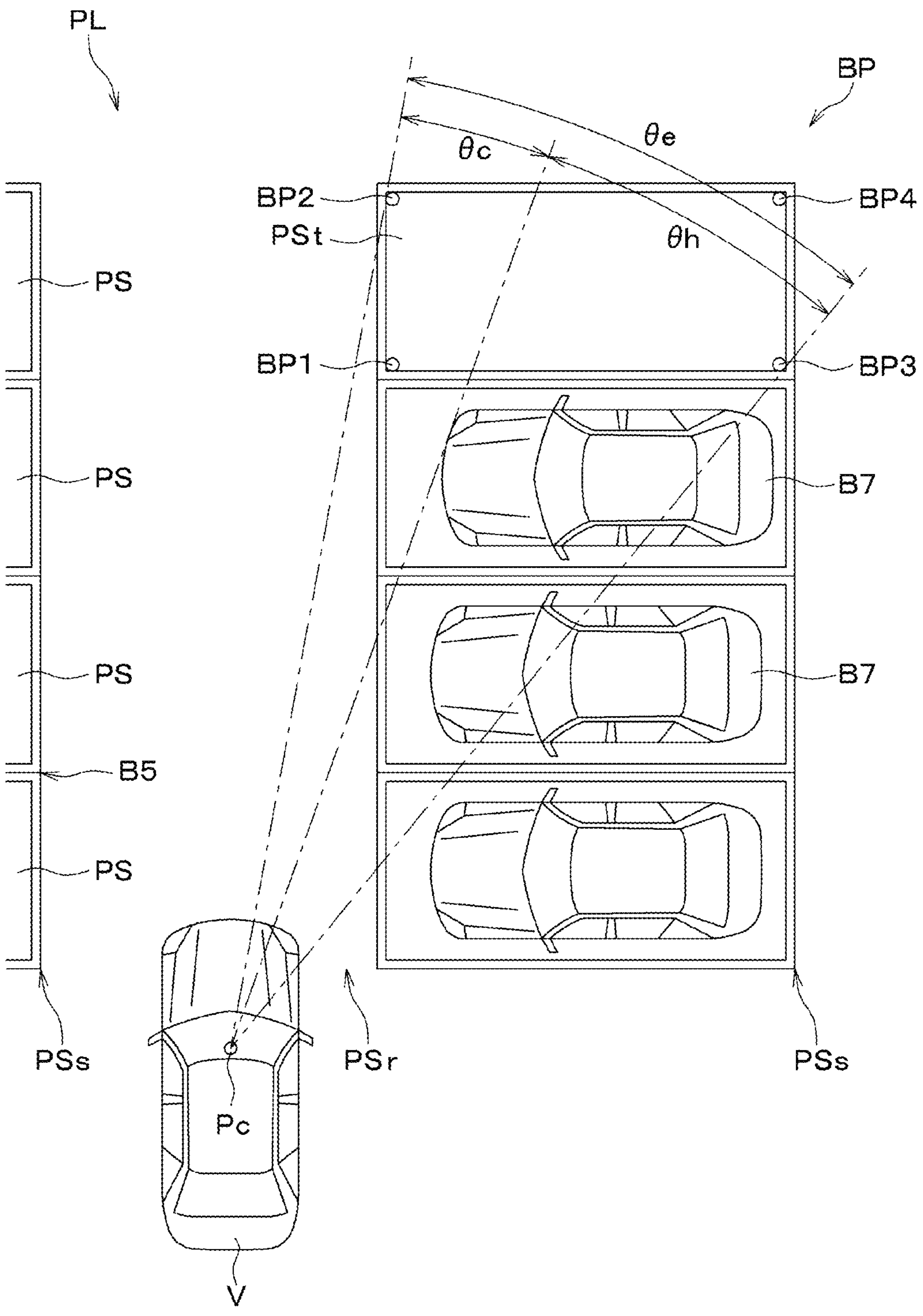
FIG. 62 is a plan view schematically illustrating a training routine according to the third embodiment under a situation where a left side-by-side parking-slot train and a right side-by-side parking-slot train are respectively arranged at both sides of a part of a common parking aisle in which the own vehicle is traveling according to the third embodiment.

The following describes a parking-slot detection apparatus 2200 according to the third embodiment of the present disclosure with reference to FIGS. 60 to 62. In FIG. 60, reference character Pc represents a viewpoint of at least one camera 34, which will be referred to as a camera position Pc. In a scene of parking assistance and/or automatic parking, information on whether each parking slot PS is empty is required. That is, a target parking slot PS in which the own vehicle V is about to be parked need be an empty slot where no parked vehicle B7 is occupied. For this reason, it is preferable to train the parameters of the machine learning model LM for each parking slot PS with the attribute information including whether the corresponding parking slot PS is empty.

However, as illustrated in FIG. 60, there may be a situation where it is difficult to determine whether a target parking slot PS, which is empty, because a parked vehicle B7 is occupied in a parking slot PS adjacent to the target parking slot PS blocks the target parking slot PS. Let us assume that the processor 21 performs training of the parameters of the machine learning model LM based on a learning image captured under such a situation. In this assumption, the processor 21 may erroneously determine that the target parking slot PS is an occupied slot during parking assistance and/or automatic parking.

From this viewpoint, the parking-slot annotation generator 2213 of the third embodiment can be configured to generate the annotation information, i.e., the parking-slot annotation code Ea for each parking slot PS included in a target image GS, that includes parking-slot empty information indicative of whether each parking slot PS included in the target image GS is empty.

Additionally, the parking-slot annotation generator 2213 of the third embodiment is configured to determine how to train the parameters of the machine learning model LM for each parking slot PS included in a target image GS in accordance with the parking-slot empty information and a positional relationship among the camera position Pc of the own vehicle V, the corresponding parking slot PS, and at least one parked vehicle B7.

FIG. 61 is a flowchart schematically illustrating a preprocess before the training of the parameters of the machine learning model LM. The processor 21 can serve as the annotation information generator 2201 and/or the learning unit 2202 to execute the preprocess illustrated in FIG. 61.

Referring to FIG. 61, the processor 21 initializes the parking-slot counter N previously prepared in the memory device 22 to 1 in step S301. The parking-slot counter N is a positive integer that is variable between 1 and Nmax inclusive. The value Nmax represents the total number of the parking slots PS that are training candidates included in the target image GS; the parking-slot annotation code Ea has been prepared for each of the parking slots PS.

Next, the processor 21 selects, from the training-candidate parking slots PS, one of the training-candidate parking slots PS as an N-th, i.e., 1-th, parking slot PS in step S302. Following the operation in step S302, the processor 21 calculates a blocked amount of the selected parking slot PS by another object, such as, typically, at least one parked vehicle B7 in step S303. How the processor 21 calculates the blocked amount of the selected parking slot PS will be described later. Next, the processor 21 determines whether the blocked amount of the selected parking slot PS is smaller than a predetermined threshold amount in step S304.

The following describes how the processor 21 calculates the blocked amount of the selected parking slot PS with reference to FIG. 62.

FIG. 62 illustrates, as an example, a situation where a left side-by-side parking-slot train PSs and a right side-by-side parking-slot train PSs are respectively arranged at both sides of a part of a common parking aisle PSr in which the own vehicle V is traveling. The left and right are defined relative to the own vehicle V traveling in the part of the common parking aisle PSr. Each of the left and right side-by-side parking-slot trains PSs represents a train of parking slots PS are arranged such that their short sides are continuously aligned in a predetermined direction parallel to the traveling direction of the common parking aisle PSr. The common parking aisle PSr represents a region through which vehicles can travel, and faces at least one of the left and right side-by-side parking-slot trains PSs. That is, the common parking aisles PSr can be defined as a region after the removal of plural parking-slot trains including the left and right side-by-side parking-slot trains PSs from the whole region of the parking lot PL.

The right side-by-side parking-slot trains PS illustrated as an example in FIG. 62 is comprised of first, second, third, and fourth parking slots PS from the near side of the own vehicle V to the far side thereof. Parked vehicles B7 are occupied in the respective first to third parking slots PS, and the fourth parking slot PS is empty. The fourth parking slot PS that is empty will be referred to as a target parking slot PSt. Note that FIG. 62 illustrates an example situation used to simply describe how the processor 21 calculates the blocked amount of the target parking slot PSt as the selected parking slot PS, and therefore the present disclosure is not limited to the situation. Specifically, the processor 21 can calculate the blocked amount of a selected parking slot PS under another situation in the same manner as the example situation.

The processor 21 can calculate the blocked amount of the target parking slot PSt based on a view angle of the own vehicle V to the target parking slot PSt.

First, as illustrated in FIG. 62, let us define, as an existence-range angle θe, a value of the view angle of the at least one camera 34 located at the camera position Pc to the target parking slot PSt in a first case where the whole of the target parking slot PSt is unblocked by parked vehicles B7 so that the whole of the target parking slot PSt can be seen by the at least one camera 34. In the example illustrated in FIG. 62, the existence-range angle de is defined as an angle formed between a first virtual line extending from the camera position Pc and passing through the right-front corner point BP2 and a second virtual line extending from the camera position Pc and passing through the left-rear corner point BP3.

Next, let us define a viewable range angle θc representing a viewable range of the at least one camera 34 located at the camera position Pc to the target parking slot PSt in a second case where a part of the target parking slot PSt is blocked by the parked vehicles B7. In the example illustrated in FIG. 62, the viewable range angle θc is defined as an angle formed between the first virtual line extending from the camera position Pc and passing through the right-front corner point BP2 and a third virtual line extending from the camera position Pc and passing through the right-front corner of the parked vehicle B7 located in the third parking slot PS in the right side-by-side parking-slot train PSs. Additionally, let us define a blocked angle range θh defined by subtracting, from the existence-range angle de, the viewable range angle θc.

The processor 21 can be configured to calculate, as the blocked amount of the target parking slot PSt, the ratio of the blocked angle range θh to the existence-range angle θe or the percentage of the blocked angle range θh to the existence-range angle θe. The predetermined threshold amount used to be compared with the blocked amount in step S304 can be freely set to any value, such as 0.8 or 80%, in accordance with empirical rules and/or experiments. The threshold amount can be modified or corrected in accordance with the training situations.

Specifically, upon determination that the blocked amount of the selected parking slot PS is greater than or equal to the predetermined threshold amount (NO in step S304), the preprocess proceeds to step S305. In step S305, the processor 21 changes the parking-slot empty information on the selected parking slot PS included in the parking-slot annotation code Ea to an "undefined state" in step S305. At that time, the training of the parameters of the machine learning model LM for the selected parking slot PS can be carried out when the class for the parking-slot empty information is set to an undefined class or the training of the parameters of the machine learning model LM for the selected parking slot PS cannot be carried out. Thereafter, the preprocess proceeds to step S306.

Otherwise, upon determination that the blocked amount of the selected parking slot PS is smaller than the predetermined threshold amount (YES in step S304), the preprocess proceeds to step S306 while skipping the operation in step S305. This results in the parking-slot empty information on the selected parking slot PS included in the parking-slot annotation code Ea is kept unchanged.

In step S306, the processor 21 determines whether the parking-slot counter N is set to the value Nmax. Upon determination that the parking-slot counter N is not set to the value Nmax (NO in step S306), the processor 21 recognizes that at least one unselected parking slot PS remains in the training-candidate parking slots PS. Then, the processor 21 increments the parking-slot counter N by 1 in step S307, and thereafter returns to the operation in step S302, and iteratively performs the operations in step S302 to S307 until the determination in step S306 is affirmative.

That is, upon determination that the parking-slot counter N is set to the value Nmax (YES in step S306), the processor 21 terminates the preprocess.

Fourth Embodiment

The following describes a parking-slot detection apparatus 2200 according to the fourth embodiment of the present disclosure with reference to FIGS. 63 to 68.

Figure 63:
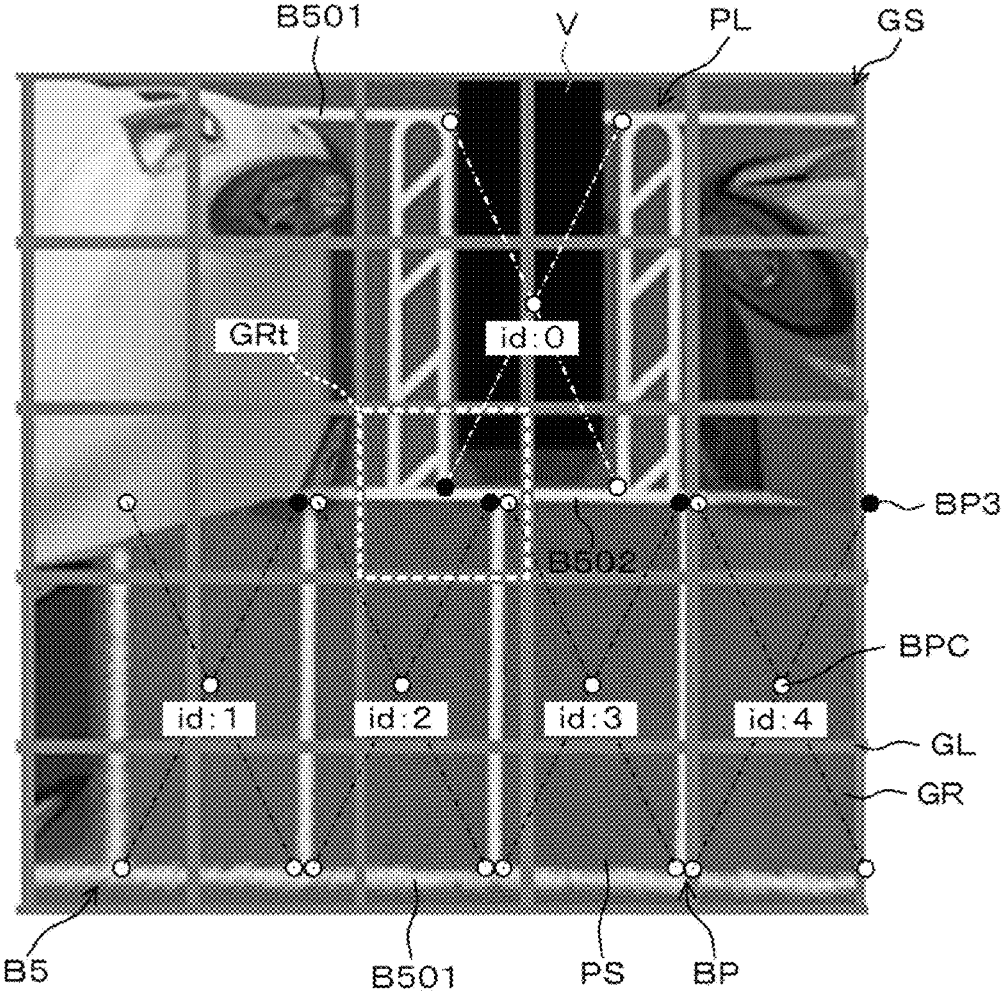
FIG. 63 is a view schematically illustrating an image indicative of a situation where the same type parking-slot corner points of different parking slots are located in a common cell of a target image according to the fourth embodiment.

FIG. 63 illustrates a 5×5 grid GR of a target image GS showing a situation where an upper side-by-side parking-slot train including a parking slot PS in which the own vehicle V is parked, and a lower side-by-side parking-slot train. That is, the parking slots PS included in the upper side-by-side parking-slot train are adjacently paired to the respective parking slots PS in the lower side-by-side parking-slot train while the parking slots PS of each adjacent pair share the common rear segment line B502. The upper side-by-side parking-slot train illustrated in FIG. 63 is actually located in front of the lower side-by-side parking-slot train.

Let us assume that an address of the parking slot PS in which the own vehicle V is parked will be referred to as id: 0, and addresses of the parking slots PS in the lower side-by-side parking-slot train arranged at the lower side of the parking slot PS with the address id: 0 will be referred to respectively as id: 1, id: 2, id: 3, and id: 4. The parking slot PS with the address id: 0 is located to face both the adjacent parking slots PS with the respective addresses id: 2 and id: 3. For convenience of descriptions, the left-rear corner point BP3 in the parking-slot corner points of each parking slot PS is only illustrated by black circle, and the other parking-slot corner points and the parking-slot center points BPC are illustrated by white circle. In a cell of the 5×5 grid GR, which is surrounded by white dashed lines and will be referred to as a remarkable cell GRt, the left-rear corner point BP3 of the parking slot PS with the address id: 0 and the left-rear corner point BP3 of the parking slot PS with the address id: 2 correspond to the same location.

The first encoded data Ec1 according to the first embodiment illustrated in FIG. 42 is comprised of (I) The first type data including the existence data of each of the five points BPC, BP1, BP2, BP3, and BP4 of an objectified parking slot PS (II) The second type data including the horizontal position data of each of the five points BPC, BP1, BP2, BP3, and BP4 of the objectified parking slot PS (III) The third type data including the vertical position data of each of the five points BPC, BP1, BP2, BP3, and BP4 of the objectified parking slot PS That is, the first encoded data Ec1 is generated on the precondition that (i) the existence data of each point BPC, BP1, BP2, BP3, and BP4 is set to a corresponding individual cell in the grid GR, (ii) the horizontal position data of each point BPC, BP1, BP2, BP3, and BP4 is set to a corresponding individual cell in the grid GR, and (iii) the vertical position data of each point BPC, BP1, BP2, BP3, and BP4 is set to a corresponding individual cell in the grid GR.

Because the remarkable cell GRt of the fourth embodiment is shared by both the left-rear corner point BP3 of the parking slot PS with the address id: 0 and the left-rear corner point BP3 of the parking slot PS with the address id: 2, it may be difficult to set (i) a first information item on the left-rear corner point BP3 of the parking slot PS with the address id: 0 and (ii) a second information item on the eft-rear corner point BP3 of the parking slot PS with the address id: 2 to the common remarkable cell GRt under the above precondition. For this reason, encoding information on a midpoint between the left-rear corner point BP3 of the parking slot PS with the address id: 0 and the left-rear corner point BP3 of the parking slot PS with the address id: 2 enables the common encoded value to be set to the remarkable cell GRt. This encoding may result in an encoded data value of the horizontal position or the vertical position of the left-rear corner point BP3 of the parking slot PS with the address id: 0 being different from an inherent encoded value, and similarly an encoded data value of the horizontal position or the vertical position of the left-rear corner point BP3 of the parking slot PS with the address id: 2 being different from an inherent encoded value. This may result in reduction in the inference accuracy using the machine learning model LM.

Such a situation where the same type parking-slot corner points BP of different parking slots PS are located in a common cell of the target image GS may occur in a specified parking lot in which the parking slots PS having the different orientations (see FIG. 31) are adjacent to one another.

Figure 64A:
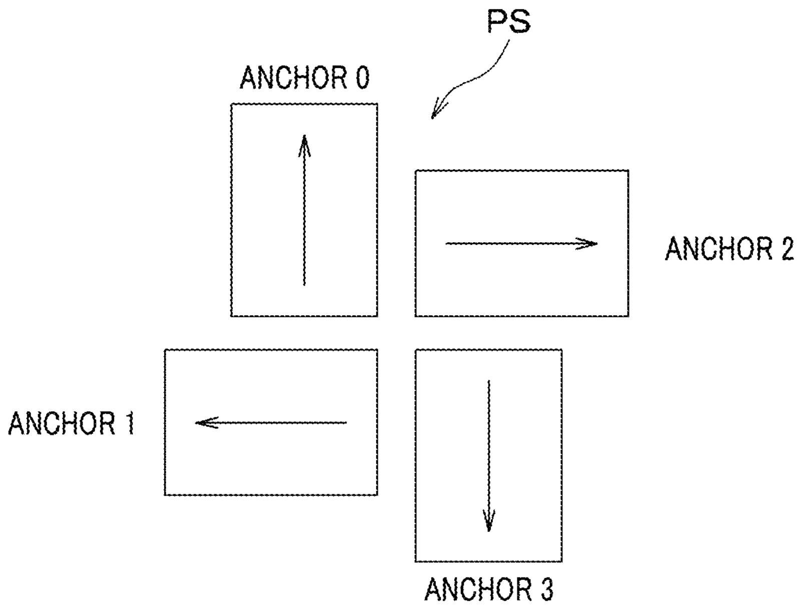
FIGS. 64A and 64B are each a diagram schematically illustrating definition of typical orientations of a parking slot according to the fourth embodiment.

From this viewpoint, the fourth embodiment defines, as illustrated in FIG. 64A, typical orientations of a parking slot PS using four anchor indexes, i.e., anchor 0, anchor 1, anchor 2, and anchor 3. In FIG. 31, the anchor 0, which is indicated by the upward arrow, represents that the orientation of the parking-slot direction BD of the parking slot PS is upward in the target image GS, and the anchor 1, which is indicated by the leftward arrow, represents that the orientation of the parking-slot direction BD of the parking slot PS is leftward in the target image GS. Similarly, in FIG. 31, the anchor 2, which is indicated by the rightward arrow, represents that the orientation of the parking-slot direction BD of the parking slot PS is rightward in the target image GS, and the anchor 3, which is indicated by the downward arrow, represents that the orientation of the parking-slot direction BD of the parking slot PS is downward in the target image GS.

Specifically, the processor 21 is configured to train the parameters of the machine learning model LM using, as the ground truth data, the parking-slot annotation code Ea for each training target image GS, whose first encoded data Ec1 additionally includes encoded information indicative of each typical orientation of the objectified parking slot PS.

Figure 64B:
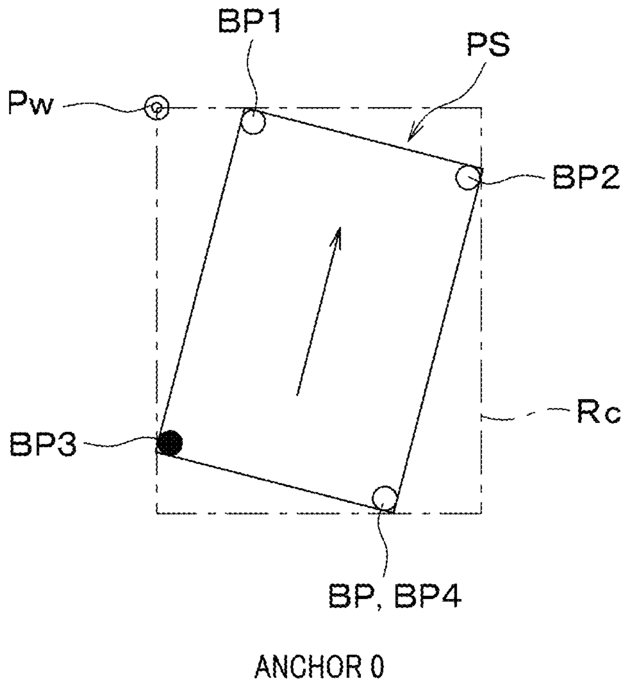

In an actual target image GS, as illustrated in FIG. 64B, the parking slot PS is inclined with respect to each of the vertical and horizontal direction of the target image GS. Then, determination of the orientation of the parking slot PS uses a circumscribed rectangle Rc and a reference point PW of the parking slot PS. The circumscribed rectangle Rc of the parking slot PS is a virtual rectangle that is circumscribed around the four parking-slot corner points BP and has each side parallel to the corresponding one of the vertical and horizontal directions of the target image GS. The reference point PW of the parking slot PS is a point on the circumscribed rectangle Rc. In the fourth embodiment, the reference point PW of the parking slot PS is a point on the left corner of the circumscribed rectangle Rc. The orientation of the parking-slot direction BD of the parking slot PS is determined based on which of the four parking-slot corner points BP of the parking slot PS is arranged closest to the reference point PW.

Specifically, if the left-front corner point BP1 is located closest to the reference point PW, the orientation of the parking-slot direction BD of the parking slot PS is set to the anchor 0. If the right-front corner point BP2 is located closest to the reference point PW, the orientation of the parking-slot direction BD of the parking slot PS is set to the anchor 1. If the right-rear corner point BP4 is located closest to the reference point PW, the orientation of the parking-slot direction BD of the parking slot PS is set to the anchor 2. If the left-rear corner point BP3 is located closest to the reference point PW, the orientation of the parking-slot direction BD of the parking slot PS is set to the anchor 3.

The following describes an encoding routine carried out by the processor 21 with reference to FIGS. 65 to 68.

Figure 65:
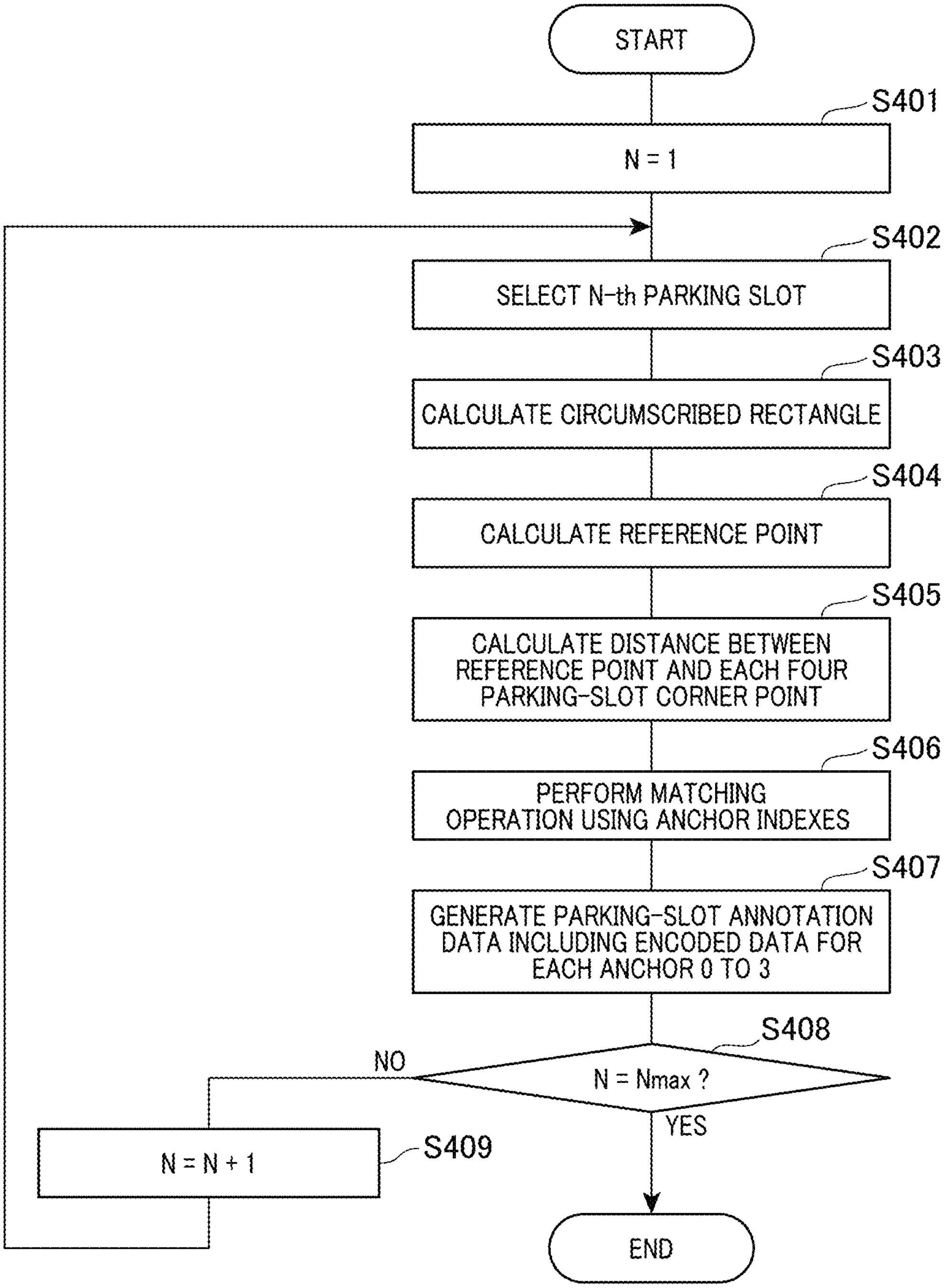
FIG. 65 is a flowchart schematically illustrating an encoding routine according to the fourth embodiment.

When starting the encoding routine illustrated in FIG. 65, the processor 21 initializes the parking-slot counter N previously prepared in the memory device 22 to 1 in step S401. The parking-slot counter N is a positive integer that is variable between 1 and Nmax inclusive. The value Nmax represents the total number of the parking slots PS that are training candidates included in the target image GS.

Next, the processor 21 selects, from the training-candidate parking slots PS, one of the training-candidate parking slots PS as an N-th, i.e., 1-th, parking slot PS in step S402.

After selecting the parking slot PS in step S402, the processor 21 executes the subsequent operations in steps S403 to S408. Specifically, the processor 21 calculates the circumscribed rectangle Rc for the selected parking slot PS in step S403, and calculates, based on the circumscribed rectangle Rc, the reference point PW in step S404. Next, the processor 21 calculates distances between the reference point PW and the respective four parking-slot corner points BP in step S405.

Following the operation in step S405, the processor 21 performs a matching operation of determining which of the anchor indexes 0 to 3 matches the selected parking slot PS in accordance with the calculated distances for the respective four parking-slot corner points BP in step S406. That is, the processor 21 determines one of the anchor indexes 0 to 3, which matches the selected parking slot PS.

Figure 66:
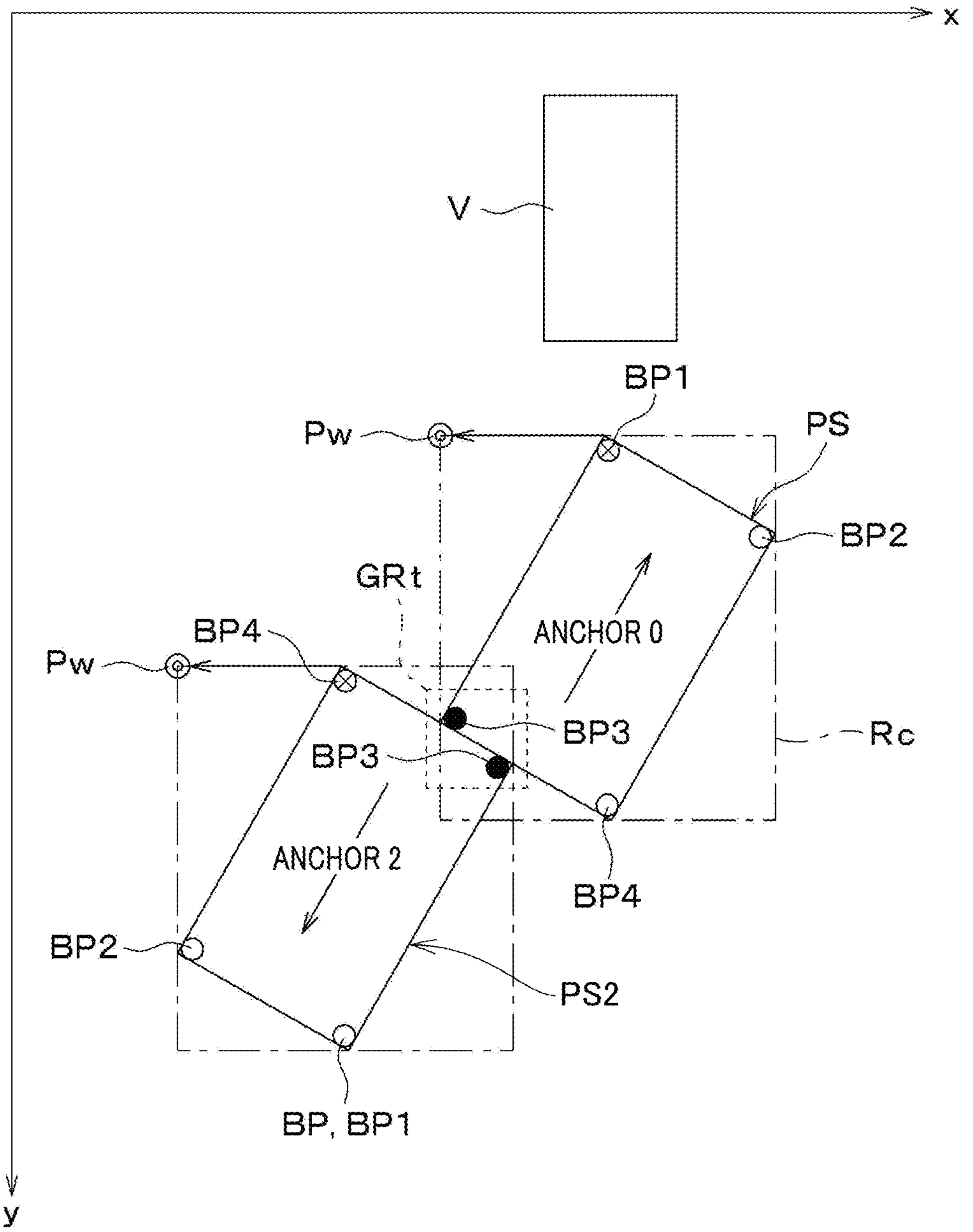
FIG. 66 is a diagram schematically illustrating an example of the encoding routine illustrated in FIG. 65.
Figure 67:
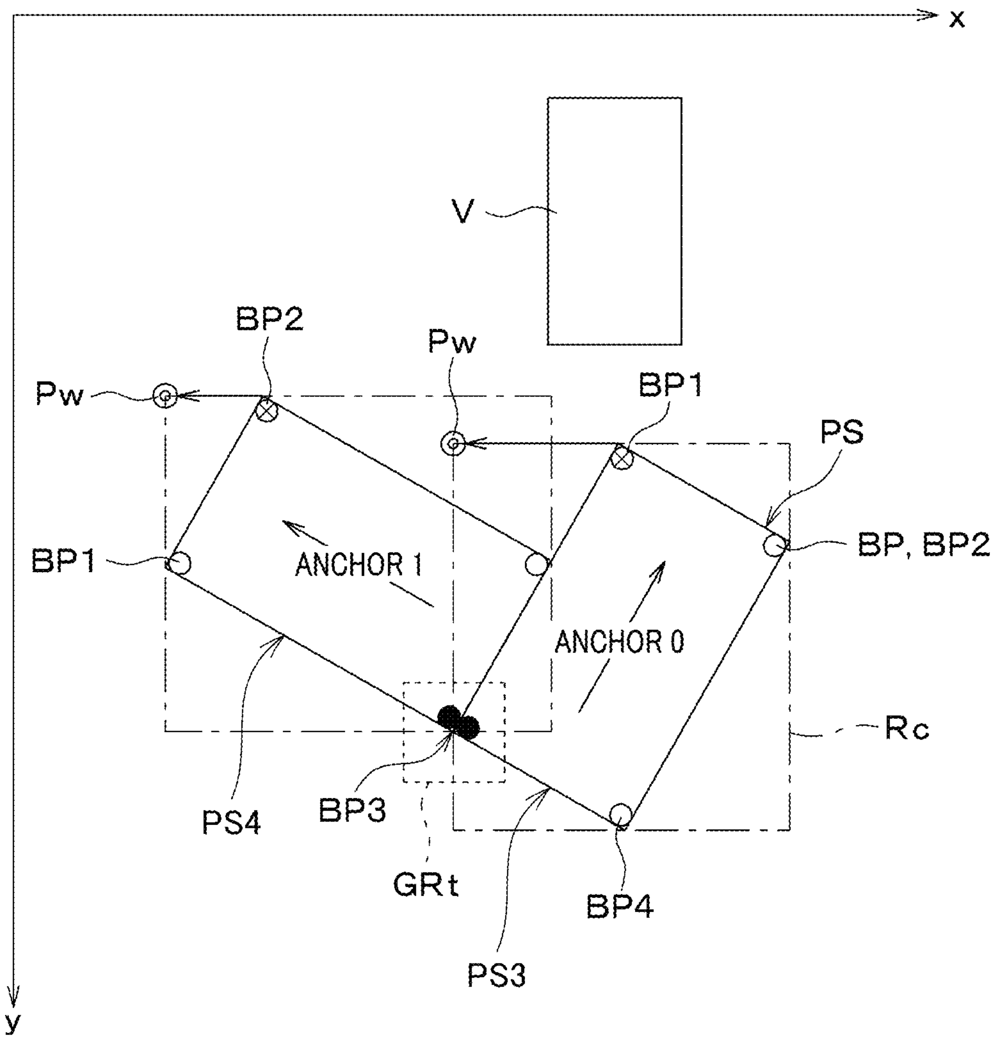
FIG. 67 is a diagram schematically illustrating another example of the encoding routine illustrated in FIG. 65.

The following describes, in detail, the matching operation in step S406 with reference to FIGS. 66 and 67. In each of FIGS. 66 and 67, an x-axis direction corresponds to the horizontal direction of the target image GS in which the horizontal position of any point in the grid GR is calculated in each of FIGS. 35 and 36, and y-direction corresponds to the vertical direction of the target image GS in which the vertical position of any point in the grid GR is calculated in each of FIGS. 35 and 36. In FIG. 66, two parking slots PS will be referred to as parking slots PS1 and PS2, and the circumscribed rectangle Rc for each of two parking slots PS1 and PS2 has a first pair of sides parallel to the x-axis direction, and a second pair of sides parallel to the y-axis direction. Similarly, in FIG. 67, two parking slots PS will be referred to as parking slots PS3 and PS4, and the circumscribed rectangle Rc for each of two parking slots PS3 and PS4 has a first pair of sides parallel to the x-axis direction, and a second pair of sides parallel to the y-axis direction.

In the example of FIG. 66, the left-rear corner point BP3 of the parking slot PS1 and the left-rear corner point BP3 of the parking slot PS2 are located in the common remarkable cell GRt. One of the parking-slot corner points BP of the parking slot PS1, which is located closest to the reference point PW, is the left-front corner point BP1. For this reason, the anchor index of the parking slot PS1 is set to the anchor 0. In contrast, one of the parking-slot corner points BP of the parking slot PS2, which is located closest to the reference point PW, is the right-rear corner point BP4. For this reason, the anchor index of the parking slot PS2 is set to the anchor 2.

In the example of FIG. 67, the left-rear corner point BP3 of the parking slot PS3 and the left-rear corner point BP3 of the parking slot PS4 are located in the common remarkable cell GRt. One of the parking-slot corner points BP of the parking slot PS3, which is located closest to the reference point PW, is the left-front corner point BP1. For this reason, the anchor index of the parking slot PS3 is set to the anchor 0. In contrast, one of the parking-slot corner points BP of the parking slot PS4, which is located closest to the reference point PW, is the right-front corner point BP2. For this reason, the anchor index of the parking slot PS4 is set to the anchor 1.

Referring to FIG. 65, following the matching operation in step S406, the processor 21 encodes the parking-slot corner points BP and the parking-slot center BPC for each of the anchor indexes, i.e., for each of the anchor 0, anchor 1, anchor 2, and anchor 3. Specifically, the processor 21 generates (i) first encoded data Ec1 corresponding to the anchor 0, (ii) first encoded data Ec1 corresponding to the anchor 1, (iii) first encoded data Ec1 corresponding to the anchor 2, and (iv) first encoded data Ec1 corresponding to the anchor 3 in step S406.

Figure 68:
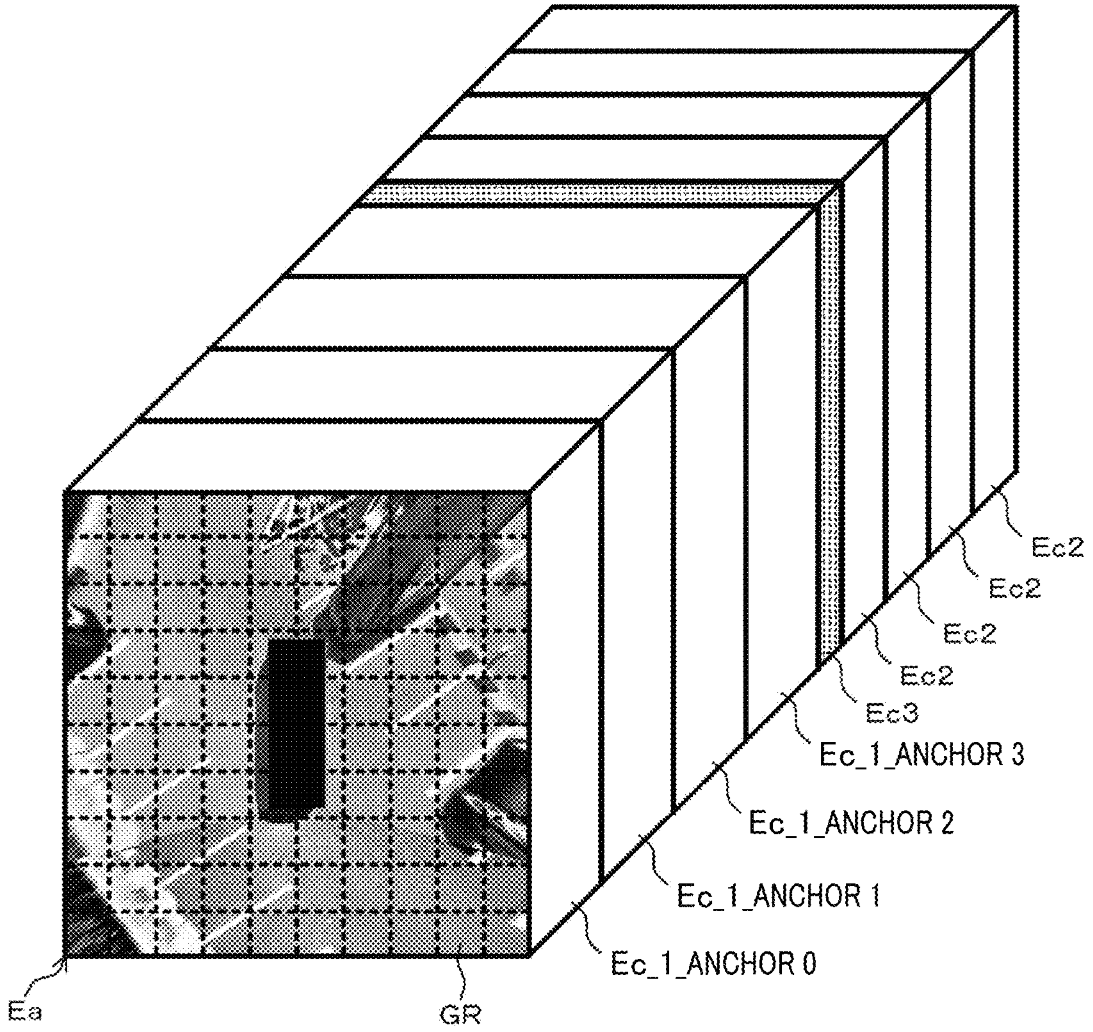
FIG. 68 is a diagram illustrating a parking-slot annotation code including a first encoded-data assembly additionally including fourth encoded data including the encoded results according to the fourth embodiment.

Then, the processor 21 generates, in step S407, the parking-slot annotation code Ea for the objectified parking slot PS included in the target image GS, which is, as illustrated in FIG. 68, comprised of (I) A first encoded-data assembly comprised of (i) the first encoded data Ec1 with the anchor 0 related to each of the five points BPC, BP1, BP2, BP3, and BP4, (ii) the first encoded data Ec1 with the anchor 1 related to each of the five points BPC, BP1, BP2, BP3, and BP4, (iii) the first encoded data Ec1 with the anchor 2 related to each of the five points BPC, BP1, BP2, BP3, and BP4, and (iv) the first encoded data Ec1, which corresponds to the anchor 3, related to each of the five points BPC, BP1, BP2, BP3, and BP4

(II) The second encoded data Ec2 related to the connection vectors (III) The third encoded data Ec3 related to the existence or non-existence of the segment lines of the parking segment B5

That is, the parking-slot annotation code Ea illustrated in FIG. 68 according to the fourth embodiment is configured such that the first encoded data Ec1 illustrated in FIG. 54 is replaced with the first encoded-data assembly.

Referring to FIG. 65, the processor 21 determines whether the parking-slot counter N is set to the value Nmax in step S408. Upon determination that the parking-slot counter N is not set to the value Nmax (NO in step S408), the processor 21 recognizes that at least one unselected parking slot PS remains in the training-candidate parking slots PS. Then, the processor 21 increments the parking-slot counter N by 1 in step S409, and thereafter returns to the operation in step S402, and iteratively performs the operations in step S402 to S409 until the determination in step S408 is affirmative.

That is, upon determination that the parking-slot counter N is set to the value Nmax (YES in step S408), the processor 21 terminates the encoding routine.

Specifically, the processor 21 of the fourth embodiment is configured to train the parameters of the machine learning model LM using, as the ground truth data, the parking-slot annotation code Ea for each training target image GS, which is additionally comprised of (i) the first encoded data Ec1, which corresponds to the anchor 0, i.e., the upward orientation, related to each of the five points BPC, BP1, BP2, BP3, and BP4, (ii) the first encoded data Ec1, which corresponds to the anchor 1, i.e., the leftward orientation, related to each of the five points BPC, BP1, BP2, BP3, and BP4, (iii) the first encoded data Ec1, which corresponds to the anchor 2, i.e., the rightward orientation, related to each of the five points BPC, BP1, BP2, BP3, and BP4, and (iv) the first encoded data Ec1, which corresponds to the anchor 3, i.e., the downward orientation, related to each of the five points BPC, BP1, BP2, BP3, and BP4.

Accordingly, even if same type, i.e., same class, parking-slot corner points BP of different parking slots PS are located in a common cell of the target image GS, this configuration enables the processor 21 to infer a recognition rule of a parking slot PS from an input image for each of the individual same type parking-slot corner points BP. This therefore makes it possible to, even if there are parking-slot corner points BP of different parking slots PS concentrated in an input image, detect the parking-slot corner points BP more accurately.

Fifth Embodiment

The following describes a parking-slot detection apparatus 2200 according to the fifth embodiment of the present disclosure with reference to FIGS. 69 to 75.

Figure 69:
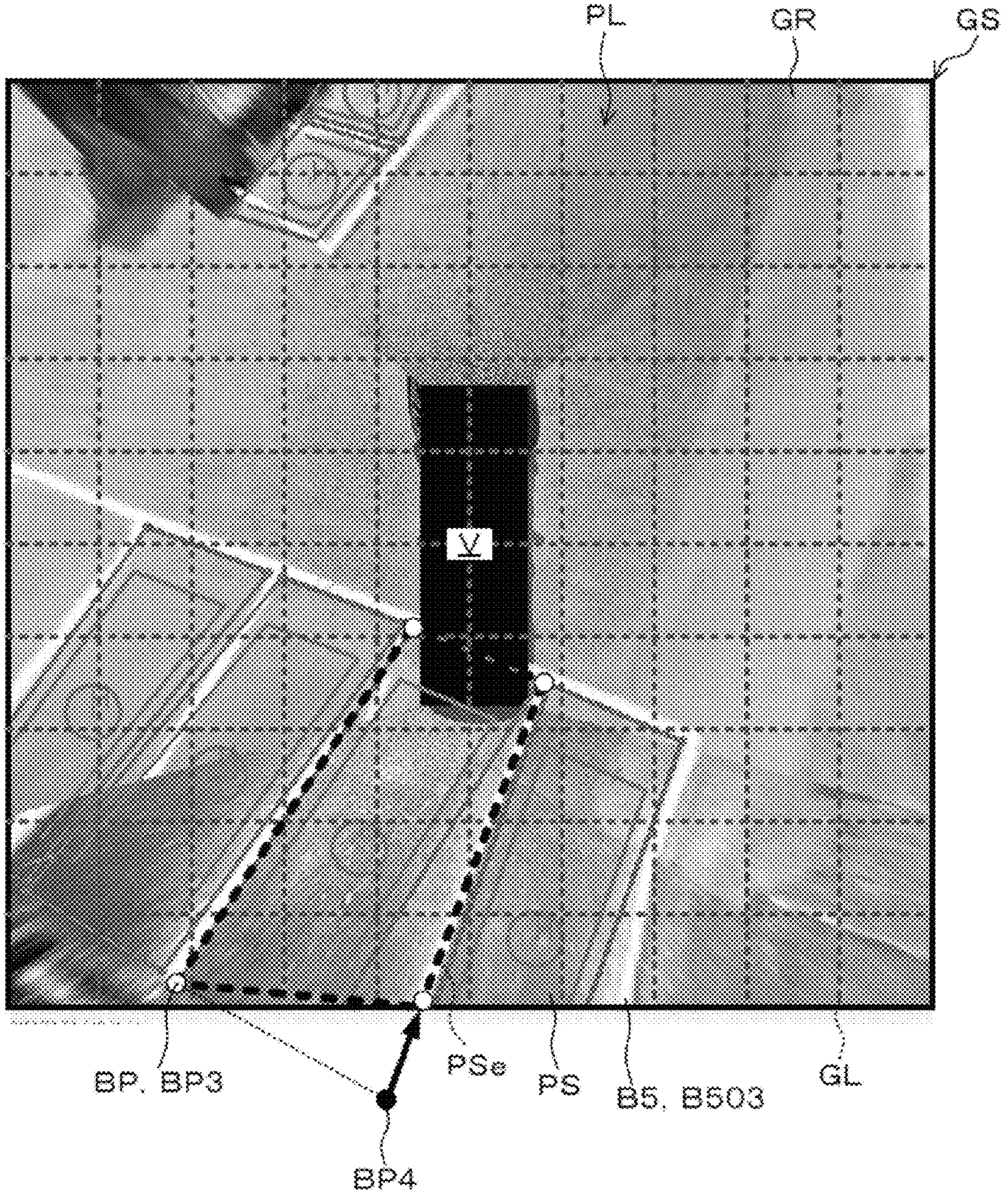
FIG. 69 is a view schematically illustrating an image indicative of a situation where at least one of a parking-slot corner points of a parking slot may be located outside a target image, and an offset task in the situation according to the fifth embodiment.

As illustrated in FIG. 69, at least one of the parking-slot corner points BP of a parking slot PS may be located outside a target image GS. Specifically, the right-rear corner point BP4 of a parking slot PS illustrated by a dashed rectangle in FIG. 69 is located outside the target image GS. In this case, if the right-rear corner point BP4 is not encoded so that training of the parameters of the machine learning model LM for the right-rear corner point BP4 is not carried out, the accuracy of the inference result of the parking slot PS may be reduced.

From this viewpoint, the processor 21 is preferably configured to execute an offset task of offsetting the right-rear corner point BP4 located outside the target image GS into the target image GS, and thereafter encode the right-rear corner point BP4. As the direction in which the right-rear corner point BP4 is offset to be into the target image GS, the direction in the long side of the rectangular parking slot PS or in the short side of the rectangular parking slot PS can be typically used.

Each of FIGS. 70 to 73 illustrates a corresponding example of the offset task for offsetting one of the four parking-slot corner points BP that is located outside the target image GS; the region of the target image GS will also be referred to as a training input region AN. In each of FIGS. 70 to 73, one of the four parking-slot corner points BP, which will be referred to as an outside point, located outside the target image GS is expressed by black circle. In each of FIGS. 70 to 73, reference character PSe represents an offset parking slot whose offset-segment point has been offset to be in the target image GS.

Figure 70:
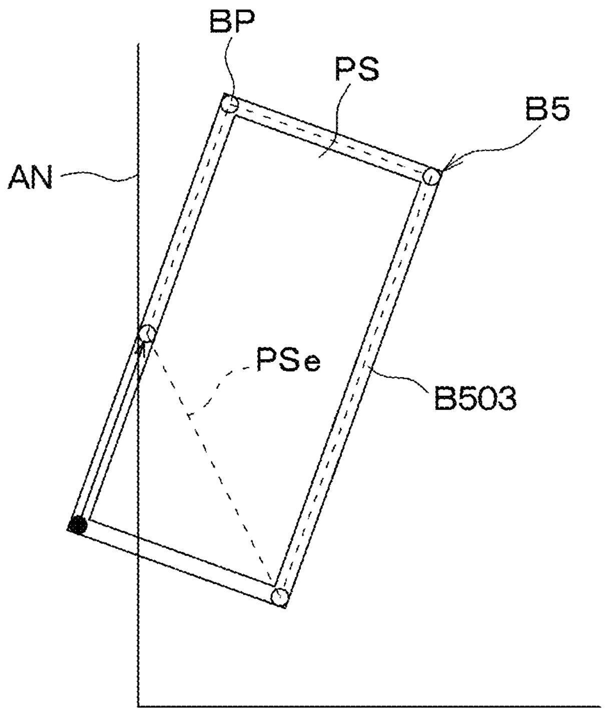
FIGS. 70 to 73 are each illustrate a corresponding example of the offset task for offsetting one of four parking-slot corner points that is located outside the target image according to the fifth embodiment.
Figure 71:
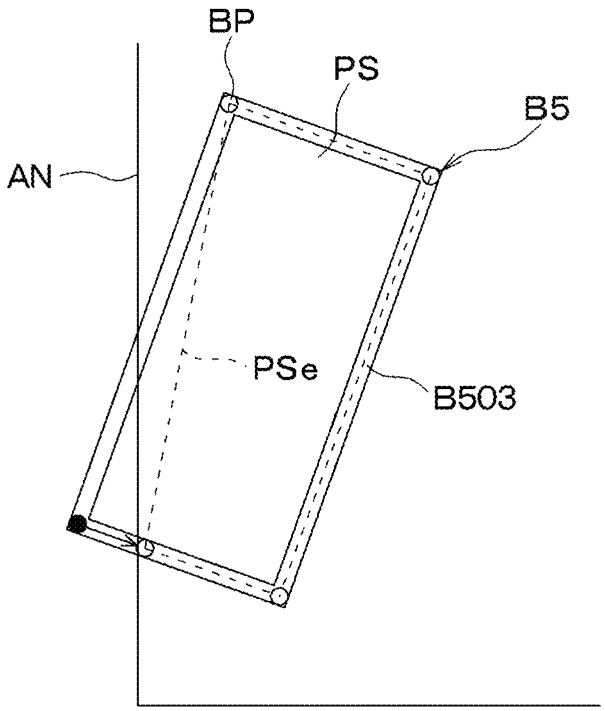

How the outside point is located outside the target image GS illustrated in FIG. 70 is identical to how the outside point is located outside the target image GS illustrated in FIG. 71, but the offset direction of the outside point illustrated in FIG. 70 is different from the offset direction of the outside point illustrated in FIG. 71. Similarly, how the outside point is located outside the target image GS illustrated in FIG. 72 is identical to how the outside point is located outside the target image GS illustrated in FIG. 73, but the offset direction of the outside point illustrated in FIG. 72 is different from the offset direction of the outside point illustrated in FIG. 73.

In the example of each of FIGS. 70 and 71, the percentage, which will be referred to as an outside percentage, of a part of a short side of the rectangular parking slot PS, which is located outside the target image GS, to the total short side is substantially 30%, and the percentage of a part of a long side of the rectangular parking slot PS, which is located outside the target image GS, to the total long side is substantially 40%. In other words, the percentage, which will be referred to as an in-image percentage, of the remaining part of the short side of the rectangular parking slot PS illustrated in each of FIGS. 70 and 71, the part of which is located outside the target image, to the total short side is 70%, and the in-image percentage of the remaining part of the long side of the rectangular parking slot PS illustrated in each of FIGS. 70 and 71, the part of which is located outside the target image, to the total long side is 60%. The offset direction for the outside point illustrated in FIG. 70 is set to the direction along the long side, and the offset direction for the outside point illustrated in FIG. 71 is set to the direction along the short side.

Figure 72:
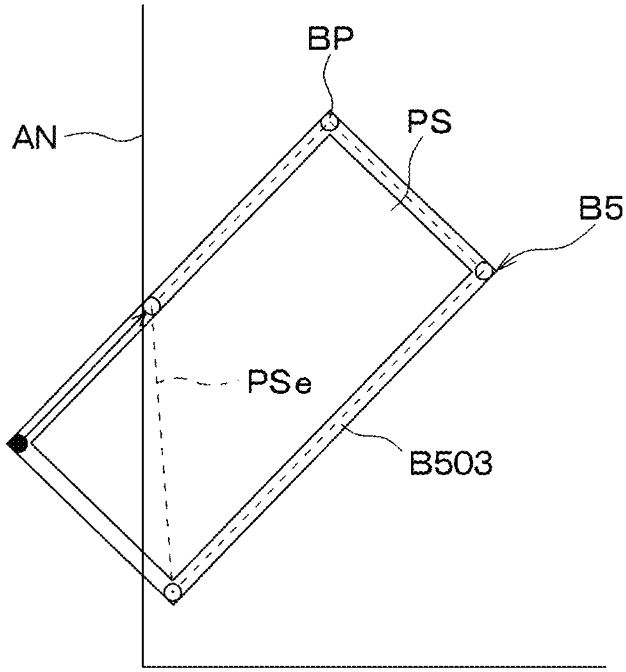
Figure 73:
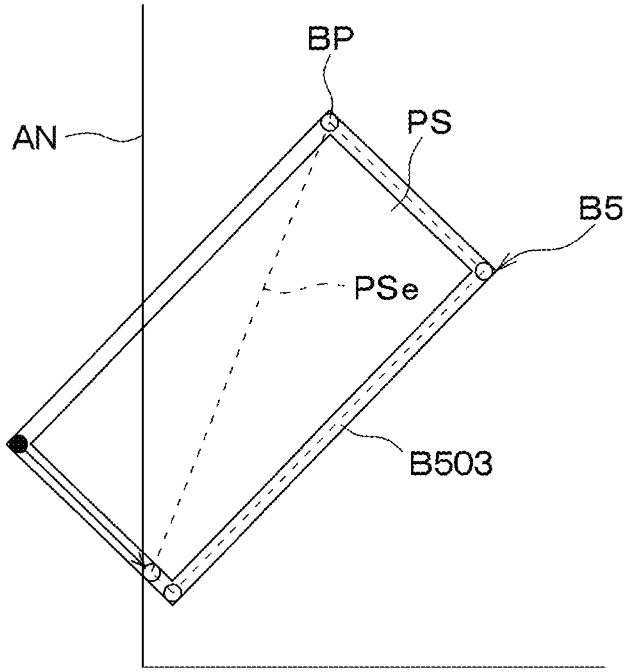

Similarly, in the example of each of FIGS. 72 and 73, the outside percentage of a part of a short side of the rectangular parking slot PS, which is located outside the target image GS, to the total short side is substantially 80%, and the percentage of a part of a long side of the rectangular parking slot PS, which is located outside the target image GS, to the total long side is substantially 40%. In other words, the in-image percentage of the remaining part of the short side of the rectangular parking slot PS illustrated in each of FIGS. 72 and 73, the part of which is located outside the target image, to the total short side is 20%, and the in-image percentage of the remaining part of the long side of the rectangular parking slot PS illustrated in each of FIGS. 70 and 71, the part of which is located outside the target image, to the total long side is 60%. The offset direction for the outside point illustrated in FIG. 72 is set to the direction along the long side, and the offset direction for the outside point illustrated in FIG. 73 is set to the direction along the short side.

Comparing FIG. 70 with FIG. 71 recognizes that the shape of the offset parking slot PSe to be encoded illustrated in FIG. 71 keeps an original shape of the actual parking slot PS much more than that illustrated in FIG. 70 does. Comparing FIG. 72 with FIG. 73 recognizes that the shape of the offset parking slot PSe to be encoded illustrated in FIG. 72 keeps an original shape of the actual parking slot PS much more than that illustrated in FIG. 73 does.

That is, offsetting the outside point of the parking slot PS in one of the partially outside short side and the partially outside long side of the parking slot PS whose outside percentage is lower than the other thereof enables the shape of the offset parking slot PSe to keep the original shape of the parking slot PS. In other words, offsetting the outside point of the parking slot PS in one of the partially outside short side and the partially outside long side of the parking slot PS whose in-image percentage is higher than the other thereof enables the shape of the offset parking slot PSe to keep the original shape of the parking slot PS.

Accordingly, offsetting the outside point of the parking slot PS into the target image in a direction determined to keep the original shape, i.e., the rectangular shape, of the parking slot PS as much as possible enables both (i) improvement of the inference result of the parking slot PS even if the parking slot PS has an outside corner point and (ii) reduction in training of the parking slot PS whose outside corner point(s) have been kept as they are.

Figure 74:
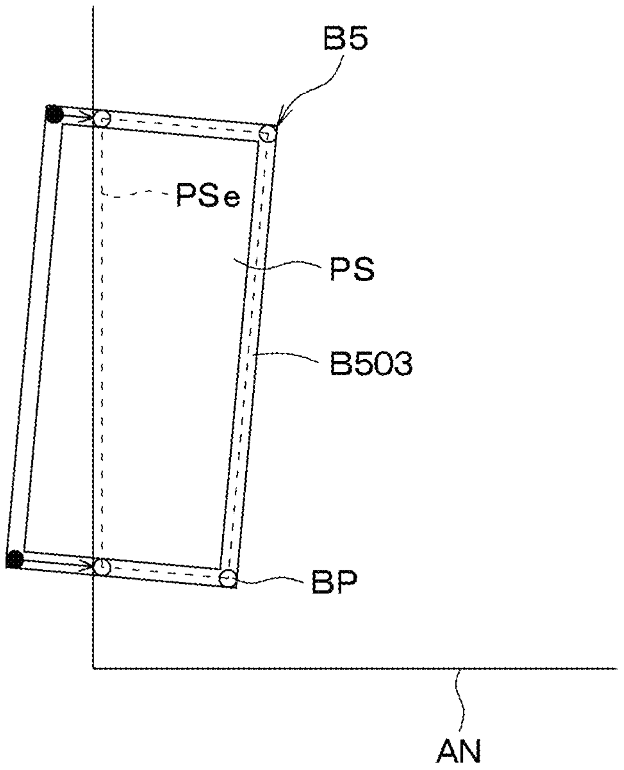
FIGS. 74 and 75 are illustrate a corresponding example of the offset task for offsetting two of the four parking-slot corner points of the parking slot that are located outside the target image according to the fifth embodiment.
Figure 75:
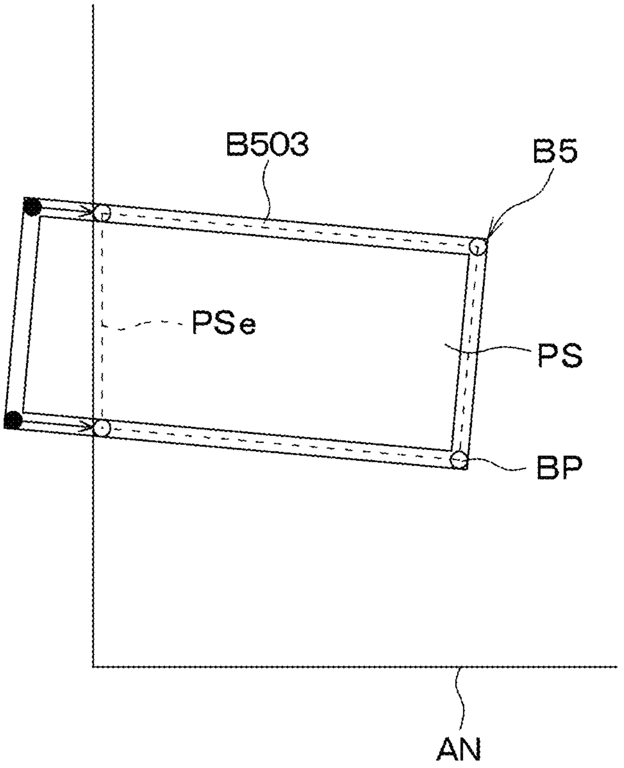

Each of FIGS. 74 and 75 illustrates a corresponding example of the offset task for offsetting two of the four parking-slot corner points BP of the parking slot PS that are located outside the target image GS. That is, if there are two or less outside points in the four parking-slot corner points BP, offsetting the two or less outside points of the parking slot PS into the target image enables the offset parking slot PSe to be encoded for training of the parameters of the machine learning model LM. This enables improvement of the inference result of the parking slot PS even if the parking slot PS has two or less outside corner points. In contrast, the processor 21 does not encode the parking slot PS if there are three or more outside points in the four parking-slot corner points BP of the parking slot PS, because the shape of the offset parking slot would not keep the original rectangular shape of the parking slot PS.

Sixth Embodiment

The following describes a parking-slot detection apparatus 2200 according to the sixth embodiment of the present disclosure with reference to FIGS. 76A to 81.

Figure 76A:
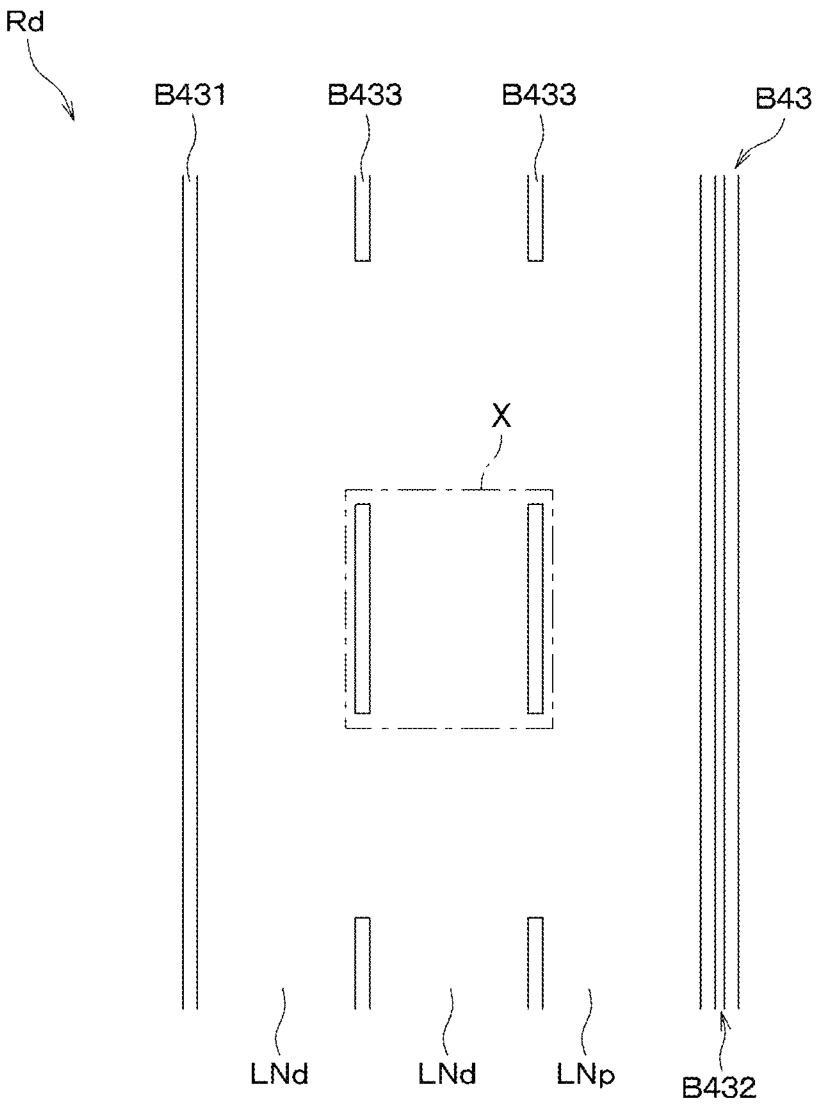
FIG. 76A is a plan view schematically illustrating determination of whether there is a parking-lot environment around the own vehicle according to the sixth embodiment.

As illustrated in FIG. 76A, plural lane lines B433, each of which has a dashed line, may be provided in a road Rd with three or more traveling lanes each way in the road width direction. In this case, when focusing a selected traveling lane LNd located at a middle of the road Rd in the road width direction, which is partitioned by two lane lines B433 located on both sides of the selected travel lane LNd, a region on the selected traveling lane LNd surrounded by a dash-dot line X is extremely similar in appearance to a parking slot PS illustrated in FIG. 76B, which is constituted by only a pair of left- and right-side segment lines B503. The selected traveling lane LNd located at the middle of the road Rd in the road width direction is a lane located between the outermost lane LNd located adjacent to the vehicle-road edge line B431 and the passing lane LNp located adjacent to the centerline B432.

Figure 76B:
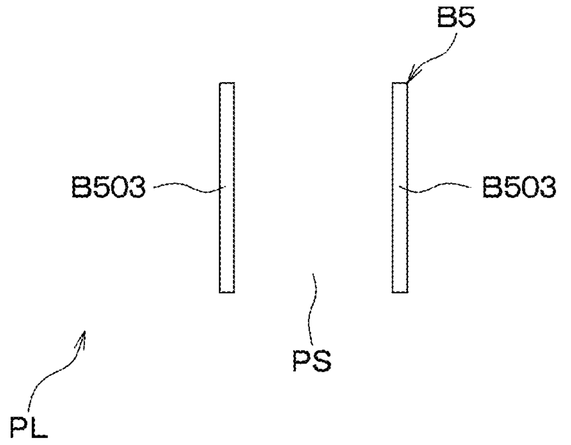
FIG. 76B is an enlarged view schematically illustrating the determination of whether there is a parking-lot environment around the own vehicle according to the sixth embodiment.

For this reason, erroneous recognition of the region on the selected traveling lane LNd surrounded by the dash-dot line X as the parking slot PS illustrated in FIG. 76B while the own vehicle V is traveling in the road Rd may result in the processor 21 erroneously determining that the own vehicle V is traveling in the parking lot PL. This erroneous determination may result in reduction in the comfort of one or more occupants of the own vehicle V due to sudden, frequent warnings caused by accelerator misoperations. From this viewpoint, training the parameters of the machine learning model LM based on the information on such a region in the road Rd being different from parking slots PS may result in the occurrence of such erroneous recognition of a region on the road Rd as a parking slot PS.

From this viewpoint, the sixth embodiment causes the processor 21 to determine, when performing training of the parameters of the machine learning model LM, whether there is a parking-lot environment around the own vehicle V. Additionally, the processor 21 is configured to infer, i.e., detect, one or more parking slots PS in an input image in accordance with whether the own vehicle V is located in the parking lot PL.

Specifically, the parking-slot annotation generator 2213 of the sixth embodiment is configured to generate the annotation information, i.e., the parking-slot annotation code Ea for each parking slot PS included in a target image GS, that additionally includes parking-lot annotation information indicative of whether the own vehicle V is located in the parking lot PL. Additionally, the processor 21 determines, when inferring one or more parking slots PS in an input image, whether the own vehicle V is located in the parking lot PL, and abandon the detected results, i.e., inferred results, of the parking slots PS upon determination that the own vehicle V is not located in the parking lot PL. This configuration efficiently reduces such erroneous recognition and erroneous determination. The parking-slot annotation generator 2213 of the sixth embodiment can be configured to generate the annotation information, i.e., the parking-slot annotation code Ea for each parking slot PS included in a target image GS, which additionally includes information indicative of whether there is a parking-lot environment around the own vehicle V. This enables the processor 21 to determine, when performing training of the parameters of the machine learning model LM, whether (i) the own vehicle V is located in the parking lot PL or (ii) the own vehicle V is not located is not located or (iii) the own vehicle V is located in an unidentified place.

Figure 77A:
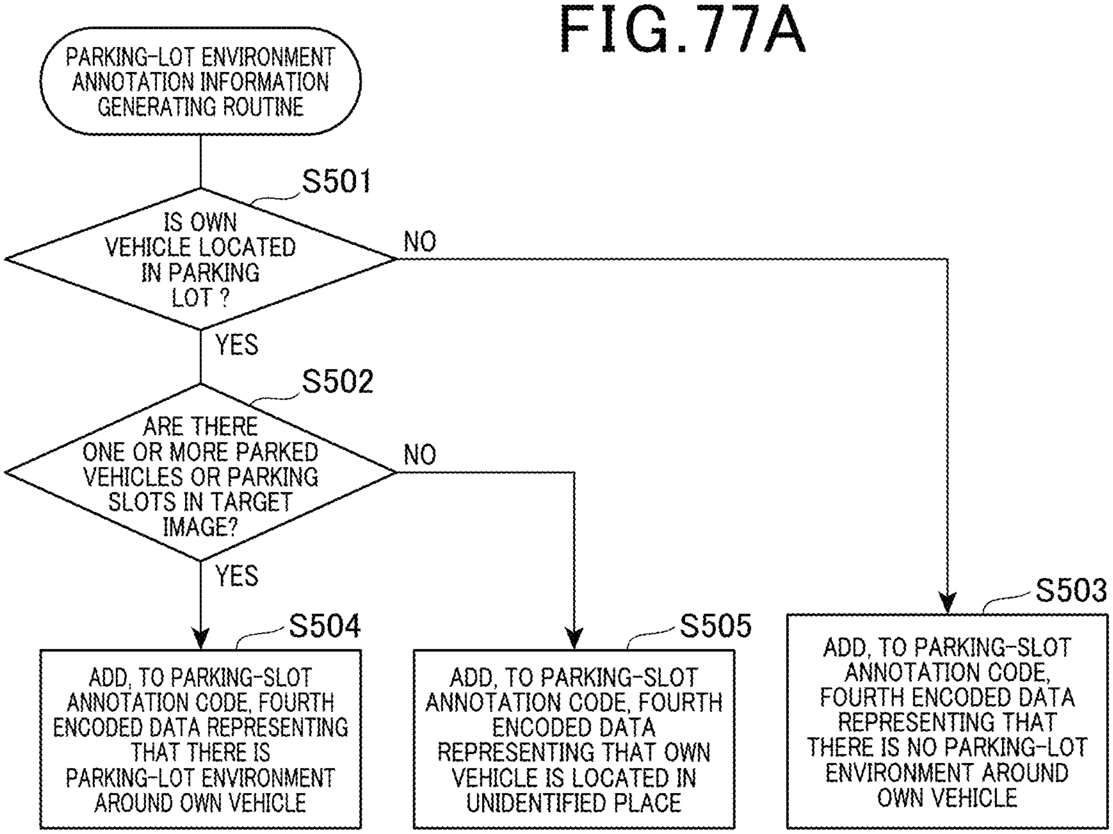
FIG. 77A is a flowchart schematically illustrating a parking-lot environment annotation information generating routine according to the sixth embodiment.

FIG. 77A is a flowchart schematically illustrating a parking-lot environment annotation information generating routine carried out by the processor 21 serving as the annotation information generator 2201, i.e., the parking-slot annotation generator 2213.

Referring to FIG. 77A, the processor 21 determines, based on the annotation information inputted through the annotation input unit 2212, whether there is a parking-lot environment around the own vehicle V, i.e., the own vehicle V is located in a parking lot PL when receiving the annotation information inputted through the annotation input unit 2212.

Upon determination that the own vehicle V is located in a parking lot PL (YES in step S501), the parking-lot environment annotation information generating routine proceeds to step S502.

Otherwise, upon determination that the own vehicle V is not located in a parking lot PL (NO in step S501), the processor 21 determines that there is no parking-lot environment around the own vehicle V, i.e., that the own vehicle V is located outside a parking lot PL. Then, the processor 21 adds, to the parking-slot annotation code Ea for each parking slot PS included in the target image GS, fourth encoded data Ec4 representing that there is no parking-lot environment around the own vehicle V in step S503.

There may be a case where, even if the own vehicle V is actually located in a parking lot PL, it is difficult to accurately determine, from the target image GS, whether the own vehicle V is located in a parking lot PL due to, for example a situation where a parking slot PS is located against walls so that the walls only appear around the parking slot PS in the target image GS. From this viewpoint, the processor 21 determines, based on the annotation information inputted through the annotation input unit 2212, whether there are one or more parked vehicles B7 in the target image GS in step S502.

Upon determination that that there are one or more parked vehicles B7 in the target image GS (YES in step S502), the processor 21 determines that the own vehicle V is likely to be located in a parking lot PL, that is, that there is a high reliability that the own vehicle V is located in a parking lot PL. Then, the processor 21 adds, to the parking-slot annotation code Ea for each parking slot PS included in the target image GS, the fourth encoded data Ec4 representing that the own vehicle V is located in a parking lot PL in step S504.

Alternatively, in step S502, the processor 21 determines, based on the annotation information inputted through the annotation input unit 2212, whether there are one or more parking slots PS in the target image GS in step S502.

Upon determination that that there are one or more parking slots PS in the target image GS (YES in step S502), the processor 21 determines that the own vehicle V is likely to be located in a parking lot PL, that is, that there is a high reliability that the own vehicle V is located in a parking lot PL. Then, the processor 21 adds, to the parking-slot annotation code Ea for each parking slot PS included in the target image GS, the fourth encoded data Ec4 representing that the own vehicle V is located in a parking lot PL in step S504.

Otherwise, upon determination that that there are no parked vehicles B7 in the target image GS (NO in step S502), the processor 21 determines that the own vehicle V is unlikely to be located in a parking lot PL, that is, that there is a low reliability that the own vehicle V is located in a parking lot PL. Similarly, upon determination that that there are no parking slots PS in the target image GS (NO in step S502), the processor 21 determines that the own vehicle V is unlikely to be located in a parking lot PL, that is, that there is a low reliability that the own vehicle V is located in a parking lot PL. Then, the processor 21 adds, to the parking-slot annotation code Ea for an objectified parking slot PS included in the target image GS, the fourth encoded data Ec4 representing that the own vehicle V is located in an unidentified place in step S505.

As described above, the processor 21 of the sixth embodiment is configured to add, to the parking-slot annotation code Ea for each parking slot PS included in the target image GS, the fourth encoded data Ec4 representing that (i) there is no parking-lot environment around the own vehicle V, (ii) the own vehicle V is located in a parking lot PL, or (iii) the own vehicle V is located in an unidentified place.

Figure 77B:
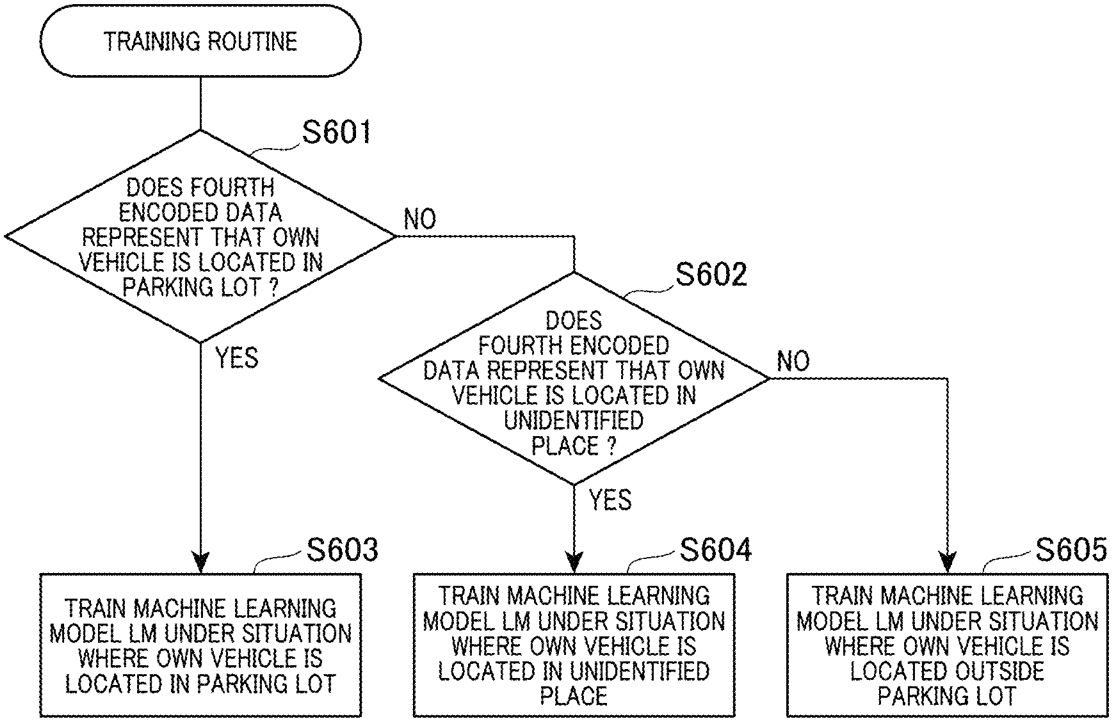
FIG. 77B is a flowchart schematically illustrating a part of a training routine according to the sixth embodiment.

FIG. 77B is a flowchart schematically illustrating a part of a training routine according to the sixth embodiment. Specifically, the processor 21 is programmed to execute the part of the training routine illustrated in FIG. 77B when starting training of the parameters of the machine learning model LM for each parking slot PS using the corresponding parking-slot annotation code Ea including the fourth encoded data Ec4.

Referring to FIG. 77B, the processor 21 refers to the parking-slot annotation code Ea for a selected parking slot PS to determine whether the fourth encoded data Ec4 represents that the own vehicle V is located in a parking lot PL in step S601.

Upon determination that the fourth encoded data Ec4 represents that the own vehicle V is not located in a parking lot PL (NO in step S601), the training routine proceeds to step S602.

Otherwise, upon determination that the fourth encoded data Ec4 represents that the own vehicle V is located in a parking lot PL (YES in step S601), the processor 21 determines to train the parameters of the machine learning model LM for the selected parking slot PS under a situation where the own vehicle V is located in a parking lot PL in step S603.

In step S602, the processor 21 refers to the parking-slot annotation code Ea for a selected parking slot PS to determine whether the fourth encoded data Ec4 represents that the own vehicle V is located in an unidentified place.

Upon determination that the fourth encoded data Ec4 represents that the own vehicle V is located in an unidentified place (YES in step S602), the processor 21 determines to train the parameters of the machine learning model LM for the selected parking slot PS under a situation where the own vehicle V is located in an unidentified place in step S604.

Otherwise, upon determination that the fourth encoded data Ec4 represents that the own vehicle V is not located in an unidentified place (NO in step S602), the processor 21 determines to train the parameters of the machine learning model LM for the selected parking slot PS under a situation where the own vehicle V is located outside a parking lot PL in step S605.

FIG. 78 illustrates an example of the fourth encoded data Ec4 representing that the own vehicle V is located in an unidentified place or the own vehicle V is located outside a parking lot PL. Specifically, the encoded values Ecv of all the cells in the target image are set to 0. In contrast, FIG. 79 illustrates an example of the fourth encoded data Ec4 representing that the own vehicle V is located in a parking lot PL. Specifically, the encoded values Ecv of all the cells in the target image are set to 1.

Figure 80:
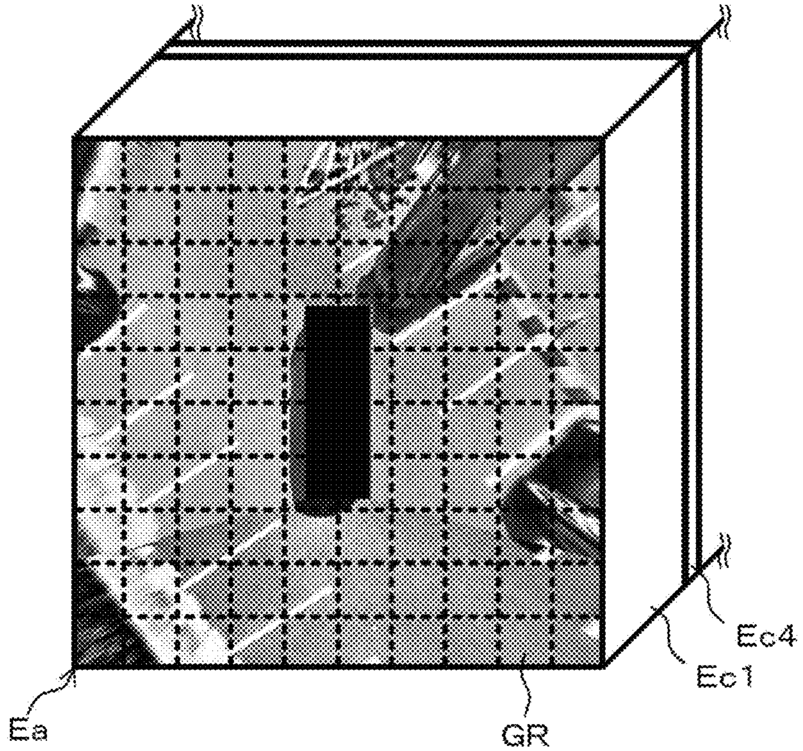
FIG. 80 is a diagram schematically illustrating a parking-slot annotation code for each parking slot included in a target image, which additionally includes the fourth encoded data illustrated in FIG. 78 or FIG. 79.

FIG. 80 schematically illustrates the parking-slot annotation code Ea for each parking slot PS included in a target image GS, which additionally includes the fourth encoded data Ec4 illustrated in FIG. 78 or FIG. 79 indicative of whether there is a parking-lot environment around the own vehicle V. For the sake of simple illustration, illustration of the second and third encoded data Ec2 and Ec3 is omitted in FIG. 80. The first encoded data Ec1 illustrated in FIG. 80 can be replaced with the first encoded data assembly illustrated in FIG. 68, which includes the first encoded data items Ec1 provided for the different orientations of each parking slot PS.

Figure 81:
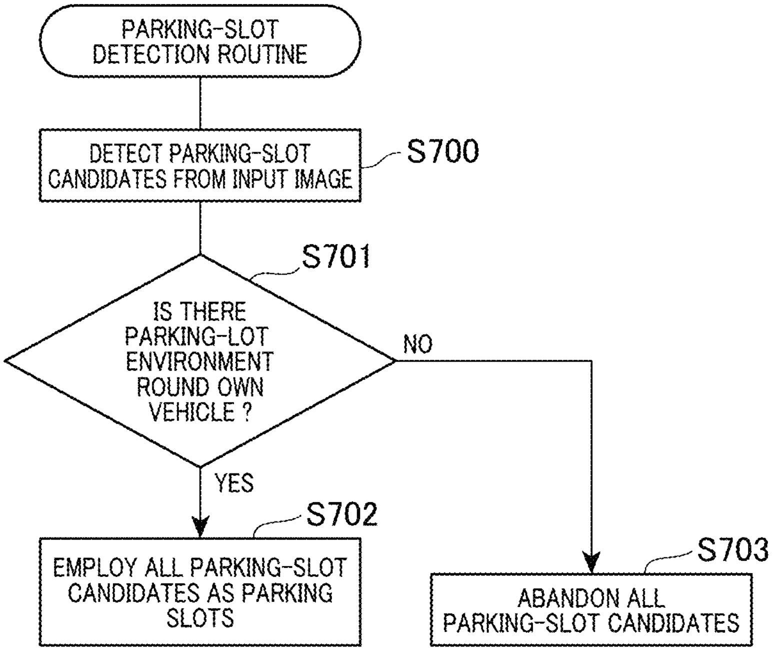
FIG. 81 is a flowchart schematically illustrating a parking-slot detection routine, i.e., a parking-slot inference routine, carried out by the processor according to the sixth embodiment.

FIG. 81 is a flowchart schematically illustrating a parking-slot detection routine, i.e., a parking-slot inference routine, carried out by the processor 21 according to the sixth embodiment.

Referring to FIG. 81, when starting the parking-slot detection routine, the processor 21 detects, i.e., infers, from the input image, a plurality of parking-slot candidates using the machine learning model LM in step S700.

Next, the processor 21 determines whether there is a parking-lot environment around the own vehicle V, i.e., the own vehicle V is located in a parking lot PL in step S701.

Upon determination that there is a parking-lot environment around the own vehicle V, i.e., the own vehicle V is located in a parking lot PL (YES in step S701), the processor 21 employs all the parking-slot candidates as the parking slots PS in step S702.

Otherwise, upon determination that there is not a parking-lot environment around the own vehicle V, i.e., the own vehicle V is not located in a parking lot PL (NO in step S701), the processor 21 abandons all the parking-slot candidates in step S703.

Seventh Embodiment

Figure 83:
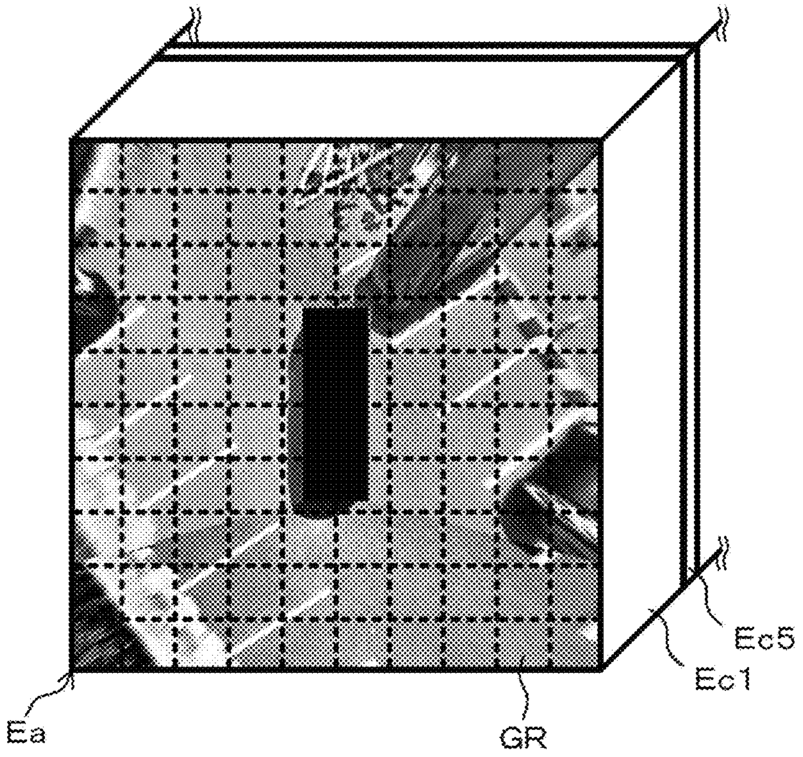
FIG. 83 is a diagram schematically illustrating a parking-slot annotation code for each parking slot included in a target image, which additionally includes the fifth encoded data illustrated in FIG. 82.

The following describes a parking-slot detection apparatus 2200 according to the seventh embodiment of the present disclosure with reference to FIGS. 82 and 83.

The seventh embodiment describes a fifth encoding of wheel stopper information related to the wheel stoppers B6 as a part of the attribute information.

FIG. 82 illustrates an example of fifth encoded data Ec5 as the result of the fifth encoding. Specifically, the training process gives an encoded data value Ecv of 0 or 1 related to the existence or non-existence of a wheel stopper B6 in each parking slot PS included in a target image GS illustrated in FIG. 32. Specifically, as can be seen in FIGS. 33, 34, 38, and 82, the training process gives (i) the encoded data value Ecv of "1" to the center cell of each selected parking slot PS in which a wheel stopper B6 exists, and (ii) the encoded data value Ecv of "0" to each of the other cells in the target image GS.

FIG. 83 schematically illustrates the parking-slot annotation code Ea for each parking slot PS included in a target image GS, which additionally includes the fifth encoded data Ec5 illustrated in FIG. 82. For the sake of simple illustration, illustration of the second to forth encoded data Ec2 to Ec4 is omitted in FIG. 83. The first encoded data Ecv1 illustrated in FIG. 83 can be replaced with the first encoded data assembly illustrated in FIG. 68, which includes the first encoded data items Ec1 provided for the different orientations of each parking slot PS.

Eighth Embodiment

Figure 84:
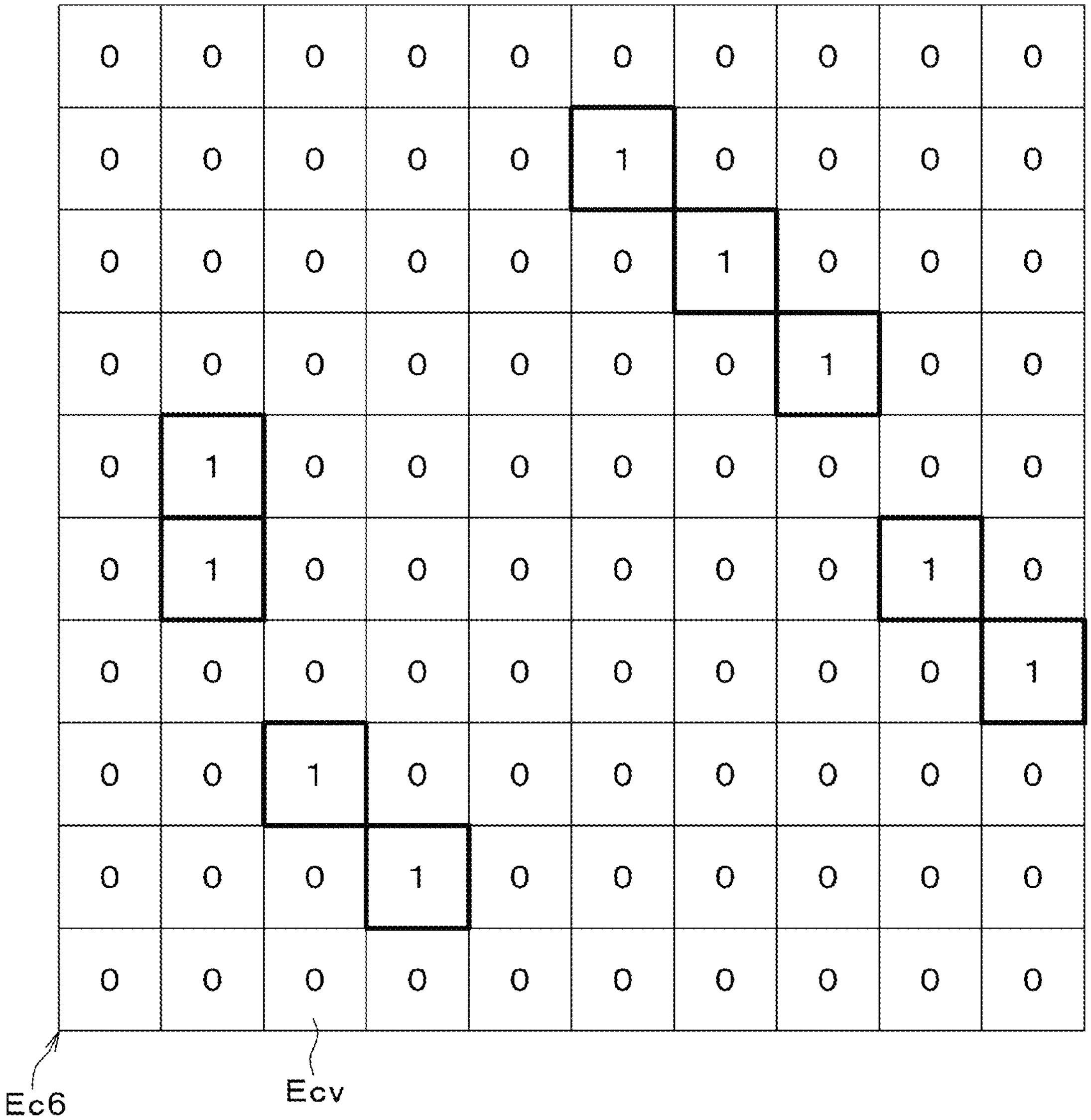
FIG. 84 is a diagram schematically illustrating an example of fifth encoded data as a result of a sixth encoding according to the eighth embodiment.
Figure 85:
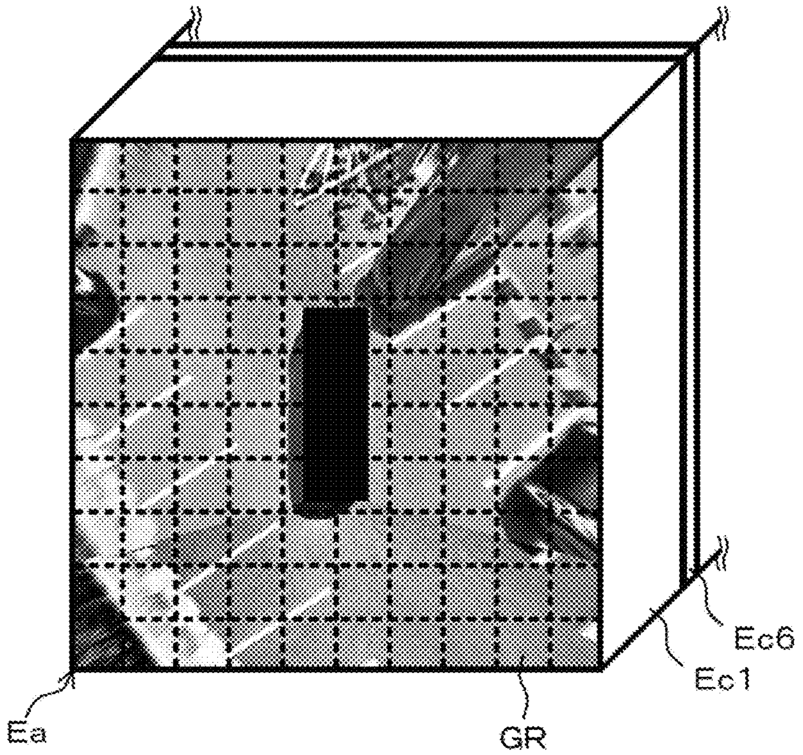
FIG. 85 is a diagram schematically illustrating a parking-slot annotation code for each parking slot included in a target image, which additionally includes the sixth encoded data illustrated in FIG. 84.

The following describes a parking-slot detection apparatus 2200 according to the eighth embodiment of the present disclosure with reference to FIGS. 84 and 85.

The eighth embodiment describes a sixth encoding of additional attribute information different from the parking segment information related to the parking segments B5 and the wheel stopper information related to the wheel stoppers B6. The additional attribute information can include, for example, existence or non-existence of painted objects in each parking slot PS, such as a painted mark indicative of side-by-side parking, diagonal side-by-side parking, parallel parking, International Wheelchair Symbol, or Electric-Vehicle mark.

FIG. 84 illustrates an example of sixth encoded data Ec6 as the result of the sixth encoding. Specifically, the training process gives an encoded data value Ecv of 0 or 1 related to the existence or non-existence of the additional attribute information in each parking slot PS included in a target image GS illustrated in FIG. 32. Specifically, as can be seen in FIGS. 33, 34, 38, and 82, the training process gives (i) the encoded data value Ecv of "1" to the center cell of each selected parking slot PS in which the attribute information exists, and (ii) the encoded data value Ecv of "0" to each of the other cells in the target image GS.

FIG. 85 schematically illustrates the parking-slot annotation code Ea for each parking slot PS included in a target image GS, which additionally includes the sixth encoded data Ec6 illustrated in FIG. 84. For the sake of simple illustration, illustration of the second to fifth encoded data Ec2 to Ec5 is omitted in FIG. 85. The first encoded data Ecv1 illustrated in FIG. 85 can be replaced with the first encoded data assembly illustrated in FIG. 68, which includes the first encoded data items Ec1 provided for the different orientations of each parking slot PS.

Ninth Embodiment

The following describes a parking-slot detection apparatus 2200 according to the ninth embodiment of the present disclosure with reference to FIGS. 86 to 118.

The processor 21 of the ninth embodiment is configured to determine whether there is a parking-lot environment around the own vehicle V, i.e., whether the own vehicle V is located in a parking lot PL based on a detection result or a recognition result of parking slots PS. The result of the parking-lot environment determination can be used to calculate a traveling route of the own vehicle V to a target parking slot PS during parking assistance or automatic parking. Alternatively, the parking-lot environment determination can be performed in response to receiving a learning image, i.e., a target image. In other words, the processor 21 can perform the parking-lot environment determination when generating the parking-slot annotation information.

Figure 86:
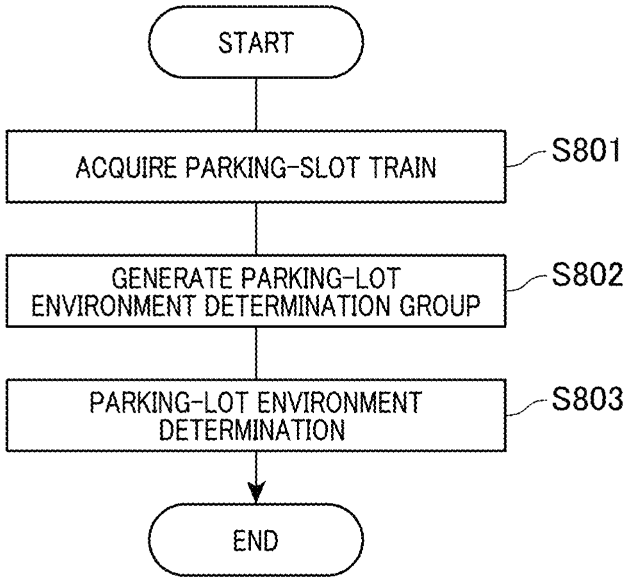
FIG. 86 is a flowchart schematically illustrating a parking-lot environment determination routine according to the ninth embodiment.
Figure 87:
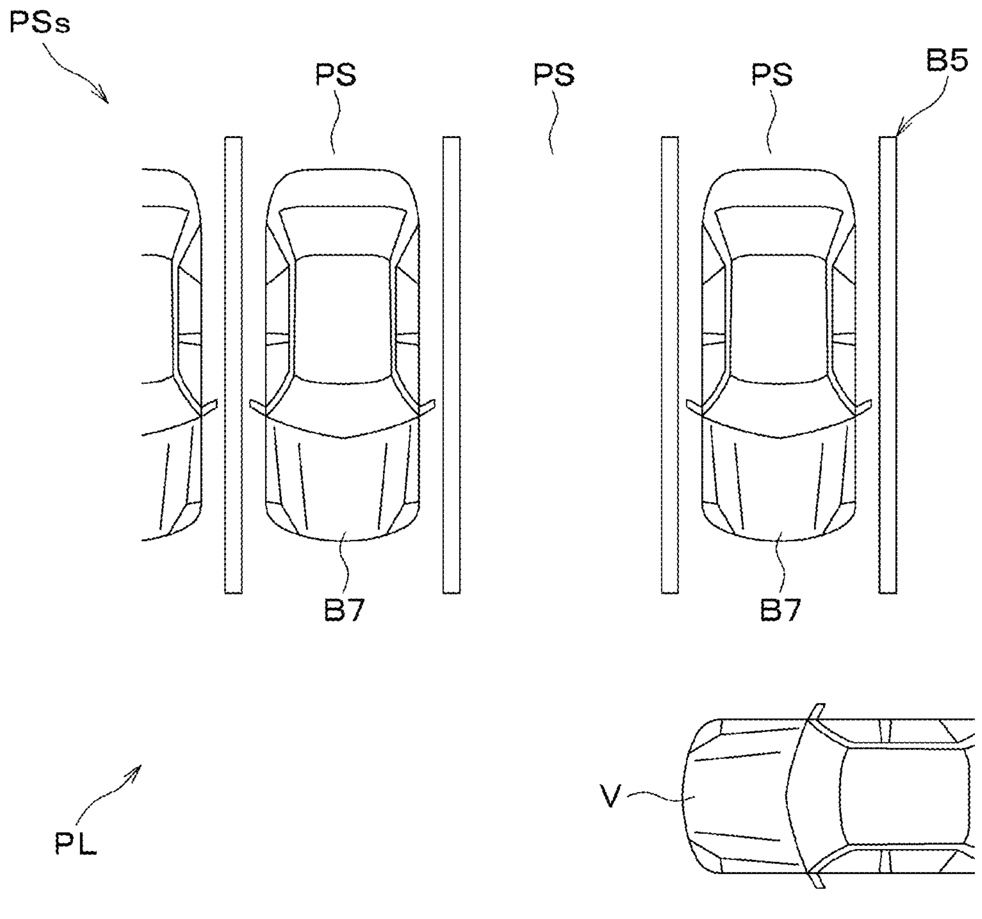
FIG. 87 is a plan view schematically illustrating an example of a parking-slot train.

The following schematically describes the parking-lot environment determination with reference to FIGS. 86 and 87.

First, the processor 21 acquires a parking-slot train PSs in step S801 of FIG. 86. FIG. 87 illustrates an example of the parking-slot train PSs.

Next, the processor 21 generates a parking-lot environment determination group in step S802. What the parking-lot environment determination group is and how the processor 21 generates the parking-lot environment determination group will be described later. Next, the processor 21 performs, based on the generated parking-lot environment determination group, the parking-lot environment determination of whether the own vehicle V is located in a parking lot PL in step S803.

The following sequentially describes, in detail, the operations in steps S801 to S803.

Parking-Slot Train Acquirement

Figure 88:
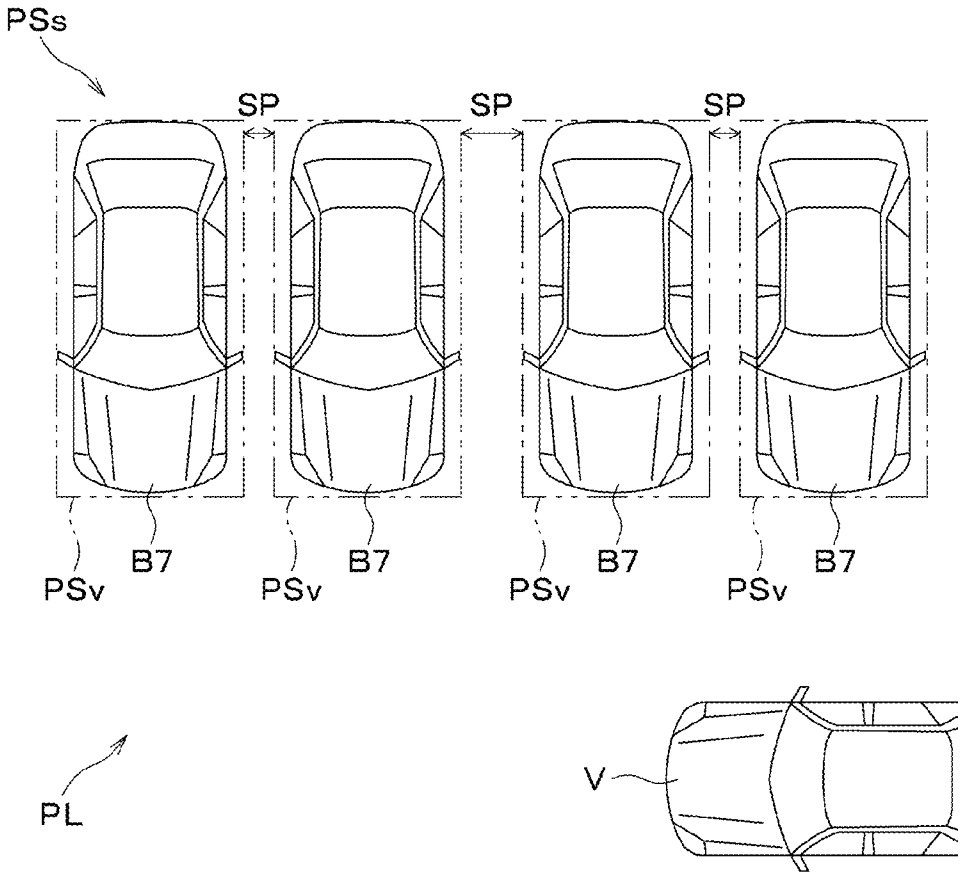
FIG. 88 is a plan view schematically illustrating another example of a parking-slot train.

The parking-slot train PSs represents a train of parking slots PS that are arranged in a predetermined direction and satisfy predetermined conditions that will be described later. Typically, the parking-slot train PSs represents, as illustrated in FIG. 87, alignment of parking slots PS partitioned by the parking segments B5. Each parking segment B5 has any shape. There may be one or more parked vehicles B7 in corresponding one or more parking slots PS or there may be no parked vehicles B7 on the parking slots PS. The parking-slot train PSs can be defined, as illustrated in FIG. 88, even if there are no parking segments B5. Specifically, a virtual circumscribed rectangle around each parked vehicle B7 can be defined as a virtual parking slot PSv. Each virtual parking slot PSv has a pair of long sides corresponding to the total longitudinal dimension of the corresponding parked vehicle V7, and a pair of short sides corresponding to the lateral dimension, i.e., width dimension, of the corresponding parked vehicle V7. The virtual parking slots PSv are aligned with their spaces SP being smaller than a predetermined length, so that the parking-slot train PSs can be defined.

Figure 89:
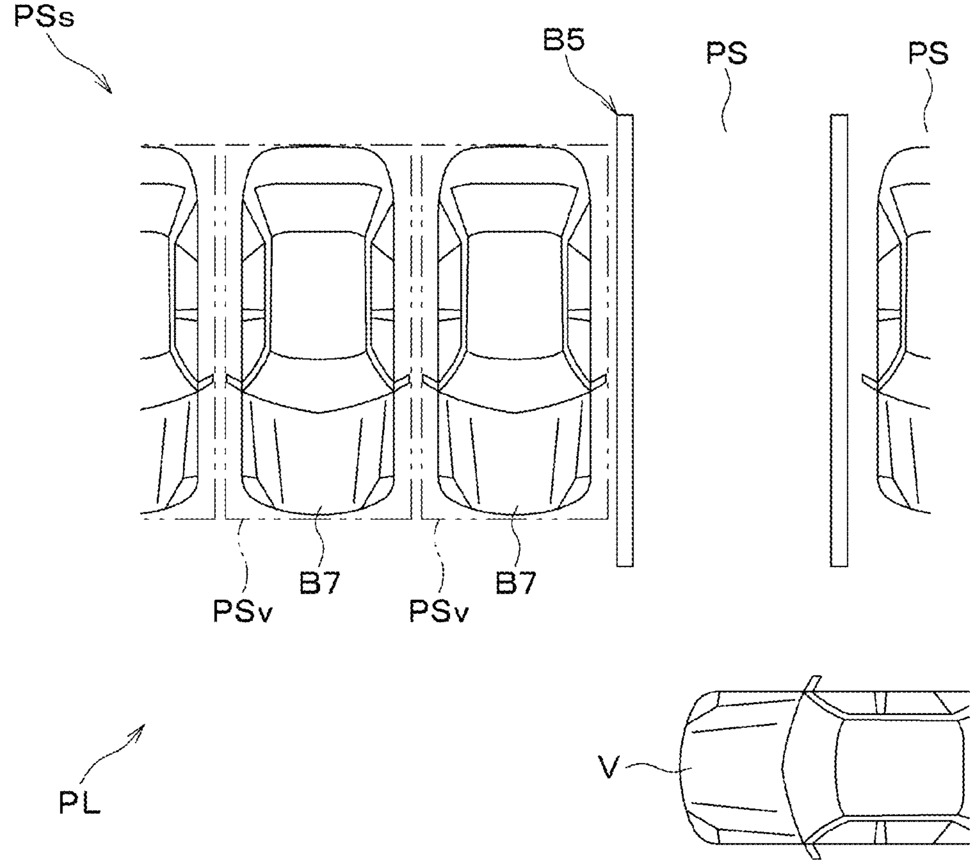
FIG. 89 is a plan view schematically illustrating a further example of a parking-slot train.

The combination of an alignment of the parking slots PS, each of which is surrounded by the corresponding parking segment B5, and an alignment of the virtual parking slots PSv, each of which is surrounded by no parking segment B5, can define, as illustrated in FIG. 89, the parking-slot train PSs. The parking slots PS, each of which has the corresponding parking segment B5, and the virtual parking slots PSV, each of which has no parking segment B5, will be collectively referred to as parking slots PS unless technical contradiction or otherwise specified. Accordingly, the parking slots PS shown in FIG. 90 and subsequent figures and described corresponding descriptions can include (i) parking slots, each of which is surrounded by the corresponding parking segment B5, and (ii) the virtual parking slots PSV, each of which is surrounded by no parking segment B5.

As described above, the processor 21 acquires the parking-slot train PSs in accordance with the parking segments B5 and/or the parked vehicles B7.

Figure 90:
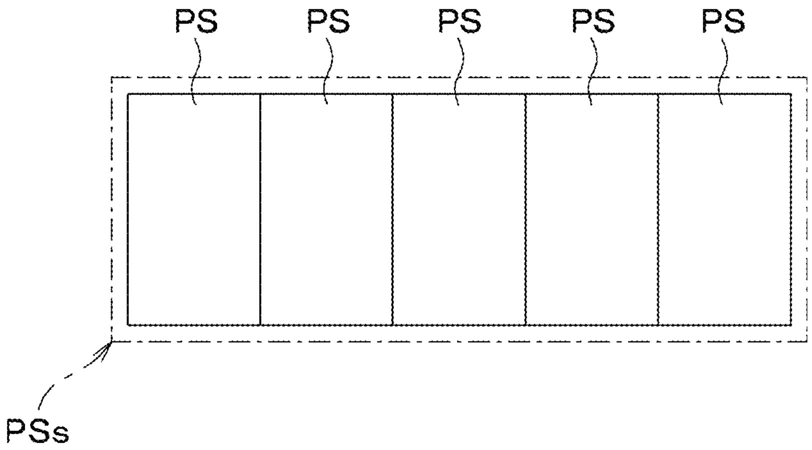
FIG. 90 is a plan view schematically illustrating an example of a side-by-side parking-slot train.
Figure 91:
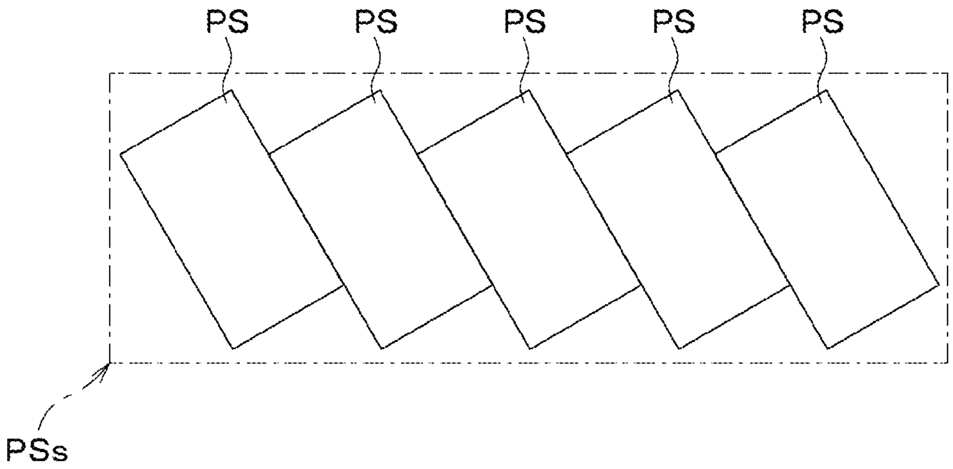
FIG. 91 is a plan view schematically illustrating an example of a diagonal side-by-side parking-slot train.
Figure 92:
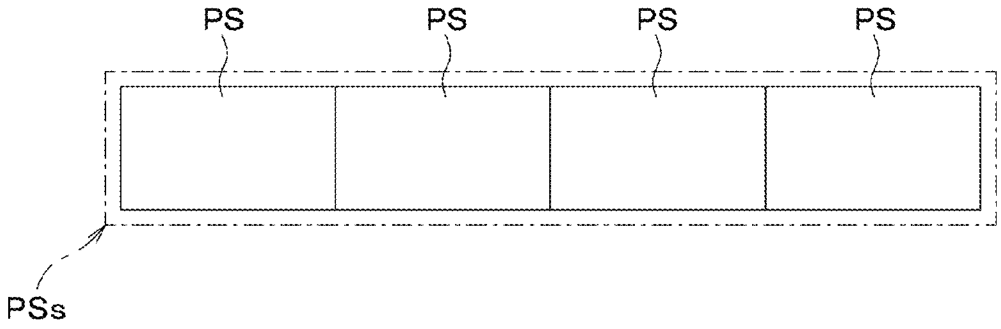
FIG. 92 is a plan view schematically illustrating an example of a parallel parking-slot train.

FIG. 90 illustrates a side-by-side parking-slot train PSs. FIG. 91 is a diagonal side-by-side parking-slot train PSs. FIG. 92 is a parallel parking-slot train PSs. Specifically, the processor 21 of the ninth embodiment is configured to identify a parking-slot train PSs for each of the parking types, i.e., the side-by-side parking, the diagonal side-by-side parking, and the parallel parking. In other words, one parking-slot train PSs is configured not to include plural-type parking-slot trains.

The following describes an example indicative of how the processor 21 acquires the parking-slot train PSs with reference to FIGS. 93 to 97.

Figure 93:
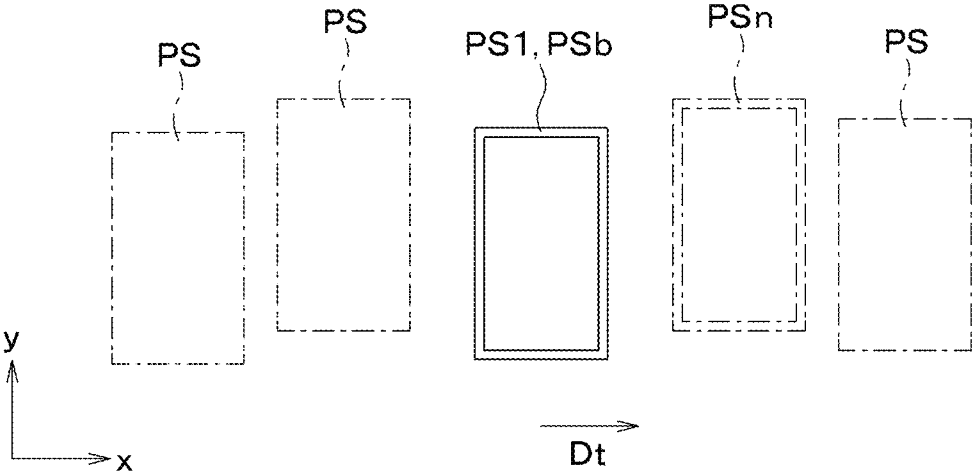
FIG. 93 is a plan view used to describe a parking-slot train acquiring routine included in the parking-lot environment determination routine illustrated in FIG. 86.

First, the processor 21 selects one of the recognized parking slots PS aligned in an x direction illustrated in FIG. 93 as a reference object PSb. Specifically, the processor 21 recognizes the alignment of the recognized parking slots PS to accordingly determine the x direction corresponding to the alignment direction. A selected one parking slot from parking slots PS constituting a provisional parking-slot train or a definitive parking-slot train will be referred to as an initial selected object PS1. In FIG. 93, the reference object PSb and the initial selected object PS1 are the same parking slot.

Next, the processor 21 performs a searching task of searching for a closest parking slot PS to the reference object PSb in a searching direction Dt corresponding to a first direction that is a positive side of the x-axis direction, thus finding the closest parking slot PS as a closest object PSn. The positive side of the x direction is the rightward direction in FIG. 93.

Figure 94:
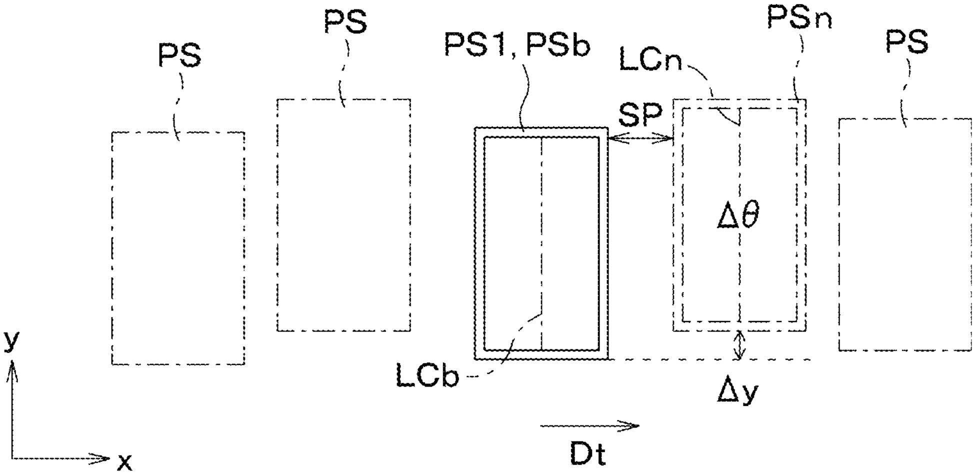
FIG. 94 is a plan view used to describe the parking-slot train acquiring routine included in the parking-lot environment determination routine illustrated in FIG. 86.

The searching task thereafter determines, based on the positional relationship between the reference object PSb and the closest object PSn, whether the reference object PSb and the closest object PSn should constitute a parking-slot train PSs (see FIG. 94). Specifically, the processor 21 determines that the reference object PSb and the closest object PSn have the positional relationship that should constitute a parking-slot train PSs upon determination that the following first to third continuity conditions are satisfied:

(I) The first continuity condition is that the interval SP between the reference object PSb and the closest object PSn in the x-axis direction is smaller than or equal to a predetermined value of, for example, 2 m.

(II) The second continuity condition that a positional deviation between the reference object PSb and the closest object PSn in the y-axis direction, which is perpendicular to the x-axis direction, is smaller than or equal to a predetermined value of, for example, 1.8 m.

(III) The third continuity condition is that an angle 40 formed between a center line LCb of the reference object PSb and a center line LCn of the closest object PSn is within a predetermined angle of, for example, 30°.

In FIG. 94, the positional deviation between the reference object PSb and the closest object PSn in the y-axis direction represents an offset amount between the reference object PSb and the closest object PSn in the y-axis direction. In other words, if each of the reference object PSb and the closest object PSn has opposing first and second ends in the y-axis direction, the positional deviation between the reference object PSb and the closest object PSn in the y-axis direction represents a positional difference between the first end of the reference object PSb and the first end of the closest object PSn in the y-axis direction. The center line LCb of the reference object PSb is a virtual line that passes through the center of the reference object PSb and is parallel to the long side thereof. The center line LCn of the closest object PSn is a virtual line that passes through the center of the closest object PSn and is parallel to the long side thereof.

Figure 95:
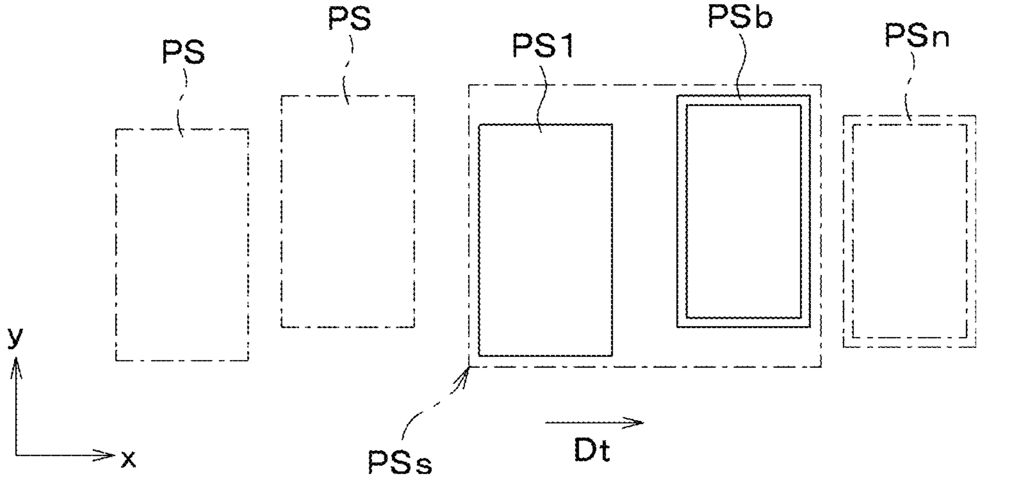
FIG. 95 is a plan view used to describe the parking-slot train acquiring routine included in the parking-lot environment determination routine illustrated in FIG. 86.

Upon determination that the first to third continuity conditions are satisfied between the reference object PSb and the closest object PSn, the searching task identifies that the reference object PSb and the closest object PSn constitute a provisional parking-slot train PSs, and sets the closest object PSn as a new reference object PSb, and sets the previous reference object PSb as the initial selected object PS1. This results in the reference object PSb having been shifted from the initial selected object PSb to the closest object in the searching direction Dt. FIG. 95 schematically illustrates the parking slots PS in which the location of the reference object PSb has been shifted in the searching direction Dt as compared with the parking slots PS illustrated in FIG. 94.

Then, the searching task retrieves a closest parking slot PS to the reference object PSb in the retrieving direction Dt, thus finding the closest parking slot PS as a closest object PSn. Thereafter, the searching task determines, based on the positional relationship between the reference object PSb and the closest object PSn, whether the first to third continuity conditions are satisfied between the reference object PSb and the closest object PSn. Upon determination that the first to third continuity conditions are satisfied between the reference object PSb and the closest object PSn, the processor 21 adds the closest object PSn to the provisional parking-slot train PSs that includes the initial selected object PS1, thus identifying that the initial selected object PS1, the reference object PSb, and the closest object PSn constitute the provisional parking-slot train PSs.

As described above, the processor 21 of the ninth embodiment is configured to search for plural parking slots PS, which should constitute a parking-slot train PSs, in the searching direction Dt corresponding to the positive side of the x-axis direction using the initial selected object PS1 as the starting point.

Figure 96:
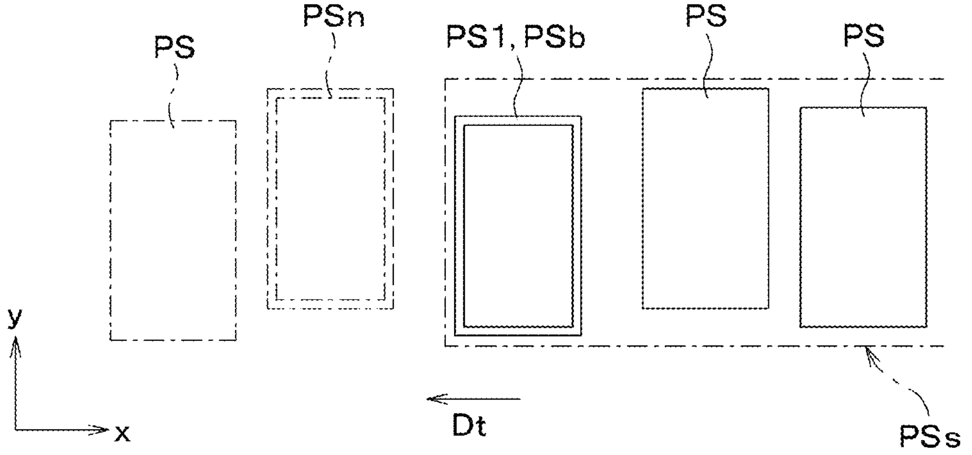
FIG. 96 is a plan view used to describe the parking-slot train acquiring routine included in the parking-lot environment determination routine illustrated in FIG. 86.
Figure 97:
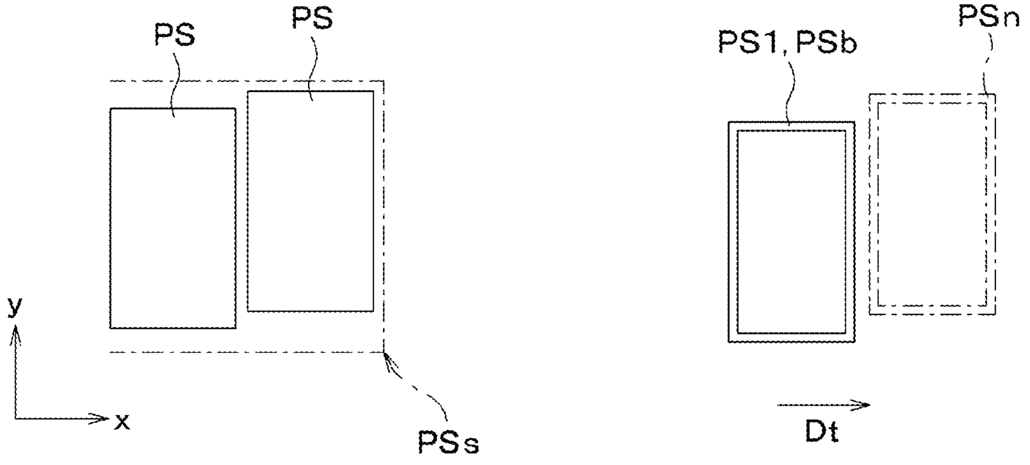
FIG. 97 is a plan view used to describe the parking-slot train acquiring routine included in the parking-lot environment determination routine illustrated in FIG. 86.

Upon determination that no closest object PSn is found or at least one of the first to third continuity conditions is not satisfied, the processor 21 terminates the above searching task in the searching direction Dt corresponding to the positive side of the x-axis direction using the initial selected object PS1 as the starting point. Then, the processor 21 returns the reference object PSb to the initial selected object PS1, inverts the searching direction Dt such that the searching direction Dt, which has been inverted, corresponds to a second first direction that is a negative side of the x-axis direction that is opposite to the positive side of the x-axis direction, and performs, as illustrated in FIG. 96, the searching task of searching for a closest parking slot PS to the reference object PSb in the searching direction Dt, thus finding the closest parking slot PS as a closest object PSn. The negative side of the x direction is the leftward direction in FIG. 96.

Thereafter, upon determination that no closest object PSn is found or at least one of the first to third continuity conditions is not satisfied in the searching task in the searching direction Dt, the processor 21 terminates the above searching task in the searching direction Dt, thus terminating the acquirement of the provisional parking-slot train PSs including the initial selected object PS1.

Next, the processor 21 selects a parking slot PS that does not belong to the one or more identified parking-slot trains PSs and is unset to the reference object PSb, i.e., the initial selected object PS1, and starts the searching task in the searching direction Dt corresponding to the positive side of the x-axis direction using the from the reference object PSb, i.e., the initial selected object PS1, as the starting point.

The processor 21 determines, after acquirement of a provisional parking-slot train PSs, whether the number of parking slots PS included in the identified provisional parking-slot train PSs is more than or equal to a predetermined threshold number.

Then, the processor 21 finalizes the identified provisional parking-slot train PSs as a definitive parking-slot train PSs upon determination that the number of parking slots PS included in the identified provisional parking-slot train PSs is more than or equal to the predetermined threshold number. Otherwise, upon determination that the number of parking slots PS included in the identified provisional parking-slot train PSs is less than the predetermined threshold number, the processor 21 abandons the identified provisional parking-slot train PSs without finalizing it.

Specifically, the processor 21 determines that the above predetermined conditions are satisfied when determining that the first to third continuity conditions are satisfied and the number condition indicative of the number of parking slots PS included in the parking-slot train PSs being more than or equal to the predetermined threshold number. The threshold number can be set to, for example, 5, but can be freely set to Q that is a positive integer more than or equal to 3. The threshold number can be variably set depending on any of the parking types, i.e., the side-by-side parking, diagonal side-by-side parking, or the parallel parking. For example, Q is set to 5 for the side-by-side parking, to 4 for the diagonal side-by-side parking, or to 3 for the parallel parking. The value of Q will also be referred to as a parking-slot train acquirement threshold.

As described above, the processor 21 of the ninth embodiment is configured to select one of recognized parking slots PS as a reference object PSb, and retrieves parking slots PS in both the first direction and the second direction opposite to the first direction from the reference object PSb. This configuration enables the processor 21 to identify a parking-slot train PSs including parking slots PS whose number is more than or equal to the threshold number; the parking slots PS satisfies the first to third continuous conditions. This therefore makes it possible for the processor 21 included in the own vehicle V traveling in an aisle of the parking lot PL to reliably identify one or more parking-slot trains PSs, thus determining, with higher accuracy, whether the own vehicle V is located in a parking lot PL in accordance with the identified one or more parking-slot trains PSs.

Figure 98A:
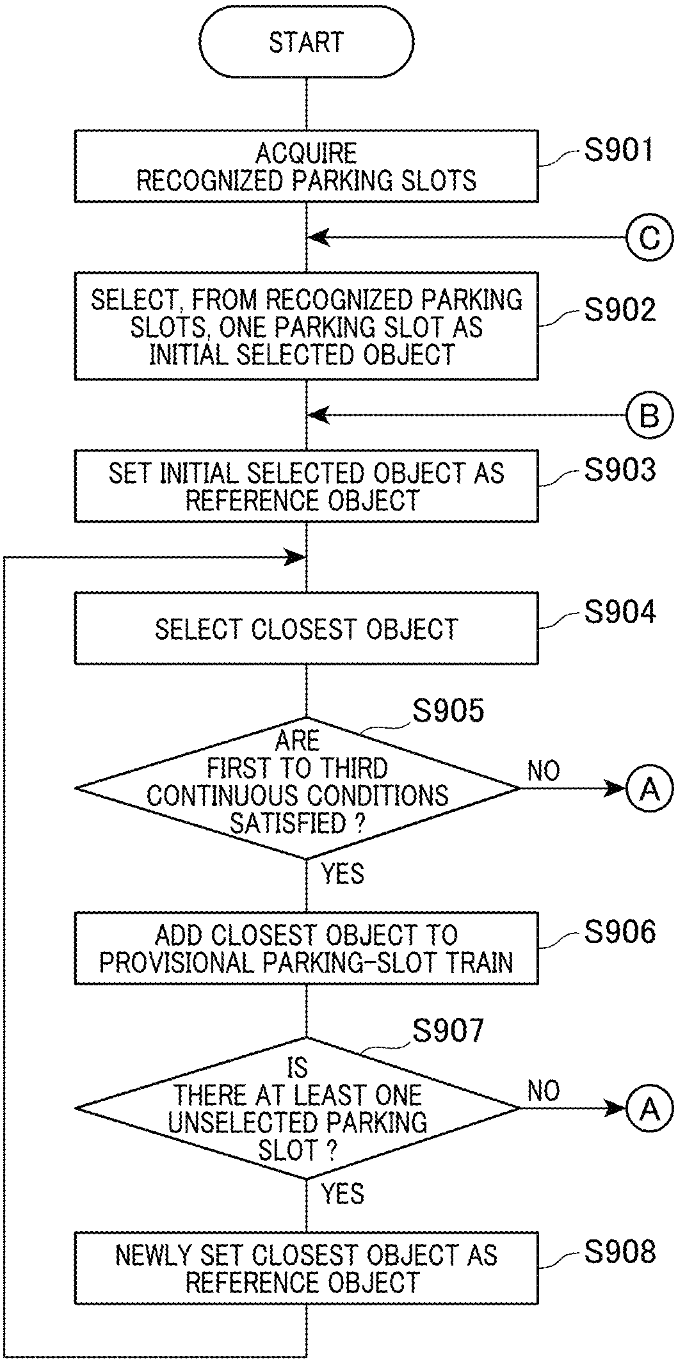
FIGS. 98A and 98B are a joint flowchart schematically illustrating the parking-slot train acquiring routine illustrated in FIG. 86.
Figure 98B:
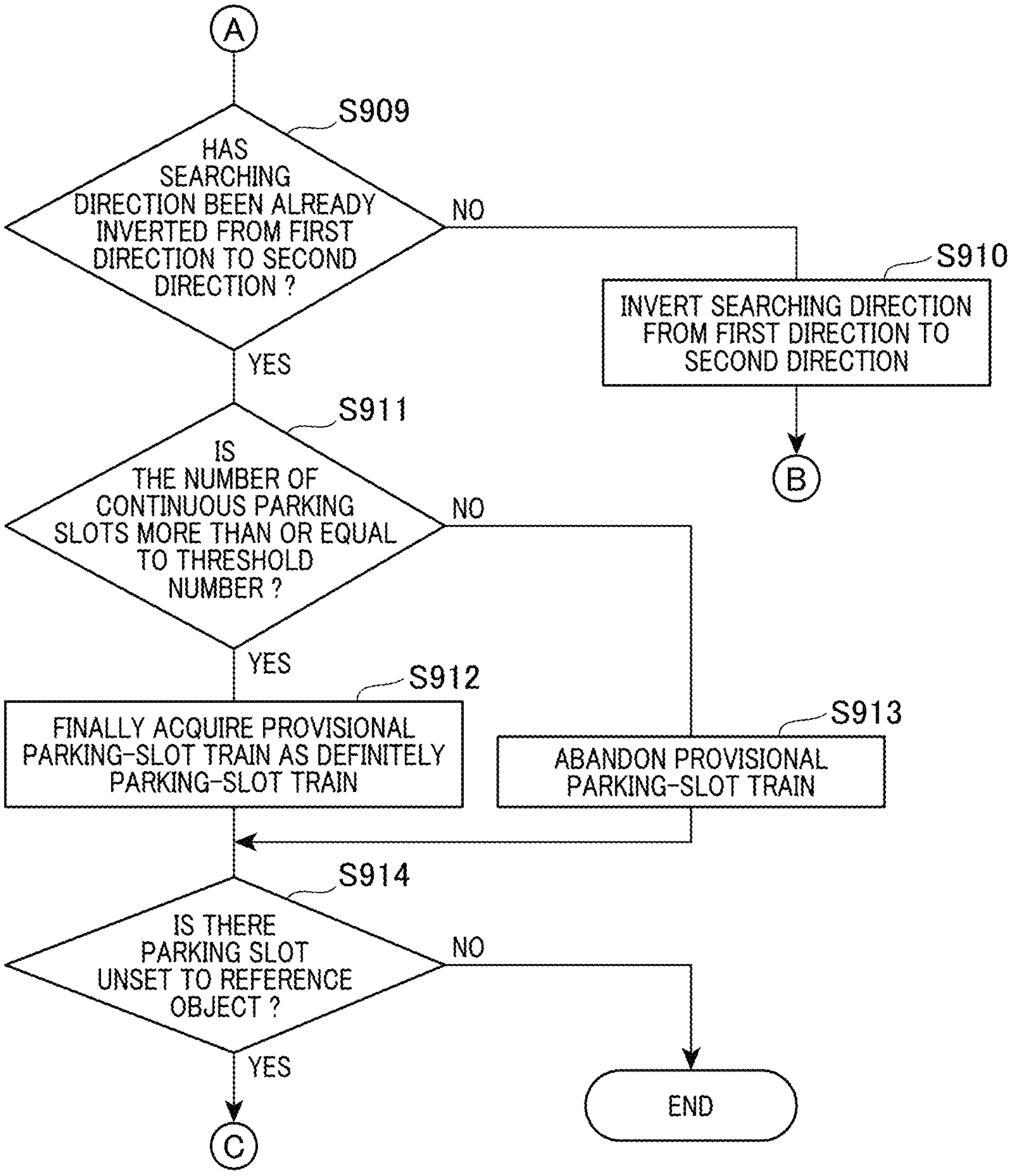

Next, the following describes an example of a parking-slot train acquiring routine corresponding the operation in step S801 illustrated in FIG. 86 with reference to FIGS. 98A and 98B.

Referring to FIGS. 98A and 98B, the processor 21 sequentially executes the operations in steps S901 to S905 of the parking-slot train acquiring routine.

In step S901, the processor 21 acquires the recognized result of the parking slots PS from an input image or a learning image. Next, the processor 21 selects, from the recognized parking slots PS, one of the recognized parking slots PS as the initial selected object PS1 in step S902. Following the operation in step S902, the processor 21 sets the initial selected object PS1 as the reference object PSb in step S903. Next, the processor 21 searches for a parking slot PS in the first direction from the reference object PSb to accordingly select a closest object PSn to the reference object PSb as the searching result in step S904.

Following the operation in step S904, the processor 21 determines whether the positional relationship between the reference object PSb and the closest object PSn satisfies the first to third continuous conditions in step S905. The determination in step S905 is negative when the positional relationship between the reference object PSb and the closest object PSn does not satisfy at least one of the first to third continuous conditions (NO in step S905). Additionally, the determination in step S905 is negative when the processor 21 does not find any parking slot PS in the first direction from the reference object PSb (NO in step S905). That is, the determination in step S905 is affirmative (YES in step S905) when the processor 21 finds a closest object PSn and the positional relationship between the reference object PSb and the closest object PSn satisfies the first to third continuous conditions.

In response to the affirmative determination in step S905, the parking-slot train acquiring routine proceeds to step S906.

In step S906, the processor 21 adds the closest object PSn to a provisional parking-slot train PSs including the reference object PSb, and thereafter determines whether there is at least one unselected parking slot PS in the searching direction Dt in step S907. Upon determination that there is at least one unselected parking slot PS in the searching direction Dt (YES in step S907), the processor 21 shifts selection of the reference object from the initial selected object PS1 to the closest object PSn as the reference object PSb. Specifically, the processor 21 newly sets the closest object PSn as the reference object PSb, and returns the previous reference object PSb to the initial selected object PS1 in step S908. Otherwise, upon determination that there are no unselected parking slot PS in the searching direction Dt (NO in step S907), the parking-slot train acquiring routine proceeds to step S909. Additionally, when the determination in step S905 is negative, the parking-slot train acquiring routine proceeds to step S909.

In step S909, the processor 21 determines whether the searching direction Dt is set at present to the second direction, i.e., the searching direction Dt has been already inverted from the first direction to the second direction. Upon determination that the searching direction Dt is not set at present to the second direction, i.e., the searching direction Dt has not been inverted from the first direction to the second direction yet (NO in step S909), the parking-slot train acquiring routine proceeds to step S910. In step S910, the processor 21 inverts the searching direction Dt from the first direction to the second direction, and thereafter returns to the operation in step S903. Then, the processor 21 executes the operations in step S903 to S909 in the searching direction Dt that is set to the second direction until the determination in step S909 is affirmative.

When the searching task in each of the first and second directions has been completed, the determination in step S909 is affirmative (YES in step S909). Then, the processor 21 determines whether the number of parking slots PS, i.e., the number of continuous parking slots PS, included in the provisional parking-slot train PSs is more than or equal to the predetermined threshold number in step S911.

Upon determination that the number of parking slots PS, i.e., the number of continuous parking slots PS, included in the provisional parking-slot train PSs is more than or equal to the predetermined threshold number (YES in step S911), the processor 21 finally acquires the provisional parking-slot train PSs as a definitive parking-slot train PSs in step S912. Otherwise, upon determination that the number of parking slots PS, i.e., the number of continuous parking slots PS, included in the provisional parking-slot train PSs is less than the predetermined threshold number (NO in step S911), the processor 21 abandons the provisional parking-slot train PSs as a definitive parking-slot train PSs in step S913.

After completion of the operation in step S912 or SS913, the parking-slot train acquiring routine proceeds to step S914. In step S914, the processor 21 determines whether there is at least one parking slot PS that does not belong to the one or more definitive parking-slot trains PSs finally identified in step S912 and is unset to the reference object PSb. Upon determination that there is at least one parking slot PS that does not belong to the one or more definitive parking-slot trains PSs finally identified in step S912 and is unset to the reference object PSb (YES in step S914), the processor 21 returns to the operation in step S902. This enables the processor 21 to perform the parking-slot train acquirement task in step S902 to S914 in each of the first and second directions until the determination in step S914 is negative. Otherwise, upon determination that there are no parking slots PS that do not belong to the one or more definitive parking-slot trains PSs finally identified in step S912 and is unset to the reference object PSb (NO in step S914), the processor 21 terminates the parking-slot train acquiring routine corresponding the operation in step S801.

Generation of Parking Region

Figure 99:
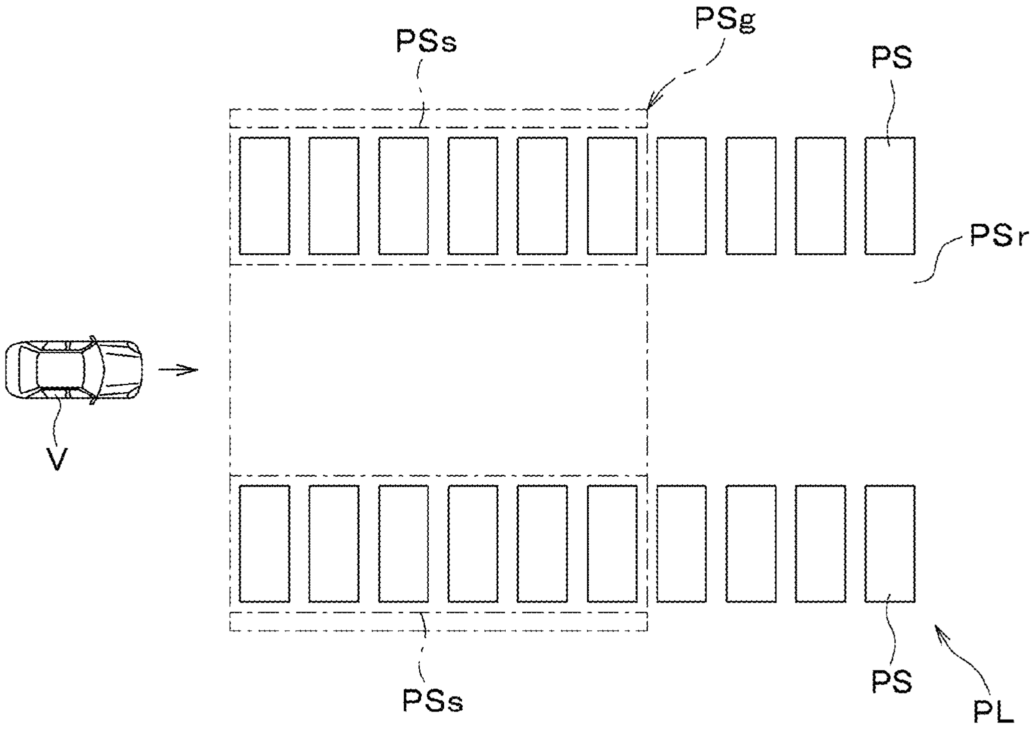
FIGS. 99 and 100 are plan views each illustrating a first example showing how the processor extends a typical parking region constituted by an aisle and parking-slot trains located on both sides of the aisle.

Next, the following describes the operation of generating at least one parking-lot environment determination group in step S802 of FIG. 86 with reference to FIGS. 99 to 103. Hereinafter, at least one parking-lot environment determination group will be referred to as at least one parking region PSg. The at least one parking region PSg is at least one virtual region including, as illustrated in FIG. 99, at least one parking-slot train PSs and an aisle PSr of the parking lot PL. Specifically, the processor 21 typically acquires, while the own vehicle V is traveling in the aisle PSr or is going to travel in the aisle PSr, the at least one parking region PSg constituted by the aisle PSr and the parking-slot trains PSs located at both sides of the aisle PSr. That is, the processor 21 of the ninth embodiment is programmed to acquire, based on the parking-slot trains PSs identified in step S801, the at least one parking region PSg that includes (i) the parking-slot trains PSs and (ii) a region that is travelable by the own vehicle V and that faces the parking-slot trains PSs. The processor 21 can acquire the at least one parking region PSg in accordance with, as parking-region acquirement conditions, the number of parking-slot trains PSs and/or the existence reliability of each parking-slot train PSs, and/or accuracy reliability. Then, the processor 21 of the ninth embodiment is programmed to determine whether the own vehicle V is located in a parking lot PL based on the generated at least one parking region PSg. Specifically, the processor 21 of the ninth embodiment is programmed to determine whether the own vehicle V is located in a parking lot PL or outside the parking lot PL in accordance with the positional relationship between the own vehicle V and the at least one parking region PSg, such as information about whether the own vehicle V has entered the at least one parking region PSg.

The processor 21 of the ninth embodiment can be programmed to extend each parking-slot train PSs and the at least one parking region PSg as the own vehicle V is traveling.

Figure 100:
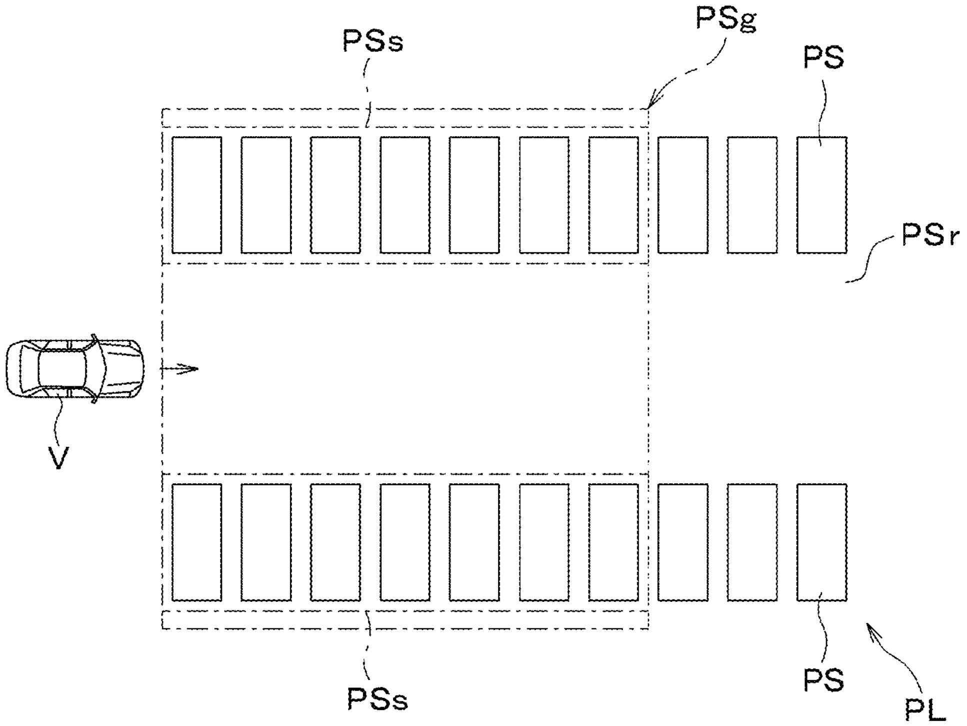

FIGS. 99 and 100 illustrate a first example showing how the processor 21 extends a typical parking region PSg constituted by the aisle PSr and the parking-slot trains PSs located at both sides of the aisle PSr. FIG. 99 illustrates a situation where the own vehicle V is approaching the parking region PSg, and FIG. 100 illustrates a next situation where the own vehicle V is approaching the parking region PSg more closely than the situation illustrated in FIG. 99. The processor 21 according to the first example illustrated in FIGS. 99 and 100 is programmed to sequentially add, to each of the parking-slot trains PSs constituting the parking region PSg, newly recognized parking slots PS aligned in the same direction as the alignment of the parking slots PS included in each of the parking-slot trains PSs as the own vehicle V is approaching the parking region PSg.

Figure 101:
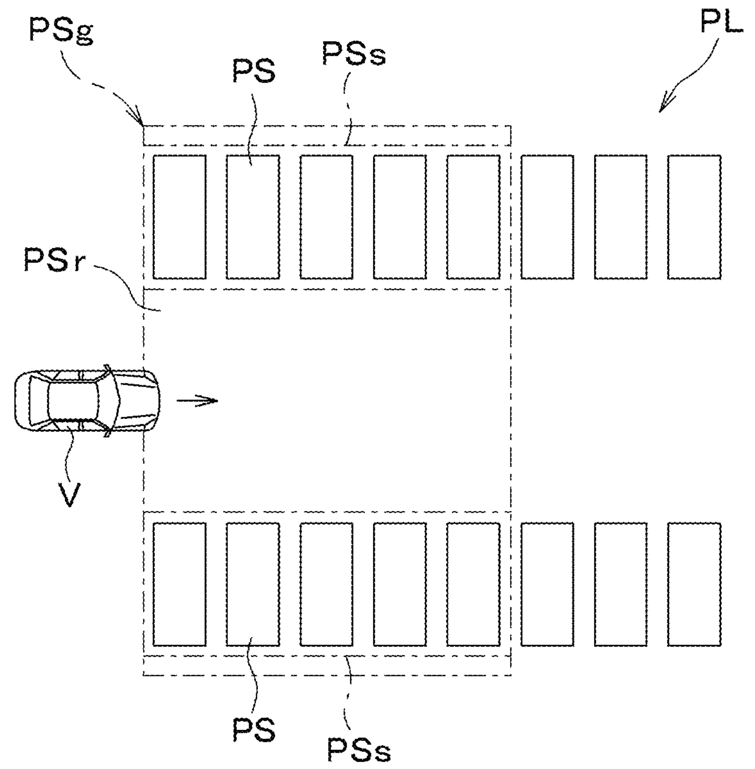
FIGS. 101 to 103 are plan views each illustrating a second example showing how the processor extends a typical parking region constituted by an aisle and parking-slot trains located on both sides of the aisle.
Figure 102:
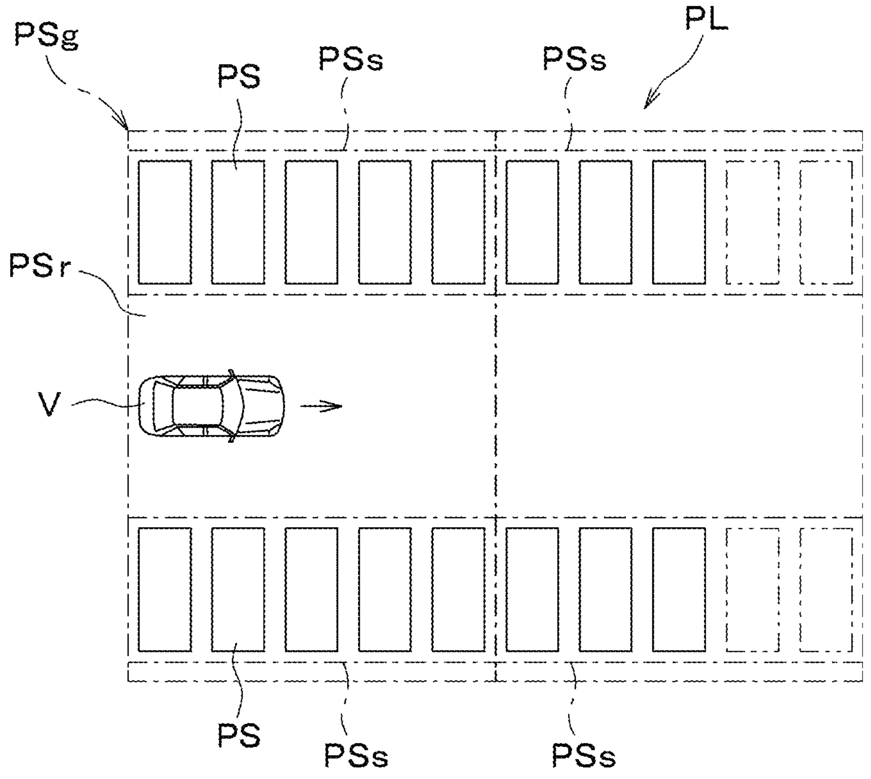
Figure 103:
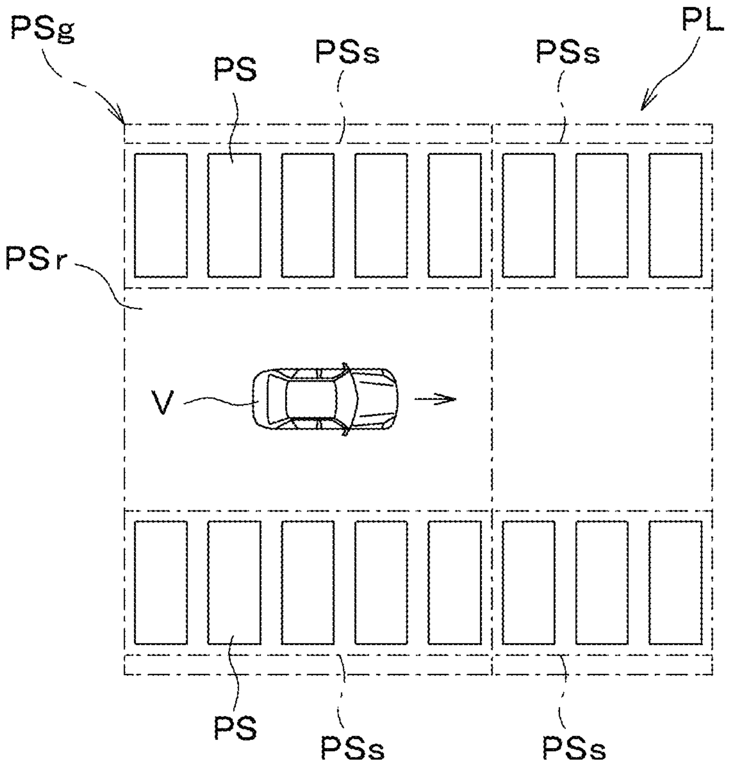

FIGS. 101 to 103 illustrate a second example showing how the processor 21 extends a typical parking region PSg constituted by the aisle PSr and the parking-slot trains PSs located at both sides of the aisle PSr. FIG. 101 illustrates a situation where the own vehicle V is traveling to partly enter the parking region PSg, and FIG. 102 illustrates a next situation where the own vehicle V is traveling to completely enter the parking region PSg. FIG. 103 illustrates a further situation where the own vehicle V is traveling to more deeply enter the parking region PSg.

The processor 21 according to the second example illustrated in FIGS. 101 to 103 is programmed to extend the parking region PSg acquired in the situation illustrated in FIG. 101 as the own vehicle V is traveling in the following procedure; the parking region PSg acquired in the situation illustrated in FIG. 101 is constituted by the aisle PSr and the parking-slot trains PSs, each of which has five parking slots PS, located at both sides of the aisle PSr.

The processor 21 is programed to create a copy of the acquired parking region PSg constituted by the aisle PSr and the parking-slot trains PSs located at both sides of the aisle PSr to continuously join the copied parking region PSg to the acquired parking region PSg in the traveling direction of the own vehicle V. Specifically, the processor 21 is programmed to continuously join the copied parking region PSg, which has the same size as the size of the acquired parking region PSg, to the acquired parking region PSg in the traveling direction of the own vehicle V, thus extending the parking region PSg two times in the traveling direction. The processor 21 can be programmed to continuously join plural copied parking region PSg, each of which has the same size as the size of the acquired parking region PSg, to the acquired parking region PSg in the traveling direction of the own vehicle V, thus extending the parking region PSg K times in the traveling direction; K is a positive integer that is two or more. In response to determination that the parking-slot trains PSs located at both sides of the aisle are each comprised of ten or more parking slots PS, the processor 21 can be programmed to finalize the virtually extended parking region PSg.

FIG. 102 illustrates that the parking region PSg is extended two times in the traveling direction. FIG. 102 illustrates that the parking-slot trains PSs located at both sides of the aisle are each comprised of only eight parking slots PS, so that there are two extra parking slots PS (see dash-double-dot lines) in each extended parking-slot train PSs included in the extended parking region PSg. For this reason, deducting the two extra parking slots PS from each extended parking-slot train PSs included in the extended parking region PSg to thereby correct the size of each extended parking-slot train PSs and the size of the extended parking region PSg enables the corrected parking region PSg including the corrected parking-slot trains PSs to be created.

As described above, the processor 21 of the ninth embodiment is configured to extend, if there are additional parking slots PS or an additional parking-slot train PSs located adjacently outside the acquired parking region PSg in a predetermined direction, the acquired parking region PSg in the predetermined direction such that the extended parking region PSg includes the additional parking slots PS or the additional parking-slot train PSs located adjacent to the acquired parking region PSg. This configuration makes it possible to extend the acquired parking region PSg in accordance with additionally recognized parking slots PS or parking-slot train PSs with traveling of the own vehicle V toward the acquired parking region PSg. This therefore enables proper determination of whether the own vehicle V is located in or outside a parking lot PL.

Determination of Whether Own Vehicle is Located in Parking Lot

Next, the following describes the operation of determining whether the own vehicle V is located in a parking lot PL in step S803 of FIG. 86 with reference to FIGS. 104 to 113.

Figure 104:
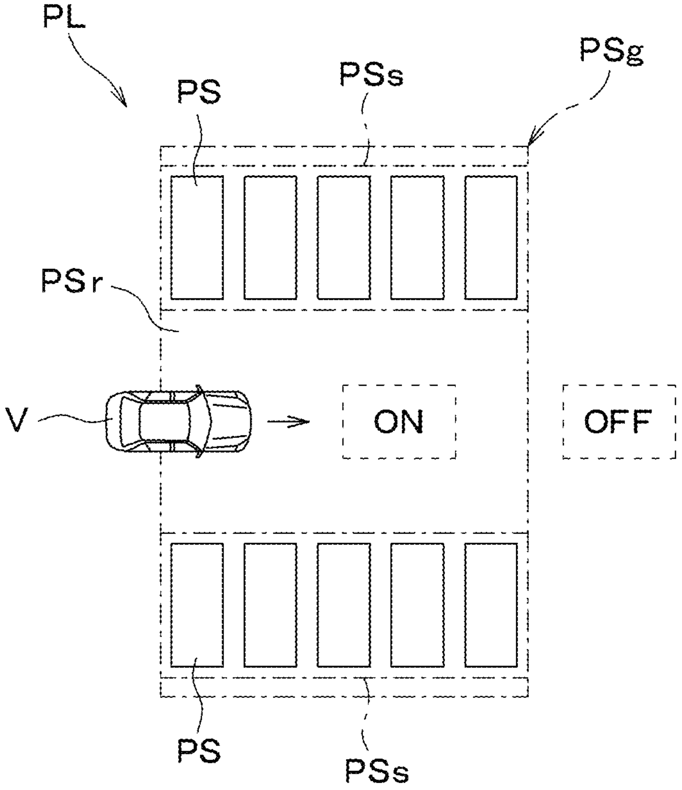
FIGS. 104 to 113 are plan views each illustrating an operation of determining whether the own vehicle is located in a parking lot in step S803 of FIG. 86.
Figure 105:
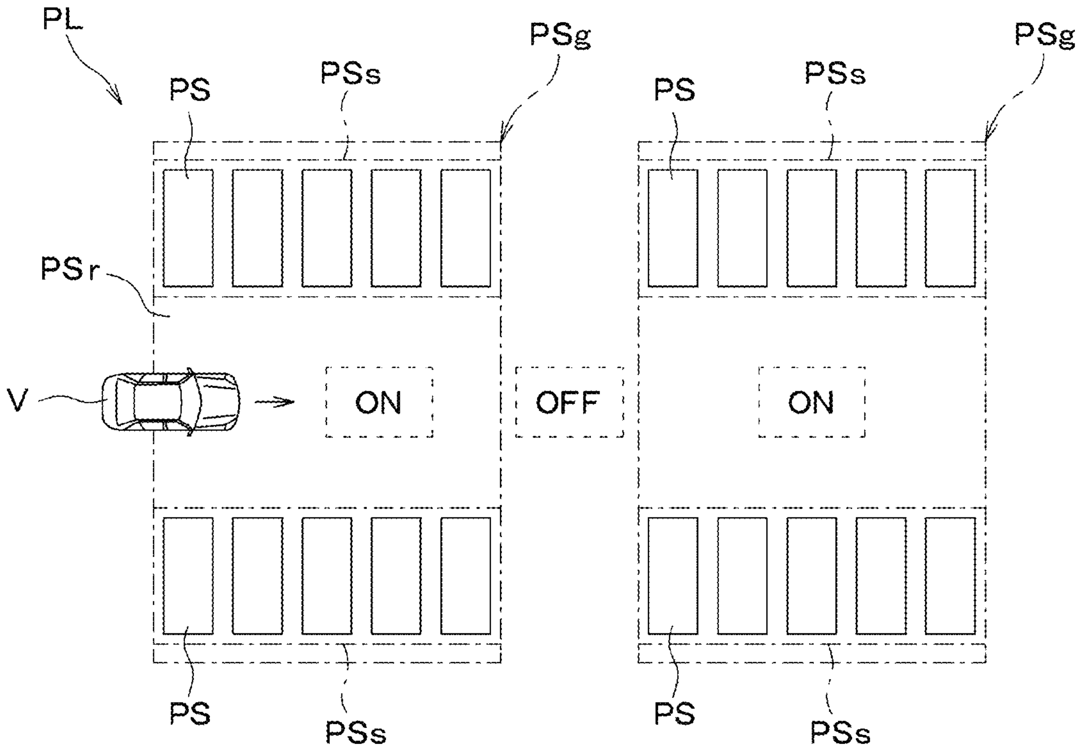
Figure 106:
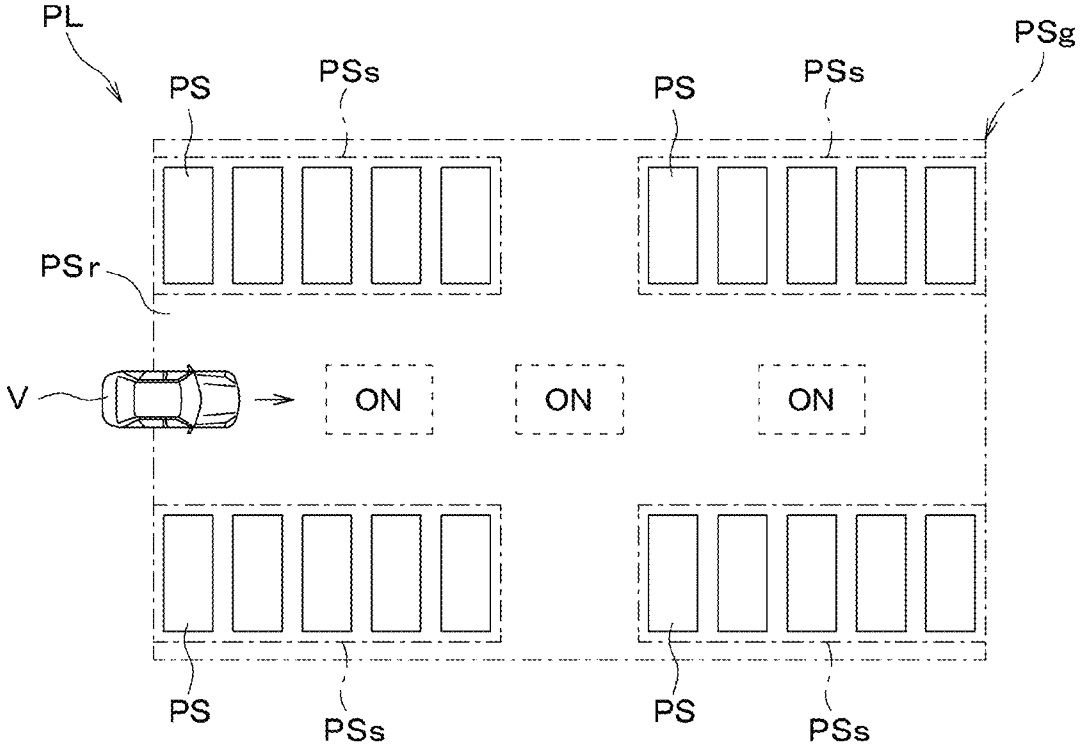

In for example FIGS. 104 to 106, reference character "ON" represents "in-parking determination" that the own vehicle V is located in a parking lot PL, and reference character "OFF" represents "out-of-parking determination" that the own vehicle V is not located in a parking lot PL. The processor 21 of the ninth embodiment is typically programmed to perform the in-parking determination that the own vehicle V is located in a parking lot PL upon determination that the own vehicle V has partly entered the parking region PSg, and the out-of-parking determination that the own vehicle V is not located in a parking lot PL upon determination that the own vehicle V has exited from the parking region PSg.

FIG. 105 illustrates an example situation where at least first and second parking regions PSg are aligned in the traveling direction of the own vehicle V, and the own vehicle V is scheduled to travel through the first and second parking regions PSg. In this example situation, when the own vehicle V has reached a space between the first and second parking regions PSg, the own vehicle V has exited from the first parking region PSg, so that the above in-parking determination should have been temporally switched to the out-of-parking determination. In this example, situation, however, there is a requirement of not switching the above in-parking determination to the out-of-parking determination in the space between the first and second parking regions PSg. That is, in this example situation, it is preferable to maintain the in-parking determination even when the own vehicle V has exited from the first parking region PSg. This makes it possible to achieve an advantageous effect that is the same as a situation illustrated in FIG. 106 that the first parking region is extended in the traveling direction of the own vehicle V, in other words, the first and second parking regions are combined to constitute an extended parking region.

Figure 107:
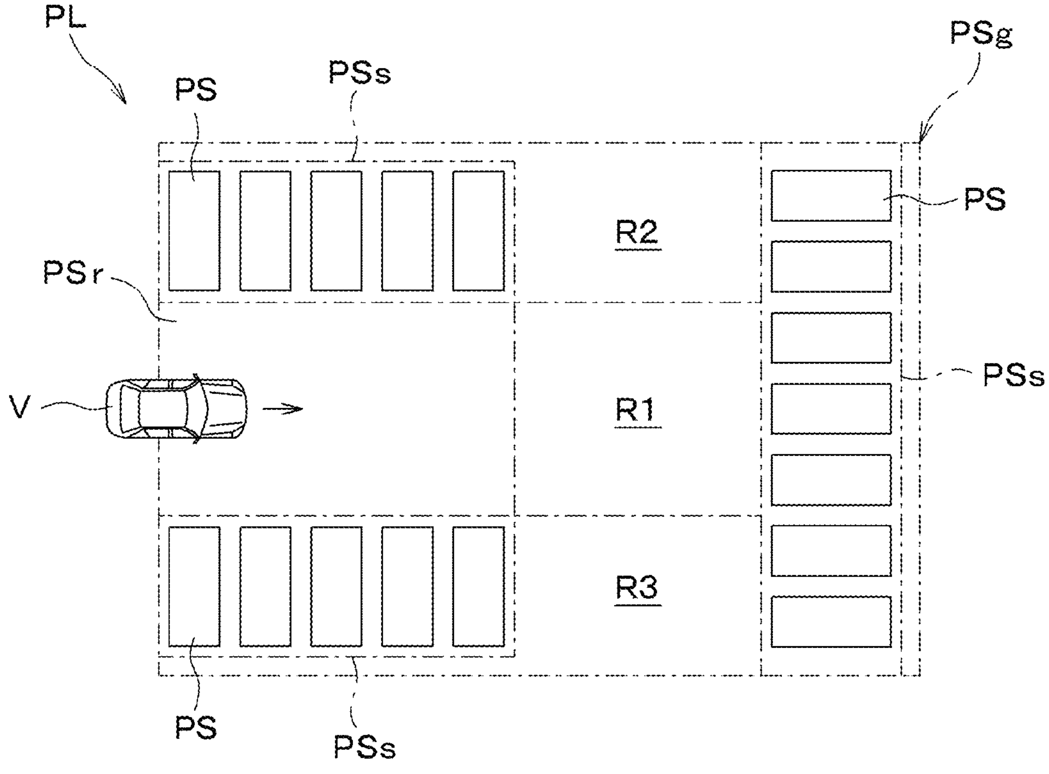

FIG. 107 illustrates a parking region PSg comprised of (i) a T-shaped aisle PSr, (ii) first and second parking-slot trains PSs located on both sides of a leg section of the T-shaped aisle PSr to be in parallel to the traveling direction of the own vehicle V, and (iii) a third parking-slot train PSs located to be separated by a head-section of the T-shaped aisle PSr from the first and second parking-slot trains PSs; the alignment of each of the first and second parking-slot trains PSs, which is parallel to the traveling direction of the own vehicle V, is orthogonal to the alignment of the third parking-slot train PSs, which is orthogonal to the traveling direction of the own vehicle V. At that time, the own vehicle V is traveling in the leg section of the T-shaped aisle PSr between the first and second parking-slot trains PSs.

In this example situation illustrated in FIG. 107, the processor 21 can be programmed to perform the in-parking determination while the own vehicle V is traveling in the T-shaped aisle PSr. Specifically, assuming that the head-section of the T-shaped aisle PSr are partitioned into a first region R1, a second region R2, and a third region R3. The first region R1 is located to be intersect with the traveling course of the own vehicle V. The second region R2 is located on the left side of the first region R1, and indicates left-turn destination. The third region R3 is located on the right side of the first region R1, and indicates right-turn destination. Because the first region R1 is not a high-reliability region sandwiched from both sides by the parking-slot trains PSs, it is preferable to maintain the in-parking determination without switching the in-parking determination to the out-of-parking determination while the own vehicle V is traveling in the first region R1.

Figure 108:
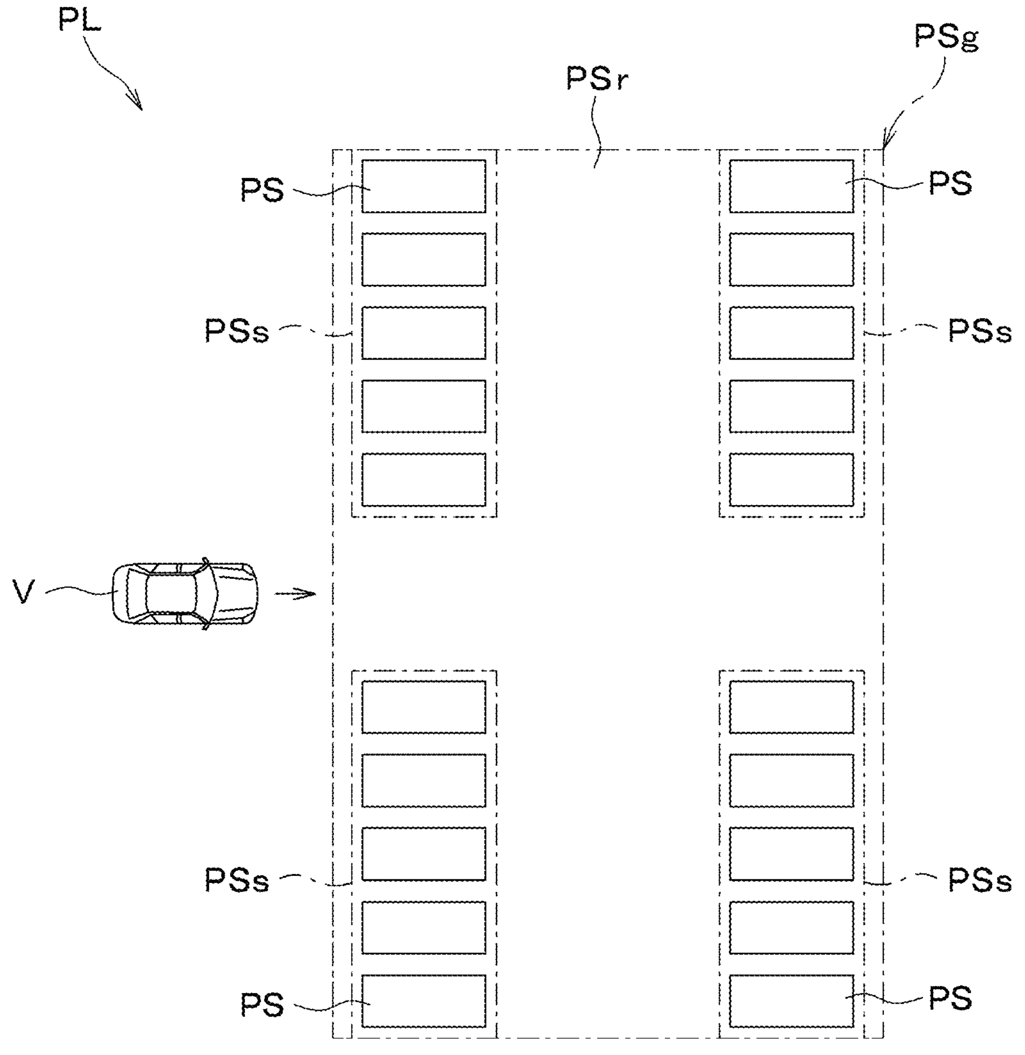

FIG. 108 illustrates a parking region PSg comprised of a cross-shaped aisle PSr and four parking-slot trains PSs arranged such that each section of the cross-shaped aisle PSr is sandwiched by a corresponding pair of parking-slot trains PSs.

Figure 109:
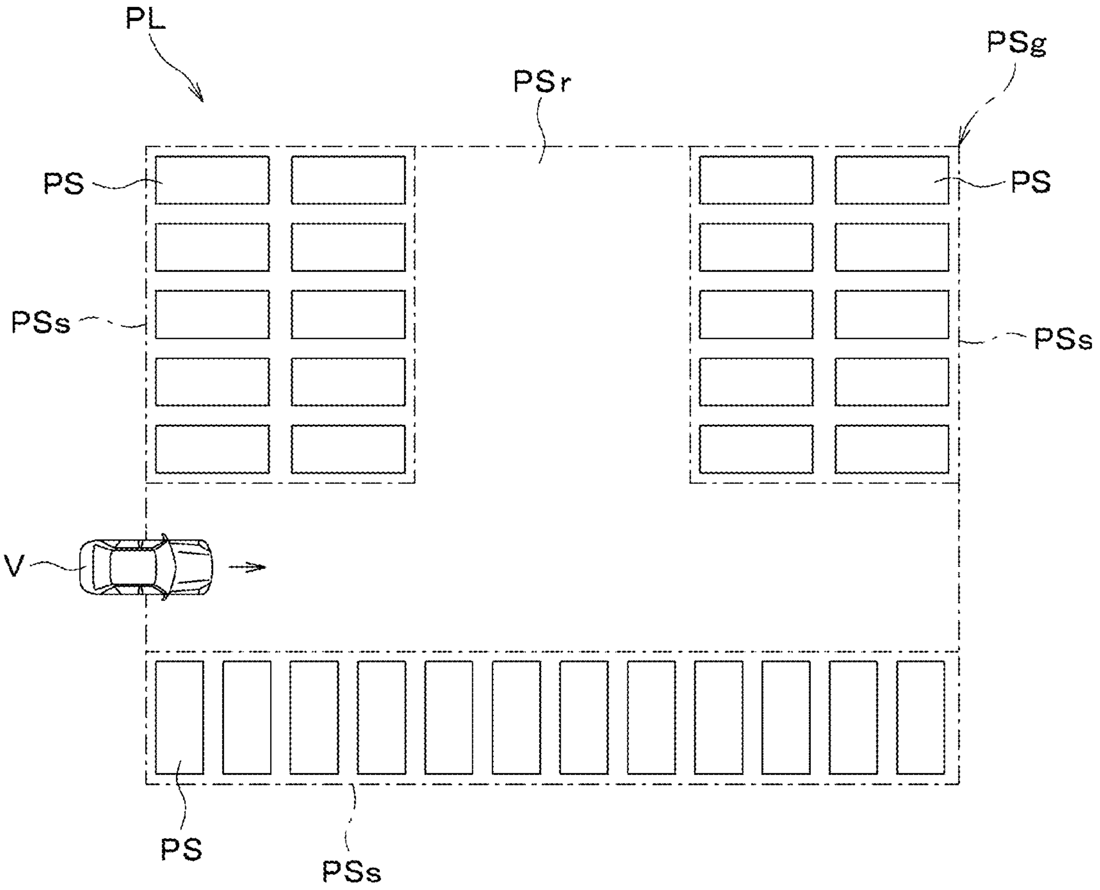

FIG. 109 illustrates a parking region PSg comprised of (i) a T-shaped aisle PSr, (ii) first and second parking-slot trains PSs located on both sides of a leg section of the T-shaped aisle PSr to be in orthogonal to the traveling direction of the own vehicle V, and (iii) a third parking-slot train PSs located to be separated by a head-section of the T-shaped aisle PSr from the first and second parking-slot trains PSs; the alignment of each of the first and second parking-slot trains PSs, which is orthogonal to the traveling direction of the own vehicle V, is orthogonal to the alignment of the third parking-slot train PSs, which is parallel to the traveling direction of the own vehicle V. At that time, the own vehicle V can travel straightforward through the head section of the T-shaped aisle PSr, and turn left from the head section of the T-shaped aisle PSr to the leg section of the T-shaped aisle PSr.

It is preferable to maintain the in-parking determination without switching the in-parking determination to the out-of-parking determination while the own vehicle V is traveling in each of the cross-shaped aisles PSr illustrated in FIG. 108 and the T-shaped aisles PSr illustrated in FIG. 109.

Figure 110:
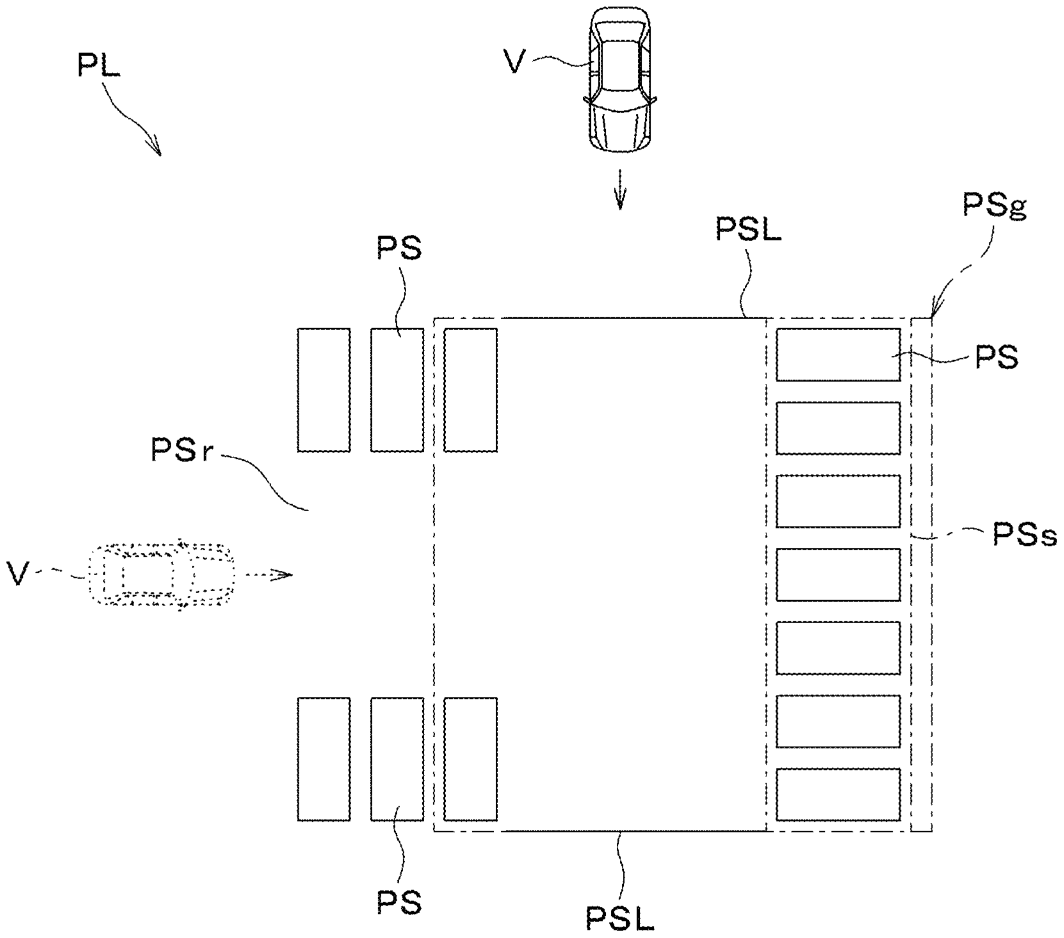

FIG. 110 illustrates, like a parking region PSg illustrated in FIG. 7, a parking region PSg comprised of (i) a T-shaped aisle PSr, (ii) first and second parking-slot trains PSs located on both sides of a leg section of the T-shaped aisle PSr, and (iii) a third parking-slot train PSs located to be separated by a head-section of the T-shaped aisle PSr from the first and second parking-slot trains PSs; the alignment of each of the first and second parking-slot trains PSs is orthogonal to the alignment of the third parking-slot train PSs.

In this situation illustrated in FIG. 110, the processor 21 can be programmed to change one of the in-parking determination and the out-of-parking determination to the other thereof depending on the traveling direction of the own vehicle V toward the parking region PSg. When the own vehicle V is about to enter the leg section of the T-shaped aisle PSr of the parking region PSg (see dashed line in FIG. 110), the parking-slot train PSs comprised of plural parking slots PS is located in front of the own vehicle V while intersecting with the traveling direction of the own vehicle V, i.e., being perpendicular to the traveling direction of the own vehicle V. Such a situation may occur when the own vehicle V waits for a traffic light in a road Rd with three or more traveling lanes each way. For this reason, as compared with a first case where the own vehicle V is entering the head section of the T-shaped aisle PSr from the left side in FIG. 110, a second case where the own vehicle V is entering the head section of the T-shaped aisle PSr from the upper side or lower side in FIG. 110 (see solid line in FIG. 110) has a higher reliability of the own vehicle V being located in the parking lot PL.

For this reason, the processor 21 can be programmed to establish, as illustrated in FIG. 110, (i) a first entrance/exit determination line PSL located at the top end of the head section of the T-shaped aisle PSr, which represents the boundary of the parking region PSg at the upper side of the parking region PSg, and (ii) a second entrance/exit determination line PSL located at the bottom end of the head section of the T-shaped aisle PSr, which represents the boundary of the parking region PSg at the lower side of the parking region PSg. Then, the processor 21 can be programmed to perform the in-parking determination, i.e., perform “ON” determination, that the own vehicle V is located in a parking lot PL upon determination that the own vehicle V has passed through the first or second entrance/exit determination line PSL to enter the parking region PSg. In contrast, the processor 21 can be programmed not to perform the in-parking determination, i.e., not to perform “ON” determination, upon determination that the own vehicle V has not passed through the first or second entrance/exit determination line PSL to enter the parking region PSg (see the dashed line in FIG. 110).

That is, the processor 21 of the ninth embodiment is configured to perform the in-parking determination upon determination that the own vehicle V has entered the parking region PSg from a specified direction, i.e., from the upper direction or the lower direction, and configured not to perform the in-parking determination upon determination that the own vehicle V has entered the parking region PSg from another direction different from the specified direction. This therefore makes it possible to perform the in-parking determination with higher reliability.

Figure 111:
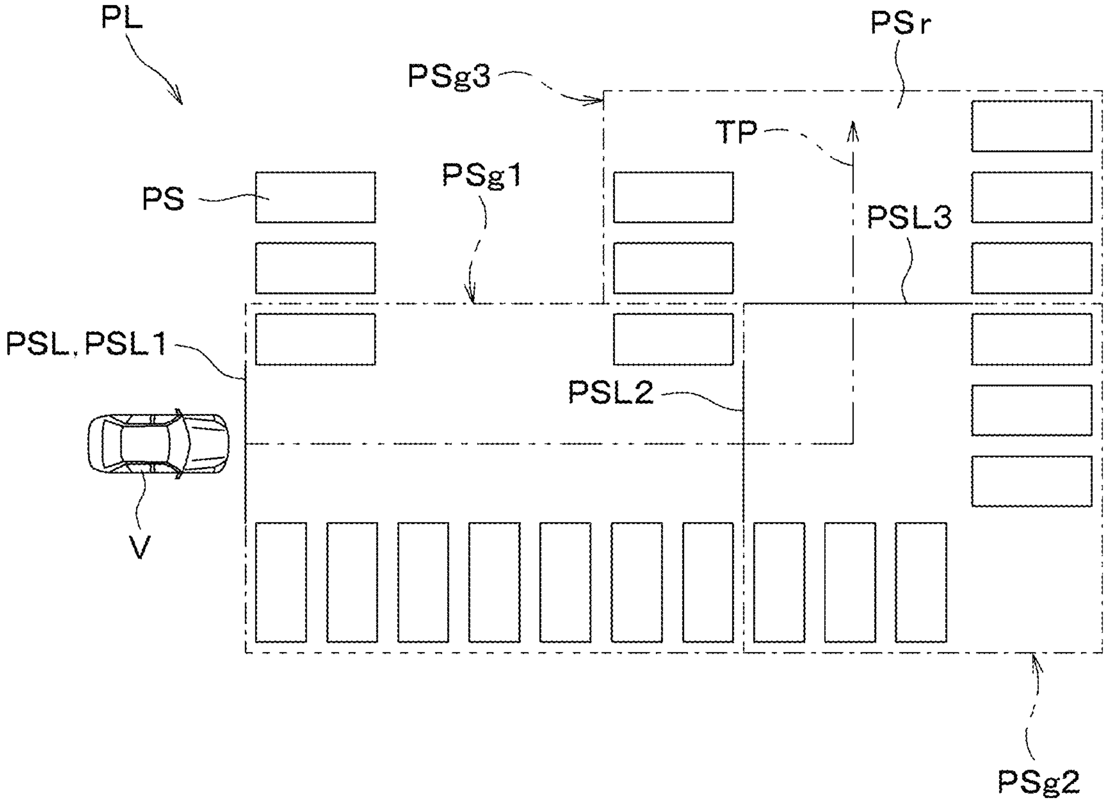

FIG. 111 illustrates a situation where a first parking region PSg1, a second parking region PSg2, and a third parking region PSg3 arranged in this order to form, as a whole, a substantially L shape, and the own vehicle V is about to pass through the first, second, and third parking regions PSg1, PSg2, and PSg3 in this order along a L-shaped scheduled travel route TP. The first parking region PSg1 includes a first-region boundary PSL1 located at an entrance thereof, and a second-region boundary PSL2 represents the boundary between an exit of the first parking region PSg1 and an entrance of the second parking region PSg2. A third-region boundary PSL3 represents the boundary between an exit of the second parking region PSg2 and an entrance of the third parking region PSg3. Because the first, second, and third parking regions PSg1, PSg2, and PSg3 are continuously arranged, the first-region boundary PSL1 serves as an entrance/exit determination line PSL. The processor 21 can be therefore configured to maintain the in-parking determination even when the own vehicle V is passing through the second-region boundary PSL2 or the third-region boundary PSL3.

Figure 112:
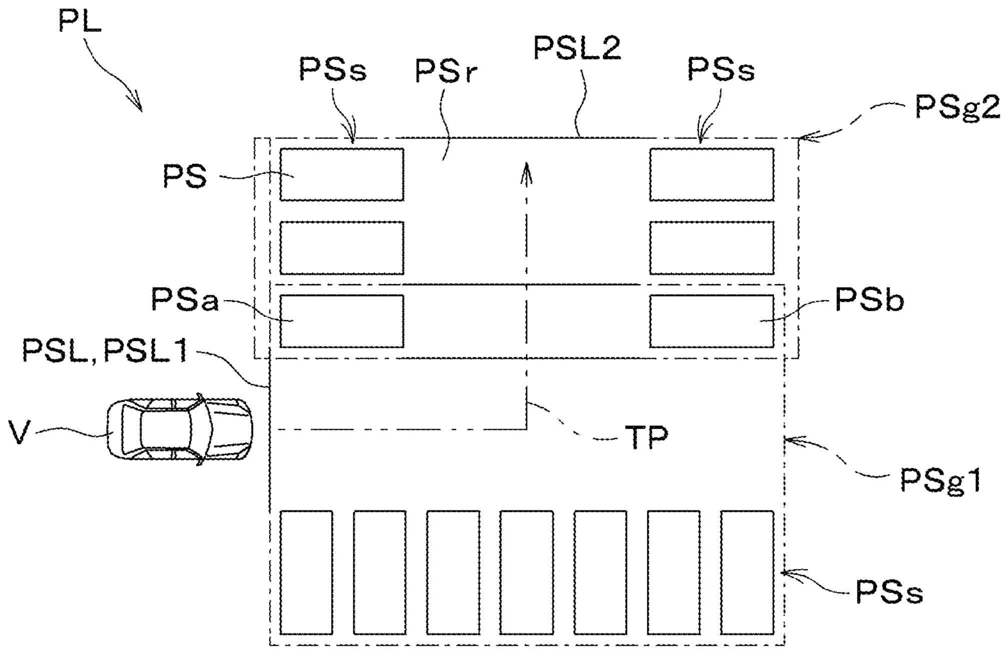

FIG. 112 illustrates a situation where the own vehicle V is scheduled to enter a T-shaped aisle PSr in which the own vehicle V can travel straight forward or turn left.

In FIG. 112, rectangular parking slots PSa and PSb are located on the left side of a head section of the T-shaped aisle PSr such that they are separated from one another through a leg section of the T-shaped aisle PSr and their long sides are parallel to the straight-forward direction of the own vehicle V. Additionally, a side-by-side parking-slot train PSs is located at the right side of the head section of the T-shaped aisle PSr. This therefore results in a first parking region PSg1 being constituted by the head section of the T-shaped aisle PSr and the parking slots PSa and PSb located on the left side of the head section of the T-shaped aisle PSr.

Additionally, in FIG. 112, first and second parking-slot trains PSs are located on both sides of a leg-section of the T-shaped aisle PSr, resulting in a second parking region PSg2 being constituted by the leg section of the T-shaped aisle PSr and the first and second parking-slot trains PSs located on both sides of the leg section of the T-shaped aisle PSr.

That is, as illustrated in FIG. 112, the first parking region PSg1 and the second parking region PSg2 are partially overlapped with one another. The first parking region PSg1 has an entrance through which the own vehicle V can pass to enter the first parking region PSg1, so that the entrance of the first parking region PSg1 serves as a first region boundary PSL1. The second parking region PSg2 has an exit through which the own vehicle V can pass to exit from the second parking region PSg2, so that the exit of the second parking region PSg2 serves as a second region boundary PSL2. That is, each of the first and second region boundaries PSL1 and PSL2 serves as an entrance/exit determination line PSL. This enables, even then the own vehicle V is passing through boundaries between the overlapped portions of the first and second parking regions PSg1 and PSg2, the processor 21 to maintain the in-parking determination.

Figure 113:
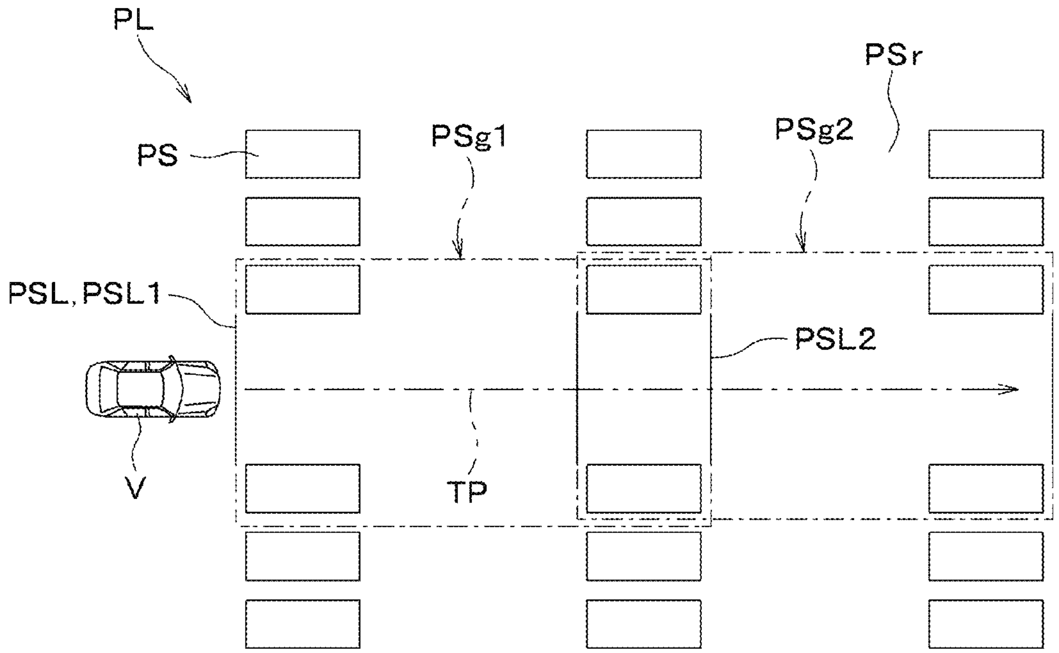

FIG. 113 illustrates a situation where the own vehicle V traveling straight forward is about to pass through a first parking region PSg1 and a second parking region PSg2 that are continuously arranged in the traveling direction of the own vehicle V with their parts overlapped. The first parking region PSg1 has an entrance through which the own vehicle V can pass to enter the first parking region PSg1, so that the entrance of the first parking region PSg1 serves as a first region boundary PSL1, i.e., an entrance/exit determination line PSL. The first parking region PSg1 also has an exit, and the exit of the first parking region PSg1 serves as a second region boundary PSL2. Because the second region boundary PSL2 is located in the second parking region PSg2, the exit of the first parking region PSg1, i.e., the second region boundary PSL2 of the first parking region PSg1 does not serve as an entrance/exit determination line PSL. This enables, even then the own vehicle V is passing through the second region boundary PSL2 of the first parking region PSg1, the processor 21 to maintain the in-parking determination.

Accelerator-Misoperation Addressing Routine

Figure 114:
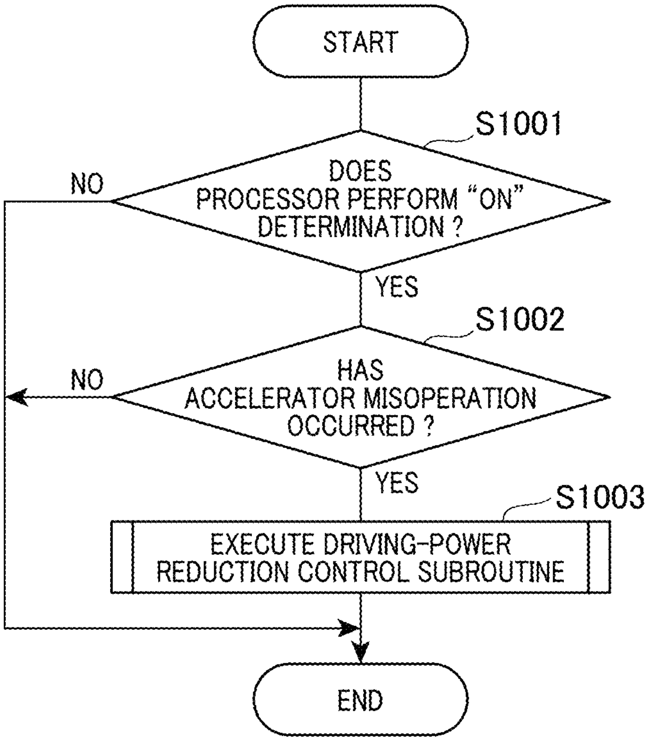
FIG. 114 is a flowchart schematically illustrating an accelerator-misoperation addressing routine according to the ninth embodiment.
Figure 115:
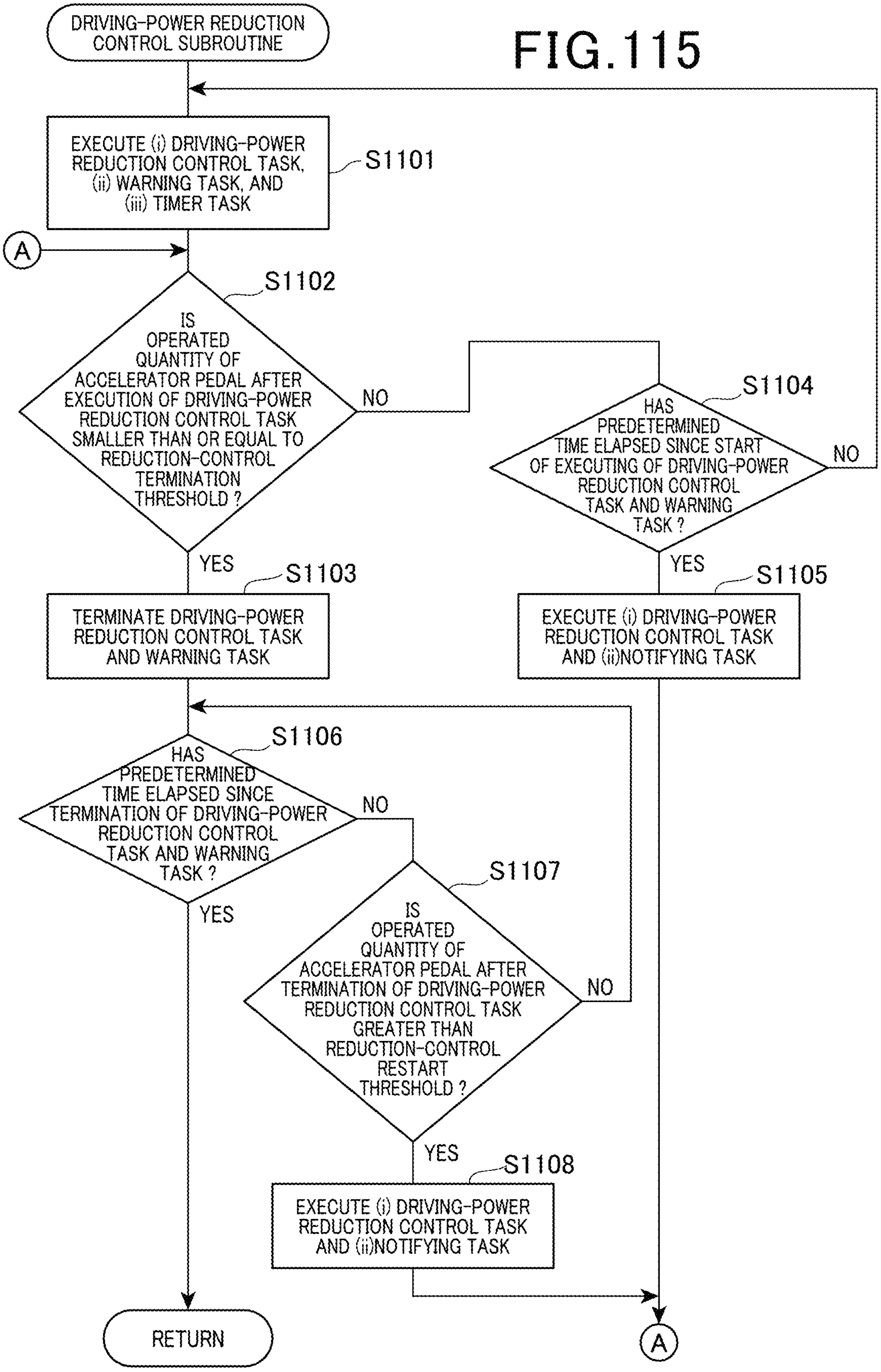
FIG. 115 is a flowchart schematically illustrating a driving-power reduction control subroutine illustrated in step S1003 of FIG. 114.

The processor 21 of the ninth embodiment can be configured to perform, under determination that the own vehicle V is located in a parking lot PL, an accelerator-misoperation addressing routine, which includes a driving-power reduction control task of the own vehicle V and/or an accelerator-misoperation notifying task, to accordingly prevent sudden acceleration of the own vehicle V under determination that the own vehicle V is located in a parking lot PL. FIGS. 114 and 115 illustrates an example of the accelerator-misoperation addressing routine according to the ninth embodiment. The processor 21 can be programmed to perform the accelerator-misoperation addressing routine illustrated in FIG. 114 every predetermined period of, for example, 100 msec under a predetermined execution condition being satisfied. The execution condition can include, for example, the current shift position of the shift lever being set to the forward position or the reverse position.

Referring to FIG. 114, when starting the accelerator-misoperation addressing routine, the processor 21 determines whether the processor 21 performs the in-parking determination, i.e., perform "ON" determination, representing that the own vehicle V is located in a parking lot PL in step S1001. Upon determination that the processor 21 performs the in-parking determination so that the own vehicle V is located in a parking lot PL (YES in step S1001), the accelerator-misoperation addressing routine proceeds to step S1002. Otherwise, upon determination that the processor 21 performs the out-parking determination, i.e., perform "ON" determination, representing that the own vehicle V is not located in a parking lot PL, the processor 21 temporally terminates the accelerator-misoperation addressing routine while skipping the operations in steps S1002 and S1003.

In step S1002, the processor 21 determines whether an accelerator misoperation has occurred. Specifically, the processor 21 determines whether all the following first to fifth conditions are satisfied, and determines that an accelerator misoperation has occurred (YES in step S1002) upon determination that all the following first to fifth conditions are satisfied. In contrast, the processor 21 determines that an accelerator misoperation has not occurred (NO in step S1002) upon determination that at least one of the first to fifth conditions is unsatisfied.

The first condition is that the speed of the own vehicle V is less than a predetermined threshold speed.

The second condition is that an operated quantity of the accelerator pedal of the own vehicle V is more than or equal to a predetermined acceleration-quantity threshold.

The third condition is that an operated speed of the accelerator pedal of the own vehicle V is more than or equal to a predetermined acceleration-operation speed threshold.

The fourth condition is that no brake-pedal operation is carried out.

The fifth condition is that no blinker switch 382 is operated.

Upon determination that an accelerator misoperation has occurred (YES in step S1002), the accelerator-misoperation addressing routine proceeds to step S1003. In step S1003, the processor 21 executes a driving-power reduction control subroutine illustrated in FIG. 115 described later. Otherwise, upon determination that an accelerator misoperation has not occurred (NO in step S1002), the processor 21 temporally terminates the accelerator-misoperation addressing routine while skipping the operation in step S1003.

The following describes the driving-power reduction control subroutine in step S1003 with reference to FIG. 115.

When starting the driving-power reduction control subroutine, the processor 21 executes (i) a driving-power reduction control task, (ii) a strong notifying task, i.e., a warning task, of warning, to the one or more occupants in the own vehicle V, the occurrence of an accelerator misoperation, and (iii) a timer task that starts counting of time from an initial value of 0 in response to execution of the driving-power reduction control task and the warning task in step S1101. For example, the processor 21 instructs the drive ECU 911 to control the driving mechanism 912 to accordingly reduce the drive power generated thereby that causes the system-installed vehicle V to travel.

Next, the processor 21 determines whether the operated quantity of the accelerator pedal of the own vehicle V after execution of the driving-power reduction control task and the waring task in step S1101 is smaller than or equal to a predetermined reduction-control termination threshold in step S1102. Upon determination that the operated quantity of the accelerator pedal of the own vehicle V has been smaller than or equal to the predetermined reduction-control termination threshold (YES in step S1102), the driving-power reduction control subroutine proceeds to step S1103. In step S1103, the processor 21 temporally terminates the driving-power reduction control task and the waring task, resets the counted time to the initial value, and starts again counting of time in response to termination of the driving-power reduction control task and the warning task. After the operation in step S103, the driving-power reduction control subroutine proceeds to step S1106.

Otherwise, upon determination that the operated quantity of the accelerator pedal of the own vehicle V has not been smaller than or equal to the predetermined reduction-control termination threshold (NO in step S1102), the driving-power reduction control subroutine proceeds to step S1104.

In step S1104, the processor 21 determines, based on the counted time, whether a predetermined time has elapsed since the start of executing the driving-power reduction control task and the waring task. Upon determination that the predetermined time has not elapsed since the start of executing the driving-power reduction control task and the waring task (NO in step S1104), the processor 21 returns to the operation in step S1101, and continues execution of the driving-power reduction control task, the waring task and counting operation, and the timer task. Otherwise, upon determination that the predetermined time has elapsed since execution of the driving-power reduction control task and the waring task (YES in step S1104), the processor 21 determines that an accelerator-pedal operation determined as the accelerator misoperation in step S1002 has a possibility of being a driver's intentional operation. Then, the processor 21 executes the driving-power reduction control task and a weak notifying task of notifying the one or more occupants in the own vehicle V of the occurrence of an accelerator misoperation in a lower-priority manner as compared with the warning task in step S1105. Thereafter, the processor 21 returns to step S1102 and executes the operation in step S1102.

In step S1106, the processor 21 determines, based on the counted time, whether a predetermined time has elapsed since termination of the driving-power reduction control task and the waring task. Upon determination that the predetermined time has not elapsed since termination of the driving-power reduction control task and the waring task (NO in step S1106), the driving-power reduction control subroutine proceeds to step S1107. Otherwise, upon determination that the predetermined time has elapsed since termination of the driving-power reduction control task and the waring task (YES in step S1106), the processor 21 resets the counted time to the initial value and temporally terminates the driving-power reduction control task and the waring task.

In step S1107, the processor 21 determines whether the operated quantity of the accelerator pedal of the own vehicle V after termination of the driving-power reduction control task and the waring task in step S1103 is greater than a predetermined reduction-control restart threshold. Upon determination that the operated quantity of the accelerator pedal of the own vehicle V has been smaller than or equal to the predetermined reduction-control restart threshold (NO in step S1107), the processor 21 returns to step S1106 and executes the operation in step S1106.

Otherwise, upon determination that the operated quantity of the accelerator pedal of the own vehicle V has been greater than the predetermined reduction-control restart threshold (YES in step S1107), the driving-power reduction control subroutine proceeds to step S1108.

In step S1108, the processor 21 executes the driving-power reduction control task and a weak notifying task of notifying the one or more occupants in the own vehicle V of the occurrence of an accelerator misoperation in a lower-priority manner as compared with the warning task. The lower-priority manner in step S1108 can be identical to or different from that in step S1105. Thereafter, the processor 21 returns to step S1102 and executes the operation in step S1102.

As described above, the processor 21 of the ninth embodiment is configured to determine (see step S1104) whether an accelerator operation has been continued for the predetermined time after execution of the task (see step S1101) of addressing the occurrence of the accelerator misoperation, and executes, again, the task (see step S1105) of addressing the occurrence of the accelerator misoperation upon determination that the accelerator operation has been continued for the predetermined time after execution of the task (see NO in step S1102 and YES in step S1104). Additionally, the processor 21 of the ninth embodiment is configured to determine (see step S1107) whether a new accelerator misoperation has occurred after the previous accelerator misoperation has been cancelled, and executes, again, the task (see step S1108) of addressing the occurrence of the new accelerator misoperation upon determination that the new accelerator operation has occurred after the previous accelerator misoperation has been cancelled.

Accordingly, the processor 21 of the ninth embodiment makes it possible to perform fine-grained control in response to the occurrence of accelerator misoperations.

Parking Assist Routine

Figure 116:
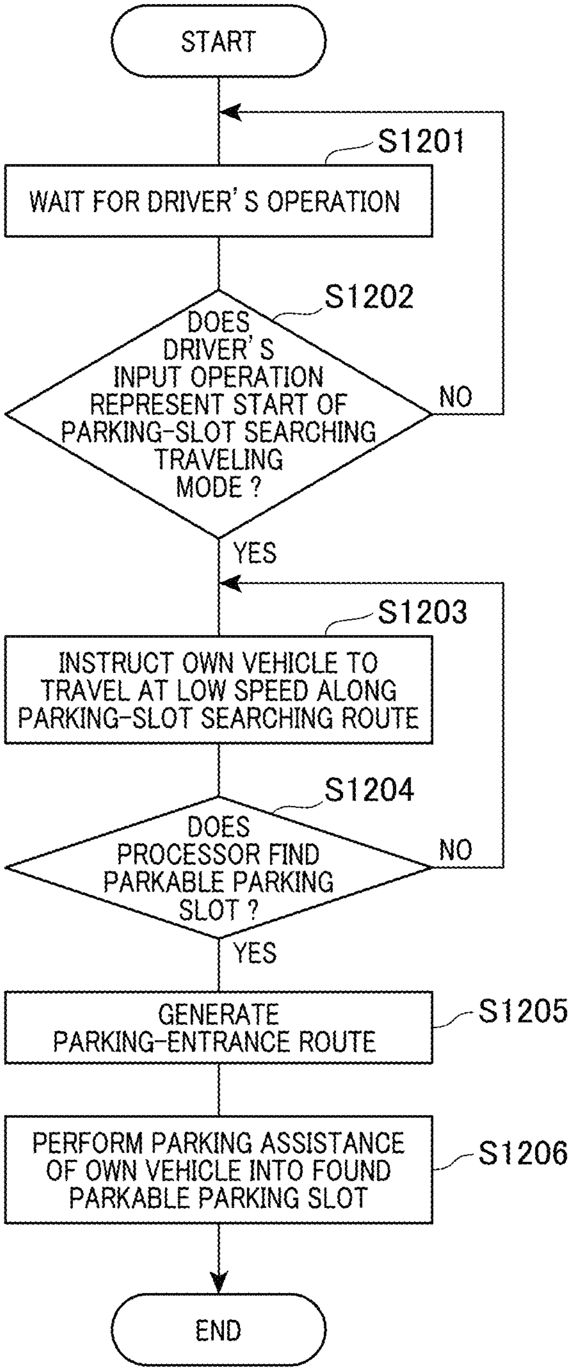
FIG. 116 is a flowchart schematically illustrating a routine for assisting traveling of the own vehicle to a selected target parking slot during parking assistance according to the ninth embodiment.
Figure 117:
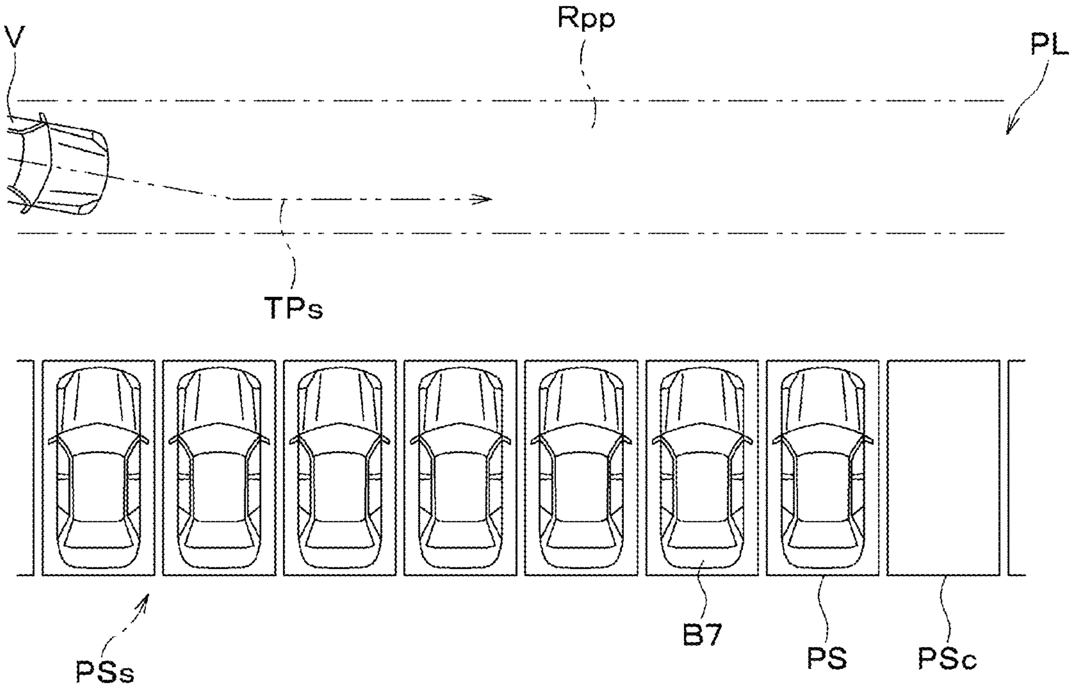
FIG. 117 is a plan view schematically illustrating a parking-slot searching route illustrated in step S1203 of FIG. 116.
Figure 118:
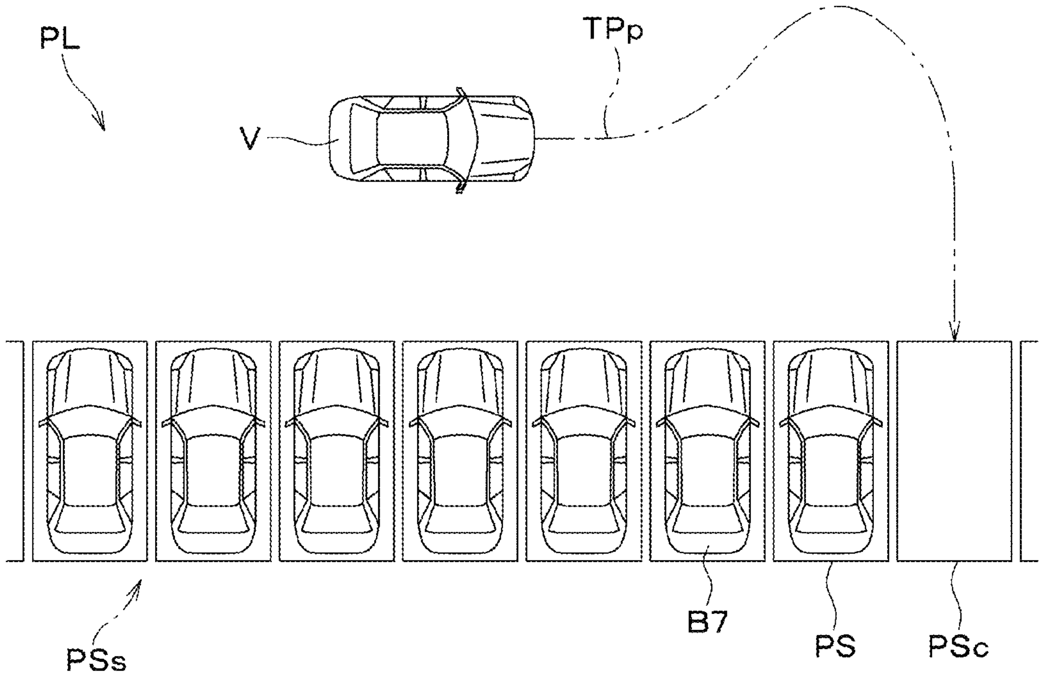
FIG. 118 is a plan view schematically illustrating a parking-entrance route generating operation illustrated in step S1205 of FIG. 116.

The following describes a routine for assisting or controlling traveling of the own vehicle V to a selected target parking slot PS where the own vehicle V is parkable during parking assistance and/or automatic parking with reference to FIGS. 116 to 118. Specifically, the processor 21 of the ninth embodiment is configured to generate a parking entrance route TPp for the own vehicle V from the current position of the own vehicle V into the selected target parking slot PS upon determination that the own vehicle V is located in a parking lot PL. The following describes mainly the routine for assisting traveling of the own vehicle V to the selected target parking slot PS during parking assistance with reference to FIGS. 116 to 118, but the processor 21 can be configured to execute the routine for controlling traveling of the own vehicle V to the selected target parking slot PS during automatic parking in the same approach as the routine for assisting traveling of the own vehicle V.

FIG. 116 schematically illustrates the routine for assisting traveling of the own vehicle V to the selected target parking slot PS during parking assistance. The processor 21 can be programmed to start the routine in response to determination that the processor 21 performs the in-parking determination, i.e., performs "ON" determination, representing that the own vehicle V is located in a parking lot PL in, for example, step S1001.

When starting the routine illustrated in FIG. 116, the processor 21 waits for any operation of the driver D of the own vehicle V through, for example, through the HMI system 7 in step S1201. In response to receiving a driver's input operation, the processor 21 determines whether the driver's input operation represents a start of a parking-slot searching traveling mode in step S1202. The parking-slot searching traveling mode represents a control mode in which the processor 21 instructs, through the driving ECU 911 and the driving mechanism 912, the own vehicle V to travel at a low speed in the parking lot PL for searching for a target parkable parking slot PSc in one or more empty parking slots PS included in the parking lot PL.

Upon determination that the driver's input operation does not represent the start of the parking-slot searching traveling mode (NO in step S1202), the processor 21 iterates the determination in step S1201. Otherwise, upon determination that the driver's input operation represents the start of the parking-slot searching traveling mode (YES in step S1202), the routine proceeds to step S1203.

In step S1203, the processor 21 calculates a parking-slot searching route TPs that is a traveling route for the own vehicle V during the parking-slot searching traveling mode such that the parking-slot searching route TPs is within a parking-assistance allowable range Rpp (see FIG. 117). The parking-assistance allowable range Rpp represents a zonal range or region defined along a detected parking-slot train PSs. The parking-assistance allowable range Rpp is separated to be within a predetermined range from the detected parking-slot train PSs. The parking-assistance allowable range Rpp is specifically defined to enable, if there is a target parkable parking slot PSc in the detected parking-slot train PSs, the own vehicle V to be effortlessly guided to the target parkable parking slot PSc therethrough.

Then, the processor 21 instructs, through the driving ECU 911 and the driving mechanism 912, the own vehicle V to travel at the low speed along the parking-slot searching route TPs in step S1203.

Following the operation in step S1203, the processor 21 determines, while the own vehicle V is traveling along the parking-slot searching route TPs, whether the processor 21 finds an empty space, i.e., a parkable parking slot PSc, in the detected parking-slot train PSs in step S1204. The processor 21 iterates the determination, i.e., continuously performs searching of a parkable parking slot PSc in step S1204 until the processor 21 does not find a parkable parking slot PSc in the detected parking-slot train PSs, i.e., continuously performs searching of a parkable parking slot PSc (NO in step S1204).

Otherwise, upon determination that the processor 21 finds a parkable parking slot PSc in the detected parking-slot train PSs (YES in step S1204), the routine proceeds to step S1205.

In step S1205, the processor 21 generates, as illustrated in FIG. 118, the parking-entrance route TPp for the own vehicle V from the current position of the own vehicle V into the found parkable parking slot PS. Then, the processor 21 instructs the HMI system 7, the drive system 91, the shift system 92, the brake system 93, and/or the steering system 94 to perform parking assistance of the own vehicle V into the found parkable parking slot PS along the generated parking-entrance route TPp in step S1206.

Modifications

While the first to ninth embodiments of the present disclosure have been described above, the present disclosure is not limited to the above embodiments. Specifically, the present disclosure includes various modifications and/or alternatives of the embodiments within the scope of the present disclosure.

The following describes typical modifications of the embodiments. In particular, the following describes mainly the different points of each typical modification as compared with the above embodiments. In the typical modifications, to the same parts or equivalent parts of at least one of the embodiments, like reference characters are assigned, so that, as the descriptions of each of the same or equivalent parts of the typical modifications, the descriptions of the corresponding one of the same or equivalent parts of the at least one of the embodiments can be employed unless technical contradiction occurs or unless otherwise specified.

The present disclosure is not limited to specific structures described in the embodiments. For example, the shape and/or the configuration of the body V1 of the system-installed vehicle V are not limited to a boxed shape, i.e., a substantially rectangular shape in plan view. The body panel V15 can be configured not to cover the top of the interior V2 or a part of the body panel V15, which covers the top of the interior V2, can be removable. No limitation can be applied to the various applications of the system-installed vehicle V, the location of each of the driver's seat V23 and the steering wheel V24, and the number of occupants in the system-installed vehicle V.

The definition of autonomous driving, the driving levels of the autonomous driving, and various categories of the autonomous driving according to the embodiments are defined in the SAE J2016 standard, but the present disclosure is not limited thereto.

Specifically, the autonomous driving in each of the SAE levels 3 to 5 represents that the vehicular system 1 serves as the autonomous driving system to execute all dynamic driving tasks in the corresponding one of the SAE levels 3 to 5. For this reason, the above definition of the autonomous driving according to the embodiments naturally includes no driver's requirement for monitoring the traffic environment around the own vehicle V. The present disclosure is not limited to the above definition.

Specifically, the definition of the autonomous driving can include not only the autonomous driving with no driver's requirement for monitoring the traffic environment around the own vehicle V, but also the autonomous driving with driver's requirement for monitoring the traffic environment around the own vehicle V. For example, hands-off driving according to the embodiments can be interpreted as the autonomous driving with driver's requirement for monitoring the traffic environment around the own vehicle V. The concept of the autonomous driving with driver's requirement for monitoring the traffic environment around the own vehicle V can include partial autonomous driving in which the driver D executes a part of the dynamic driving tasks, such as the task of monitoring the traffic environment around the own vehicle V. The partial autonomous driving can be evaluated to be substantially synonymous with the advanced driving assistance. The road traffic system of each country can have limitations on types of the autonomous driving and/or conditions, such as autonomous-driving executable roads, allowable traveling speed ranges for the autonomous driving, and lane-change enabling/disabling. For this reason, the specifications of the present disclosure can be modified to be in conformity with the road traffic system of each country.

The configuration of the vehicular system 1 according to the present disclosure is not limited to that of the vehicular system 1 of each embodiment described above.

For example, the number of ADAS sensors 31, 32, 33, and 34 and the location of each of the ADAS sensors 31, 32, 33, and 34 can be freely determined. For example, the number of relatively expensive radar sensor 32 and laser-radar sensors 33 can be reduced as small as possible, thus contributing to earlier proliferation of autonomous vehicles. The radar sensor 32 and laser-radar sensors 33 can be eliminated.

The locator 39 according to the present disclosure is not limited to the above configuration that includes the inertia detector 392. Specifically, the locator 38 according to the present disclosure can be configured not to include the inertia detector 392 and can be configured to receive (i) the linear accelerations measured by an acceleration sensor provided outside the locator 39 as one of the behavior sensors 36 and (ii) the angular velocities measured by an angular velocity sensor provided outside the locator 39 as one of the behavior sensors 36. The locator 39 can be integrated with the HD map database 5. The locator 39 is not limited to a POSLV system manufactured by Applanix Corporation.

The navigation system 6 can be communicably connected to the HMI system 7 through a subnetwork different from the vehicular communication network 10. The navigation system 6 can include a screen for displaying only navigation images, which is a separate member from the HMI system 7. Alternatively, the navigation system 6 can constitute a part of the HMI system 7. For example, the navigation system 6 can be integrated with the main display device 703.

The HMI system 7 according to the present disclosure is not limited to the above configuration that includes the meter panel 702, the main display device 703, and the head-up display 704. Specifically, the HMI system 7 can be configured to include a single display device, such as a liquid-crystal display device or an organic EL display device, that serves as both the meter panel 702 and the main display device 703. In this modification, the meter panel 702 can be designed as a part of a display region of the single display device. Specifically, the meter panel 702 can be comprised of a graphical tachometer, a graphic tachometer, a graphic speed meter, and a graphic water temperature gauge, each of which is comprised of an image of bezel, an image of scale on the image of bezel, and an image of indicator needle on the image of bezel.

The HMI system 7 can be configured not to include the head-up display 704.

Each ECU according to each embodiment is configured as a vehicular microcomputer comprised of, for example, a CPU and/or an MPU, but the present disclosure is not limited thereto.

Specifically, a part or the whole of each ECU can be configured as one or more digital circuits, such as one or more application specific integrated circuits (ASICs) or one or more field-programmable gate-array (FPGA) processors. That is, each ECU can be concurrently comprised of one or more vehicular microcomputers and one or more digital circuits.

The computer programs, i.e., computer-program instructions, described in each embodiment, which cause the processor 21 to execute various operations, tasks, and/or procedures set forth above, can be downloaded into the memory device 22 or upgraded using vehicle-to-everything (V2X) communications through the vehicular communication module 4. The computer-program instructions can be downloaded and/or upgraded through terminals; the terminals are provided in, for example, a manufacturing factor of the own vehicle V, a garage, or an authorized distributor. The computer programs can be stored in a memory card, an optical disk, or a magnetic disk, accessible to the processor 21 which can read out. That is, the memory card, optical disk, or magnetic disk can serve as the memory device 22.

The functional configurations and methods described in the present disclosure can be implemented by a dedicated computer including a memory and a processor programmed to perform one or more functions embodied by one or more computer programs.

The functional configurations and methods described in the present disclosure can also be implemented by a dedicated computer including a processor comprised of one or more dedicated hardware logic circuits.

The functional configurations and methods described in the present disclosure can further be implemented by a processor system comprised of a memory, a processor programmed to perform one or more functions embodied by one or more computer programs, and one or more hardware logic circuits.

The one or more computer programs can be stored in a non-transitory storage medium as instructions to be carried out by a computer or a processor. The functional configurations and methods described in the present disclosure can be implemented as one or more computer programs or a non-transitory storage medium that stores these one or more computer programs.

The present disclosure is not limited to the specific operations and/or the specific processes described in the above embodiments. For example, the specification and figures are described on the premise that the drivers keep to the left side of the road that should be in conformity with the Japanese Road Traffic Laws/Regulations, but the present disclosure is not limited thereto. Specifically, the specification and figures of the present disclosure can be modified in accordance with the premise that the drivers keep to the right side of the road that should be in conformity with the other country's Road Traffic Laws/Regulations, such as the US Road Traffic Laws/Regulations. In this modification, some figures, which include, for example, FIGS. 10 and 18, should be flipped horizontally, and the descriptions corresponding to the figures should be changed in accordance with the flipped figures. The colors and/or the line types of the road marking lines B43, which have been described on the premise that the drivers keep to the left side of the road that should be in conformity with the Japanese Road Traffic Laws/Regulations, can be similarly modified to be in conformity with the other country's Road Traffic Laws/Regulations, such as the US Road Traffic Laws/Regulations.

The image information storage 2204 can have stored many target images GS, each of which is a bird's-eye view image. This modification enables the bird's-eye view image generator 2211 to be eliminated from the annotation information generator 2201, and the bird's-eye view image generator 2221 to be eliminated from the learning unit 2202.

The parking-slot annotation code Ea according to each embodiment is configured to be generated by the parking-slot training unit 2222, but the present disclosure is not limited thereto. Specifically, the parking-slot annotation code Ea according to the present disclosure can be configured to be generated by the parking-slot annotation generator 2213.

In the ninth embodiment, the parking region PSg is typically acquired under a condition that there is an aisle PSr and parking-slot trains PSs are located at both sides of the aisle PSr. This is because a situation where parking-slot trains PSs are located on both sides of an aisle PSr in which the own vehicle V is traveling has the highest reliability that the own vehicle V is located in a parking lot PL. The present disclosure is however not limited to the above. Specifically, in the example illustrated in each of FIGS. 105 and 106, even if there is no parking-slot train PSs located at the bottom right of the corresponding one of FIGS. 105 and 106, the parking region PSg can be acquired in the same manner as a case where the parking-slot train PSs is located at the bottom right of the corresponding one of FIGS. 105 and 106.

Similar expressions, such as "obtaining", "calculation", "estimation", "detection", and "determination", can be mutually substituted for one another unless the substitution produces technological inconsistency. The expression that A is more than (greater than or other similar expressions) or equal to B, and the expression that A is more than B can be substituted for one another unless the substitution produces technological inconsistency. Similarly, the expression that A is less than (smaller than or other similar expressions) or equal to B, and the expression that A is less than B can be substituted for one another unless the substitution produces technological inconsistency.

One or more components in each embodiment are not necessarily essential components except for (i) one or more components that are described as one or more essential components or (ii) one or more components that are essential in principle.

Specific values disclosed in each embodiment, each of which represents the number of components, a physical quantity, and/or a range of a physical parameter, are not limited thereto except that (i) the specific values are obviously essential or (ii) the specific values are essential in principle.

The specific structure and direction of each component described in each embodiment are not limited thereto except for cases in which (1) the specific structure and direction are described to be essential or (2) the specific structure and direction are required in principle. Additionally, the specific structural or functional relationship between components described in each embodiment is not limited thereto except for cases in which (1) the specific structural or functional relationship is described to be essential or (2) the specific structural or functional relationship is required in principle.

Modifications of the present disclosure are not limited to those described set forth above. For example, specific examples described set forth above can be combined with each other unless the combination produces technological inconsistency, and similarly the modifications set forth above can be combined with each other unless the combination produces technological inconsistency. At least part of at least one of the embodiments can be combined with at least part of the modifications set forth above unless the combination produces technological inconsistency. The present disclosure includes the following first to twelfth technological-concept groups.

First Technological-Concept Group (A1)

[A1-1]

A first aspect of the first technological-concept group is an apparatus (2) for learning a recognition rule of at least one parking slot around a vehicle (V). The apparatus include a memory device (22) storing learning program instructions, and a processor (21) configured to execute the learning program instructions to accordingly objectify at least one parking slot at least partly included in a learning image as an at least one objectified parking slot comprised of (i) a plurality of corner points (BP) of the at least one parking slot, (ii) a center point (BPC) of the at least one parking slot; and (iii) attribute information on the at least one parking slot. The processor (21) is configured to execute the learning program instructions to generate annotation data for the objectified at least one parking slot, and execute, from the learning image, learning of a recognition rule of the at least one parking slot based on the generated annotation data for the objectified at least one parking slot.

[A1-2]

A second aspect of the first technological-concept group, which depends from the first aspect, is that the attribute information includes parking-frame information related to a parking frame (B5) of the at least one parking slot.

[A1-3]

A third aspect of the first technological-concept group, which depends from the first or second aspect, is that the attribute information includes wheel-stopper information on a wheel stopper (B6) located in the at least one parking slot.

[A1-4]

A fourth aspect of the first technological-concept group, which depends from any one of the first to third aspects, is that the attribute information includes additional attribute information related to the at least one parking slot, the additional attribute information being different from the parking-frame information and the wheel-stopper information.

[A1-5] A fifth aspect of the first technological-concept group, which depends from any one of the first to fourth aspects, is that the at least one parking slot includes a plurality of parking slots. The processor is configured to calculate the number of one or more of the corner points of at least one of the parking slots, the one or more of the corner points of the at least one of the parking slots being blocked by at least one object (B7) other than each of the parking slots. The processor is configured to execute the learning program instructions not to learn the recognition rule of the at least one of the parking slots based on the generated annotation data for the objectified at least one of the parking slots upon determination that the number of the one or more of the corner points of the at least one of the parking slots is more than or equal to a predetermined threshold number.

[A1-6]

A sixth aspect of the first technological-concept group, which depends from any one of the first to fifth aspects, is that the processor is configured to (I) Determine whether one or two of the corner points are located outside the learning image (II) Offset, upon determination that the one or two of the corner points are located outside the learning image, the one or two of the corner points into the learning image (III) Execute, from the learning image, the learning of the recognition rule of the at least one parking slot based on the generated annotation data for the objectified at least one parking slot after offsetting of the one or two of the corner points into the learning image

[A1-7]

A seventh aspect of the first technological-concept group, which depends from the sixth aspect, is that the processor is configured to offset the one or two of the corner points into the learning image in a predetermined offset direction, the predetermined offset direction being selected to make smaller a change of a shape of the at least one parking slot before and after the offsetting as compared with another offset direction.

[A1-8]

An eighth aspect of the first technological-concept group, which depends from any one of the first to seventh aspects, is that the processor is configured to (I) Calculate, as a blocked amount, an amount of a part of the at least one parking slot being blocked by at least one object (B7) other than the at least one parking slot (II) Set parking-slot empty information on the at least one parking slot to an undefined state upon determination that the calculated blocked amount of the part of the at least one parking slot is greater than or equal to a threshold amount.

[A1-9]

A ninth aspect of the first technological-concept group, which depends from the eighth aspect, is that the processor is configured to calculate the blocked amount based on a view angle of the vehicle to the at least one parking slot.

[A1-10]

A tenth aspect of the first technological-concept group, which depends from any one of the first to ninth aspects, is that the processor is configured to define typical orientations (anchor 0, anchor 1, anchor 2, and anchor 3) of the at least one parking slot, and executes the learning for each of the typical orientations.

[A1-11]

An eleventh aspect of the first technological-concept group, which depends from the tenth aspect, is that the processor is configured to encode each of the corner points and the center point of the at least one parking slot for each of the typical orientations to acquire encoded data for each typical orientation, and execute the learning using the encoded data for each typical orientation.

[A1-12]

A twelfth aspect of the first technological-concept group, which depends from any one of the first to eleventh aspects, is that the processor is configured to (I) Recognize, from the learning image, a plurality of parking slots as the at least one parking slot (II) Select one parking slot from the recognized parking slots as a reference object (PSb)

(III) Search, from the reference object, for at least one parking-slot train (PSs) in at least one of a predetermined first direction and a second direction opposite to the first direction, the at least one parking-slot train being comprised of selected parking slots that are included in the plurality of parking slots and are continuously aligned in at least one of the first direction or the second direction to find the at least one parking-slot train (IV) Perform, based on information related to the at least one parking-slot train, a parking-lot environment determination of whether the vehicle is located in a parking lot

[A1-13]

A thirteenth aspect of the first technological-concept group, which depends from the twelfth aspect, is that the processor is configured to (I) Acquire, based on the at least one parking-slot train, a parking region (PSg) that includes the at least one parking-slot train and an aisle (PSr) arranged to face the parking-slot train, the vehicle being travelable in the aisle (II) Determine that the vehicle is located in a parking lot upon determination that the vehicle has entered the parking region (III) Determine that the vehicle is not located in a parking lot upon determination that the vehicle has exited from the parking region

[A1-14]

A fourteenth aspect of the first technological-concept group, which depends from the thirteenth aspect, is that the processor is configured to acquire first and second parking-slot trains as the at least one parking-slot train, and acquire the parking region that is configured such that the first and second parking-slot trains are located on both sides of the aisle.

[A1-15]

A fifteenth aspect of the first technological-concept group, which depends from any one of the first to eleventh aspects, is that the processor is configured to (I) Recognize, from the learning image, a plurality of parking slots as the at least one parking slot (II) Acquire, based on the plurality of parking slots, at least one parking-slot train (PSs) that is comprised of selected parking slots that are included in the plurality of parking slots and are continuously aligned in a predetermined direction (III) Acquire, based on the at least one parking-slot train, a parking region (PSg) that includes the at least one parking-slot train and an aisle (PSr) arranged to face the parking-slot train, the vehicle being travelable in the aisle (IV) Extend, upon determination that there is at least one additional parking slot or at least one additional parking-slot train located adjacent to the acquired parking region in the predetermined direction, the parking region in the predetermined direction (V) Perform, based on information related to the extended parking region, a parking-lot environment determination of whether the vehicle is located in a parking lot

[A1-16]

A sixteenth aspect of the first technological-concept group, which depends from the fifteenth aspect, is that the processor is configured to acquire first and second parking-slot trains as the at least one parking-slot train, and acquire the parking region that is configured such that the first and second parking-slot trains are located on both sides of the aisle.

[A1-17]

A seventeenth aspect of the first technological-concept group, which depends from the fifteenth or sixteenth aspect, is that the processor is configured to determine that the vehicle is located in a parking lot upon determination that the vehicle has entered the extended parking region, and determine that the vehicle is not located in a parking lot upon determination that the vehicle has exited from the extended parking region.

[A1-18]

An eighteenth aspect of the first technological-concept group, which depends from any one of the thirteenth to seventeenth aspects, is that the processor is configured to perform the parking-lot environment determination that the vehicle is located in a parking lot upon determination that the vehicle has entered the parking region from a specified direction, and not to perform the parking-lot environment determination upon determination that the vehicle has entered the parking region from another direction different from the specified direction.

[A1-19]

A nineteenth aspect of the first technological-concept group, which depends from any one of the twelfth to eighteenth aspects, is that the processor is configured to abandon the recognized parking slots upon determination that the vehicle is not located in a parking lot.

[A1-20]

A twentieth aspect of the first technological-concept group, which depends from any one of the twelfth to nineteenth aspects, is that the processor is configured to acquire the at least one parking-slot train in accordance with a positional relationship among the plurality of parking slots.

[A1-21]

A twenty-first aspect of the first technological-concept group, which depends from any one of the twelfth to twentieth aspects, is that the processor is configured to, when detecting, upon determination that the vehicle is located in a parking lot, sudden acceleration due to an accelerator misoperation, execute an accelerator-misoperation addressing task including at least one of (i) reducing driving power of the vehicle and (ii) notifying one or more occupants included in the vehicle of an occurrence of the accelerator misoperation.

[A1-22]

A twenty-second aspect of the first technological-concept group, which depends from the twenty-first aspect, is that the processor is configured to determine whether the accelerator misoperation has been continued for a predetermined time after execution of the accelerator-misoperation addressing task, and execute, again, the accelerator-misoperation addressing task upon determination that the accelerator misoperation has been continued for the predetermined time.

[A1-23]

A twenty-third aspect of the first technological-concept group, which depends from the twenty-first or twenty-second aspect, is that the processor is configured to determine, after the accelerator misoperation is cancelled, whether there is a new accelerator misoperation, and execute, again, the accelerator-misoperation addressing task upon determination that there is a new accelerator misoperation after the accelerator misoperation is cancelled.

[A1-24]

A twenty-fourth aspect of the first technological-concept group, which depends from any one of the twelfth to twenty-third aspects, is that the processor is configured to generate a traveling route to a selected one of the plurality of parking slots where the vehicle is parkable upon determination that the vehicle is located in a parking lot.

Second Technological-Concept Group (A2)

[A2-1]

A first aspect of the second technological-concept group is that a method of learning a recognition rule of at least one parking slot around a vehicle (V), the method including (1) Objectifying at least one parking slot at least partly included in a learning image as an at least one objectified parking slot comprised of (i) a plurality of corner points (BP) of the at least one parking slot, (ii) a center point (BPC) of the at least one parking slot; and (iii) attribute information on the at least one parking slot (2) Generating annotation data for the objectified at least one parking slot (3) Executing, from the learning image, learning of a recognition rule of the at least one parking slot based on the generated annotation data for the objectified at least one parking slot

[A2-2]

A second aspect of the second technological-concept group, which depends from the first aspect, is that the attribute information includes parking-frame information related to a parking frame (B5) of the at least one parking slot.

[A2-3]

A third aspect of the second technological-concept group, which depends from the first or second aspect, is that the attribute information includes wheel-stopper information on a wheel stopper (B6) located in the at least one parking slot.

[A2-4]

A fourth aspect of the second technological-concept group, which depends from any one of the first to third aspects, is that the attribute information includes additional attribute information related to the at least one parking slot, the additional attribute information being different from the parking-frame information and the wheel-stopper information.

[A2-5]

A fifth aspect of the second technological-concept group, which depends from any one of the first to fourth aspects, is that the at least one parking slot includes a plurality of parking slots. The method further includes calculating the number of one or more of the corner points of at least one of the parking slots, the one or more of the corner points of the at least one of the parking slots being blocked by at least one object (B7) other than each of the parking slots. The executing of the learning does not learn the recognition rule of the at least one of the parking slots based on the generated annotation data for the objectified at least one of the parking slots upon determination that the number of the one or more of the corner points of the at least one of the parking slots is more than or equal to a predetermined threshold number.

[A2-6]

A sixth aspect of the second technological-concept group, which depends from any one of the first to fifth aspects, is that the executing of the learning includes (I) Determining whether one or two of the corner points are located outside the learning image (II) Offsetting, upon determination that the one or two of the corner points are located outside the learning image, the one or two of the corner points into the learning image (III) Executing, from the learning image, the learning of the recognition rule of the at least one parking slot based on the generated annotation data for the objectified at least one parking slot after offsetting of the one or two of the corner points into the learning image

[A2-7]

A seventh aspect of the second technological-concept group, which depends from the sixth aspect, is that the offsetting offsets the one or two of the corner points into the learning image in a predetermined offset direction, the predetermined offset direction being selected to make smaller a change of a shape of the at least one parking slot before and after the offsetting as compared with another offset direction.

[A2-8]

An eighth aspect of the second technological-concept group, which depends from any one of the first to seventh aspects, is that the method further includes calculating, as a blocked amount, an amount of a part of the at least one parking slot being blocked by at least one object (B7) other than the at least one parking slot. The executing of the learning sets parking-slot empty information on the at least one parking slot to an undefined state upon determination that the calculated blocked amount of the part of the at least one parking slot is greater than or equal to a threshold amount.

[A2-9]

A ninth aspect of the second technological-concept group, which depends from the eighth aspect, is that the calculating of the blocked amount calculates the blocked amount based on a view angle of the vehicle to the at least one parking slot.

[A2-10]

A tenth aspect of the second technological-concept group, which depends from any one of the first to ninth aspects, is that the executing of the learning defines typical orientations (anchor 0, anchor 1, anchor 2, and anchor 3) of the at least one parking slot, and executes the learning for each of the typical orientations.

[A2-11]

An eleventh aspect of the second technological-concept group, which depends from the tenth aspect, is that the executing of the learning encodes each of the corner points and the center point of the at least one parking slot for each of the typical orientations to acquire encoded data for each typical orientation, and executes the learning using the encoded data for each typical orientation.

[A2-12]

A twelfth aspect of the second technological-concept group, which depends from any one of the first to eleventh aspects, is that the method further includes (I) Recognizing, from the learning image, a plurality of parking slots as the at least one parking slot (II) Selecting one parking slot from the recognized parking slots as a reference object (PSb)

(III) Searching, from the reference object, for at least one parking-slot train (PSs) in at least one of a predetermined first direction and a second direction opposite to the first direction, the at least one parking-slot train being comprised of selected parking slots that are included in the plurality of parking slots and are continuously aligned in at least one of the first direction or the second direction to find the at least one parking-slot train (IV) Performing, based on information related to the at least one parking-slot train, a parking-lot environment determination of whether the vehicle is located in a parking lot

[A2-13]

A thirteenth aspect of the second technological-concept group, which depends from the twelfth aspect, is that the performing of the parking-lot environment determination includes (I) Acquiring, based on the at least one parking-slot train, a parking region (PSg) that includes the at least one parking-slot train and an aisle (PSr) arranged to face the parking-slot train, the vehicle being travelable in the aisle (II) Determining that the vehicle is located in a parking lot upon determination that the vehicle has entered the parking region (III) Determining that the vehicle is not located in a parking lot upon determination that the vehicle has exited from the parking region

[A2-14]

A fourteenth aspect of the second technological-concept group, which depends from the thirteenth aspect, is that the acquiring of the parking region acquires first and second parking-slot trains as the at least one parking-slot train, and acquires the parking region that is configured such that the first and second parking-slot trains are located on both sides of the aisle.

[A2-15]

A fifteenth aspect of the second technological-concept group, which depends from any one of the first to eleventh aspects, is that the method further includes (I) Recognizing, from the learning image, a plurality of parking slots as the at least one parking slot (II) Acquiring, based on the plurality of parking slots, at least one parking-slot train (PSs) that is comprised of selected parking slots that are included in the plurality of parking slots and are continuously aligned in a predetermined direction (III) Acquiring, based on the at least one parking-slot train, a parking region (PSg) that includes the at least one parking-slot train and an aisle (PSr) arranged to face the parking-slot train, the vehicle being travelable in the aisle (IV) Extending, upon determination that there is at least one additional parking slot or at least one additional parking-slot train located adjacent to the acquired parking region in the predetermined direction, the parking region in the predetermined direction (V) Performing, based on information related to the extended parking region, a parking-lot environment determination of whether the vehicle is located in a parking lot

[A2-16]

A sixteenth aspect of the second technological-concept group, which depends from the fifteenth aspect, is that the acquiring of the at least one parking-slot train acquires first and second parking-slot trains as the at least one parking-slot train, and the acquiring of the parking region acquires the parking region that is configured such that the first and second parking-slot trains are located on both sides of the aisle.

[A2-17]

A seventeenth aspect of the second technological-concept group, which depends from the fifteenth or sixteenth aspect, is that the performing of the parking-lot environment determination includes determining that the vehicle is located in a parking lot upon determination that the vehicle has entered the extended parking region, and determining that the vehicle is not located in a parking lot upon determination that the vehicle has exited from the extended parking region.

[A2-18]

An eighteenth aspect of the second technological-concept group, which depends from any one of the thirteenth to seventeenth aspects, is that the performing of the parking-lot environment determination performs the parking-lot environment determination that the vehicle is located in a parking lot upon determination that the vehicle has entered the parking region from a specified direction, and does not perform the parking-lot environment determination upon determination that the vehicle has entered the parking region from another direction different from the specified direction.

[A2-19]

A nineteenth aspect of the second technological-concept group, which depends from any one of the twelfth to eighteenth aspects, is that the executing of the learning abandons the recognized parking slots upon determination that the vehicle is not located in a parking lot.

[A2-20]

A twentieth aspect of the second technological-concept group, which depends from any one of the twelfth to nineteenth aspects, is that the executing of the learning acquires the at least one parking-slot train in accordance with a positional relationship among the plurality of parking slots.

[A2-21]

A twenty-first aspect of the second technological-concept group, which depends from any one of the twelfth to twentieth aspects, is that the method further includes, when detecting, upon determination that the vehicle is located in a parking lot, sudden acceleration due to an accelerator misoperation, executing an accelerator-misoperation addressing task including at least one of (i) reducing driving power of the vehicle and (ii) notifying one or more occupants included in the vehicle of an occurrence of the accelerator misoperation.

[A2-22]

A twenty-second aspect of the second technological-concept group, which depends from the twenty-first aspect, is that the executing of the accelerator-misoperation addressing task determines whether the accelerator misoperation has been continued for a predetermined time after execution of the accelerator-misoperation addressing task, and executes, again, the accelerator-misoperation addressing task upon determination that the accelerator misoperation has been continued for the predetermined time.

[A2-23]

A twenty-third aspect of the second technological-concept group, which depends from the twenty-first or twenty-second aspect, is that the executing of the accelerator-misoperation addressing task determines, after the accelerator misoperation is cancelled, whether there is a new accelerator misoperation, and executes, again, the accelerator-misoperation addressing task upon determination that there is a new accelerator misoperation after the accelerator misoperation is cancelled.

[A2-24]

A twenty-fourth aspect of the second technological-concept group, which depends from any one of the twelfth to twenty-third aspects, is that the method further includes generating a traveling route to a selected one of the plurality of parking slots where the vehicle is parkable upon determination that the vehicle is located in a parking lot.

Third Technological-Concept Group (A3)

[A3-1]

A first aspect of the third technological-concept group is a processor program product readable by a processor (21) installed in a vehicle (V). The processor program product includes learning program instructions that cause the processor to (1) Objectify at least one parking slot at least partly included in a learning image as an at least one objectified parking slot comprised of (i) a plurality of corner points (BP) of the at least one parking slot, (ii) a center point (BPC) of the at least one parking slot; and (iii) attribute information on the at least one parking slot (2) Generate annotation data for the objectified at least one parking slot (3) Execute, from the learning image, learning of a recognition rule of the at least one parking slot based on the generated annotation data for the objectified at least one parking slot

[A3-2]

A second aspect of the third technological-concept group, which depends from the first aspect, is that the attribute information includes parking-frame information related to a parking frame (B5) of the at least one parking slot.

[A3-3]

A third aspect of the third technological-concept group, which depends from the first or second aspect, is that the attribute information includes wheel-stopper information on a wheel stopper (B6) located in the at least one parking slot.

[A3-4]

A fourth aspect of the third technological-concept group, which depends from any one of the first to third aspects, is that the attribute information includes additional attribute information related to the at least one parking slot, the additional attribute information being different from the parking-frame information and the wheel-stopper information.

[A3-5]

A fifth aspect of the third technological-concept group, which depends from any one of the first to fourth aspects, is that the at least one parking slot incudes a plurality of parking slots. The processor is configured to execute the learning program instructions to calculate the number of one or more of the corner points of at least one of the parking slots, the one or more of the corner points of the at least one of the parking slots being blocked by at least one object (B7) other than each of the parking slots. The processor is configured to execute the learning program instructions not to learn the recognition rule of the at least one of the parking slots based on the generated annotation data for the objectified at least one of the parking slots upon determination that the number of the one or more of the corner points of the at least one of the parking slots is more than or equal to a predetermined threshold number.

[A3-6]

A sixth aspect of the third technological-concept group, which depends from any one of the first to fifth aspects, is that the processor is configured to (I) Determine whether one or two of the corner points are located outside the learning image (II) Offset, upon determination that the one or two of the corner points are located outside the learning image, the one or two of the corner points into the learning image (III) Execute, from the learning image, the learning of the recognition rule of the at least one parking slot based on the generated annotation data for the objectified at least one parking slot after offsetting of the one or two of the corner points into the learning image

[A3-7]

A seventh aspect of the third technological-concept group, which depends from the sixth aspect, is that the processor is configured to offset the one or two of the corner points into the learning image in a predetermined offset direction, the predetermined offset direction being selected to make smaller a change of a shape of the at least one parking slot before and after the offsetting as compared with another offset direction.

[A3-8]

An eighth aspect of the third technological-concept group, which depends from any one of the first to seventh aspects, is that the processor is configured to (I) Calculate, as a blocked amount, an amount of a part of the at least one parking slot being blocked by at least one object (B7) other than the at least one parking slot (II) Set parking-slot empty information on the at least one parking slot to an undefined state upon determination that the calculated blocked amount of the part of the at least one parking slot is greater than or equal to a threshold amount.

[A3-9]

A ninth aspect of the third technological-concept group, which depends from the eighth aspect, is that the processor is configured to calculate the blocked amount based on a view angle of the vehicle to the at least one parking slot.

[A3-10]

A tenth aspect of the third technological-concept group, which depends from any one of the first to ninth aspects, is that the processor is configured to define typical orientations (anchor 0, anchor 1, anchor 2, and anchor 3) of the at least one parking slot, and executes the learning for each of the typical orientations.

[A3-11]

An eleventh aspect of the third technological-concept group, which depends from the tenth aspect, is that the processor is configured to encode each of the corner points and the center point of the at least one parking slot for each of the typical orientations to acquire encoded data for each typical orientation, and execute the learning using the encoded data for each typical orientation.

[A3-12]

A twelfth aspect of the third technological-concept group, which depends from any one of the first to eleventh aspects, is that the processor is configured to (I) Recognize, from the learning image, a plurality of parking slots as the at least one parking slot (II) Select one parking slot from the recognized parking slots as a reference object (PSb)

(III) Search, from the reference object, for at least one parking-slot train (PSs) in at least one of a predetermined first direction and a second direction opposite to the first direction, the at least one parking-slot train being comprised of selected parking slots that are included in the plurality of parking slots and are continuously aligned in at least one of the first direction or the second direction to find the at least one parking-slot train (IV) Perform, based on information related to the at least one parking-slot train, a parking-lot environment determination of whether the vehicle is located in a parking lot

[A3-13]

A thirteenth aspect of the third technological-concept group, which depends from the twelfth aspect, is that the processor is configured to (I) Acquire, based on the at least one parking-slot train, a parking region (PSg) that includes the at least one parking-slot train and an aisle (PSr) arranged to face the parking-slot train, the vehicle being travelable in the aisle (II) Determine that the vehicle is located in a parking lot upon determination that the vehicle has entered the parking region (III) Determine that the vehicle is not located in a parking lot upon determination that the vehicle has exited from the parking region

[A3-14]

A fourteenth aspect of the third technological-concept group, which depends from the thirteenth aspect, is that the processor is configured to acquire first and second parking-slot trains as the at least one parking-slot train, and acquire the parking region that is configured such that the first and second parking-slot trains are located on both sides of the aisle.

[A3-15]

A fifteenth aspect of the third technological-concept group, which depends from any one of the first to eleventh aspects, is that the processor is configured to execute the learning program instructions to (I) Recognize, from the learning image, a plurality of parking slots as the at least one parking slot (II) Acquire, based on the plurality of parking slots, at least one parking-slot train (PSs) that is comprised of selected parking slots that are included in the plurality of parking slots and are continuously aligned in a predetermined direction (III) Acquire, based on the at least one parking-slot train, a parking region (PSg) that includes the at least one parking-slot train and an aisle (PSr) arranged to face the parking-slot train, the vehicle being travelable in the aisle (IV) Extend, upon determination that there is at least one additional parking slot or at least one additional parking-slot train located adjacent to the acquired parking region in the predetermined direction, the parking region in the predetermined direction (V) Perform, based on information related to the extended parking region, a parking-lot environment determination of whether the vehicle is located in a parking lot

[A3-16]

A sixteenth aspect of the third technological-concept group, which depends from the fifteenth aspect, is that the processor is configured to acquire first and second parking-slot trains as the at least one parking-slot train, and acquire the parking region that is configured such that the first and second parking-slot trains are located on both sides of the aisle.

[A3-17]

A seventeenth aspect of the third technological-concept group, which depends from the fifteenth or sixteenth aspect, is that the processor is configured to determine that the vehicle is located in a parking lot upon determination that the vehicle has entered the extended parking region, and determine that the vehicle is not located in a parking lot upon determination that the vehicle has exited from the extended parking region.

[A3-18]

An eighteenth aspect of the third technological-concept group, which depends from any one of the thirteenth to seventeenth aspects, is that the processor is configured to perform the parking-lot environment determination that the vehicle is located in a parking lot upon determination that the vehicle has entered the parking region from a specified direction, and not to perform the parking-lot environment determination upon determination that the vehicle has entered the parking region from another direction different from the specified direction.

[A3-19]

A nineteenth aspect of the third technological-concept group, which depends from any one of the twelfth to eighteenth aspects, is that the processor is configured to abandon the recognized parking slots upon determination that the vehicle is not located in a parking lot.

[A3-20]

A twentieth aspect of the third technological-concept group, which depends from any one of the twelfth to nineteenth aspects, is that the processor is configured to acquire the at least one parking-slot train in accordance with a positional relationship among the plurality of parking slots.

[A3-21]

A twenty-first aspect of the third technological-concept group, which depends from any one of the twelfth to twentieth aspects, is that the processor is configured to, when detecting, upon determination that the vehicle is located in a parking lot, sudden acceleration due to an accelerator misoperation, execute an accelerator-misoperation addressing task including at least one of (i) reducing driving power of the vehicle and (ii) notifying one or more occupants included in the vehicle of an occurrence of the accelerator misoperation.

[A3-22]

A twenty-second aspect of the third technological-concept group, which depends from the twenty-first aspect, is that the processor is configured to determine whether the accelerator misoperation has been continued for a predetermined time after execution of the accelerator-misoperation addressing task, and execute, again, the accelerator-misoperation addressing task upon determination that the accelerator misoperation has been continued for the predetermined time.

[A3-23]

A twenty-third aspect of the third technological-concept group, which depends from the twenty-first or twenty-second aspect, is that the processor is configured to determine, after the accelerator misoperation is cancelled, whether there is a new accelerator misoperation, and execute, again, the accelerator-misoperation addressing task upon determination that there is a new accelerator misoperation after the accelerator misoperation is cancelled.

[A3-24]

A twenty-fourth aspect of the third technological-concept group, which depends from any one of the twelfth to twenty-third aspects, is that the processor is configured to generate a traveling route to a selected one of the plurality of parking slots where the vehicle is parkable upon determination that the vehicle is located in a parking lot.

Fourth Technological-Concept Group (B1)

[B1-1]

A first aspect of the fourth technological-concept group is a parking-lot environment determination apparatus (2) that includes a memory device (22) storing program instructions, and a processor (21) configured to execute the program instructions to (I) Recognize, from an input image to the processor, a plurality of parking slots (II) Select one parking slot from the recognized parking slots as a reference object (PSb)

(III) Search, from the reference object, for at least one parking-slot train (PSs) in at least one of a predetermined first direction and a second direction opposite to the first direction, the at least one parking-slot train being comprised of selected parking slots that are included in the plurality of parking slots and are continuously aligned in at least one of the first direction or the second direction to find the at least one parking-slot train (IV) Perform, based on information related to the at least one parking-slot train, a parking-lot environment determination of whether the vehicle is located in a parking lot

[B1-2]

A second aspect of the fourth technological-concept group, which depends from the first aspect, is that the processor is configured to (I) Acquire, based on the at least one parking-slot train, a parking region (PSg) that includes the at least one parking-slot train and an aisle (PSr) arranged to face the parking-slot train, the vehicle being travelable in the aisle (II) Determine that the vehicle is located in a parking lot upon determination that the vehicle has entered the parking region (III) Determine that the vehicle is not located in a parking lot upon determination that the vehicle has exited from the parking region

[B1-3]

A third aspect of the fourth technological-concept group, which depends from the second aspect, is that the processor is configured to acquire first and second parking-slot trains as the at least one parking-slot train, and acquire the parking region that is configured such that the first and second parking-slot trains are located on both sides of the aisle.

[B1-4]

A fourth aspect of the fourth technological-concept group, which depends from the second or third aspect, is that the processor is configured to determine that the vehicle is located in a parking lot upon determination that the vehicle has entered the parking region, and determine that the vehicle is not located in a parking lot upon determination that the vehicle has exited from the parking region.

[B1-5]

A fifth aspect of the fourth technological-concept group, which depends from any one of the first to fourth aspects, is that the processor is configured to abandon the recognized parking slots upon determination that the vehicle is not located in a parking lot.

[B1-6]

A sixth aspect of the fourth technological-concept group, which depends from any one of the first to fifth aspects, is that the processor is configured to acquire the at least one parking-slot train in accordance with a positional relationship among the plurality of parking slots.

[B1-7]

A seventh aspect of the fourth technological-concept group, which depends from any one of the first to sixth aspects, is that the processor is configured to, when detecting, upon determination that the vehicle is located in a parking lot, sudden acceleration due to an accelerator misoperation, execute an accelerator-misoperation addressing task including at least one of (i) reducing driving power of the vehicle and (ii) notifying one or more occupants included in the vehicle of an occurrence of the accelerator misoperation.

[B1-8]

An eighth aspect of the fourth technological-concept group, which depends from the seventh aspect, is that the processor is configured to determine whether the accelerator misoperation has been continued for a predetermined time after execution of the accelerator-misoperation addressing task, and execute, again, the accelerator-misoperation addressing task upon determination that the accelerator misoperation has been continued for the predetermined time.

[B1-9]

A ninth aspect of the fourth technological-concept group, which depends from the seventh or eighth aspect, is that the processor is configured to determine, after the accelerator misoperation is cancelled, whether there is a new accelerator misoperation, and execute, again, the accelerator-misoperation addressing task upon determination that there is a new accelerator misoperation after the accelerator misoperation is cancelled.

[B1-10]

A tenth aspect of the fourth technological-concept group, which depends from any one of the first to ninth aspects, is that the processor is configured to generate a traveling route to a selected one of the plurality of parking slots where the vehicle is parkable upon determination that the vehicle is located in a parking lot.

Fifth Technological-Concept Group (B2)

[B2-1]

A first aspect of the fifth technological-concept group is a parking-lot environment determination method including (I) Recognizing, from an input image, a plurality of parking slots (II) Selecting one parking slot from the recognized parking slots as a reference object (PSb)

(III) Searching, from the reference object, for at least one parking-slot train (PSs) in at least one of a predetermined first direction and a second direction opposite to the first direction, the at least one parking-slot train being comprised of selected parking slots that are included in the plurality of parking slots and are continuously aligned in at least one of the first direction or the second direction to find the at least one parking-slot train (IV) Performing, based on information related to the at least one parking-slot train, a parking-lot environment determination of whether the vehicle is located in a parking lot

[B2-2]

A second aspect of the fifth technological-concept group, which depends from the first aspect, is that the performing of the parking-lot environment determination includes (I) Acquiring, based on the at least one parking-slot train, a parking region (PSg) that includes the at least one parking-slot train and an aisle (PSr) arranged to face the parking-slot train, the vehicle being travelable in the aisle (II) Determining that the vehicle is located in a parking lot upon determination that the vehicle has entered the parking region (III) Determining that the vehicle is not located in a parking lot upon determination that the vehicle has exited from the parking region

[B2-3]

A third aspect of the fifth technological-concept group, which depends from the second aspect, is that the acquiring of the parking region acquires first and second parking-slot trains as the at least one parking-slot train, and acquires the parking region that is configured such that the first and second parking-slot trains are located on both sides of the aisle.

[B2-4]

A fourth aspect of the fifth technological-concept group, which depends from the second or third aspect, is that the performing of the parking-lot environment determination includes determining that the vehicle is located in a parking lot upon determination that the vehicle has entered the parking region, and determining that the vehicle is not located in a parking lot upon determination that the vehicle has exited from the parking region.

[B2-5]

A fifth aspect of the fifth technological-concept group, which depends from any one of the first to fourth aspects, is that the method further comprises abandoning the recognized parking slots upon determination that the vehicle is not located in a parking lot.

[B2-6]

A sixth aspect of the fourth technological-concept group, which depends from any one of the first to fifth aspects, is that the searching acquires the at least one parking-slot train in accordance with a positional relationship among the plurality of parking slots.

[B2-7]

A seventh aspect of the fifth technological-concept group, which depends from any one of the first to sixth aspects, is that the method further includes, when detecting, upon determination that the vehicle is located in a parking lot, sudden acceleration due to an accelerator misoperation, executing an accelerator-misoperation addressing task including at least one of (i) reducing driving power of the vehicle and (ii) notifying one or more occupants included in the vehicle of an occurrence of the accelerator misoperation.

[B2-8]

An eighth aspect of the fifth technological-concept group, which depends from the seventh aspect, is that the executing of the accelerator-misoperation addressing task determines whether the accelerator misoperation has been continued for a predetermined time after execution of the accelerator-misoperation addressing task, and executes, again, the accelerator-misoperation addressing task upon determination that the accelerator misoperation has been continued for the predetermined time.

[B2-9]

A ninth aspect of the fifth technological-concept group, which depends from the seventh or eighth aspect, is that the executing of the accelerator-misoperation addressing task determines, after the accelerator misoperation is cancelled, whether there is a new accelerator misoperation, and executes, again, the accelerator-misoperation addressing task upon determination that there is a new accelerator misoperation after the accelerator misoperation is cancelled.

[B2-10]

A tenth aspect of the fifth technological-concept group, which depends from any one of the first to ninth aspects, is that the method further includes generating a traveling route to a selected one of the plurality of parking slots where the vehicle is parkable upon determination that the vehicle is located in a parking lot.

Sixth Technological-Concept Group (B3)

[B3-1]

A first aspect of the sixth technological-concept group is a processor program product readable by a processor (21) installed in a vehicle (V). The processor program product includes processor program instructions that cause the processor to (I) Recognize, from an input image to the processor, a plurality of parking slots (II) Select one parking slot from the recognized parking slots as a reference object (PSb)

(III) Search, from the reference object, for at least one parking-slot train (PSs) in at least one of a predetermined first direction and a second direction opposite to the first direction, the at least one parking-slot train being comprised of selected parking slots that are included in the plurality of parking slots and are continuously aligned in at least one of the first direction or the second direction to find the at least one parking-slot train (IV) Perform, based on information related to the at least one parking-slot train, a parking-lot environment determination of whether the vehicle is located in a parking lot

[B3-2]

A second aspect of the sixth technological-concept group, which depends from the first aspect, is that the processor is configured to (I) Acquire, based on the at least one parking-slot train, a parking region (PSg) that includes the at least one parking-slot train and an aisle (PSr) arranged to face the parking-slot train, the vehicle being travelable in the aisle (II) Determine that the vehicle is located in a parking lot upon determination that the vehicle has entered the parking region (III) Determine that the vehicle is not located in a parking lot upon determination that the vehicle has exited from the parking region

[B3-3]

A third aspect of the sixth technological-concept group, which depends from the second aspect, is that the processor is configured to acquire first and second parking-slot trains as the at least one parking-slot train, and acquire the parking region that is configured such that the first and second parking-slot trains are located on both sides of the aisle.

[B3-4]

A fourth aspect of the sixth technological-concept group, which depends from the second or third aspect, is that the processor is configured to determine that the vehicle is located in a parking lot upon determination that the vehicle has entered the parking region, and determine that the vehicle is not located in a parking lot upon determination that the vehicle has exited from the parking region.

[B3-5]

A fifth aspect of the fifth technological-concept group, which depends from any one of the first to fourth aspects, is that the processor is configured to abandon the recognized parking slots upon determination that the vehicle is not located in a parking lot.

[B3-6]

A sixth aspect of the sixth technological-concept group, which depends from any one of the first to fifth aspects, is that the processor is configured to acquire the at least one parking-slot train in accordance with a positional relationship among the plurality of parking slots.

[B3-7]

A seventh aspect of the sixth technological-concept group, which depends from any one of the first to sixth aspects, is that the processor is configured to, when detecting, upon determination that the vehicle is located in a parking lot, sudden acceleration due to an accelerator misoperation, execute an accelerator-misoperation addressing task including at least one of (i) reducing driving power of the vehicle and (ii) notifying one or more occupants included in the vehicle of an occurrence of the accelerator misoperation.

[B3-8]

An eighth aspect of the sixth technological-concept group, which depends from the seventh aspect, is that the processor is configured to determine whether the accelerator misoperation has been continued for a predetermined time after execution of the accelerator-misoperation addressing task, and execute, again, the accelerator-misoperation addressing task upon determination that the accelerator misoperation has been continued for the predetermined time.

[B3-9]

A ninth aspect of the sixth technological-concept group, which depends from the seventh or eighth aspect, is that the processor is configured to determine, after the accelerator misoperation is cancelled, whether there is a new accelerator misoperation, and execute, again, the accelerator-misoperation addressing task upon determination that there is a new accelerator misoperation after the accelerator misoperation is cancelled.

[B1-10]

A tenth aspect of the sixth technological-concept group, which depends from any one of the first to ninth aspects, is that the processor is configured to generate a traveling route to a selected one of the plurality of parking slots where the vehicle is parkable upon determination that the vehicle is located in a parking lot.

Seventh Technological-Concept Group (C1)

[C1-1]

A first aspect of the seventh technological-concept group is a parking-lot environment determination apparatus (2) that includes a memory device (22) storing program instructions, and a processor (21) configured to execute the program instructions to (I) Recognize, from an input image to the processor, a plurality of parking slots (II) Acquire, based on the plurality of parking slots, at least one parking-slot train (PSs) that is comprised of selected parking slots that are included in the plurality of parking slots and are continuously aligned in a predetermined direction (III) Acquire, based on the at least one parking-slot train, a parking region (PSg) that includes the at least one parking-slot train and an aisle (PSr) arranged to face the parking-slot train, the vehicle being travelable in the aisle (IV) Extend, upon determination that there is at least one additional parking slot or at least one additional parking-slot train located adjacent to the acquired parking region in the predetermined direction, the parking region in the predetermined direction (V) Perform, based on information related to the extended parking region, a parking-lot environment determination of whether the vehicle is located in a parking lot

[C1-2]

A second aspect of the seventh technological-concept group, which depends from the first aspect, is that the processor is configured to acquire first and second parking-slot trains as the at least one parking-slot train, and acquire the parking region that is configured such that the first and second parking-slot trains are located on both sides of the aisle.

[C1-3]

A third aspect of the seventh technological-concept group, which depends from the first or second aspect, is that the processor is configured to determine that the vehicle is located in a parking lot upon determination that the vehicle has entered the parking region, and determine that the vehicle is not located in a parking lot upon determination that the vehicle has exited from the parking region.

[C1-4]

A fourth aspect of the seventh technological-concept group, which depends from any one of the first to third aspects, is that the processor is configured to perform the parking-lot environment determination that the vehicle is located in a parking lot upon determination that the vehicle has entered the parking region from a specified direction, and not to perform the parking-lot environment determination upon determination that the vehicle has entered the parking region from another direction different from the specified direction.

[C1-5]

A fifth aspect of the seventh technological-concept group, which depends from any one of the first to fourth aspects, is that the processor is configured to abandon the recognized parking slots upon determination that the vehicle is not located in a parking lot.

[C1-6]

A sixth aspect of the seventh technological-concept group, which depends from any one of the first to fifth aspects, is that the processor is configured to acquire the at least one parking-slot train in accordance with a positional relationship among the plurality of parking slots.

[C1-7]

A seventh aspect of the seventh technological-concept group, which depends from any one of the first to sixth aspects, is that the processor is configured to, when detecting, upon determination that the vehicle is located in a parking lot, sudden acceleration due to an accelerator misoperation, execute an accelerator-misoperation addressing task including at least one of (i) reducing driving power of the vehicle and (ii) notifying one or more occupants included in the vehicle of an occurrence of the accelerator misoperation.

[C1-8]

An eighth aspect of the seventh technological-concept group, which depends from the seventh aspect, is that the processor is configured to determine whether the accelerator misoperation has been continued for a predetermined time after execution of the accelerator-misoperation addressing task, and execute, again, the accelerator-misoperation addressing task upon determination that the accelerator misoperation has been continued for the predetermined time.

[C1-9]

A ninth aspect of the seventh technological-concept group, which depends from the seventh or eighth aspect, is that the processor is configured to determine, after the accelerator misoperation is cancelled, whether there is a new accelerator misoperation, and execute, again, the accelerator-misoperation addressing task upon determination that there is a new accelerator misoperation after the accelerator misoperation is cancelled.

[C1-10]

A tenth aspect of the seventh technological-concept group, which depends from any one of the first to ninth aspects, is that the processor is configured to generate a traveling route to a selected one of the plurality of parking slots where the vehicle is parkable upon determination that the vehicle is located in a parking lot.

Eighth Technological-Concept Group (C2)

[C2-1]

A first aspect of the eighth technological-concept group is a parking-lot environment determination method including (I) Recognizing, from an input image, a plurality of parking slots (II) Acquiring, based on the plurality of parking slots, at least one parking-slot train (PSs) that is comprised of selected parking slots that are included in the plurality of parking slots and are continuously aligned in a predetermined direction (III) Acquiring, based on the at least one parking-slot train, a parking region (PSg) that includes the at least one parking-slot train and an aisle (PSr) arranged to face the parking-slot train, the vehicle being travelable in the aisle (IV) Extending, upon determination that there is at least one additional parking slot or at least one additional parking-slot train located adjacent to the acquired parking region in the predetermined direction, the parking region in the predetermined direction (V) Performing, based on information related to the extended parking region, a parking-lot environment determination of whether the vehicle is located in a parking lot

[C2-2]

A second aspect of the eighth technological-concept group, which depends from the first aspect, is that the acquiring of the parking region acquires first and second parking-slot trains as the at least one parking-slot train, and acquires the parking region that is configured such that the first and second parking-slot trains are located on both sides of the aisle.

[C2-3]

A third aspect of the eighth technological-concept group, which depends from the first or second aspect, is that the performing of the parking-lot environment determination includes determining that the vehicle is located in a parking lot upon determination that the vehicle has entered the parking region, and determining that the vehicle is not located in a parking lot upon determination that the vehicle has exited from the parking region.

[C2-4]

A fourth aspect of the eighth technological-concept group, which depends from any one of the first to third aspects, is that the performing of the parking-lot environment determination performs the parking-lot environment determination that the vehicle is located in a parking lot upon determination that the vehicle has entered the parking region from a specified direction, and does not perform the parking-lot environment determination upon determination that the vehicle has entered the parking region from another direction different from the specified direction.

[C2-5]

A fifth aspect of the eighth technological-concept group, which depends from any one of the first to fourth aspects, is that the method further comprises abandoning the recognized parking slots upon determination that the vehicle is not located in a parking lot.

[C2-6]

A sixth aspect of the eighth technological-concept group, which depends from any one of the first to fifth aspects, is that the searching acquires the at least one parking-slot train in accordance with a positional relationship among the plurality of parking slots.

[C2-7]

A seventh aspect of the eighth technological-concept group, which depends from any one of the first to sixth aspects, is that the method further includes, when detecting, upon determination that the vehicle is located in a parking lot, sudden acceleration due to an accelerator misoperation, executing an accelerator-misoperation addressing task including at least one of (i) reducing driving power of the vehicle and (ii) notifying one or more occupants included in the vehicle of an occurrence of the accelerator misoperation.

[C2-8]

An eighth aspect of the eighth technological-concept group, which depends from the seventh aspect, is that the executing of the accelerator-misoperation addressing task determines whether the accelerator misoperation has been continued for a predetermined time after execution of the accelerator-misoperation addressing task, and executes, again, the accelerator-misoperation addressing task upon determination that the accelerator misoperation has been continued for the predetermined time.

[C2-9]

A ninth aspect of the eighth technological-concept group, which depends from the seventh or eighth aspect, is that the executing of the accelerator-misoperation addressing task determines, after the accelerator misoperation is cancelled, whether there is a new accelerator misoperation, and executes, again, the accelerator-misoperation addressing task upon determination that there is a new accelerator misoperation after the accelerator misoperation is cancelled.

[C2-10]

A tenth aspect of the eighth technological-concept group, which depends from any one of the first to ninth aspects, is that the method further includes generating a traveling route to a selected one of the plurality of parking slots where the vehicle is parkable upon determination that the vehicle is located in a parking lot.

Ninth Technological-Concept Group (C3)

[C3-1]

A first aspect of the ninth technological-concept group is a processor program product readable by a processor (21) installed in a vehicle (V). The processor program product includes processor program instructions that cause the processor to A first aspect of the seventh technological-concept group is a parking-lot environment determination apparatus (2) that includes a memory device (22) storing program instructions, and a processor (21) configured to execute the program instructions to (I) Recognize, from an input image to the processor, a plurality of parking slots (II) Acquire, based on the plurality of parking slots, at least one parking-slot train (PSs) that is comprised of selected parking slots that are included in the plurality of parking slots and are continuously aligned in a predetermined direction (III) Acquire, based on the at least one parking-slot train, a parking region (PSg) that includes the at least one parking-slot train and an aisle (PSr) arranged to face the parking-slot train, the vehicle being travelable in the aisle (IV) Extend, upon determination that there is at least one additional parking slot or at least one additional parking-slot train located adjacent to the acquired parking region in the predetermined direction, the parking region in the predetermined direction (V) Perform, based on information related to the extended parking region, a parking-lot environment determination of whether the vehicle is located in a parking lot

[C3-2]

A second aspect of the ninth technological-concept group, which depends from the first aspect, is that the processor is configured to acquire first and second parking-slot trains as the at least one parking-slot train, and acquire the parking region that is configured such that the first and second parking-slot trains are located on both sides of the aisle.

[C3-3]

A third aspect of the ninth technological-concept group, which depends from the first or second aspect, is that the processor is configured to determine that the vehicle is located in a parking lot upon determination that the vehicle has entered the parking region, and determine that the vehicle is not located in a parking lot upon determination that the vehicle has exited from the parking region.

[C3-4]

A fourth aspect of the ninth technological-concept group, which depends from any one of the first to third aspects, is that the processor is configured to perform the parking-lot environment determination that the vehicle is located in a parking lot upon determination that the vehicle has entered the parking region from a specified direction, and not to perform the parking-lot environment determination upon determination that the vehicle has entered the parking region from another direction different from the specified direction.

[C3-5]

A fifth aspect of the ninth technological-concept group, which depends from any one of the first to fourth aspects, is that the processor is configured to abandon the recognized parking slots upon determination that the vehicle is not located in a parking lot.

[C3-6]

A sixth aspect of the ninth technological-concept group, which depends from any one of the first to fifth aspects, is that the processor is configured to acquire the at least one parking-slot train in accordance with a positional relationship among the plurality of parking slots.

[C3-7]

A seventh aspect of the ninth technological-concept group, which depends from any one of the first to sixth aspects, is that the processor is configured to, when detecting, upon determination that the vehicle is located in a parking lot, sudden acceleration due to an accelerator misoperation, execute an accelerator-misoperation addressing task including at least one of (i) reducing driving power of the vehicle and (ii) notifying one or more occupants included in the vehicle of an occurrence of the accelerator misoperation.

[C3-8]

An eighth aspect of the ninth technological-concept group, which depends from the seventh aspect, is that the processor is configured to determine whether the accelerator misoperation has been continued for a predetermined time after execution of the accelerator-misoperation addressing task, and execute, again, the accelerator-misoperation addressing task upon determination that the accelerator misoperation has been continued for the predetermined time.

[C3-9]

A ninth aspect of the ninth technological-concept group, which depends from the seventh or eighth aspect, is that the processor is configured to determine, after the accelerator misoperation is cancelled, whether there is a new accelerator misoperation, and execute, again, the accelerator-misoperation addressing task upon determination that there is a new accelerator misoperation after the accelerator misoperation is cancelled.

[C3-10]

A tenth aspect of the ninth technological-concept group, which depends from any one of the first to ninth aspects, is that the processor is configured to generate a traveling route to a selected one of the plurality of parking slots where the vehicle is parkable upon determination that the vehicle is located in a parking lot.

Tenth Technological-Concept Group (D)

A method of learning a recognition rule of at least one parking slot around a vehicle (V) belonging to a tenth technological-concept group includes (I) Objectifying at least one parking slot at least partly included in a learning image as an at least one objectified parking slot comprised of (i) a plurality of corner points (BP) of the at least one parking slot, (ii) a center point (BPC) of the at least one parking slot; and (iii) attribute information on the at least one parking slot (II) Generating annotation data for the objectified at least one parking slot (III) Executing, from the learning image, learning of a recognition rule of the at least one parking slot based on the generated annotation data for the objectified at least one parking slot (IV) Receiving an input image around the vehicle captured by a camera (34) installed in the vehicle (V) Determining whether there is at least one target parking slot in the input image in accordance with the learned recognition rule.

Eleventh Technological-Concept Group (E)

A parking-lot environment determination method belonging to an eleventh technological-concept group includes (I) Recognizing, from an input image, a plurality of parking slots (II) Selecting one parking slot from the recognized parking slots as a reference object (PSb)

(III) Searching, from the reference object, for at least one parking-slot train (PSs) in at least one of a predetermined first direction and a second direction opposite to the first direction, the at least one parking-slot train being comprised of selected parking slots that are included in the plurality of parking slots and are continuously aligned in at least one of the first direction or the second direction to find the at least one parking-slot train (IV) Performing, based on information related to the at least one parking-slot train, a parking-lot environment determination of whether the vehicle is located in a parking lot Twelfth Technological-Concept Group (F)

A parking-lot environment determination method belonging to a twelfth technological-concept group includes (I) Recognizing, from an input image, a plurality of parking slots (II) Acquiring, based on the plurality of parking slots, at least one parking-slot train (PSs) that is comprised of selected parking slots that are included in the plurality of parking slots and are continuously aligned in a predetermined direction (III) Acquiring, based on the at least one parking-slot train, a parking region (PSg) that includes the at least one parking-slot train and an aisle (PSr) arranged to face the parking-slot train, the vehicle being travelable in the aisle (IV) Extending, upon determination that there is at least one additional parking slot or at least one additional parking-slot train located adjacent to the acquired parking region in the predetermined direction, the parking region in the predetermined direction (V) Performing, based on information related to the extended parking region, a parking-lot environment determination of whether the vehicle is located in a parking lot

The invention claimed is:

1. A method of learning a recognition rule of at least one parking slot around a vehicle, the method comprising:

objectifying at least one parking slot at least partly included in a learning image as an at least one objectified parking slot comprised of (i) a plurality of corner points of the at least one parking slot, (ii) a center point of the at least one parking slot; and (iii) attribute information on the at least one parking slot;

generating annotation data for the objectified at least one parking slot;

executing, from the learning image, learning of a recognition rule of the at least one parking slot based on the generated annotation data for the objectified at least one parking slot;

receiving an input image around the vehicle captured by a camera installed in the vehicle; and determining whether there is at least one target parking slot in the input image in accordance with the learned recognition rule, wherein:

the executing of the learning comprises:

determining whether one or two of the corner points are located outside the learning image;

offsetting, upon determination that the one or two of the corner points are located outside the learning image, the one or two of the corner points into the learning image; and executing, from the learning image, the learning of the recognition rule of the at least one parking slot based on the generated annotation data for the objectified at least one parking slot after offsetting of the one or two of the corner points into the learning image.

2. A method of learning a recognition rule of at least one parking slot around a vehicle, the method comprising:

objectifying at least one parking slot at least partly included in a learning image as an at least one objectified parking slot comprised of (i) a plurality of corner points of the at least one parking slot, (ii) a center point of the at least one parking slot; and (iii) attribute information on the at least one parking slot;

generating annotation data for the objectified at least one parking slot;

executing, from the learning image, learning of a recognition rule of the at least one parking slot based on the generated annotation data for the objectified at least one parking slot, wherein:

the executing of the learning comprises:

determining whether one or two of the corner points are located outside the learning image;

offsetting, upon determination that the one or two of the corner points are located outside the learning image, the one or two of the corner points into the learning image; and executing, from the learning image, the learning of the recognition rule of the at least one parking slot based on the generated annotation data for the objectified at least one parking slot after offsetting of the one or two of the corner points into the learning image.

3. The method according to claim 1, wherein:

the attribute information includes at least one of:

parking-frame information related to a parking frame of the at least one parking slot;

wheel-stopper information on a wheel stopper located in the at least one parking slot; and additional attribute information related to the at least one parking slot, the additional attribute information being different from the parking-frame information and the wheel-stopper information.

4. The method according to claim 1, wherein:

the at least one parking slot comprises a plurality of parking slots, the method further comprising:

calculating the number of one or more of the corner points of at least one of the parking slots, the one or more of the corner points of the at least one of the parking slots being blocked by at least one object other than each of the parking slots, the executing of the learning does not learn the recognition rule of the at least one of the parking slots based on the generated annotation data for the objectified at least one of the parking slots upon determination that the number of the one or more of the corner points of the at least one of the parking slots is more than or equal to a predetermined threshold number.

5. The method according to claim 1, wherein:

the offsetting offsets the one or two of the corner points into the learning image in a predetermined offset direction, the predetermined offset direction being selected to make smaller a change of a shape of the at least one parking slot before and after the offsetting as compared with another offset direction.

6. A method of learning a recognition rule of at least one parking slot around a vehicle, the method comprising:

objectifying at least one parking slot at least partly included in a learning image as an at least one objectified parking slot comprised of (i) a plurality of corner points of the at least one parking slot, (ii) a center point of the at least one parking slot; and (iii) attribute information on the at least one parking slot;

generating annotation data for the objectified at least one parking slot;

executing, from the learning image, learning of a recognition rule of the at least one parking slot based on the generated annotation data for the objectified at least one parking slot;

receiving an input image around the vehicle captured by a camera installed in the vehicle;

determining whether there is at least one target parking slot in the input image in accordance with the learned recognition rule; and calculating, as a blocked amount, an amount of a part of the at least one parking slot being blocked by at least one object other than the at least one parking slot, the executing of the learning sets parking-slot empty information on the at least one parking slot to an undefined state upon determination that the calculated blocked amount of the part of the at least one parking slot is greater than or equal to a threshold amount.

7. The method according to claim 6, wherein:

the calculating of the blocked amount calculates the blocked amount based on a view angle of the vehicle to the at least one parking slot.

8. The method according to claim 1, wherein:

the executing of the learning defines typical orientations of the at least one parking slot, and executes the learning for each of the typical orientations.

9. The method according to claim 8, wherein:

the executing of the learning encodes each of the corner points and the center point of the at least one parking slot for each of the typical orientations to acquire encoded data for each typical orientation, and executes the learning using the encoded data for each typical orientation.

10. The method according to claim 1, further comprising:

recognizing, from the learning image, a plurality of parking slots as the at least one parking slot;

selecting one parking slot from the recognized parking slots as a reference object;

searching, from the reference object, for at least one parking-slot train in at least one of a predetermined first direction and a second direction opposite to the first direction, the at least one parking-slot train being comprised of selected parking slots that are included in the plurality of parking slots and are continuously aligned in at least one of the first direction or the second direction to find the at least one parking-slot train; and performing, based on information related to the at least one parking-slot train, a parking-lot environment determination of whether the vehicle is located in a parking lot.

11. The method according to claim 10, wherein:

the performing of the parking-lot environment determination comprises:

acquiring, based on the at least one parking-slot train, a parking region that includes the at least one parking-slot train and an aisle arranged to face the parking-slot train, the vehicle being travelable in the aisle;

determining that the vehicle is located in a parking lot upon determination that the vehicle has entered the parking region; and determining that the vehicle is not located in a parking lot upon determination that the vehicle has exited from the parking region.

12. The method according to claim 1, further comprising:

recognizing, from the learning image, a plurality of parking slots as the at least one parking slot;

acquiring, based on the plurality of parking slots, at least one parking-slot train that is comprised of selected parking slots that are included in the plurality of parking slots and are continuously aligned in a predetermined direction;

acquiring, based on the at least one parking-slot train, a parking region that includes the at least one parking-slot train and an aisle arranged to face the parking-slot train, the vehicle being travelable in the aisle;

extending, upon determination that there is at least one additional parking slot or at least one additional parking-slot train located adjacent to the acquired parking region in the predetermined direction, the parking region in the predetermined direction; and performing, based on information related to the extended parking region, a parking-lot environment determination of whether the vehicle is located in a parking lot.

13. The method according to claim 12, wherein:

the acquiring of the at least one parking-slot train acquires first and second parking-slot trains as the at least one parking-slot train; and the acquiring of the parking region acquires the parking region that is configured such that the first and second parking-slot trains are located on both sides of the aisle.

14. The method according to claim 12, wherein:

the performing of the parking-lot environment determination comprises:

determining that the vehicle is located in a parking lot upon determination that the vehicle has entered the extended parking region; and determining that the vehicle is not located in a parking lot upon determination that the vehicle has exited from the extended parking region.

15. A method of learning a recognition rule of at least one parking slot around a vehicle, the method comprising:

objectifying at least one parking slot at least partly included in a learning image as an at least one objectified parking slot comprised of (i) a plurality of corner points of the at least one parking slot, (ii) a center point of the at least one parking slot; and (iii) attribute information on the at least one parking slot;

generating annotation data for the objectified at least one parking slot;

executing, from the learning image, learning of a recognition rule of the at least one parking slot based on the generated annotation data for the objectified at least one parking slot;

receiving an input image around the vehicle captured by a camera installed in the vehicle; and determining whether there is at least one target parking slot in the input image in accordance with the learned recognition rule;

recognizing, from the learning image, a plurality of parking slots as the at least one parking slot;

selecting one parking slot from the recognized parking slots as a reference object;

searching, from the reference object, for at least one parking-slot train in at least one of a predetermined first direction and a second direction opposite to the first direction, the at least one parking-slot train being comprised of selected parking slots that are included in the plurality of parking slots and are continuously aligned in at least one of the first direction or the second direction to find the at least one parking-slot train; and performing, based on information related to the at least one parking-slot train, a parking-lot environment determination of whether the vehicle is located in a parking lot, wherein the performing of the parking-lot environment determination comprises:

acquiring, based on the at least one parking-slot train, a parking region that includes the at least one parking-slot train and an aisle arranged to face the parking-slot train, the vehicle being travelable in the aisle;

determining that the vehicle is located in a parking lot upon determination that the vehicle has entered the parking region; and determining that the vehicle is not located in a parking lot upon determination that the vehicle has exited from the parking region, wherein the performing of the parking-lot environment determination performs the parking-lot environment determination that the vehicle is located in a parking lot upon determination that the vehicle has entered the acquired parking region from a specified direction, and does not perform the parking-lot environment determination upon determination that the vehicle has entered the acquired parking region from another direction different from the specified direction.

16. The method according to claim 10, further comprising:

when detecting, upon determination that the vehicle is located in a parking lot, sudden acceleration due to an accelerator misoperation, executing an accelerator-misoperation addressing task including at least one of (i) reducing driving power of the vehicle and (ii) notifying one or more occupants included in the vehicle of an occurrence of the accelerator misoperation.

17. The method according to claim 16, wherein:

the executing of the accelerator-misoperation addressing task determines whether the accelerator misoperation has been continued for a predetermined time after execution of the accelerator-misoperation addressing task, and executes, again, the accelerator-misoperation addressing task upon determination that the accelerator misoperation has been continued for the predetermined time.

18. The method according to claim 16, wherein:

the executing of the accelerator-misoperation addressing task determines, after the accelerator misoperation is cancelled, whether there is a new accelerator misoperation, and executes, again, the accelerator-misoperation addressing task upon determination that there is a new accelerator misoperation after the accelerator misoperation is cancelled.

19. An apparatus for learning a recognition rule of at least one parking slot around a vehicle, the apparatus comprising:

a non-transitory memory device storing learning program instructions; and a processor configured to execute the learning program instructions to:

objectify at least one parking slot at least partly included in a learning image as an at least one objectified parking slot comprised of (i) a plurality of corner points of the at least one parking slot, (ii) a center point of the at least one parking slot; and (iii) attribute information on the at least one parking slot;

generate annotation data for the objectified at least one parking slot;

execute, from the learning image, learning of a recognition rule of the at least one parking slot based on the generated annotation data for the objectified at least one parking slot, wherein:

the executing of the learning comprises:

determining whether one or two of the corner points are located outside the learning image;

offsetting, upon determination that the one or two of the corner points are located outside the learning image, the one or two of the corner points into the learning image; and executing, from the learning image, the learning of the recognition rule of the at least one parking slot based on the generated annotation data for the objectified at least one parking slot after offsetting of the one or two of the corner points into the learning image.

20. A method of learning a recognition rule of at least one parking slot around a vehicle, the method comprising:

objectifying at least one parking slot at least partly included in a learning image as an at least one objectified parking slot comprised of (i) a plurality of corner points of the at least one parking slot, (ii) a center point of the at least one parking slot; and (iii) attribute information on the at least one parking slot;

generating annotation data for the objectified at least one parking slot;

executing, from the learning image, learning of a recognition rule of the at least one parking slot based on the generated annotation data for the objectified at least one parking slot;

receiving an input image around the vehicle captured by a camera installed in the vehicle;

determining whether there is at least one target parking slot in the input image in accordance with the learned recognition rule;

recognizing, from the learning image, a plurality of parking slots as the at least one parking slot;

acquiring, based on the plurality of parking slots, at least one parking-slot train that is comprised of selected parking slots that are included in the plurality of parking slots and are continuously aligned in a predetermined direction;

acquiring, based on the at least one parking-slot train, a parking region that includes the at least one parking-slot train and an aisle arranged to face the parking-slot train, the vehicle being travelable in the aisle;

extending, upon determination that there is at least one additional parking slot or at least one additional parking-slot train located adjacent to the acquired parking region in the predetermined direction, the parking region in the predetermined direction; and performing, based on information related to the extended parking region, a parking-lot environment determination of whether the vehicle is located in a parking lot, wherein the performing of the parking-lot environment determination performs the parking-lot environment determination that the vehicle is located in a parking lot upon determination that the vehicle has entered the extended parking region from a specified direction, and does not perform the parking-lot environment determination upon determination that the vehicle has entered the extended parking region from another direction different from the specified direction.

* * * * *